United States Patent [19]
Miller et al.

[11] Patent Number: 4,656,475
[45] Date of Patent: Apr. 7, 1987

[54] METHOD AND APPARATUS FOR CONTROLLING DISTRIBUTED ELECTRICAL LOADS

[75] Inventors: Edward B. Miller, West Warwick, R.I.; Charles W. Eichelberger, Schenectady, N.Y.

[73] Assignee: General Electric Company, Cleveland, Ohio

[21] Appl. No.: 729,425

[22] Filed: May 1, 1985

Related U.S. Application Data

[62] Division of Ser. No. 325,031, Nov. 25, 1981, Pat. No. 4,535,332, which is a division of Ser. No. 89,478, Oct. 30, 1979, abandoned.

[51] Int. Cl.$^4$ .............................................. H04Q 9/00
[52] U.S. Cl. ............................ 340/825.06; 340/825.5
[58] Field of Search ........... 340/825.5, 825.51, 825.06; 370/61, 79, 94, 108; 371/32, 69

[56] References Cited

U.S. PATENT DOCUMENTS

| | | | |
|---|---|---|---|
| 3,854,122 | 12/1974 | Cross | 340/825.06 |
| 3,919,461 | 11/1975 | Hunting et al. | 340/825.5 |
| 4,019,172 | 4/1977 | Srodes | 340/825.06 |
| 4,032,893 | 6/1977 | Moran | 340/825.83 |
| 4,054,949 | 10/1977 | Takezoe | 371/32 |
| 4,090,248 | 5/1978 | Swanson et al. | 340/825.06 |
| 4,145,735 | 3/1979 | Soga | 340/825.51 |
| 4,156,866 | 5/1979 | Miller | 371/69 |
| 4,173,754 | 11/1979 | Feiker | 340/825.52 |
| 4,199,663 | 4/1980 | Herzog | 370/108 |
| 4,271,507 | 6/1981 | Gable et al. | 370/79 |
| 4,429,299 | 1/1984 | Kabat et al. | 340/825.52 |

Primary Examiner—Donald J. Yusko
Attorney, Agent, or Firm—Cushman, Darby & Cushman

[57] ABSTRACT

An apparatus for controlling distributed electrical loads including a microprocessor based central controller coupled via a twisted pair bi-directional data line to a plurality of microcomputer based transceiver decoders. Each transceiver decoder is coupled to a plurality of relays, each relay associated with a particular load to be controlled. Override switches and sensors, coupled to transceiver decoders provide override requests and information related to ambient conditions at the site of a load. A user defined data base includes sub-sets of relays called sectors, patterns of relay states, remote switches, a time dependent schedule and condition responses. A communication protocall and arbitration scheme provide for interactive communication between the central controller and each transceiver decoder with interfacing with the operation of any other transceiver decoder. Enhanced data storage capacity is achieved through dynamic allocation of memory space for pattern data.

9 Claims, 45 Drawing Figures

SEQUENCE OF TRANSMISSION FROM TRANSCEIVER/DECODER

DATA LINE ARBITRATION

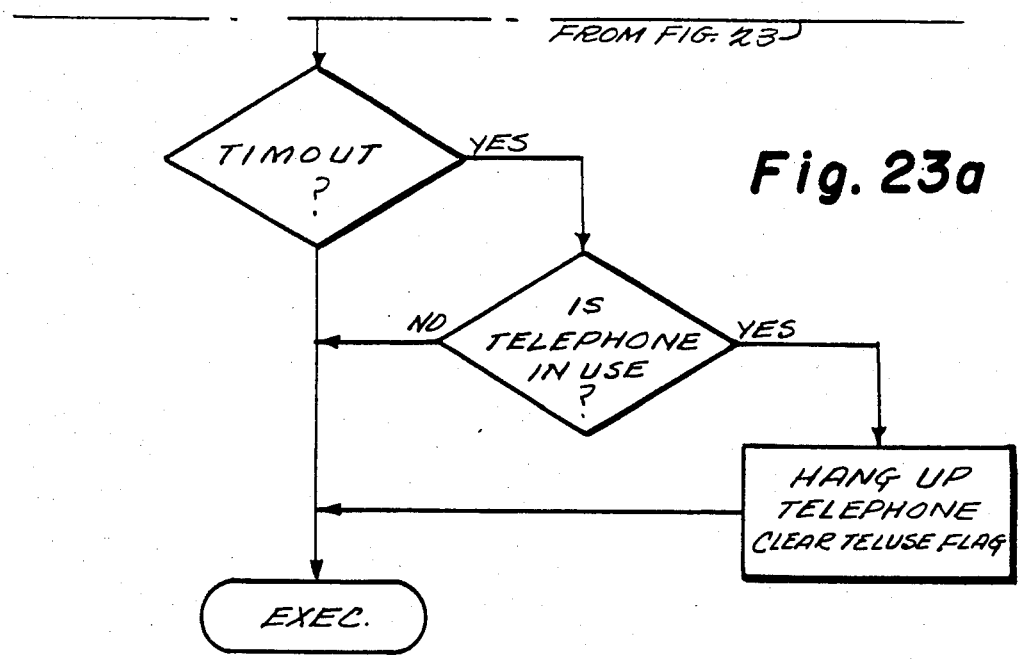

| Area | Address |
|---|---|
| PRIORITY OVERRIDE AREA | BA58 |
| CURRENT RELAY TABLE ? | B66E / B66D |
| CODED AREA | B284 / B273 |
| PRIORITY CHECKSUM | B278 |
| PRIORITY ERASE TIME | B276 / B266 |
| SWITCH CHECKSUM | B263 |
| SWITCH DEFINITION AREA | B262 / A2BF |
| SECTOR CHECKSUM | A2BC |
| SECTOR DEFINITION AREA | A2BB / 7180 |
| SCHEDULE CHECKSUM | 71AD |
| ALTERNATE SCHEDULE-2 (9TH DAY) | 710D |
| ALTERNATE SCHEDULE-1 (8TH DAY) | 7071 |
| MAIN SCHEDULE AREA | 5E15 / 5E14 |
| PATTERN CHECKSUM VALVE | 5E12 / 5E11 |
| PATTERN STORAGE AREA | 4000 |

Fig. 25

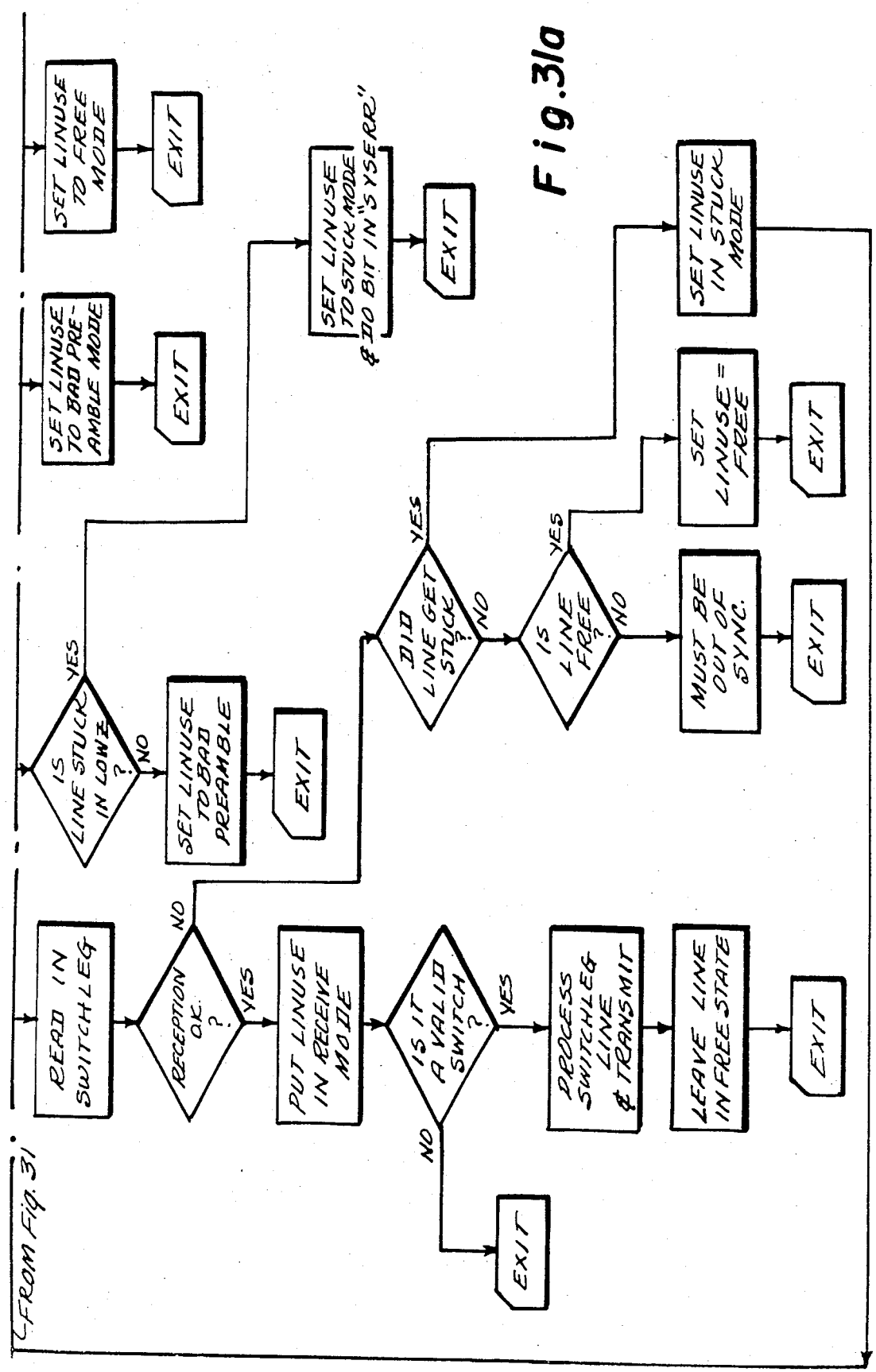

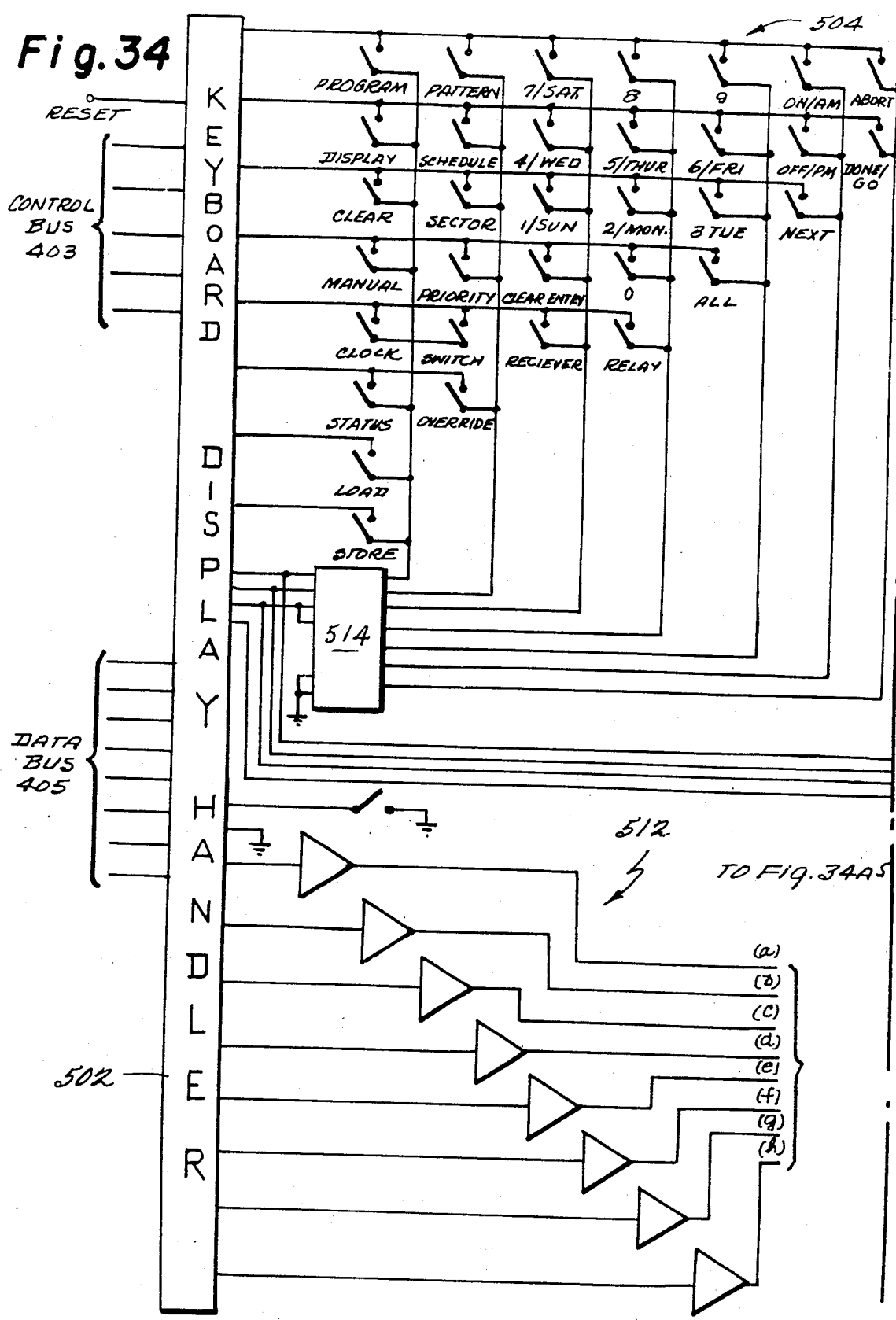

METHOD AND APPARATUS FOR CONTROLLING DISTRIBUTED ELECTRICAL LOADS

This is a division of application Ser. No. 325,031, filed Nov. 25, 1981, now U.S. Pat. No. 4,535,332, which was a division of Ser. No. 89,478, filed Oct. 30, 1979, now abandoned.

Table of Contents

Introduction
Brief Description of the drawings
DETAILED DESCRIPTION OF THE PREFERRED EMBODIMENT
System Overview
Communications Link
Modified Ratio Signaling
Data Line Arbitration
Transceiver decoder—hardware
Data Stream Format
Transceiver Decoder Microcomputer-Connections
Transceiver Decoder Data I/O
Analog Sensor Section
Watchdog Reset
Switchleg Input
Relay Drivers
Transceiver Decoder Microcomputer Logic Function
Controller Hardware Overview
Memory Access Hardware and Battery Back-up
Data Line Coupling to Controller
Magnetic Tape
System Definitions
Firmware Overview
Flag Words
Telephone
Data Line Maintenance
Relay Check
Priority Override
Alternate Schedules
Dynamic Allocation of Pattern Data
Keyboard
Summary
Appendix A—ROM Code for Microcomputer 100
Appendix B—for machine Code for Controller 50
CLAIMS

INTRODUCTION

This invention generally relates to methods and apparatus for controlling distributed electrical loads. This invention also relates to novel components, combinations and subcombinations capable of implementing such control. More particularly, it relates to a programmable microprocessor based system having a central controller under program control which communicates with plural distributed microprocessor-based transceiver decoders (also referred to as transceivers) connected together through a common communication channel (e.g. an unshielded twisted pair of wires in the presently preferred embodiment). Remotely located switches and/or sensor devices can be employed throughout the system for modifying the nominally defined time-dependent schedule of load control functions and for rendering the system condition responsive. Control inputs may also be received at the central processor site via telephone connections. As disclosed in the presently preferred, nonlimiting, specific exemplary embodiment, the system is used to control the distributed lighting loads throughout a building, cluster of related buildings, a building site, etc. However, the system is capable of controlling virtually any type of electrical load according to a user defined schedule and/or according to conditions sensed at remote locations. Such loads could include heating systems, air-conditioning systems, etc.

Programmable electrical load control systems of this general type have been known and proposed heretofore by the applicants and/or their assignee. For example, a microprocessor based distributed control system for lighting loads in a building was disclosed by T. K. McGowan and G. E. Feiker in an article entitled "A New Approach to Lighting System Control" published in the Journal of IES, October 1976 (pages 38-43) and a subsequent discussion of this article by others appears at pages 125-126 of the January 1977 issue of that Journal.

An early approach is described in two pending, commonly assigned, U.S. patent applications:
 a. Ser. No. 809,939, filed June 24, 1977, entitled Distribution Control System and naming George E. Feiker as inventor now issued at U.S. Pat. No. 4,173,754; and
 b. Ser. No. 029,614, filed Apr. 13, 1979, as a division of Ser. No. 809,939, entitled Distribution Control System and filed Apr. 13, 1979, naming George E. Feiker as inventor now issued as U.S. Pat. No. 4,185,272.

Feiker was instrumental in having a first rudimentary lighting control system developed and installed in a single room at the Nela Park Plant of General Electric in Cleveland, Oh. Some of the actual design work was done by C. Eichelberger for this first rudimentary lighting control. This installation is described in the article entitled "A New Approach to Lighting System Control" by T. K. McGowan and G. E. Feiker along with some projections of alternative ways to achieve similar results.

A system for reducing noise error was developed and is the subject matter of U.S. Pat. No. 4,091,361 issued on application Ser. No. 748,932, filed Dec. 9, 1976 for Noise-Immune Carrier Current Actuated Control; naming Charles W. Eichelberger and Philip M. Garratt inventors.

Based on a substantially different approach to lighting control, the present applicants designed and installed an experimental "first generation" system which incorporates several improvements. This first generation system and several features thereof are described in earlier copending, commonly assigned, patent applications or issued patents the texts of which are incorporated herein by reference:
 a. Application Ser. No. 966,816 filed Dec. 6, 1978 entitled Programmable Energy Load Controller System & Methods and naming Charles W. Eichelberger and Edward B. Miller as inventor now issued as U.S. Pat. No. 4,213,182;
 b. Application Ser. No. 871,988, filed Jan. 24, 1978 entitled Load Control Processor and naming Edward B. Miller and Charles W. Eichelberger as inventors; now issued as U.S. Pat. No. 4,167,786.
 c. Application Ser. No. 871,991, filed Jan. 24, 1978 entitled Interface Driver Circuit and naming Edward B. Miller and Charles W. Eichelbeger as inventors;
 d. Application Ser. No. 871,990, filed Jan. 24, 1978, and entitled Programmable Real Time Clock and naming Charles E. Eichelberger and Edward B. Miller as inventors now issued as U.S. Pat. No. 4,168,531.

While the prior art load control systems just referenced have been successfully operated at an experimental test site so as to produce significant energy savings which permit the cost of such a system to be recovered in a very short time, operating experience with these earlier prior art systems has also revealed several areas where further significant improvements in operating convenience and capability would be highly advantageous. We have now discovered many such improved features which are incorporated in the "second generation" control system of this invention.

One of the primary commercial applications for programmable load control is for the control of lighting, particularly for large office buildings, or groups of office buildings. Effective lighting control requires achieving the right amount of light where it is needed and when it is needed. Energy and money are wasted when there is too much or too little light for a particular task, when lights are on where not needed and when lights are not on when needed. In a typical office, lighting accounts for 30-40% of the total electrical load and in many cases a substantial amount of this light is wasted by having lights on when not needed or on at higher levels than required.

In addition to energy savings, better lighting control can increase flexibility in future use of office space. Control of individual fixtures can allow offices, classrooms or other space to be rearranged and partitions moved without expensive, hard wiring changes. With adequate control, ceiling systems can remain unchanged even when work areas are rearranged. Furthermore, the ability to control individual fixtures also permits finely tuned lighting arrangements for different activities, for example, normal lighting or desk work; reduced lighting for conferences; and dim lighting for slides, security lighting, etc.

Since lighting relates to people and tasks, the ability to control lighting can be used to control the use of space. For example, unwanted use of an area can be minimized by not allowing the lighting to be controlled by unauthorized personnel. Thus, the use of conference rooms can be curtailed for unauthorized meetings or as temporary work areas for tasks which should be performed in offices.

In a typical office building, using circuit breaker control, around 6:00 a.m. when people start arriving, the lights on each floor would be turned on by the first person to arrive. The lights would stay on, at full intensity all day. About 6:30 p.m. when most offices are empty, a guard would begin to switch off lights. A cleaning crew would begin work about this time and hopefully switches off each floor as they finish. By 11:30 p.m. when the cleaning crew is finished, all lights should be off. This scenario for a typical office building inherently includes a significant degree of energy waste. For example, lights are on when people are not in the area, near the beginning of each working day and during lunch hour. There is no way to provide a lower light level for tasks which do not require strong lighting. It may be appropriate that cleaning and maintenance chores in the evening be performed at a lower light level than could be used for the routine work of office workers during the day. In addition, the amount of daylight near window areas is not taken into account. It is not necessary to light areas near windows to the same extent that more internal ofice areas must be lit.

The programmable load control system as set forth herein allows for control over these built-in energy wasting situations. It calls for the automatic shutting off of lights during the progammed non-use times while permitting selected overrides for providing light in the immediate area of a person working outside his normal hours. It allows light levels to be altered in accordance with a pre-defined schedule such that tasks performed at or during preset times requiring a lower light level than normal will not waste power. Futhermore, in areas near windows, where daylight adds a substantial amount of light, a photo relay is used to automatically reduce lighting levels when adequate sunlight is available.

The difference in energy cost for the normal electrical load for a typical office building and that for a building controlled by the present invention is substantial. A typical payback time for the cost of installation of the control system is 1-2 years.

The presently described system for distributed electrical load control for lighting provides a degree of flexibility and economy not previously available with any prior system. It uses mechanically latching relays to control groups of lighting fixtures or other loads. These relays are turned on or off by a 24-volt pulse. However, the relays are not hard wired to manual switches, time switches, photocells, etc. All control comes from a central controller, through a data line to a transceiver decoder associated with the relay to be operated.

The central controller utilized in the present system is micro-computer based and has an internal program providing the function of a user programmable load control system. It incorporates a 7-day clock and provides minute-by-minute control of the entire load system including up to 8000 separate relays according to a predetermined schedule when operating in its automatic mode. The data format selected would allow the use of up to 16,000 relays. However, the memory space available in the memories selected for this presently preferred embodiment limits the number of relays to 8,000. A load control schedule can be entered manually through a keyboard or by reading mark-sense cards through a cardreader. In addition to the automatic schedule, any lighting circuit can be controlled manually from the keyboard of the central controller when operating in its manual mode. The central controller also provides monitoring of the system and can display the on/off state of each relay. If hard copy records are desired, the controller can print data out through a standard printer.

A low voltage twisted pair data line running throughout a building under load control forms a communication channel which connects the central controller to a plurality of transceiver decoders and provides for two-way (bi-directional) communications between the controller and each of the transceiver decoders.

Up to 32 relays are coupled to each transceiver decoder. Each relay turns on and off a particular load in response to a command from the central controller, propagated through the data line to its associated transceiver decoder. The transceiver decoder is generally located near the loads to be controlled by its relays so as to minimize the amount of hard wiring needed. The transceiver decoder receives a signal from the central controller over the data line when one of its relays is to be opened or closed and transmits an activating pulse to the relay.

Communication between the controller and each of the transceivers is bi-directional. Each transceiver decoder can send a message to the controller requesting that the controller issue a command to alter the state of a particular load.

Each transceiver decoder has 8 switchleg inputs which can be connected to manually operable or condition responsive switches, either of the momentary or maintained contact type. Each switch can control "on" or "off" a designated subset of lighting control relays, known as a sector, anywhere in the building. This is accomplished by activating a switch causing the transceiver decoder to send a signal through the data line to the central controller. The central controller interprets that signal and determines which relays require activation and in turn sends a signal to the transceiver decoder involved for actuating the relays associated with the lights to be turned on or off. Automatically actuated switches such as photo-relays can be connected to a switchleg input of a transceiver decoder for condition responsive automatic control such as fire and smoke detection.

Analog sensors such as thermistors or photo-transistors can be wired to a transceiver decoder through an analog sensor input circuit in each transceiver decoder. These analog sensing devices are interrogated (polled) by the central controller which may decide to send a command to a transceiver decoder to operate selected relays. The analog sensors enhance the condition responsive capability of the system. Any condition that can be sensed and transformed into a variable impedance or variable voltage condition can be polled by the central controller so as to make the system responsive to that condition.

The central controller can also accept manual override from a standard telephone of those sectors that have been user defined to have "priority" status. By connecting the telephone system to the central controller, any group of relays can be controlled by any Touchtone ™ or push-botton telephone (with appropriate interface equipment a standard dial telephone access is possible).

The system is highly adaptable to changes in space utilization and to personnel shifts. Simply by altering the data base originally defined by the user, time dependent schedule changes can be made, different subsets of loads to be controlled simultaneously can be defined and switches can be programmed to control different loads. This flexibility is achieved by the entry of new data to replace previously entered data. Such data replacement can be accomplished either by reading cards or by making keyboard entries and does not require expensive re-wiring. The system can be easily expanded by extending the twisted pair data line and adding more transceiver decoders without affecting the existing installation. For excessively long data lines, repeaters (boosters) can be used. Therefore there is no practical limitation of system size other than the address space of the data structure (a ten bit address specifies 1024 unique devices). More than 1024 transceiver decoders can be used if multiple transceiver decoders are to respond to an identical address.

In the earlier referenced prior art systems, the central controller was generally in one way communication with the remote distributed receiver/decoders which, in turn, controlled a bank of up to 16 relays. However, the present second generation system of this invention now provides for bi-directional data communication between the central controller and plural remote distributed transceiver decoder units which can each control a plurality of relays. Futhermore, provisions are now made for remotely located switchlegs connected to any desired transceiver decoder as remote inputs to the central controller. That is, the actuation of a specific remotely located switchleg will cause a unique signal to be transmitted back to the central controller. The controller, in turn, will interpret such actuation in accordance with a desired programmable function. Typically, such a remote switchleg might be used by the controller to modify the lighting load in a predetermined area of the building. However, with subsequent reorganization of furniture, office walls, etc., the particular sector of lighting load affected by the switchleg can be redefined (i.e., different relays associated with a sector number) as desired. Furthermore, the function controlled by such a remote switchleg could be re-programmed at will to control other lighting loads remote from the switchleg, heating or air conditioning loads, or any other control functions as might be appropriate.

Bi-directional communication with the central processor also permits the use of remotely located electrical sensors (i.e., photocells, thermisters, etc.) so as to remotely control selected, programmable functions. For example, light sensors at the periphery of a building might be used to control the lighting load at the periphery of the building in response to ambient light levels incident through transparent window panes or the like. Proximity sensors might also be used to control loads as a function of human presence.

The microprocessors used in the present exemplary embodiment of this invention (one microprocessor is each transceiver decoder and one in the controller) are controlled by programs permanently embodied as firmware in a read only memory (ROM). Accordingly, once the ROM has been appropriately structured (e.g., by initial IC manufacturing techniques or by selectively severing fusable links within the ROM or by injecting charge under oxides (floating gate avalanche injected metal oxide semiconductor), the entire system of interconnected integrated circuits, discrete components, and the like becomes a fixed-purpose control system defined by a unique physical structure—albeit certain control functions remain "programmable" by altering the user defined data base stored in RAM devices or the like. However, as those in the art will appreciate, similar systems can be realized by storing the control determining program in other forms of memory devices which are not permanently altered by their content values (e.g., read/write memory devices such as a RAM or a PROM). Furthermore, many of the digital microprocessor-based circuit operations in the present exemplary embodiment could be realized in analog discrete and/or integrated circuits (e.g., a phase-lock oscillator loop as described below). While the presently preferred exemplary embodiment thus includes a fixed-purpose computer, it should be appreciated that this invention can be realized in many other equivalent forms without in any way departing from the novel and patentable features of this invention.

The data structures employed for controlling loads have been organized in this invention so as to provide a more flexible, convenient and comprehensive system operation. For example, a greater number of load control patterns than were feasible using the referenced prior art teachings (e.g., the "on" and "off" state of each controlled relay in the system or part of a system may comprise a pattern) are realized by using variable length records, by permitting the definition of partial load definition patterns and by dynamically allocating the available memory locations for such pattern data.

Furthermore, in the present invention as contrasted with prior art inventions referenced above greater system flexibility is achieved by pemitting the time dependent scheduling of sectors rather than of entire load patterns. A sector is defined as a particular sub-set of all the system relays. In turn, when a particular sector is scheduled (for a particular day of the week and time of the day) a particular one of a plurality of separate available and predefined patterns is also identified. Since patterns can be defined as sub-patterns to include less than all of the system transceivers (but all relays for any transceiver included in a given pattern or subpattern must be defined therein) and since there is virtually no limit to the number of sectors that can be defined (including overlapping subsets of relays), the actual programming of desired load control functions for a given building can be defined with virtually unlimited flexibility.

According to the commonly assigned prior art system referred to above, one was limited to the scheduling of a relatively small number of patterns where each pattern included all relays in the system. However, using the new virtually unlimited flexibility of the second generation system of this invention, all kinds of peculiar operating conditions can be easily accommodated. For example, employees on different "flex time" hours of work can be easily accommodated. Furthermore, when one group of employees at some location in the building changes its desired flex time hours, such changes may be easily accommodated. Applicants know of no other system providing a degree of flexibility adaptable to "flex time". Furthermore, where a building has many different tenants, the peculiar operting modes for any given tenant can be more easily accommodated with this second generation system of scheduling sectors rather than patterns.

Accordingly, the novel organization of data storge structures, their identification, and their intended meaning within the second generation system of this invention offer significant advantages over the prior art.

The second generation system of this invention also permits sectors to be defined and controlled, if desired, such that no remote input can achieve a priority override.

In the normal (automatic control) mode of this invention, the central controller constantly self-diagnoses the system for various types of faults or errors. For example, the integrity of the data communications circuit is tested from time to time. After instructing a remote transceiver to control a relay to a particular state, the central controller can obtain feedback information from the transceiver so that it may verify that the intended relay actually was controlled as intended. If any of these automated system testing procedures detects a problem, the system operator is notified via communications on the processor console. At that time, the operator may enter a manual control mode during which normal scheduling and automatic functioning of the processor is temporarily interrupted. In the manual control mode, the operator can cause any sector to assume a desired relay state without regard to the scheduled program.

In the presently preferred exemplary embodiment, all of the transceivers are interconnected to the central controller over a common twisted pair of electrical conductors which are typically unshielded. Communications are bi-directional between the central controller and any of the transceivers (possibly as many as a thousand or so). Furthermore, each transceiver is also microprocessor-based and may initiate a transmission at any arbitrary time (asynchronously) in response to control inputs from connected switchlegs, electrical transducers, etc.

A form of pulse width modulation (modified ratio signalling) is used to transmit a serial bit stream. The data is transmitted in blocks of 40 bits and preceded by an inter-block gap and a predefined preamble.

Prior to transmission on the common party line, any given device first of all monitors the line to see if it is free. A desired transmission is delayed until the line is found to be free. Nevertheless, with so many separate devices all independently capable of arbitrary communication initiation times, it will not be uncommon for two or more transceiver decoders to simultaneously sense a free line and to begin simultaneous transmissions. Indeed, if two or more devices have data to send and are waiting to send such data because the line is currently being used by another device, they may well both find the line free at the same time and begin transmitting simultaneously.

A special bus arbitration technique is therefore employed in such circumstances to cause all but one of the interferring transceivers to drop out of operation while yet permitting the one selected transceiver to continue its data transmission without any loss of any of the data which any transceiver has begun transmiting. For example, if two transceivers begin simultaneous transmission, the state of the transmission line will be identical anyway through the inter-block gap (2-6 milliseconds) and the preamble of 50% duty cycle pulses (during which a phase lock loop is used to lock a clock oscillator onto the correct frequency for interpreting the following 40 bits of data). While the data is actually being transmitted, each transceiver does a bitwise read-after-write sampling of the common transmission line. If the bit that is read is not the same as that which the transceiver just attempted to transmit, then this is taken as an indication that another transceiver is transmitting different data (by holding the transmission line at a low impedance level for a longer time or sending different data bits during the pulse width modulation transmission of a single bit) and the transceiver which has detected this difference then drops out, aborts its attempted data transmission, saves its data, and waits to try again the next time it detects the data line as being free.

Accordingly, as soon as competing transceivers attempt to transmit differing data bits during the same bit cell, the transceiver decoder which has attempted unsuccessfully to transmit a high impedance signal on the data bus (which is still being held at a low impedance value by another transceiver) will immediately detect this condition and abort any further transmission attempts until the line is again detected as being free (such as by detecting a high impedance bus line condition which persists for more than three nominal bit periods). In this way, only one of the transceivers will continue to transmit all of its 40 bits and they will be transmitted without any interference from other transceivers in spite of the fact that the other transceivers may have initially been competing to transmit their own data at the same time.

Each transceiver in this second generation system of this invention is capable of several different modes of opeation. For example, in one mode it may accept data transmitted from the central controller relating to desired controlled relay states. In another mode, it may transmit the existing controlled relay states back to the central processor. In yet another mode, it may transmit data to the central processor repesenting the current value of a connected electrical sensor (e.g., photocell, thermistor, etc.). In yet another mode, it may transmit data back to the central processor indicating that a particular connected switchleg has been activated. In the presently preferred exemplary embodiment, the data bit stream (e.g., 40 bits) includes a special function word (e.g., 3 bits) which is utilized to select the different modes of transceiver operation and/or to provide for enhanced data security or for specifying the correct interpretation to be accorded the remaining bits of a given data block.

The self-diagnosis of transceiver decoder failures (i.e., failure of a transceiver to confirm that it has carried out a prior instruction with respect to a particular relay or respond to any command or status check from the central controller) is followed by continuous re-interrogation of that particular transceiver until either the manual mode is entered by the operator or until the diagnosed transceiver failure is self-cleared by successfully receiving a transmission from that paticular transceiver. Thereafter, if the transceiver has not confirmed a correct state for the relay in question, appropriate instructions are re-transmitted and the whole cycle of relay state verification and failure self-diagnosis is carried out again.

If the data line becomes stuck in a low impedance state, then it is assumed that one of the connected transceiver decoders has seriously malfunctioned or that there is an electrical short on the data line. Each of the transceiver decoders is connected to the common data line through a fusable link. Accordingly, if the low impedance condition exists in a given transceiver, it may be physically disconnected from the data line by driving a relatively high current (e.g., 1 amp) pulse down the data line. The central processor is programmed so as to carry out this self-correcting function whenever the data bus is detected as being stuck in a low impedance state.

If a whole sequence of successive transceivers are self-diagnosed as failing to communicate, it probably indicates an open condition in the common data line and the approximate location of the open condition can be deduced by noting the location of the group of transceivers for which failures are indicated.

A non-volatile storage system such as a magnetic tape micro-cassette device is utilized for storing programmable data (i.e., schedules, patterns, sector identification, etc.). In the event of power failures or for any other desired reason, the program information for a particular system can then be read into the central processor from this micro-cassette. However, because the micro-cassette tape drives presently available are not of very high quality for use in digital systems, special clocking techniques have been employed. For example, because the frequency of digital signals read off the micro-cassette will normally vary significantly during the course of a given reading of the tape, special resynchronization self-clocking techniques are utilized to keep a clock circuit synchronized with the data being read from the tape. In the presently preferred exemplary embodiment, a continuous weighted average of detected data pulses is used to resynchronize the clock circuit. This results in a continuous lock on the clock frequency with the most recently detected bit frequency being the most effective in controlling the clock frequency. Using this technique, variations of bit frequency approaching 50% in only a single clock cycle may still be successfully read.

BRIEF DESCRIPTION OF THE DRAWINGS

These and other objects and advantages of this invention will be more completely understood by study of the following detailed description of the presently preferred exemplary embodiment of this invention in conjunction with the accompanying drawings, wherein:

FIGS. 23 and 23a are a flow chart showing the updating function of the pseudo clock interrupt;

FIG. 25 is a more detailed diagram of the memory storage areas within the controller's RAM;

FIGS. 31 and 31a are a flow chart illustrating the data line checker task;

FIG. 32 is a diagram illustrating the dynamic allocation of memory storage areas within the controller's RAM;

Figures 33A, 33B:
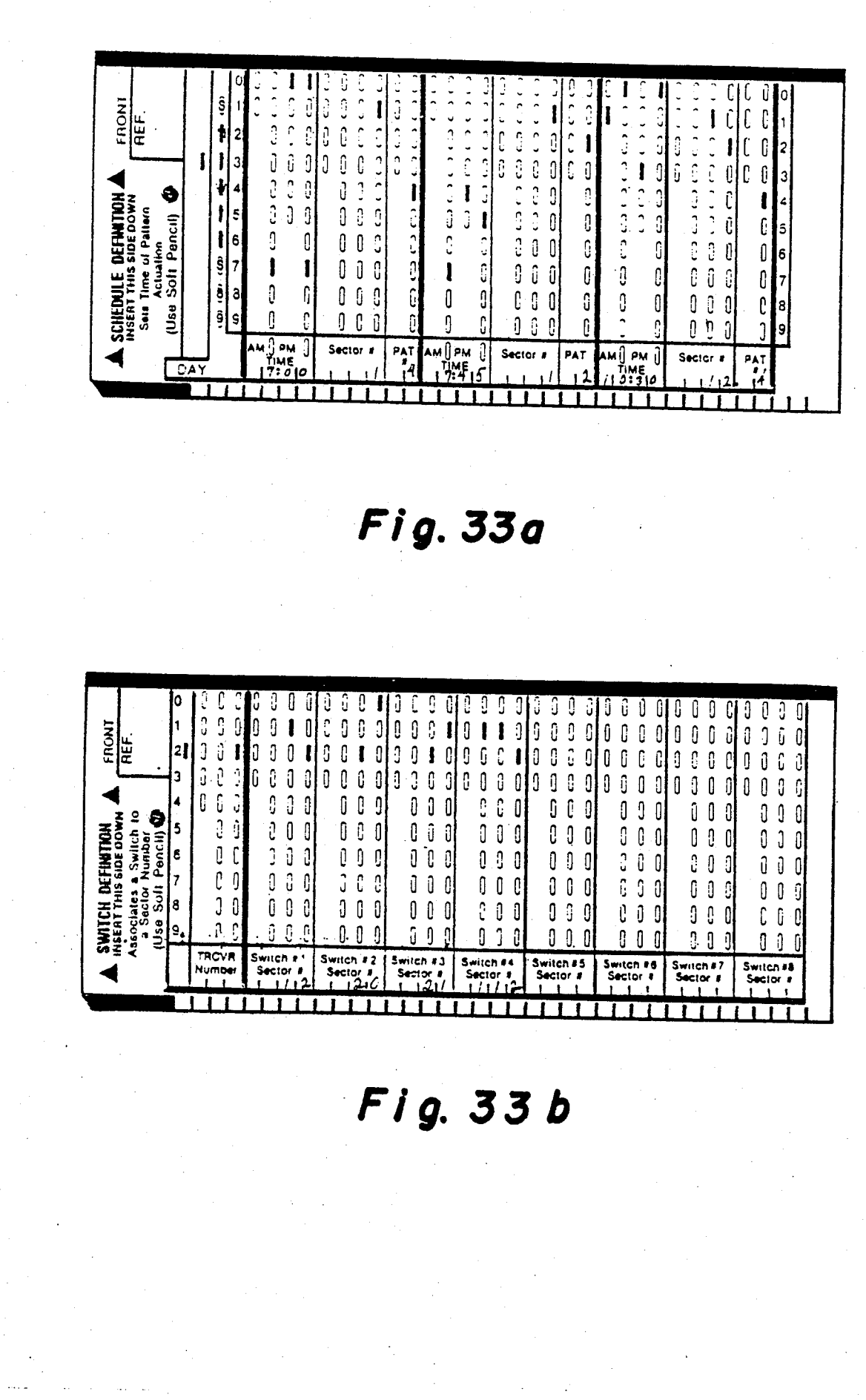
Figures 33C, 33D:
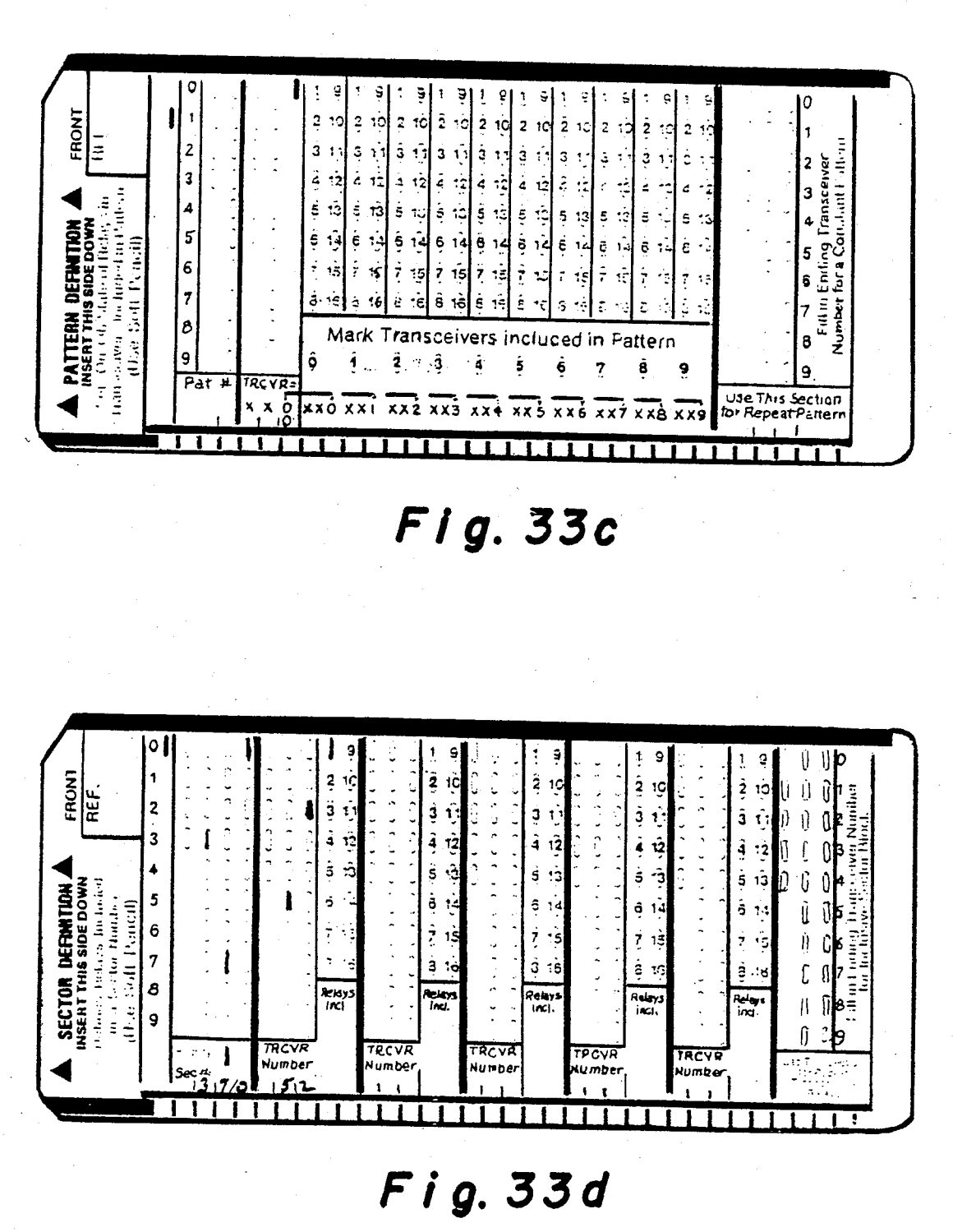

FIGS. 33(a), 33(b), 33(c), and 33(d) are photocopies of mark-sense data input cards (partially completed for particular data) for use with the exemplary embodiment.

FIGS. 34 and 34a are a schematic diagram of the keyboard and interface; and

DETAILED DESCRIPTION OF THE PREFERRED EMBODIMENT

System Overview

Figure 1:
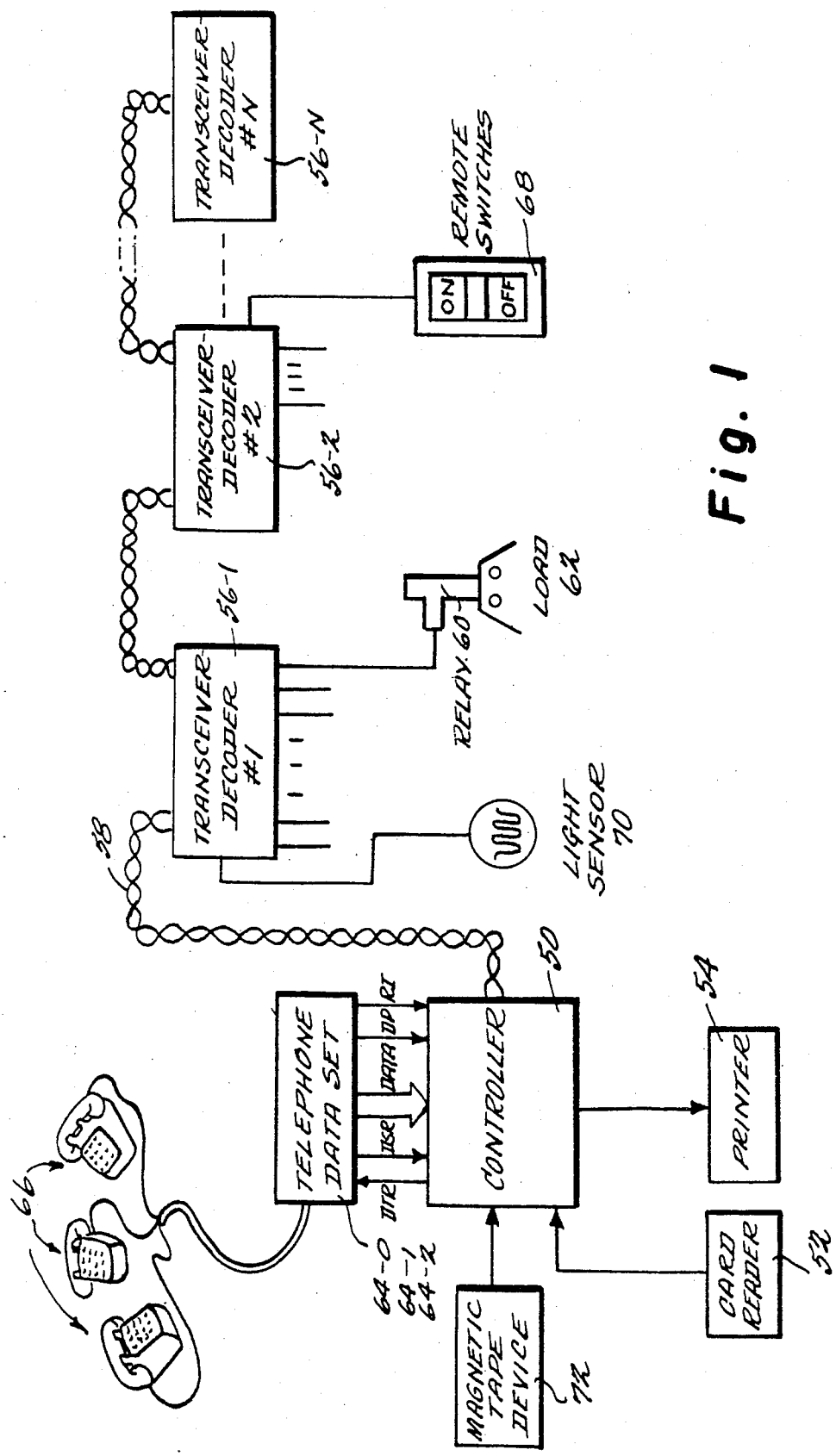
FIG. 1 is a general block and pictorial diagram of the apparatus for controlling distributed electrical loads according to the present invention.

Referring now to FIG. 1, there is shown a general block and pictorial diagram of the apparatus for controlling distributed electrical loads according to the present invention.

The heart of the apparatus for controlling distributed electrical loads is a central controller 50 which automatically controls a user-defined, time-dependent lighting schedule in accordance with a built-in 7-day clock. Operating in a manual mode, controller 50 provides for control of any lighting circuit through its keyboard (not shown in this Figure). For operation in its automatic mode, controller 50 accepts a user defined data base specifying sectors to be controlled (which relays are defined to be in each sector), patterns specifying the states of all relays or any subset of relays, time schedules (when a particular sector or sectors will assume the relay states defined by a particular pattern), switches and condition responsive switchleg inputs (which relays will be activated in response to each particular switch), and condition responsive relationships controlled by analog sensors (a user determines the criteria for analog sensor activation). This data is entered through its keyboard or via mark-sense data cards. Mark-sense data cards carrying scheduling, sector and priority status (including priority erase time), switch, and pattern information are read by a card reader 52 coupled to controller 50. A printer 54 can be coupled to controller 50 to provide a hard copy printout of the user supplied data base, a list of the status of all relays, any priority sector overrides that are in effect and the total number of relays in an "on" state along with the day and time.

Controller 50 is coupled to a plurality of transceiver decoders 56 (labeled 56 (1), 56 (2), . . . 56 (N)) in the figure. The coupling from controller 50 to transceiver decoders 56 is achieved via a data line 58 constituted by a twisted pair of wires. Data line 58 provides a bi-directional communications channel for communication between controller 50 and any of transceiver decoders 56. Associated with each transceiver decoder 56 are a plurality of relays 60 (up to 32 relays) for turning "on" or "off" individual loads 62.

All commands including those resulting from a condition response for changing the state of a relay 60 (and its associated load 62) come from controller 50. However, controller 50 can be requested by a user to initiate a command for changing the status of a particular relay 60 and its associated load 62. Through telephone data sets 64, up to three users can simultaneously access controller 50 via telephones 66. Telephone data sets 64-0, 64-1 and 64-2 provide for interface between controller 50 and the standard public telephone system so that a user can call controller 50 from any location desired. For example, a user could initiate a lighting control function from his home by calling controller 50 through data set 64 before he leaves for the office. Secret codes can be employed to restrict telephone access to authorized persons only.

It is also possible to communicate with controller 50 via transceiver decoders 56. Each transceiver decoder 56 includes provisions for remote switches 68 to be coupled to switchleg inputs thereof. Activation of a remote switch 68, either of the momentary type or maintain type, will cause its associated transceiver decoder 56 to communicate with central controller 50 so as to request a lighting control command to be issued thereby. Sensors having a switch output can be substituted for a manually operable switch (such as switch 68 shown in FIG. 1) to permit a condition responsive override (i.e., fire or smoke detector having a relay output that closes when heat or smoke levels exceed predetermined thresholds).

In addition, analog sensing devices such as a light sensor 70 can be coupled to an analog sensor input section of transceiver decoder 56. These sensors can be polled (interrogated) by controller 50 to provide information related to light levels, heat levels, etc. Based upon the information provided by these analog sensors, controller 50 can issue appropriate commands for altering the status of selected relays. The incorporation of analog sensors and associated information generating capability in transceiver decoders 56 and the use of condition responsive switches coupled to switchleg inputs of the transceiver decoders provide a condition responsive capability for the system.

Controller 50 can be coupled to a non-volatile memory storage system such as a magnetic tape device 72 for storing sector, pattern switch, priority erase time and schedule information. Thus, if controller 50 were to lose power for a substantial period of time, such that all data stored in a volatile form of memory were lost, the data could be easily recovered through the magnetic tape device 72. Means are provided within controller 50 for reading the data stored within magnetic tape device 72.

Because the micro-cassette tape drives presently available for tape device 72 are not of very high quality for use in digital systems, special clocking techniques are employed. For example, because the frequency of digital signals read off the micro-cassette will normally vary significantly during the course of a given reading of the tape, special resynchronization self-clocking techniques are utilized to keep a clock circuit synchronized with the data being read from the tape. A continuous weighted average of detected data pulses is used to resynchronize the clock circuit. This results in a continuous lock on the clock frequency with the most recently detected bit frequency being the most effective in controlling the clock frequency. Using this technique, variations of bit frequency approaching 50% in only a single clock cycle may still be successfully read.

Communications Link

As stated, communication between controller 50 and each of transceiver decoders 56 is via a data line 58 formed by a single twisted pair of wires, constituting a bi-directional data communication link or bi-directional communication channel. Both controller 50 and each of transceiver decoders 56 include circuitry for transmitting and circuitry for receiving information. The communication link provides a protocol for the transfer of information to and from these communicating points. The protocol insures that information transmitted and received is free of errors and will not be garbled or interfered with by other communication devices also connected to the data communication link. The communication link, since it can be coupled to different types of synchronized machines each running on an independent clock, is independent of any system timing. The communication link is bi-directional in nature and in one selected mode provides for the utilization of data verification as well as interactive data processing to insure data security while maintaining system throughput.

Arbitration is provided for resolving any bus conflicts arising during simultaneous transmission of two or more control points without garbling, degrading, or interferring with any data being transmitted. The arbitration scheme is suitable for use with the load control system described herein or independently thereof.

As used throughout the description of the communication link, the term "communication point" will be used to refer to any point connected to the data link that has transmitting and/or receiving capability; thus including both controller 50 and all of transceiver decoders 56. The terms "data communication link" and "communication link" include both data line 58 and the protocol in which data is transferred between communication points. The terms "time to compute mode" and "time to compute state" define a time period during which a communication point is not monitoring the communication link. This time is overhead to allow a receiving device sufficient time to process and decode the incoming signal. The term "lockout" is defined to be a mode in which specific communication points are using the communication link in an interactive manner locking out other points from interfering.

The protocol of the communication link defines two possible signal states of the communication link. An active state refers to the state in which the actual information and clock are found during a transmission. As applied to data line 58, the "active" state is defined to be the existence of a voltage potential of 10–30 volts between the two wires of data line 58. The "inactive" state refers to a state wherein the voltage between the two wires of data line 58 is less than 10 volts. The inactive state is of arbitrary duration and is essentially ignored during a transmission sequence. By utilizing a dedicated twisted pair of wires for data line 58, a bus arbitration technique and the data communication protocol, base band signals are transmitted between communication points without the need of extra modulating and demodulating devices. Of course, other communications channels such as power lines, radio channels, etc., could be utilized with appropriate modulating and demodulating devices. The use of an interactive data communication link allows a single communication point to be polled and interrogated without interferring with other communication points. However, other communication points can be actuated asynchronously to use the data line and send information on command from a remote user.

The protocol is based upon a modified form of a standard $\frac{1}{3}$, $\frac{2}{3}$ pulse-width modulated signaling technique. This modified pulse width modulated signaling technqiue is hereafter referred to as "modified ratio signaling".

Controller 50 is coupled to a plurality of transceiver decoders 56 via data line 58. Controller 50 is utilized as the command controller that transmits load control information over the data communication link (including data line 58) to the remote transceiver decoders.

Controller 50 is also responsible for normal system maintenance, i.e., the controller interrogates the transceiver decoders in order to verify the state of their relays as well as transceiver decoder operation. This maintenance function is achieved through the same bi-directional communication link between transceiver decoders 56 and the controller 50. At the time when controller 50 is interrogating a particular transceiver decoder 56 for either specifying relay information or checking the status of the transceiver decoder, individual polling is used. Individual polling refers to a transceiver decoder answering a specific question by controller 50 immediately upon receipt of the question. No other transceiver decoder 56 will be allowed to respond to a question directed to a particular transceiver decoder. This condition is defined to be transceiver decoder lock-out as will be further described.

Transceiver decoders 56 are capable of transmitting switch input information from a remote switch 68 coupled to a switchleg input thereof immediately upon its actuation by a user. In this mode, the transceiver decoder 56, to which the remote switch 68 is coupled, responds to a switch input on command of the remote user and does not wait for or require controller 50 to poll for information. This form of data line control is known as asynchronous access of the data communication link. Accessing the data communication link by this method eliminates the need for polling schemes that take much more time and degrade system throughput. The throughput that is realizable by this asynchronous bus access is solely dependent on the current activity on the data link. Therefore, if the data link is not being utilized by another transceiver decoder 56 found on the data bus, the transfer of information from the closure of a remote switch 68 will occur immediately from the particular transceiver decoder 56 to which the switch is connected to controller 50.

In summary, a transceiver decoder 56 will use data line 58 when there is information requested by controller 50 or it will use the data line asynchronously upon a switch input command at its remote control point. Information is transferred in a half duplex form of communication.

The data communication link can couple controller 50 with up to 1,024 transceiver decoders 56. This limitation results from the data bit stream format described hereafter.

Figure 2:
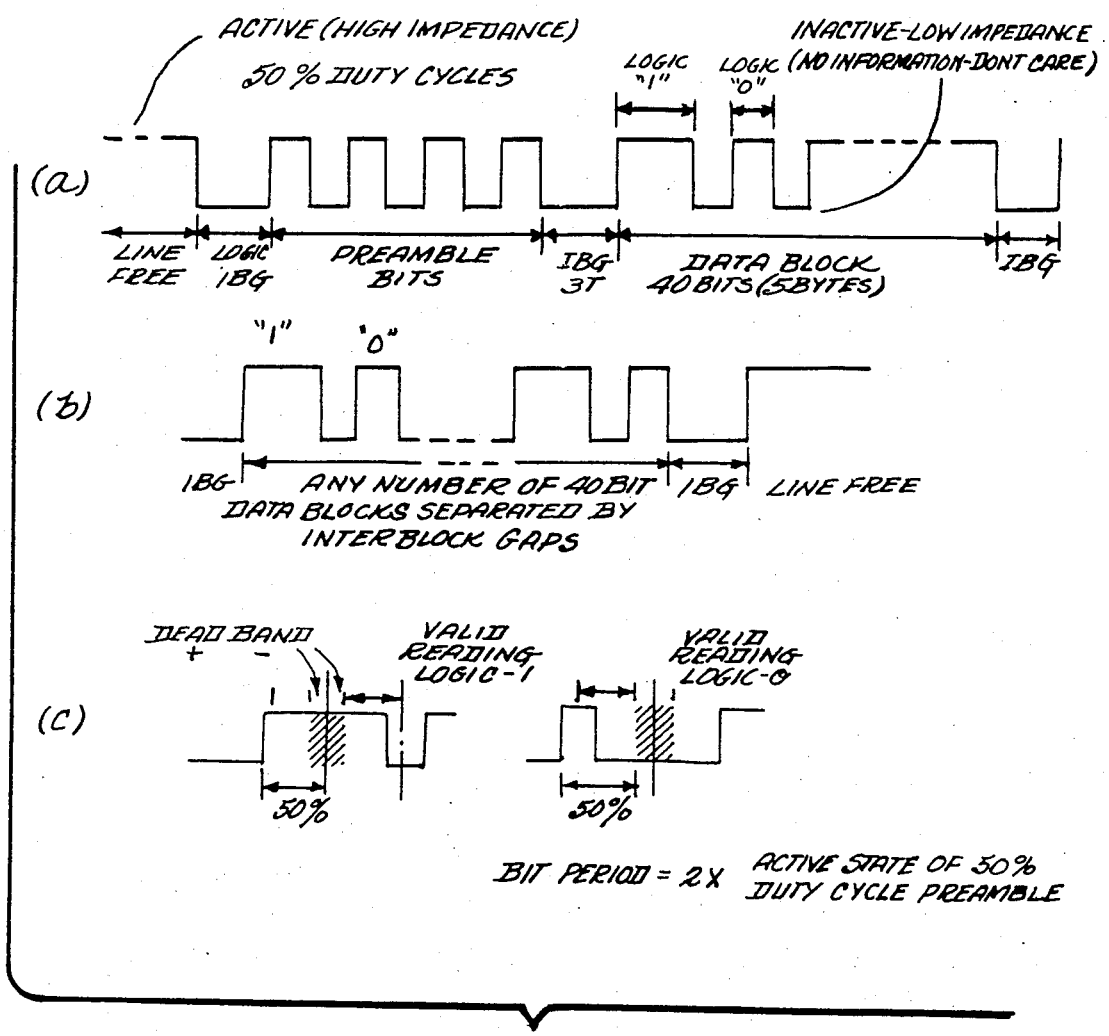
FIG. 2 is a graphical representation of various hypothetical data wave forms illustrating the communication protocol.

Referring now to FIG. 2 there is shown a graphical representation of various hypothetical data waveforms describing the communication protocol. FIG. 2A illustrates that a transmission sequence starts with the data line deemed "free for access or usage". The line free condition is an active (high impedance) state of the line and corresponds to a voltage between the two wires of data line 58 of from 10 to 30 volts. The communication point in need of gaining access of the data communication link sends a long interblock gap (IBG) to grab the line. After the data line has been accessed, a preamble is sent so that the other communication points receiving the data will lock in on the data signal and establish the data rate. The regular IBG follows so that the system may be synchronized thereon. Then the data is transmitted serially as digital information comprising logic level 1's and 0's. Forty bits of information are transmitted during the data segment. The forty bits of information correspond to five bytes (eight bits/byte). An IBG follows the data block of forty bits and if more data needs to be sent, another forty bit data stream is sent and if there is no more data, then the line is released.

FIG. 2b shows a data block of forty bits preceded by and followed by an interblock gap. Note that at the end of the final interblock gap, a line free condition exists wherein the line is returned to the active (high impedance) state.

Figure 3:
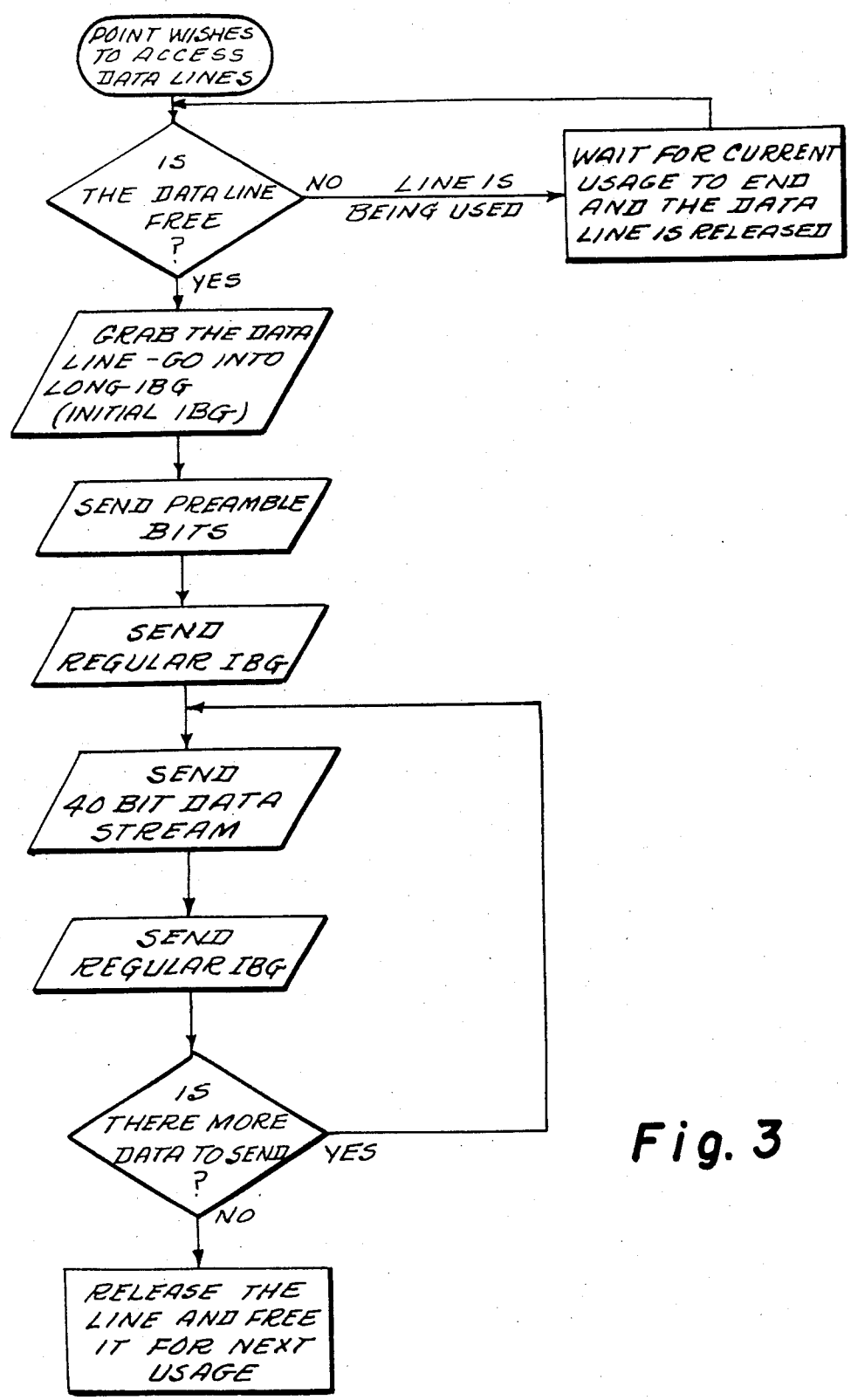
FIG. 3 is a flow chart illustrating the transmission sequence utilized by a transceiver decoder for communicating with the controller.

Referring now to FIG. 3 there is shown a flow chart of the transmission sequence utilized by a transceiver decoder 56 to communicate with controller 50. In the "data line free" mode the data line is in a dormant state. It is not being used by any communication point. Protocol to deem the line as being in a free mode as opposed to being accessed is achieved by timing out the inactivity of the data line in the active state for a minimum of three (3) bit periods T. Timeout can be 6–25 msec. depending upon whether phase lock is achieved. With phase lock, timeout can be as short as 6 msec. In the absence of phase lock, timeout automatically occurs at 25 msec. If a signal is to be sent during this time out period for the line free protocol then the previous data rate just received is used to receive the next transmission sequence. It uses the last data rate established and does not expect to see a new preamble. When the line is free it is released for general access and any communication point can attempt to gain control of the line. Therefore, if the state of the data line remains active for a period of time, then the line will be deemed free of data and can be accessed by any communication point.

There are two types of IBG's, one for grabbing the line, and the second for delineation of data blocks within the data stream by an IBG between each block of forty bits of data. In order for a communication point to grab the data line, it accesses the line by forcing an initial IBG (long IBG). The duration of the IBG must be long enough to allow all devices maintained on the line time to set up for receiving the data stream that is to follow. Since the devices on the data line are sequential machines (microcomputers), it is necessary that this duration be a minimum of two msecs. so as to gain the attention of these machines. The duration of the IBG must be long enough so that any communication point will have time to compute before the IBG is recognized. The normal IBG is a minimum of three bit periods (3T) of the data rate. The IBG serves as a synchronizing signal to delineate the data blocks being transmitted. When a receiver is out of sync with the transmission, the IBG serves to justify the system and resync a receiver.

The preamble is sent only once during a transmission sequence independent of the number of the data blocks being transmitted. Preamble includes a minimum of four bits at the receiver, a weighted average is taken during each bit period from which the data rate is calculated and its logic threshold determined. The preamble is a sequence of 50 percent duty cycle pulses which a receiver utilizes in order to lock in the data rate (generally 350–4000 bits/second).

A data block includes 40 bits of information using modified ratio signalling for transmitting a series of logic 1's and 0's. The duration and decoding of each received bit is referenced to the previously received preamble. The decoding of the logic levels are not determined by any present condition internal to a receiver. Any number of data blocks separated by IBG's may be transmitted during the time that a communication's point has control of the line.

As stated, the logic levels are transmitted using a modified ratio signalling scheme. The signalling scheme utilizes the active state of the data line for the exchange of information and clock. The duration of the active state during the data block sequence is compared to the previously transmitted preamble which has been stored in memory. This comparison is used to determine the actual logic level being received. Since the data bit input is being referenced to a previous data input, i.e., preamble, it is said to be a ratioed reception. Therefore, common mode distortions caused by parametric shifts in the receiver electronics or in the data line cancel. Since both preamble and data are coupled through data line 58 to a particular control point acting as a receiver, the elimination of parametric variations allow the use of a more simple receiver circuit than might normally be required since tolerances need not be very strict. The logic level thresholds of the received signals are calculated from the preamble.

Modified Ratio Signaling

Referring back to FIG. 2 and specifically to FIG. 2(c), there is shown a signal diagram illustrating the modified ratio signalling scheme and particularly illustrating the effective calculation of the minimum and maximum pulse width value and defining dead bands where no signals are permitted.

The receiver of a communication point has an initial band width of 4–5 Khz for receiving the preamble. After the preamble has been received and data logic thresholds have been calculated, the bandwidth of the receiver is narrowed to reject signals outside of that narrowed bandwidth. This bandwidth narrowing is achieved by a digitally simulated phase locked loop in each transceiver decoder 56, or controller 50. The rejection of signals outside the narrowed bandwidth is achieved by dynamically setting the bandwidth of filters in accordance with the preamble.

Logic levels are defined in terms of the percentage of a total bit period (T) where a bit period is defined to be two (2) times the period of the active state of the 50% duty cycle preamble signal (T50). The duration of the active state as a percentage of the total bit period that determines whether the logic 1 or the logic 0 is present. The preamble is defined to have a bit period of 50 percent of the total clock period (a fifty percent duty cycle signal) and this reference time is used as the basis for making all logic level decisions. As shown in FIG. 2(c), the dead band corresponds to 12.5 percent of the total bit period. The logic "1" and "0" levels are calculated as follows:

The total data bit period (T)=2×T50=100% (i.e, total duration of the active state).

Let the deadband=T50/4=12.5% of the duration of the active state.

Then logic "1" level (threshold determination filtering) is defined by:

T50+deadband≧logic 1≧T−deadband
T50+T50/4≧logic 1≧T−T50/4
62.5%≧logic 1≧87.5%

Similarly, logic "0" level (threshold determination filtering) is defined by:

Deadband≧logic 0≧T50−deadband
T50/4≧logic 0≧T50−T50/4
12.5%≧logic 0≧37.5%

Since the data logic levels are determined only by the active state of the line, the inactive state is ignored and is used to provide a time needed by the microcomputer to compute. This period of the inactive state between bits is constant but cannot exceed two bit periods. Thus, it can not be mistaken for an IBG. A bit period (T) is defined as two active state preamble bits. Of course, regardless of the particular data bit, logic "1" and "0" interpretations are made with respect to the bit period established by the preamble received immediately prior to the data. Information is only carried by the duration of the active state. The inactive state is the time between bits and its minimum duration is determined by the time needed to compute at the communication point acting as a receiver. The inactive state is approximately 160 microseconds in duration. The use of a constant inactive state duration while modulating the active state of the line for the transfer of information provides for a varying bit transfer rate. A logic "0" bit period is approximately ⅓ less in duration than a logic 1 bit period. Therefore, a word transmitted with logic zeros will be transmitted at a higher baud rate than a word with a logic ones. Thus it is possible to communicate with a central point faster that would be possible using a conventional pulse width modulation scheme. Faster throughput is achieved by carrying information only on one state (active) of the data line while making the other state an "I don't care" state. In conventional pulse width schemes, the inactive state period is varied to maintain a fixed clock rate. It takes the same length of time to send eight "1"'s as it does to send eight "0"'s. However, in this system eight "0"'s will be sent faster because the inactive state is not lengthened to maintain a constant clock rate.

Data Line Arbitration

The communication link which is a bi-directional communications channel is able to arbitrate any data line contention without interfering with the current communication sequence. When two or more communication points access the data line for transmission of information there is a bus conflict. This conflict is arbitrated so that there is no loss of information or interference with the current transmission. The arbitration of the data line is achieved either during the line access level or bit transmission level at the communication point. The flow of the arbitration logic is set forth in FIG. 4.

Figure 4:
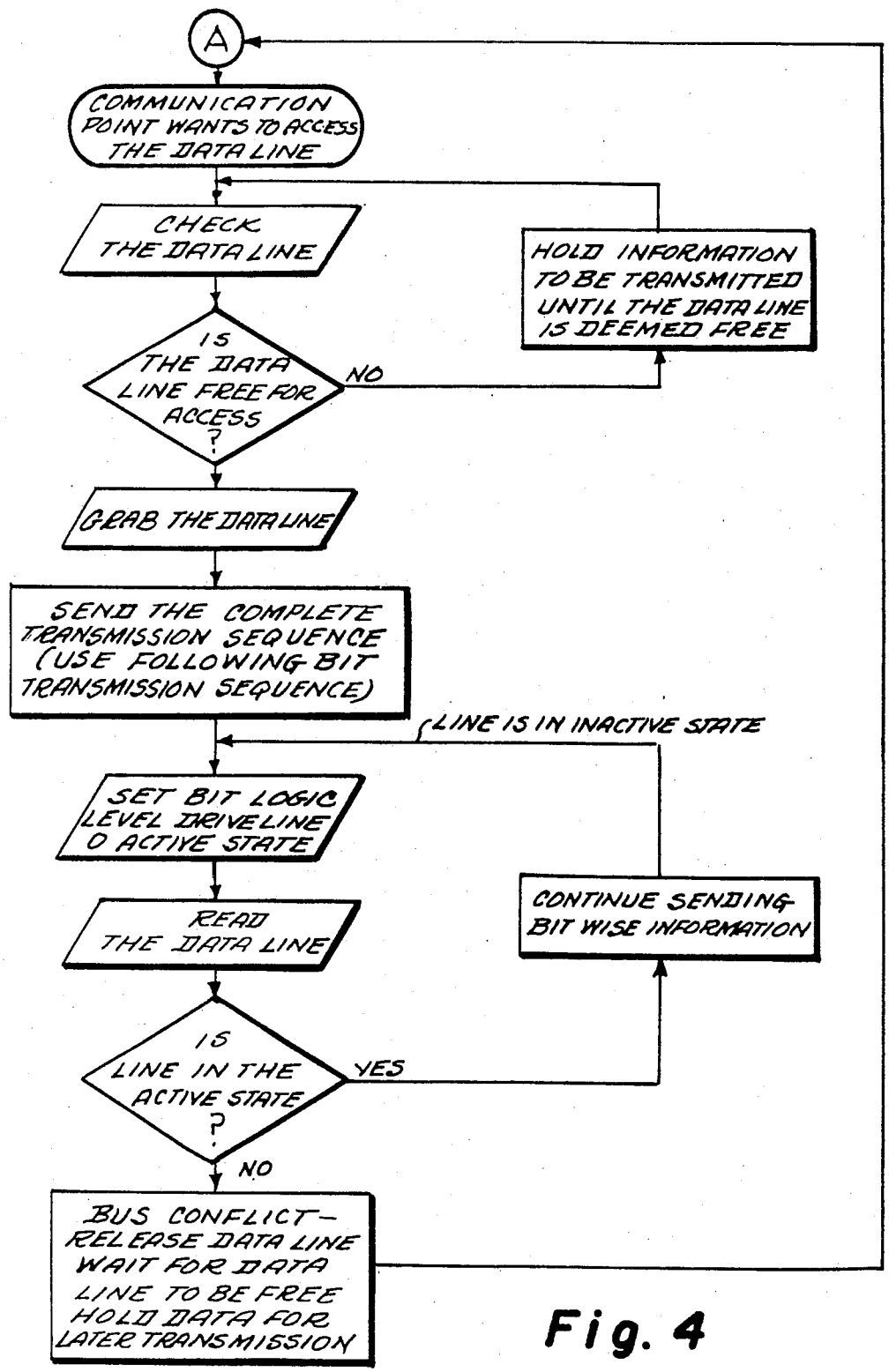
FIG. 4 is a flow chart illustrating the data line arbitration protocol.

Referring now to FIG. 4 there is shown a flow chart of the data line arbitration protocol. When a communication point has information to be transferred over the data line it must first access data line 58. Data line 58 must be in a free state (high impedance, active state) for the communication point to begin the transmission sequence. If the data line is currently being used by another communication point, the point desiring access automatically holds until the data line is deemed free. During this holding period, the communications point is also receiving whatever data is being sent during the current transmission on the data line. The data held in the communications point needing to be transferred is stored and therefore not lost until the transfer of the information can take place. This stored data can be held indefinitely until the data line has been released and is deemed free for subsequent transmission.

Since the communication points consist of identical electronics and sequential logic, it is possible for two or more transmitting devices to be synchronized with each other. If two devices are synchronized, then they will attempt to access the data line at the same time and not realize that other devices are using it as well. To guard against multiple simultaneous transmissions interfering with the integrity of the data being transferred over the data line, a bit level arbitration scheme has been developed.

The bit level arbitration flow charted in FIG. 4 is achieved by reading the data line on a bit-wise basis after driving the line to a particular state, i.e., the inactive or active state. If there is a discrepancy between the state desired and the actual state of the line as read, then that transmitting device will automatically realize the line is in use and drop off the line into the hold data mode for subsequent transmission when the line is deemed free. The selection of the device driven off the line is achieved dynamically during the course of the transmission sequence and not by a predetermined priority and queing scheme. As two or more communications points transmit, the first bit of information that is different between the two devices will immediately resolve the bus conflict. Since each communication point is uniquely addressable, having its own name, then there is guaranteed to be a sequence of bits during the course of the transmission that will differ. Therefore, there will only be one device left transmitting on the data line at the completion of this transmission sequence. During the arbitration of this information, no data is inteferred with or garbled by this data line conflict since it is being achieved on a bit wise level.

The arbitration technique is dependent on the impedance levels of the active and inactive states of the data communications line. The inactive state, is the low impedance state of the line (e.g., the DC resistance of the line in the inactive state is less than 50 ohms). The active state is a higher impedance (e.g., greater than 90 ohms). The impedance of data line 58 is relative to the driver circuit found on the communication point. When there is a conflict between two devices (where one is driving the line to the active state), while the other is driving the line to the inactive state, it is the latter that will win the bus. The device driving the line to the active state is driven off the line since the active state is of higher impedance and, therefore, yields to the low impedance state of the line. Thus, during the bit level arbitration mode, the device that drives the line to the inactive state when the other devices are driving it to the active state, will gain full and uncontested access of the data line.

Performing this arbitration technique dynamically at the time of the actual transmission, provides the utmost in system throughput; i.e., the actual throughput is solely dependent upon the activity on the data communications line at any given time. Futhermore, this also eliminates the need for lengthly polling techniques when information must immediately be transferred and processed upon demand.

The arbitration technique may also be used to freeze or hold the current status of the system without any loss of information. This may be desired during maintenance or downtime procedures. This freezing is achieved by holding the data line in the inactive state for an indefinite period of time so that maintenance procedures can be performed. Since the data line is being held in the inactive state, all information will be held at the communications point and, therefore, not be lost until the information can be effectively transferred.

There is a mode of operation during which controller 50, which is an overriding master device, holds an interactive uninterrupted data conversation with a transceiver decoder 56 (slave). During this interactive interchange of information to a particular transceiver decoder 56, no other transceiver decoder can contest the use of the data line. The other transceiver decoders 56 are said to be locked out and yield the data line to the control of controller 50. This is achieved by defining a master device and slave devices in the system.

The determination of the master/slave relationship of the system components are built into each of the communication points, i.e., controller 50 is the master and the remote transceiver decoders 56 are the slaves. Controller 50 has overriding control of the data communication line such that it can interrupt, stop, or access data line 58 over any of the other slave devices.

The master/slave mode of operation is achieved through the line free determination logic. In this logic the deeming of a line to be free has a different timeout period in masters and slaves. A master device will have a shorter time out period (4 msec.), so that it can slip in and grab the line before a slave device times out (slave time out is 6 msec.). Furthermore, the slave device may become a master upon command of the actual master device. During an interactive conversation between controller 50, a master, and a transceiver decoder 56, a slave, control of data line 58 is automatically transferred to the slave device being accessed. This transfer allows controller 50 to select or poll a specific transceiver decoder 56 without being endangered by a response from an arbitrary device transmitting data.

Therefore, the master device is capable of transferring the control of data line 58 to a specific slave device without any interference.

Transceiver decoder—hardware

Figure 5:
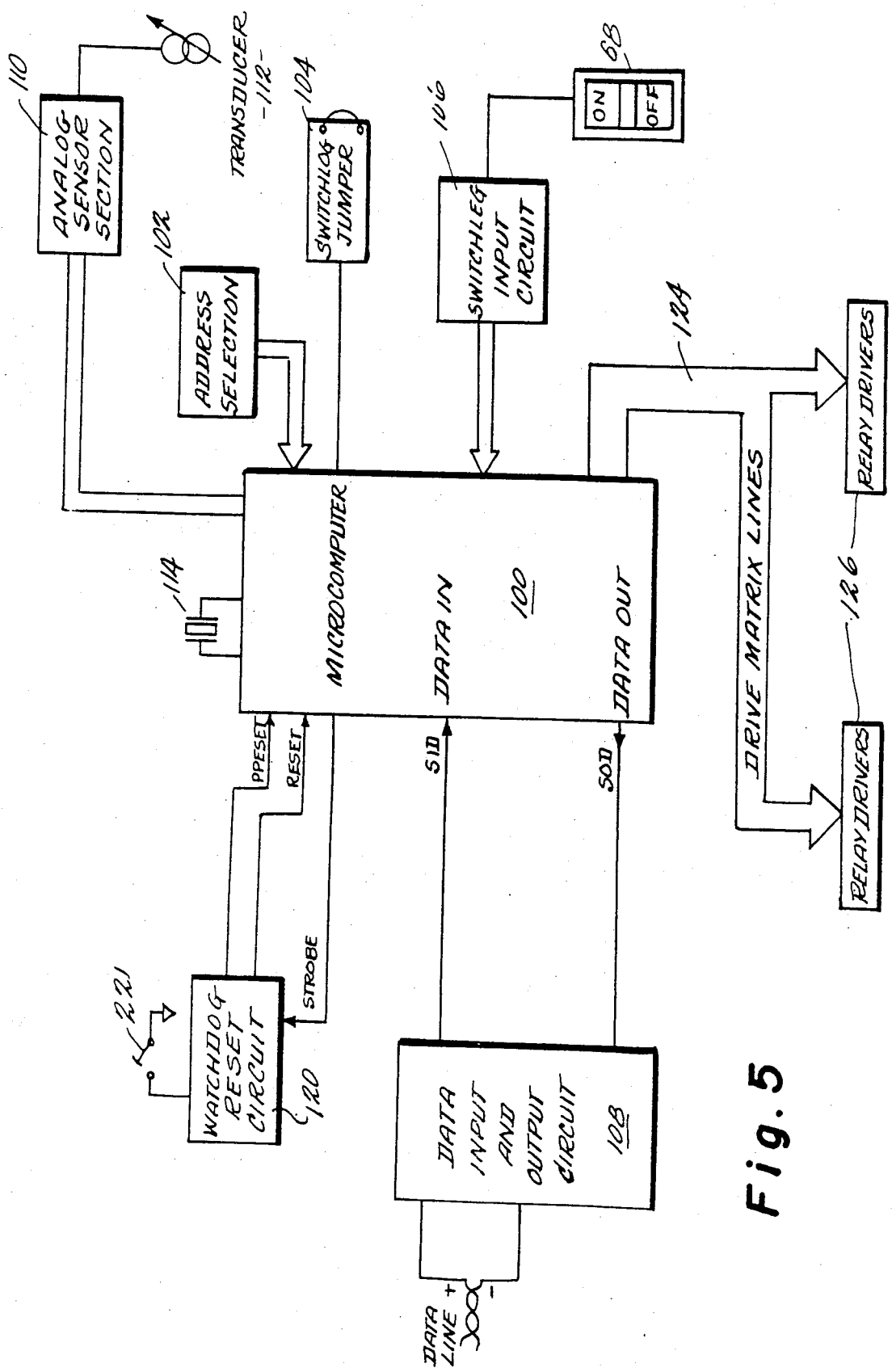
FIG. 5 is a general block diagram of a transceiver decoder.

Referring now to FIG. 5, there is shown a general block diagram of a transceiver decoder 56. Each transceiver decoder 56 is built around a single chip microcomputer 100, suitably a 3870, which performs all of the logic control functions of the transceiver decoder including the encoding of data from switch and analog sensor inputs for ultimate transmission to the central controller, and the interpretation and execution of the instructions from the central controller. The address of each transceiver decoder 56 is jumper-selectable by an address selection bus 102 which sets a 10-bit binary word giving each transceiver decoder an address from "0" to "1023". A switchleg jumper 104 allows the user to select the type of switchleg (momentary or maintain) 68 to be coupled to microcomputer 100 of transceiver decoder 56 through a plurality of switchleg inputs 106. A data input and output circuit 108 couples the data line (data line 58) to microcomputer 100. Data input and output circuit 108 includes optoisolators for providing an isolated differential data input and output for enhancing noise immunity against electromagnetically coupled noise sources. As previously stated, the data communications link is bi-directional. An analog sensor section 110 allows the coupling to a transceiver decoder 56 of up to eight analog sensors (temperature, light sensors, snow, ice, humidity, wind, smoke, etc.) using an 8-channel analog multiplexer and a dual-slope A/D converter. The analog sensors are of the variable impedance type and are represented by transducer 112 in the Figure (analogous to light sensor 70 shown in FIG. 1). These analog sensors can be polled by controller 50 and in response to such polling, send data via their associated transceiver decoder 56 through data line 58 to the controller providing information related to ambient lights, temperature conditions, etc. for initiating an appropriate response to such conditions.

The use of analog sensors and switches renders the system "condition responsive". The time dependent scheduling of relays of selected sectors responding to a pattern of relay states illustrates the use of time as a condition. However, the system can also be condition responsive through its switchleg inputs and analog sensor inputs. Analog sensor section 110 (see FIG. 5) provides connection for up to eight (8) analog sensors, i.e., devices providing a range of impedances or voltages responsive to ambient conditions such as light level, temperature, humidity, etc. Controller 50 can poll (interrogate) these sensors periodically and issue programmed commands in response to their status. There are also available on the commercial market switch type sensors. Such sensors detect thresholds of temperature, light, humidity, etc. and close switch contacts when their predetermined threshold is exceeded. These switch type sensors can be treated as substitutes for switches 68 coupled to the switchleg inputs of a transceiver decoder 56. The response to the actuation of a switchleg is defined by the user regardless of the particular device utilized to close the contacts of the switchleg. Thus a smoke detector having a switch-type output can be coupled to a switchleg of a transceiver decoder 56 and programmed to activate a specific lighting pattern for an emergency sector.

Watchdog reset circuit 120 provides reset and preset capability for transceiver decoder 56. When microcomputer 100 is operating normally, i.e., sequencing through its instructions beginning at its base (zero) address and proper sequence of instructions it sends a STROBE signal to watchdog reset circuit 120. Whenever the STROBE signal ceases, watchdog reset 120 senses that microcomputer 100 is malfunctioning. Either it has lost a bit and is executing an improper instruction or it has locked into a loop and is not following its proper sequence of instructions. Watchdog reset circuit 120, in response, sends a RESET signal to microcomputer 100 forcing it back to its zero address to begin its instruction sequence again. Watchdog reset circuit 120 also includes a preset switch for giving a user the ability to override a transceiver decoder 56 by turning on all relays. The present switch would be utilized in the event of a data line 58 or controller 50 failure and permits circuit breaker control of all relays without the present necessity of hard wiring changes Microcomputer 100 is clocked by an external clock crystal 114.

Commands to specific loads issue from microcomputer 100 through drive matrix lines 124 and are coupled to a bank of relay drivers 126 for activating individual relays associated one with each specific load.

The general block diagram shown in FIG. 1 shows several transceiver decoders 56 coupled along data line 58 serving as the bi-directional data link. Transceiver decoders 56 are individually addressable and are utilized to directly control relays specified on command of controller 50.

The system is a closed loop wherein controller 50 can interrogate the status of the remote transceiver decoder 56. This status information can be the current relay pattern in force such that justification of system activity can be made and verified. A command from controller 50 can either initiate load actuation or be in a responsive mode for interrogation and self-diagnosis. Data sent to controller 50 from a transceiver decode 56 can either be in response to an interrogation command from the controller or it can be asynchronously sent in response to a remote user input, such as the activation of a switchleg by a switch 68 or a condition responsive device coupled to a switchleg input. Since there is no critical system timing, a user can actuate an input to a transceiver decoder 56 at any time. When an input is recognized, the appropriate information is transmitted to controller 50 which in turn decodes the switchleg signal and sends the appropriate command to actuate the proper relays and loads.

The transfer of data between controller 56 and a transceiver decoder 56 is achieved over data line 58. Data is transmitted in a serial fashion as described in great detail above.

Data Stream Format

Figure 6:
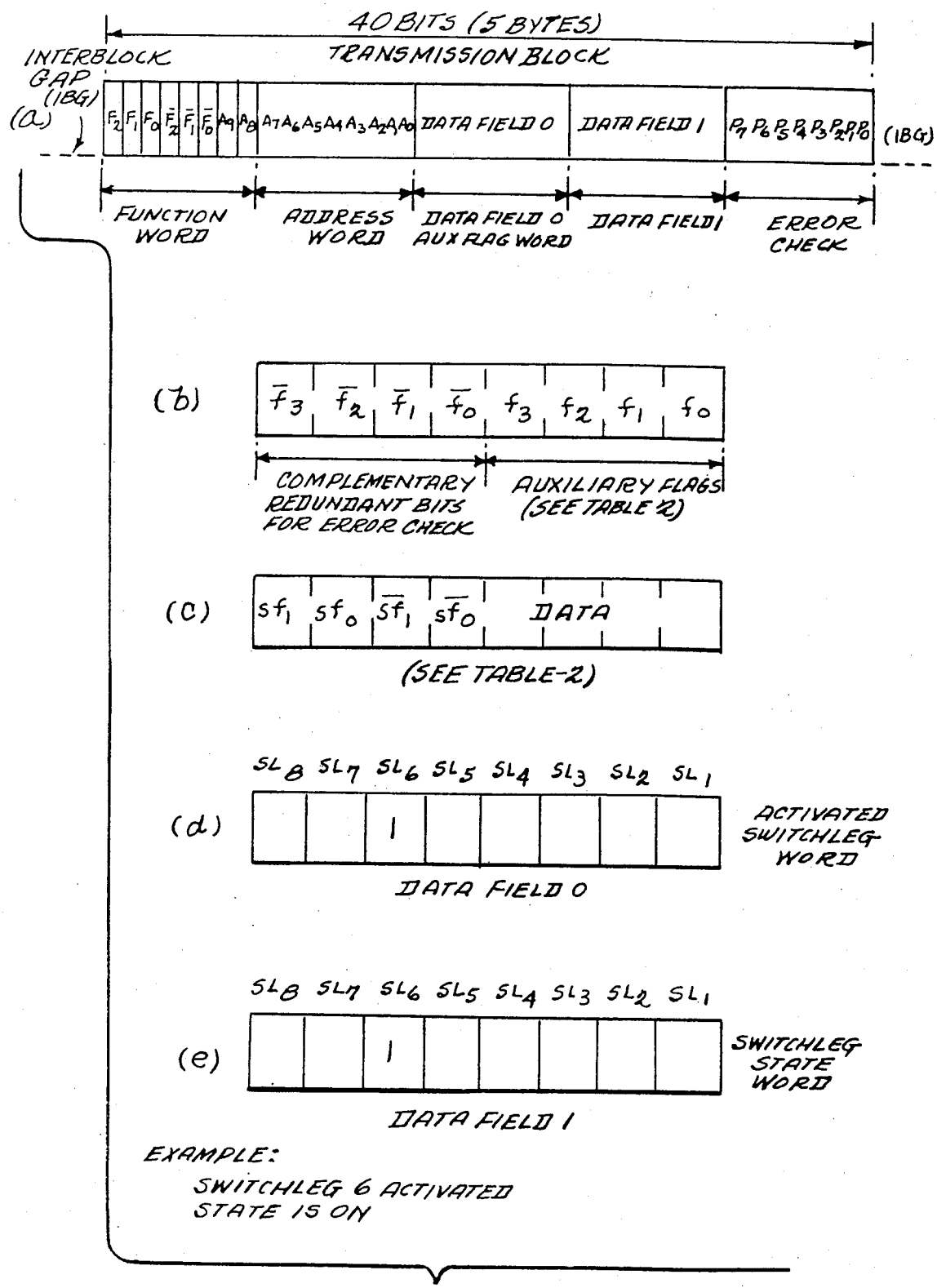
FIG. 6 is a diagrammatic representation of the format of a data stream.

Referring to FIG. 6, there is shown a diagrammatic representation of the format of the data stream. FIG. 6(a) shows a transmission block of 40-bits (5-bytes) including multiple fields. The data stream includes a function word, an address word, a data field zero, a data field 1, and an error check work. A word refers to one byte of 8 bits of binary information.

The first byte of the 40-bit data stream is the function word. Three bits called F0, F1 and F2, shown in FIG. 6(a), comprise the binary pattern that is used to dynamically set the type of transmission sequence. Since the decoding of this function word is critical to the accurate transfer of data, it is complementary-redundant bit-wise error-checked. The error checking for the function bits is in the three bits following F0, F1 and F2 called F0, F1 and F2. Before the data is decoded, the function words are error-checked for accuracy. These six bits are exclusively OR'ed together in the appropriate bit positions such that valid data exist when they differ in logic level in each bit position. This will produce a logic one in the exclusively OR'ed section indicating that data is valid.

The function word is present in all data transfers between the controller 50 and a transceiver decoder 56. The three bits provided in the function word provide a binary number from 0 through 7 which indicates one of eight possible modes. Modes 0 through 4 indicate that the data stream was transmitted by controller 50. Modes 5 through 7 indicate that the transmission emanated from a remote transceiver decoder 56. Table 1 summarizes the different modes specified in the function word. In general, the function word specifies the type of data being transferred and the data security which affects the system throughput.

TABLE 1

| $F_2$ | $F_1$ | $F_0$ | | |
|---|---|---|---|---|
| | | | FUNCTION WORD - TRANSMITTED BY CENTRAL CONTROLLER | |
| 0 | 0 | 0 | Mode 0 - | Install Specified Relay States in Data Fields 0 and 1 |
| 0 | 0 | 1 | Mode 1 - | First Transmission of Relay States in Data Fields 0 and 1 |
| 0 | 1 | 0 | Mode 2 - | Second Transmission of Complementary Relay States in Mode 1 |
| 0 | 1 | 1 | Mode 3 - | Interactive Data Verification |
| 1 | 0 | 0 | Mode 4 - | Data Interrogation Mode-Use (Auxiliary Function Word in Data Field 0) |
| | | | FUNCTION WORD - TRANSMITTED BY TRANSCEIVER DECODER 56 | |
| 1 | 0 | 1 | Mode 5 - | Current Relay States in Data Fields 0 and 1 |
| 1 | 1 | 0 | Mode 6 - | Remote User Activated Switchleg |
| 1 | 1 | 1 | Mode 7 - | Data Type Found in Data Field 0 - Analog Sensor Data - Transceiver Decoder 56 Status for Testing (Secondary Auxiliary Function Word in Data Field 0) |

Continuing to refer to FIG. 6(a), the address of the transceiver decoder 56 includes 10 binary bits which provide 1024 unique addresses that exist on a single data communication line. The high order address bits, A8 and A9, exist in the least two significant bits of the function word. The remaining address bits, A0 to A7, are contained in the second byte of the transmission block, the address word.

The type of data that is contained in data field 0, which is the third byte of the transmission block, is specified in the function word. For modes 0 to 3, data fields 0 and 1 contain the appropriate loading pattern for 16 relays specified by controller 50. In mode 4 (see Table 1) data field 0 contains an auxiliary function word which is decoded similarly to the function word of the first transmission byte. Each auxiliary function word includes a lower and upper order nibble of 4 bits each. The lower order nibble of the auxiliary function word, (see FIG. 6(b)), f0–f3, specifies the particular flag which must be decoded. The higher order nibble, f0–f3, consists of the complementary redundant bits of the auxiliary function word which is used for error checking. These bits are exclusively OR'ed with the auxiliary flag to determine their validity. Table 2 is a summary of the auxiliary function words.

TABLE 2

AUXILIARY FUNCTION WORD TABLE FOR MODE 4
(Decoded in Data Field 0 Transmitted by Central Controller)

| $f_3$ | $f_2$ | $f_1$ | $f_0$ | |
|---|---|---|---|---|
| 0 | 0 | 0 | 0 | Individual relay override, force to OPEN state. Relay number in data field 1. |
| 0 | 0 | 0 | 1 | Individual relay override, force to CLOSE state. |
| 0 | 0 | 1 | 0 | Acknowledge of valid loading pattern - Mode 3 response (See Table 1) |
| 0 | 0 | 1 | 1 | Negative acknowledge indication of erroneous relay pattern data, Mode 3 response. |
| 0 | 1 | 0 | 0 | Interrogate current status of relays. NOTE - Does not override pending switchleg request. |
| 0 | 1 | 0 | 1 | Reserved for future use. |
| 0 | 1 | 1 | 0 | Interrogate system status used in debugging. Does not over- |

TABLE 2-continued
AUXILIARY FUNCTION WORD TABLE FOR MODE 4
(Decoded in Data Field 0 Transmitted by Central Controller)

| $f_3$ | $f_2$ | $f_1$ | $f_0$ | |
|---|---|---|---|---|
| | | | | ride pending switchleg request. |
| 0 | 1 | 1 | 1 | Reserved for future use. |
| 1 | 0 | 0 | 0 | Request for analog sensor reading whose sensor address is in data field 1. |
| 1 | 0 | 0 | 1 | Interrogate relay status - overrides any pending switchleg request. |
| 1 | 0 | 1 | 0 | Interrogate current system status - override any pending switchleg request. |
| 1 | 0 | 1 | 1 | |
| 1 | 1 | 1 | 1 | Not Used. |

Modes 5 and 6 (see Table 1) are transmitted by tranceiver decoder 56. Data fields 0 and 1 contain either the current state of the relays or the activated switchlegs by the remote user.

Referring now to FIG. 6(c) mode 7 is also sent by the transceiver decoder 56 and indicates, in the high order nibble of data field 0, a second set of auxiliary function words sf0 and sf1 specifying the type of data found in data field 1 and in the low order nibble of data field 0. This second auxiliary function word is used to send the analog sensor reading as well as information used in testing the transceiver decoder 56. Table 3 summarizes this second auxiliary function word.

TABLE 3
SECOND AUXILIARY FUNCTION WORD

| $sf_1$ | $sf_0$ | |
|---|---|---|
| 0 | 1 | System status contained in low nibble of data field 0 and in data field 1. |
| 1 | 0 | Analog Data enclosed in data field 1 - addressed in low nibble of data field 0. |

The fifth and last byte of the transmission block (see FIG. 6(a)) is the parity error check word. This generates even parity for every four bits of data of the previous four bytes of the transmission block. Before any action is taken by transceiver decoder 56, a parity check on the previous bytes is performed with the error check word to determine the validity of the transmission block. If an error is detected, no action will occur and the transceiver decoder will continue its normal activity and wait for a new command from the controller 50, or remote user input.

Mode 0 is the binary bit pattern 000 shown in Table 1. This is the fastest mode providing the highest degree of system throughput. This mode, sent by the controller 50, informs a transceiver decoder 56 that load control data is contained in data fields 0 and 1. Transceiver decoder 56, upon receipt of this data block, performs an address and error check using the error check word and immediately installs the specified states of relays 60.

Modes 1 and 2 provide a higher level of data security at a reduced system throughput than mode 0. Mode 1 indicates to transceiver decoder 56 that load control information is contained in data fields 0 and 1, as in mode 0. However, no action occurs until after a second transmission, mode 2, which must follow immediately. The mode 2 transmission consists of complementary redundant load control information in data fields 0 and 1. After the reception of mode 2, data fields 0 and 1 of mode 1 and mode 2 are exclusively OR'ed together to insure that each appropriate bit position differs in logic level indicating valid data before actuation occurs. If the transmission is made out of sequence, that is, mode 2 before mode 1, or if the data field bits agree in logic level, then an error condition is said to exist and no action by the transceiver decoder will take place.

Mode 3 is an interactive sequence of data transfer to and from transceiver decoder 56. It provides the highest degree of data security at the slowest system throughput. The sequence of events in this communication scheme are in the following order.

a. Controller 50 specifies load control information in data fields 0 and 1 as in mode 0.
 b. Transceiver decoder 56 performs an address and error check on this transmission block and immediately responds by transmitting the load control information from data fields 0 and 1 back to controller 50.
 c. Controller 50, upon receipt of this data, verifies that the loading pattern is correct and then immediately transmits a positive acknowledge so that load actuation can take place. If controller 50 receives conflicting load control data, it will issue a negative acknowledge signal indicating to transceiver decoder 56 to abort the transmission sequence.
 d. Transceiver decoder 56, upon receiving a positive acknowlegement, will then install the specified loading pattern. If at any time the transmission of this information is out of sequence or a negative acknowledgement is received, transceiver decoder 56 will abort this operation.

Mode 4 specifies a particular task to be performed which may require a response by the transceiver decoder 56 to controller 50. The mode 4 task is described in Table 2 and is specified in data field 0.

The state of an individual relay can be modified by controller 50 without affecting the other loads connected to a transceiver decoder 56. Controller 50 can also request a reading of an analog sensor whose address appears in data field 1. Controller 50 can interrogate the status of the loads controlled by transceiver decoder 56.

Mode 5 is transmitted by transceive decoder 56 and contains the current state of the relays in force in response to a read request from controller 50.

In mode 6, the state of an activated switchleg is transmitted to controller 50 by transceiver decoder 56. A switchleg 68 is activated by a user and indicates whether the position is on or off.

Mode 7 contains status information requested by controller 50. Transceiver decoder 56 responds in this mode for the following two cases:
 a. Analog Sensor Reading
  An analog sensor (such as transducer 112 shown in FIG. 5) whose address is in the low order nibble of data field 0 is supplied in data field 1. This is only sent back to controller 50 after it has requested the analog sensor reading.
 b. System Inquiry Mode
  This mode is used for testing and debugging transceiver decoder 56. When controller 50 asks for system status, the low order nibble of data field 0 will contain the condition of several user selectable jumpers. Data field 1 will contain the value of the data rate counter used in determining the logic level inputs from data line.

Up to eight switches 68 can be connected to switchleg input circuit 106 of transceiver decoder 56 providing programmable remote user inputs to controller 50. Switches 68 can be either maintain or momentary type. The type of switchleg is determined at the time of installation by a jumper selection at switchleg jumper 104 (see FIG. 5). When momentary switches are selected, transceiver decoder 56 will only transmit data indicating the state or direction of the contact when there is a MAKE condition or on positive action only. For the maintain switches, transmission to controller 50 will occur on a MAKE or BREAK condition, i.e., whenever the switchleg changes state. Switchleg actuation is achieved asynchronously and independently of any activity of controller 50 and other transceiver decoder 56 connected with data line 58. This independence allows each transceiver decoder 56 to function without any critical system timing and thereby reduces system complexity and its susceptibility to erroneous action while increasing system throughput. Activation of a switchleg input by the closure of a switch 68 asynchronously causes a signal to be sent to controller 50 requesting an override instruction for a particular relay 60 and its associated load. If controller 50 has been programmed to respond to the activation of switch 68, a command will be sent to the transceiver decoder 56 associated with the relay requiring activation.

Transceiver decoder 56 contains filtering and debouncing logic for eliminating multiple switchleg actuations and for rejecting errors caused by noise. Switchleg inputs are read at 80 msec intervals and require that the user enable a switch for at least 100 msec to guarantee a true reading.

When a switch 68 is activated by a remote user, a switchleg output word is formed in data fields 0 and 1 of a transmitter buffer in transceiver decoder 56. The switchleg word is then transmitted to controller 50 as soon as the data line is deemed free. Data field 0 will contain the particular switchlegs that have been activated and data field 1 contain the desired state. The bit positions that are set in data field 0 indicate which switchlegs were activated by the remote user. The corresponding bit positions in data field 1 indicate the state of the activated switch 68 (on or off). For example, referring to FIGS. 6(d) and 6(e), if switchleg 6 has been activated, then data bit 6 will contain a 1 in data fields 0 and the corresponding bit position in data field 1 will contain the state of the switchleg (logic 1 for on and logic 0 for off).

If data line 58 is in use, transceiver decoder 56 will standby, latching the switchleg request until the information can be sent. Therefore, the switchleg actuation is not lost and does not require multiple actuations by the user. If while transceiver decoder 56 is standing by another switchleg is activated or if multiple switchleg inputs occur at the same time or if the same switchleg is reactivated, then all the inputs will be added to the current switchleg output word waiting to be sent to controller 50. All inputs are latched and provide "N-key rollover" insuring accurate readings even if multiple switches are simultaneously actuated. This will guarantee that no data is lost due to the interaction of the other devices.

The transmission of the switchleg data occurs asynchronously with controller 50. This eliminates the need for slow polling methods. The throughput is therefore a function of the current activity on the data bus.

FIGS. 7-17 detail the specific circuitry and logic functions performed by transceiver decoder 56. The heart of each transceiver decoder 56 is a 3870 single chip microcomputer 100 which contains a 2K ROM program providing all required logic functions.

Transceiver Decoder Microcomputer-Connections

Microcomputer 100 is a general purpose microcomputer that is transformed into a special purpose microcomputer by its particular program burned into read only memory (ROM). All logic functions of transceiver decoder 56 are carried out by microcomputer 100. Signal or pin names as used throughout this specification can be correlated to those shown on FIG. 7.

Figure 7:
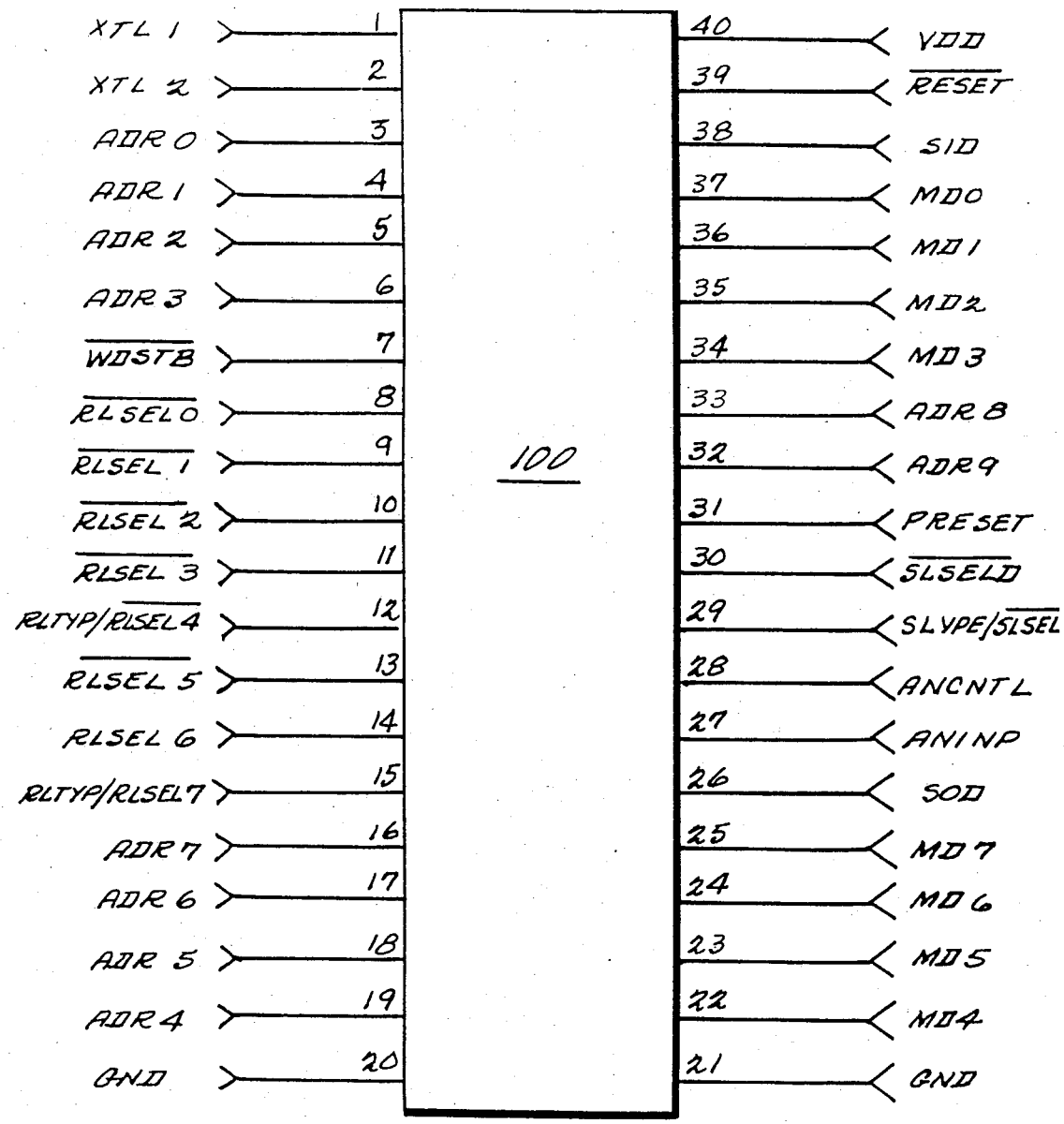
FIG. 7 is a detailed signal and pin assignment for the microcomputer in a transceiver decoder.

Referring now to FIG. 7, there is shown a detailed signal and pin assignment for microcomputer 100. The address bus includes pins 3-6, 19-16 and 33-32, respectively. Serial input data from data line 58 is coupled into SID on pin 38. Serial output data to data line 58 is coupled from SOD pin 26. The digital signal representing the status of the analog sensors coupled to analog sensor section 110 (see FIG. 6) is coupled into ANINP pin 27. Selection of particular banks of relay drivers is made by signals on a relay bank selection bus including RESEL0 ... RESEL7 at pins 8-15 respectively. Particular relay drivers within each bank are selected by MD0-MD7 at pins 37-34 and 22-25 respectively. Switchleg inputs 106 are multiplexed onto the MD0-MD7 lines.

Figure 8:
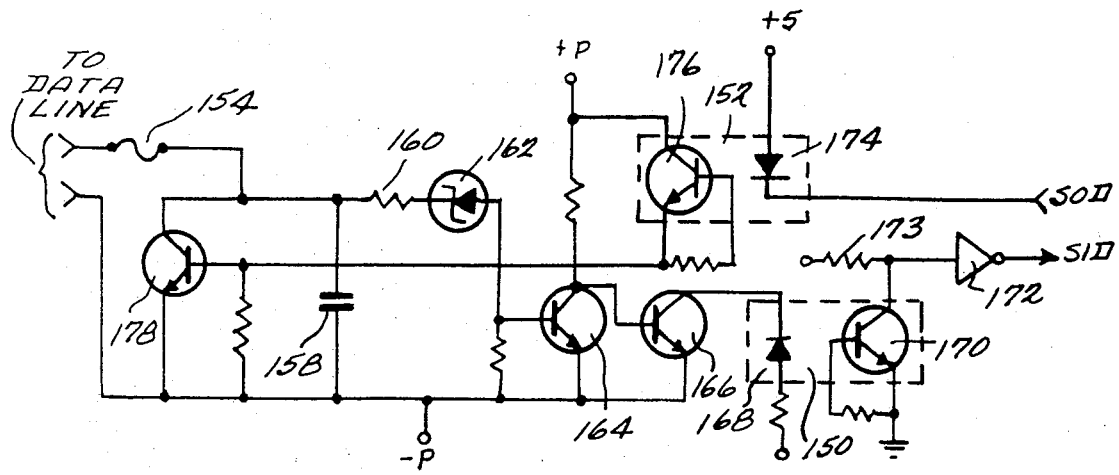
FIG. 8 is a schematic diagram of the data input and output circuit of a transceiver decoder.

Referring now to FIG. 8, there is shown a schematic diagram of data input and output circuit 108.

Transceiver Decoder Data I/O

Data input and output circuit 108 provides isolation between data line 58 and microcomputer 100. Specifically, isolation from data line 58 to input SID (pin 38 of microcomputer 100) is provided by an optoisolator 150. Isolation from the data output SOD (pin 26 of microcomputer 100) to data line 58 is provided by a second optoisolator 152. All circuitry from the data line side of optoisolators 150 and 152 to data line 58 are powered by an isolated power supply providing voltages +P and −P.

Data is coupled to and from data input and output circuit 108 via a fusable link 154. A high impedance is provided to the data line by a series resistor 160 in the data path. A small amount of filtering is provided by a capacitor 158 across the data line. Only minimal filtering is required because the primary filtering is handled by digital signal processing techniques within microcomputer 100. A zener diode 162 establishes a 10 volt threshold level for decoding the logic levels of received data. This threshold provides a certain measure of noise immunity.

The normal state of data line 58 is active (high impedance) when the line is free. This corresponds to a voltage level of greater than 10 volts between the two wires of the twisted pair forming data line 58 in accordance with the definition of the active state and the detailed discussion of the communication link.

A voltage of greater than 10 volts at data line 58 effectively turns on transistor 164 which turns off transistor 166 and maintains optoisolator 150 in an off condition. Since the normal condition is low power, there is very little stress on optoisolator 150, enhancing system reliability. When optoisolator 150 is off, the collector of transistor 170 is pulled up to five volts by a resistor 173 coupled thereto. Because amplifier 172 is an inverting amplifier, a logic level zero will appear at the data input SID for coupling into pin 38 of microcomputer 100. In summary, the normal, active state of the data line (data line 58) impresses a logic level zero on the SID input of microcomputer 100.

When data line 58 is driven by controller 50 or another transceiver decoder 56 to a voltage level of less than 10 volts between the wires of the twisted pair, zener diode 162 blocks current to transistor 164 causing it to be in the cut off state. Transistor 164 then turns on transistor 166 which causes optoisolator 150 to turn on (current through diode 168). The turning on of optoisolator 150 causes transistor 170 to turn on thereby establishing a zero level at the input of amplifier 172 and a logic level one to appear at the data input SID of microcomputer 100. Thus, when the data line is driven to an inactive state (low impedance) a logic level "1" will appear at the data input SID of microcomputer 100.

When microcomputer 100 of a transceiver decoder 56 wants to drive the data line (data line 58) it must bring the data line to an inactive (low impedance) state. No transceiver decoder 56 is capable of sourcing current onto the line, but rather drives the data line 58 to a lower impedance state thereby impressing a signal upon it. Only controller 50 sources current onto data line 58. There are two states defined for the data line: a high impedance state (greater than 90 ohms) wherein the voltage level between the wires of data line 58 exceeds 10 volts and a low impedance state (less than 50 ohms) wherein the voltage level between the wires of the twisted pair is less than 10 volts. This impedance level difference allows the use of bus arbitration. In order to drive the data line, a transceiver decoder 56 must drive the data line to a low impedance condition. A logic level "0" appearing at the output data line SOD of microcomputer 100 will turn on an LED 174 within optoisolator 152. Optoisolator 152 includes a phototransistor 176 which is turned on by the conduction of LED 174 thereby supplying curent from the isolated power supply to the output drive transistor 178. Turning on transistor 178 across the data line sinks enough current so that the voltage level between the wires of data line 58 falls to less than 10 volts and the impedance between the wires drops below 50 ohms. Current is sunk through fusable link 154. If transistor 178 fails so as to present a low impedance between its collector and emitter, data line 58 is effectively shorted. By virtue of data line 58 being held in a low impedance state for an abnormal length of time, controller 50 detects a malfunction and responds by sending a pulse of approximately one amp down data line 58. This pulse is designed to blow fusable link 154 of the malfunctioned transceiver decoder 56 thereby severing that particular transceiver decoder from data line 58. This detection and subsequent response by attempting to blow fusible link 154 on a malfunctioning transceiver decoder 56 constitutes the self clearing mode of the transceiver decoder operation.

As stated, optoisolators 150 and 152 and an isolated power supply provide isolation between microcomputer 100 and the data line. This isolation helps to maintain the integrity of data line 58 and provides noise immunity. Data line 58 runs throughout the entire system and is quite long. It is possible for noise to be coupled into data line 58 from various electrical sources. Even if the line were brought to a level of 1,000 volts with respect to earth ground, isolation prevents this higher voltage level on data line 58 from affecting either controller 50 or microcomputer 100. Both controller 50 and microcomputer 100 will still be able to distinguish active and inactive data levels by sensing the differential voltage between the wires of data line 58.

By using a twisted pair for data line 58, common mode rejection is enhanced. A property of twisted pair is that in the presence of a strong magnetic field, signals coupled into one wire of the twisted pair will also be coupled into the other wire. Common mode noise is therefore rejected on input and output circuit 108 and only the differential signal between the wires of data line 58 is amplified and decoded. If one wire of the twisted pair of data line 58 were referenced to ground, this would not be possible.

Analog Sensor Section

Figure 9:
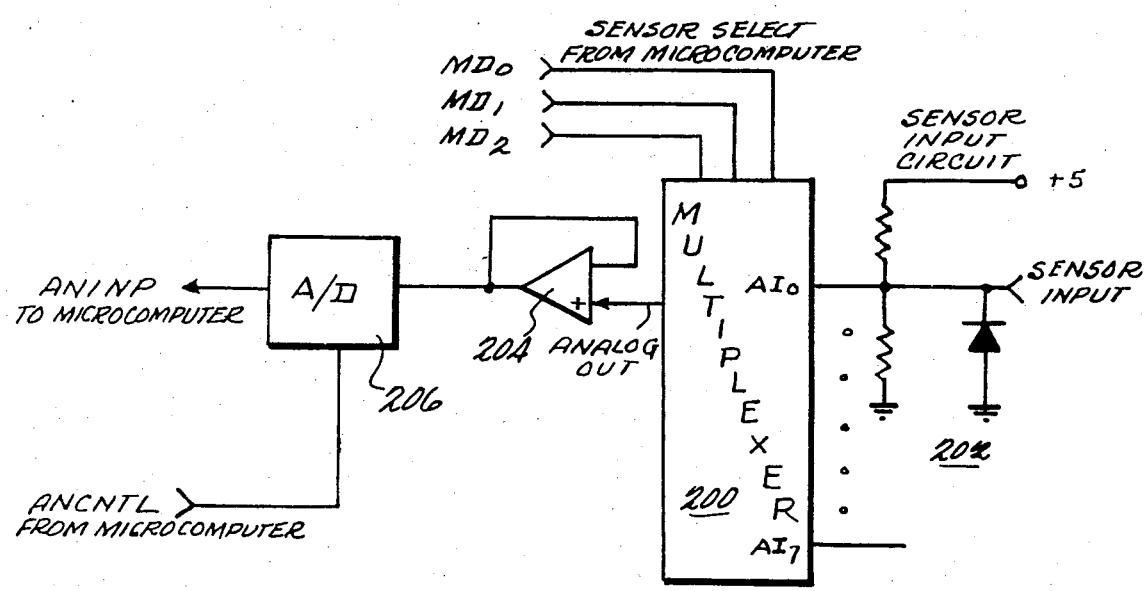
FIG. 9 is a schematic and block diagram of the analaog sensor section of a transceiver decoder.

Referring now to FIG. 9 there is shown a more detailed diagram of analog sensor section 110 of a transceiver decoder 56. Analog sensor section 110 accommodates up to eight analog inputs for coupling to analog devices such as photocells and thermistors. These analog inputs are periodically interrogated by controller 50 to determine the ambient conditions that exist at a remote control point. Light and temperature levels can be read by connecting the appropriate sensors to analog sensor section 110.

One of eight analog inputs is selected by a multiplexer 200 having sensor select inputs multiplexed onto the MD0, MD1, and MD2 outputs (pins 37, 36, and 35) of microcomputer 100. Utilizing these three sensor select bits, multiplexer 200 is able to select one of eight sensor input circuits 202. A representative sensor input circuit 202 is shown coupled to the AI$_0$ input of multiplexer 200. The output of multiplexer 200 is coupled through an isolation amplifier 204, suitably a voltage follower circuit utilizing an operational amplifier, to an analog to digital converter 206. Analog to digital converter 206 is suitable a dual slope A/D converter having a maximum conversion cycle time of 22 milliseconds. The output of analog to digital converter 206 is coupled to the ANINP input (pin 27) of microcomputer 100. Ramp control of analog to digital conveter 206 is coupled to the ANCNTL output (pin 28) of microcomputer 100.

Watchdog Reset

Figure 10:
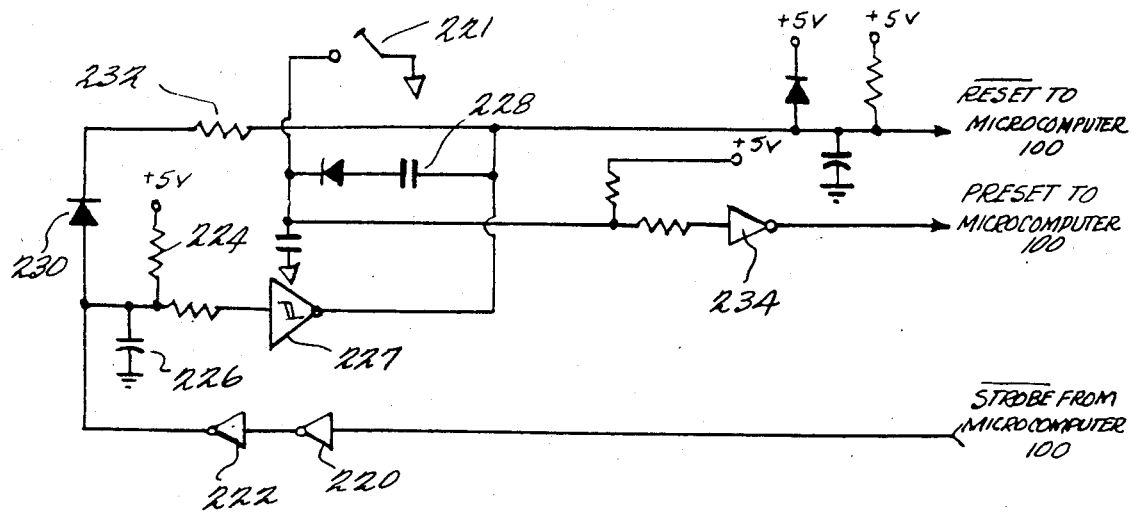
FIG. 10 is a schematic diagram of the watchdog reset circuit of a transceiver decoder.

Referring now to FIG. 10 there is shown a detailed schematic diagram of Watchdog reset circuit 120. Because transceiver decoder 56 is based upon a single chip microcomputer 100, it operates as a sequential machine executing a sequence of instructions. In its normal power-up mode, the microcomputer must periodically reset itself in order to justify its operation back to its zero address. In addition, the sequence of instructions to be executed depends upon values stored within internal registers such as its program counter. Due to the presence of noise, it is possible for internal registers to drop a bit of data in such a manner that the data bit loss would cause microcomputer 100 to execute an improper instruction, an out of sequence instruction, or execute on data rather than the appropriate instruction. It is possible for microcomputer 100 to be forced into an operating loop which effectively latches the entire board and prevents it from responding to any command from external sources. In addition, it is advantangeous to provide the capability to override the system at a transceiver decoder 56 in the event of a controller 50 or data line 58 failure.

Watchdog reset circuit 120 provides a source of periodic reset pulses for justifying the operation of microcomputer 100 to its zero address for the start of each of its normal cycles through its address sequence. In addition, watchdog reset circuit 120 provides reset pulses to justify microcomputer 100 after a dropped data bit has caused it to stray from its normal sequence of operation. In addition, an emergency override switch 221 provides a preset signal for causing all relays to be turned on regardless of signals on data line 58. Operating in such a preset mode effectively returns all relays associated with the preset transceiver decoder 56 to circuit breaker control.

In the absence of a STROBE signal from microcomputer 100, watchdog reset circuit 120 provides RESET pulses to the microcomputer every 240 milliseconds. Thus, in the absence of a STROBE pulse from microcomputer 100, the microcomputer would be returned to its zero address every 240 milliseconds when a pulse is received at its reset input. The time period between reset pulses is controlled by the RC time constant associated with a resistor 224 and a capacitor 226. When allowed to charge, in the absence of a STROBE pulse, capacitor 226 charges through resistor 224 to a predetermined voltage level, typically 2.5 volts. When capacitor 226 is permitted to charge, it trips a Schmitt trigger 227 having an inverting output coupled to the reset input line of microcomputer 100. Once activated by a RESET signal, microcomputer 100 executes the instruction at its zero address location as if it were being powered up for the first time.

When microcomputer 100 is functioning normally and executing its instructions in proper sequence, it clears the charge from capacitor 226 by coupling a STROBE signal through inverting amplifiers 220 and 222 to capacitor 226. When microcomputer 100 is operating properly, a STROBE of approximately 4 microseconds appears every 25 milliseconds. These STROBE pulses, 25 milliseconds apart, clear the voltage from capacitor 226 before Schmitt trigger 227 can be triggered, thus inhibiting RESET pulses from watchdog reset circuit in the absence of STROBE pulses from microcomputer 100, a feedback loop formed by a diode 230 and resistor 232 cause a periodic pulse signal to appear on the RESET line. In essence, the STROBE can be thought of as the heart beat of microcomputer 100. Until that heart beat is sensed, the RESET line will continue to pulse the microprocessor until the computer is operating properly and the STROBE is found.

When controller 50 fails or data line 58 is severed, no data can be transferred to the relays associated with a transceiver decoder 56. Therefore means are provided for overriding data line control of relays. The activation of preset switch 221 provides a signal forcing all relays on thereby returning them to circuit breaker control without the necessity for hard wiring them around a transceiver decoder 56. This provides an emergency backup for a controller 50 or data line 58 failure.

Preset switch 221, when activated, provides a pulse on the RESET line. When microcomputer 100 senses a RESET pulse, it reads the PRESET input line. The PRESET input line is coupled through inverter 234 to preset switch 221. The activation of switch 221 effectively grounds the input of inverter 234 thereby providing a logic level 1 at its output. That logic level 1 at the output of inverter 234 appears on the preset line simultaneously with the appearance of a RESET pulse on the reset line. Switch 221 is AC coupled by a capacitor 228 to the RESET line. AC coupling insures that the RESET line will pulse while the PRESET line stays at DC. This insures that when microcomputer 100 responds to a reset pulse, it will read the PRESET as being at a logic level 1 and know that it should go into a PRESET state and force all relays on.

Switchleg Input

Figure 11:
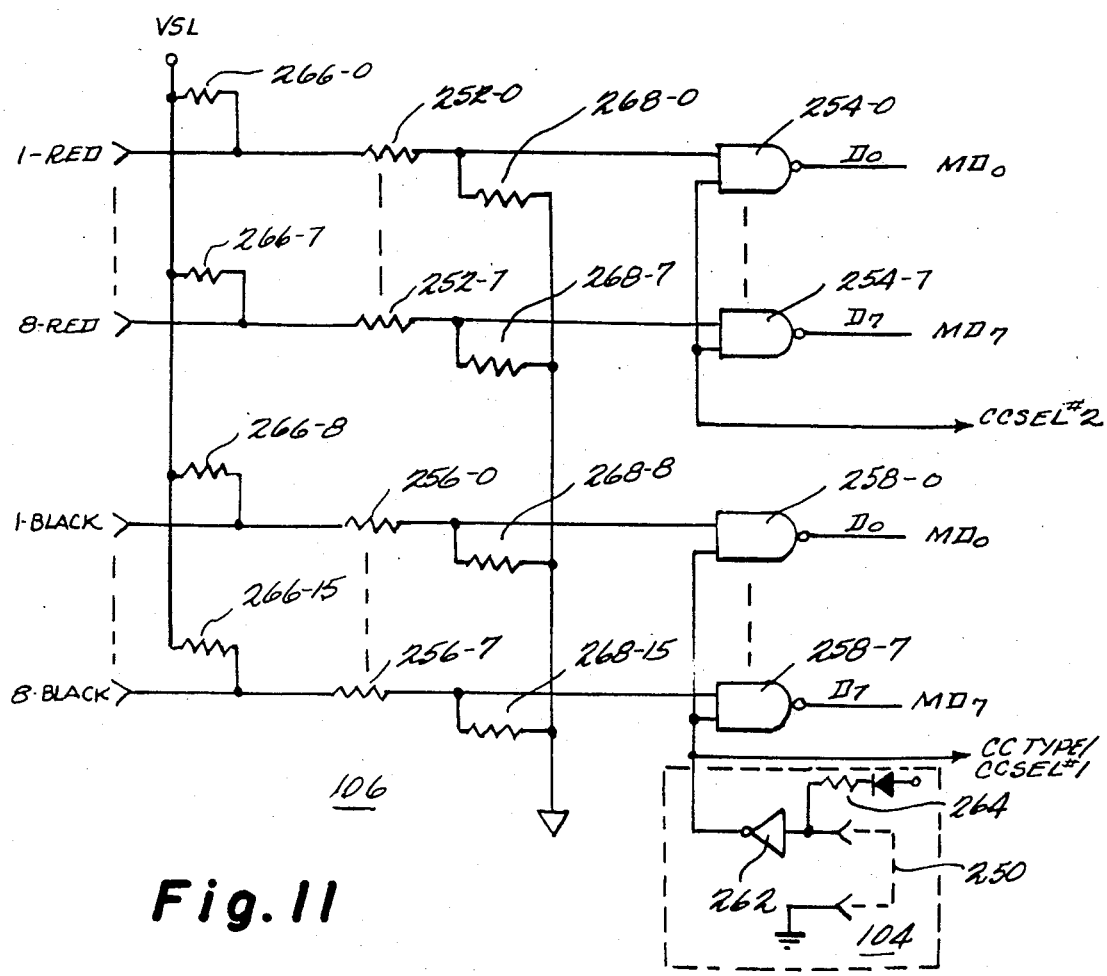
FIG. 11 is a schematic diagram of the switchleg input circuit and switchleg jumper circuit of a transceiver decoder.

Referring now to FIG. 11, there is shown a detailed schematic diagram of switchleg input circuit 106 and switchleg jumper circuit 104. Each transceiver decoder 56 includes switchleg inputs for up to eight remote switches 68. By the coupling or decoupling of a switchleg jumper 250, switchleg jumper circuit 104 appropriately instructs microcomputer 100 so that either momentary or maintained type switches can be used. There are 16 inputs labeled 1-red . . . 8-red, 1-black . . . 8-black. Each of the red inputs is coupled through a resistor 252-0 . . . 252-7 to one input of a NAND gate 254-0 . . . 254-7 respectively. The outputs of NAND gates 254 are coupled respectively to the MD0 . . . MD7 input lines of microcomputer 100. The other inputs of NAND gates 254 are tied together and coupled to the CCSEL #2 input of microcomputer 100. Similarly, the eight black switch inputs are respectively coupled through resistors 256-0 . . . 256-7 to one input each of NAND gates 258-0 . . . 258-7 respectively. The respective output lines of NAND gates 258 are also coupled to the MD0 . . . MD7 inputs of microcomputer 100. The second inputs of NAND gates 258 are tied together and are coupled to the CCTYPE/CCSEL #1 input of microcomputer 100. The output of switchleg jumper circuit 104 is also coupled to the CCTYPE/CCSEL #1 input of microcomputer 100.

The switchleg voltage VSL is 20-40 volts generated in a switchleg power supply (not shown). The combination of resistors 266 and 268 coupled into each of gates 254 and 258 provide appropriate voltage levels to operate the gates so as to provide a 3.5-5 volt output for coupling into standard TTL logic entering microcomputer 100. When jumper 250 is removed from jumper circuit 104, the input of an amplifier 262 is pulled up to a 5 volt level by the action of a resistor 264 in series with a diode. This forces the inverted output of amplifier 262 and the connected CCTYPE/CCSEL #1 input at pin 29 of microcomputer 100 to a logic level 0. With pin 29 of microcomputer 100 at a logic zero, switchleg input circuit 106 is set for the use of maintain switches, that is switches which maintain contact between their poles rather than making a momentary contact and returning to an open normal condition immediately thereafter. By forcing pin 29 of microcomputer 100 to a saturated logic level zero state, it is impossible to drive that input line high and thus, one input to each of gates 258 will be a logic level zero disabling gates 258 since they are not used with maintain switches.

The maintain mode switches will be coupled to the eight red inputs coupled to gates 254. Again, a maintain mode switch maintains contact closure until the contact is opened. Using maintain mode switches, coupled to the eight red inputs, if a switch is open, the red input line is pulled up to switchleg voltage VSL which is between 20 and 40 volts depending upon voltage variations and loading. A voltage of 20-40 volts is utilized so that there will be sufficient voltage to prevent the mechanical contacts of the switches from building up an oxide layer thereby rendering the switch unreliable. Also, the use of a voltage between 20 and 40 volts, as opposed to using logic level voltage, allows the switchleg to be somewhat remote from the transceiver decoder 56. With the IR loses associated in long wires, a logic level signal would require that the switches be only a short distance from transceiver decoder 56. With voltage VSL applied, the switchleg voltages are divided through resistors 266, 252 and 268. This voltage division provides a standard TTL logic level of 3.5–5 volts.

In order to utilize momentary type switches, jumper 250 is inserted in switchleg jumper circuit 104 thereby forcing the output of amplifier 262 to a logic level 1. Thus, gates 258-0 . . . 258-7 become operable and momentary type switches or contact closures can be coupled between the corresponding red and black inputs for a particular switch member.

Microcomputer 100 at intervals of from 75 to 80 milliseconds reads (polls) the switchlegs connected to its MD0-MD7 inputs at its pins 37–25 respectively. This reading operation is done without any command from any other devices connected to its data lines. This reading is under the logic control of microcomputer 100. It is done independently and on its own, and in accordance with its internal clock. Essentially, microcomputer 100 is a sequential machine which operates through its various states to do specific tasks. Even though it is continuously interrogating the switchlegs to determine their status, it is not continuously sending that data back to controller 50. The only time a switchleg 68 requires action is when there is a change in its state. That is, when its state is different from the previous reading of it 75 to 80 milliseconds before. For example, assuming a switch 68 is coupled to switchleg input 1, the input of NAND gate 254-0 will be allowed to pull up to a plus voltage thereby enabling the gate. When a switchleg is interrogated or polled by microcomputer 100, a high voltage appears on the output of gate 254. A TTL gate is used where output is of the open collector variety. It will either saturate and stick the line at a logic zero or be in a high impedance state. Therefore, the driving of the line to a logic level 1 is performed on internal pull-up devices or in this case by resistors located internal to the microcomputer 100.

Once a transition has been made from an open switch state to a closed switch state or from a closed switch state to an open switch state a change in disposition of the switch from the prior reading about 80 milliseconds ago takes place. A series of readings then follows in order to prevent an erroneous reading. To guard against erroneous readings, 10 readings are successively made and they must all have the same reading for a switch to be accepted as a closure or as a change of state. Once the change of state has been verified, the microcomputer 100 will attempt to access the data line in order to transmit this information to controller 50.

In the case of a momentary type switch only the positive action of temporarily closing the switch is meaningful. Contact is made and then broken. However the breaking of contact is not acted upon. Momentary type switch connections can be used for photo relays and other types of condition responsive devices having a switch-like trigger mechanism coupled to a switchleg input as well as for momentary type switches. By using momentary type switches you can connect the off stage of the switch to different switch numbers to provide increased flexibility for the system.

Relay Drivers

Figure 12:
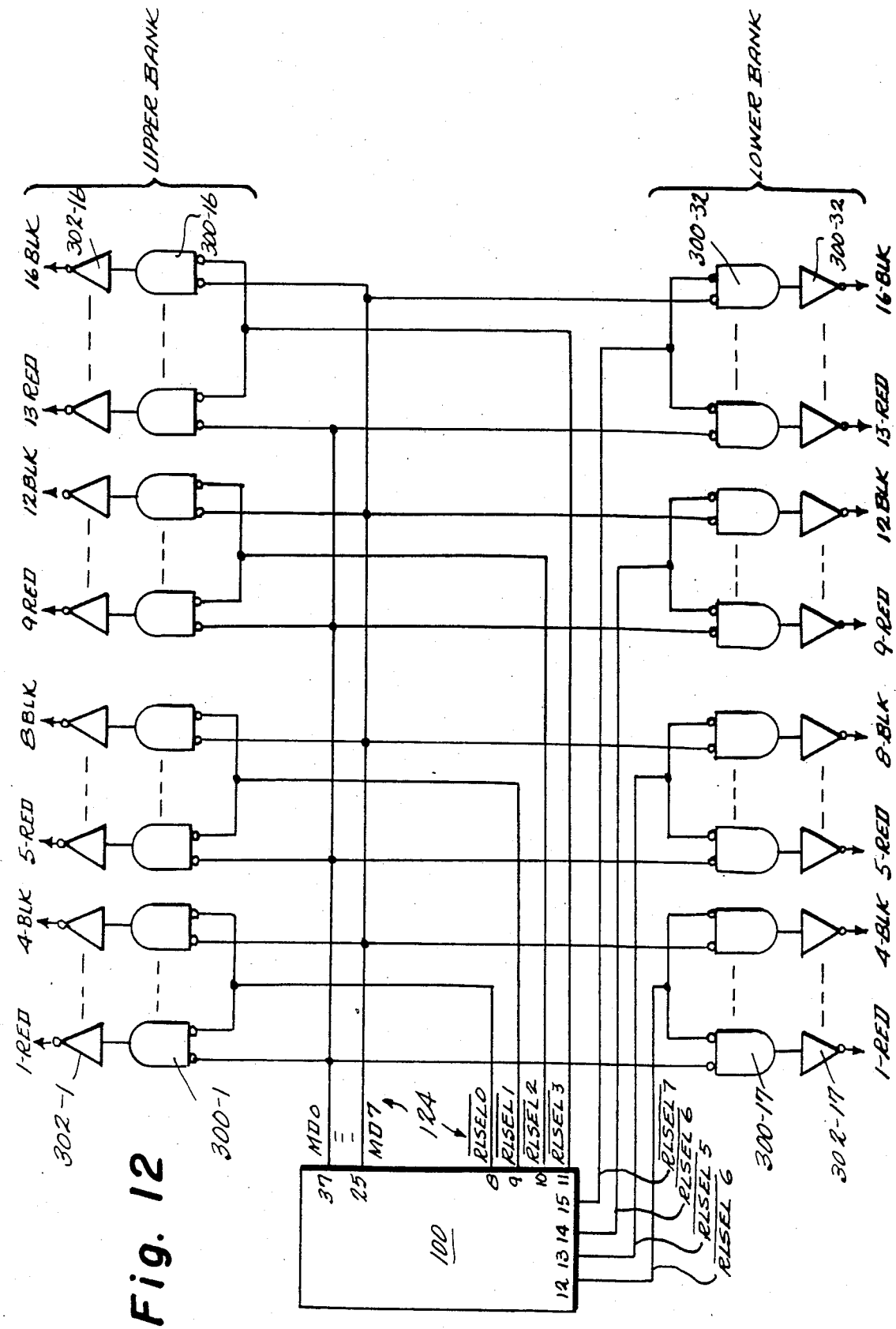
FIG. 12 is a schematic diagram of the relay drive circuitry of transceiver decoder.

Referring now to FIG. 12 there is shown a detailed schematic diagram of relay drivers 126 coupled to their drive matrix lines 124. Transceiver decoder 56 includes a bank of 32 relay drivers organized into an upper bank of 16 relay drivers and a lower bank of 16 relay drivers. Each relay is associated with two gates 300 and two amplifier drivers 302. In the upper bank the gates are numbered 300-1 . . . 300-16 and the inverting amplifiers are numbered 302-1 . . . 302-16. In the lower bank the gates are numbered 300-17 . . . 300-32 and the amplifier drivers are numbered 302-17 . . . 302-32 . In both the upper and lower banks, the gate/amplifier combinations are wired in groups of eight (to control four relays) with one gate input commonly connected. Pins 8-15 of microcomputer 100 are relay bank select signals RLSEL0 . . . RLSEL7 respectively and are coupled to the common input of each group of gates/ amplifiers. Data bus lines MD0 . . . MD7 on pins 37–25 of microcomputer 100 are connected one each to each of the gates/amplifiers of each group. Thus, a particular relay bank select signal coupled with a specific address line defines only one relay including two gates 300 and two amplifier drivers 302. When using all 32 relays, transceiver decoder 56 is assigned two consecutive addresses, the first being an even address and the second being the odd address immediately following the even address.

Microcomputer 100 responds to the even and odd address coding wherein the least significant figure is in essence a "don't care" bit. The particular transceiver decoder 56 addressed will respond to either of these addresses. The upper bank of relay drivers will respond to the even address and the lower bank of relay drivers will respond to the odd address. Each of amplifier drivers 302 includes a Darlington pair (open collector) of transistors for directly driving a relay. It further includes a transient protection diode to protect from inductive load kick-back from a relay that has been triggered. The relays are standard latching type relays having three wires, one red and one black and one blue. The red and black wires of the relay connect to a pair of adjacent amplifier drivers 302. A pulse on the black wire forces the relay into an open state and a pulse on the red wire forces the relay into a closed state. The blue wire is the common and is coupled to a power supply. To drive the relay to either of its bi-stable states (open or closed) the red or black wire is grounded by an enabling pulse from amplifier driver 302.

As stated, each group of four relays is coupled to a relay bank select signal (one of pins 8-15 of microcomputer 100). Enabling a given bank select signal enables up to four relays. However, due to excessive loading on the semiconductors in the relay drivers, only two relays in a bank are activated at the same time. Data appearing on data lines MD0 . . . MD7 specify the particular state for each relay winding when a relay becomes energized. After the data is stable on lines MD0 . . . MD7, a bank select signal activates a particular bank. Relays are pulsed in groups of two and microcomputer 100 cycles through the entire bank of relays repeatedly. It takes 25 milliseconds to pulse a single relay winding and two such windings are activated at the same time. After a period of 200 milliseconds 16 relays have been pulsed. However, because of mechanical shifts in the properties of the relays, i.e., armature displacements, etc., a particular relay may not be pulsed on or off as desired. Therefore, each relay is pulsed three times so that in case it does not change state on the first pulse it will probably change state on either the second or third pulses. Three full cycles require 600 milliseconds so that an entire bank of 16 relays can be pulsed three times in succession.

Transceiver Decoder Microcomputer Logic Function

All logic functions of transceiver decoder 56 are carried out by microcomputer 100. Microcomputer 100 is suitably a 3870 (originally developed by MOSTEK and also sourced by Fairchild and Motorola). The 3870 is a single chip microcomputer system providing standard architecture that is customized through the use of firmware built into an on-chip read only memory (ROM) to perform the specific logic functions required. With the specific ROM code set forth below in Appendix A, microcomputer 100 is transformed into a custom transceiver decoder chip.

As customized by the ROM code set forth in Appendix A, microcomputer 100 performs tasks falling within four main modes of operation:
data communications handling
relay actuation and control
contact closure (processing)
analog sensor handling Along with these four main modes of operation, a built in fifth mode allows the contents of its internal ROM to be dumped and checked. Even though all logic functions are built into the ROM code for microcomputer 100, these logic functions can be represented by functional blocks and can be hard wired using standard logic components.

Figure 13:
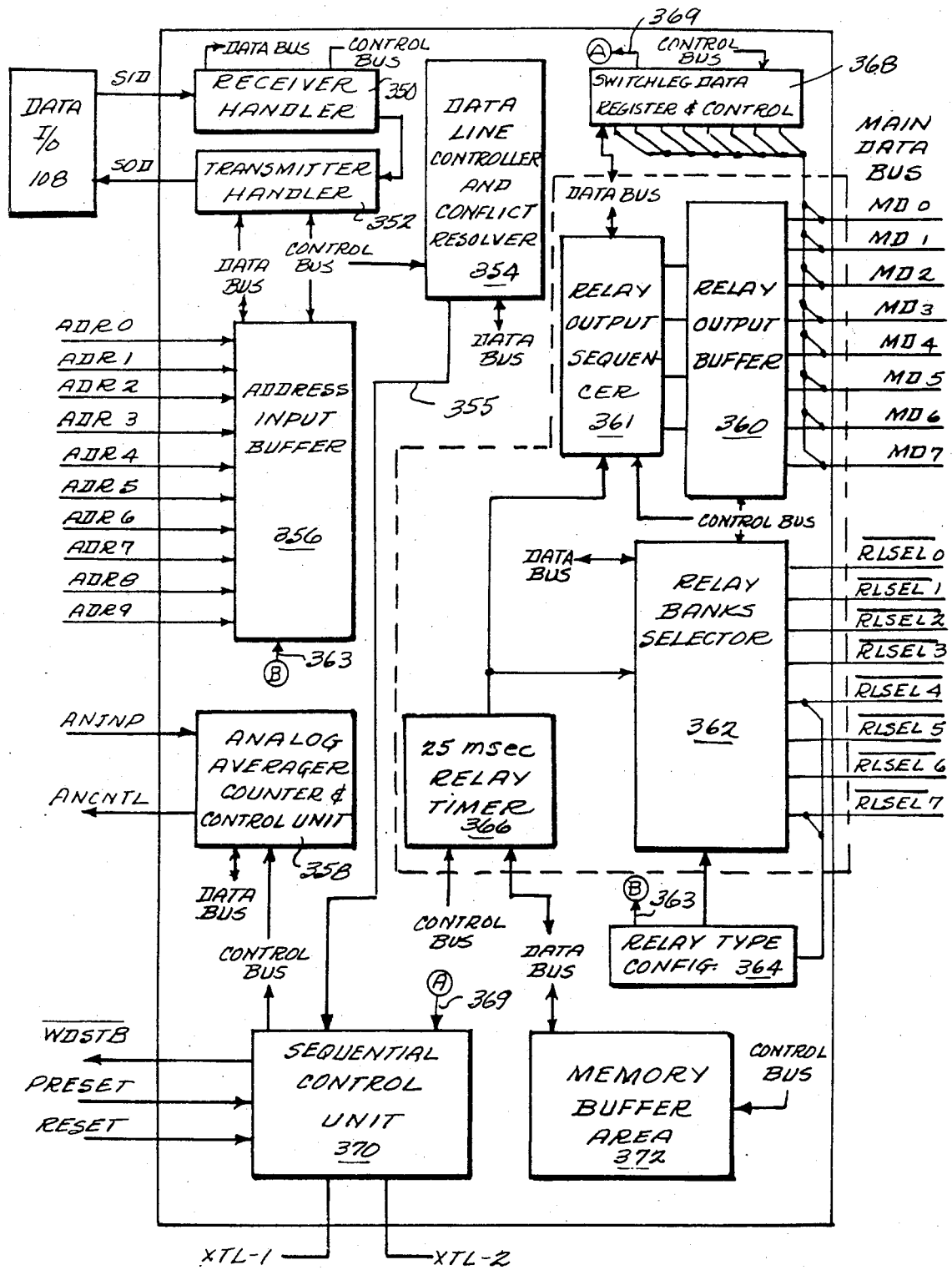
FIG. 13 is a functional block diagram of the microcomputer in each transceiver decoder.

Referring now to FIG. 13 there is shown a functional block diagram of microcomputer 100. In essence, these functional blocks correspond to the blocks that would exist if the functions of transceiver decoder 56 were hard wired into discrete components instead of being implemented by a specialized microcomputer. Overall sequential control of the logic function of microcomputer 100 is provided by a sequential control unit 370 which receives signals indicating the status of various blocks and generates control signals on control lines for stepping the various functional blocks through their respective tasks. Data received from data line 58 through data I/O 108 is coupled to the SID (pin 38) input of microcomputer 100 and is received by a receiver handler 350. Receiver handler 350 provides inut logic and phase locked loop filtering for incoming data. Data to be transmitted by microcomputer 100 through data I/O 108 is coupled onto the SOD line (pin 26) of the microcomputer from a transmitter handler 352.

Receiver handler 350 and transmitter handler 352 are each coupled to a data line controller and conflict resolver 354 for resolving conflicts between received data and data to be transmitted. Transmitted data includes switchleg activations, analog sensor inputs and relay status information. When data has been received by data line controller and conflict resolver 354 from receiver handler 350, the data line controller and conflict resolver sends a signal on a signal line 351 to sequential control unit 370 indicating that data has been received.

Switchleg data on the MD0 to MD7 data bus is coupled into a switchleg data register and controller 368. Switchleg data register and controller 368 includes registers storing the previous state of each switch input and its current state and includes a comparator for comparing the values in these two registers to determine if a switch has changed state; i.e., a user has turned his switch on or off. When a status change of a switch is indicated switchleg data register and controller 368 sends a signal on a line 369 to sequential control unit 370 indicating that switch data must be sent onto data line 58 for transmission to controller 50. Sequential control unit 370 then issues a command on its control line to switchleg data register and controller 368 causing it to couple its data onto an internal data bus for transfer to data line controller and conflict resolver 354 for ultimate transfer through transmitter handler 352 and data I/O 108 to data line 58. An internal 8 bit wide data bus couples all block sending and receiving data so that data can be freely transferred between blocks at the direction of control signals from sequential control unit 370. Sequential control unit 370 is coupled to each functional block through control lines for disseminating control signals for controlling the flow of data and sequence of operation of the blocks.

An address input buffer and latch 356 is coupled to the address lines ADR0...ADR9 at pins 3-6 and 19-16 and 33-32 respectively. Address input buffer 356 couples address information into microcomputer 100 and latches the address information into a set of buffers so that the information can subsequently be compared with the address called for in data received from data line 8. When data is received through receiver handler 350 and coupled to data line controller and conflict resolver 354, the data line controller and conflict resolver sends a signal on a line 355 to sequential control unit 370 indicating that data has been received. Through its control lines, sequential control unit gates the address information in address input buffer 356 (address set for this particular transceiver decoder 56 by the user when installed) to data line controller and conflict resolver 354 for comparison with the address received from data line 58. The address information from address input buffer 356 is transferred to data line controller and conflict resolver 354 on the internal data bus. If an address comparison indicates a valid address (transmission intended for *this* transceiver decoder 56) a signal is sent on line 355 to sequential control unit 370. Sequential control unit 370 causes a decode of the data and takes the required action. The required action may be the taking of an analog sense reading, the activation of a relay or the sending of relay status information. If an analog sensor reading is required, sequential control unit 370 activates through its control lines an analog averager and control unit 358.

Analog averager counter and control unit 358 accepts analog information ANINP coupled to pin 27 of microcomputer 100 from an A/D converter 206 and provides the ANLNTL signal to the A/D converter. Analog averager counter and control unit 358 has the capability to control the dual slope of A/D converter 206 and to read a dual slope conversion circuit within the A/D converter. Analog averager counter and control unit 358 includes an analog averaging counter and a control circuit. In essence, it is merely a preset counter that is gated on and off to count up or down from a preset count.

If sequential control unit 370 determines from the decoded data that a relay activation is required, it activates via its control lines, a relay output sequencer 361. Sequential control unit 370 also enables data line controller and conflict resolver 354 to impress the data in data fields 0 and 1 onto the internal data bus for coupling to relay output sequencer 361. A control signal from sequential control unit 370 causes the data in relay output sequencer 361 to transfer its data to a relay output buffer 360 for driving relays through lines MD0 to MD7. Simultaneous with the control signal to relay output sequencer 361, a control signal is coupled to a relay timer 366 which is a 25 msec. timer. Relay timer 366 activates a relay bank selector 362 causing it to select the appropriate relay bank through lines RLSEL0 to RLSEL7. Together, relay timer 366, relay bank selector 362, relay output sequencer 361 and relay output buffer 360 determine the duration and which relays are to be actuated and to which states they are to be actuated. These four blocks are activated simultaneously by sequential control unit 370 in response to the received data in data line controller and conflict resolver 354. Relay timer 366 controls the sequencing of the eight banks of relays by relay bank selector 362 so that there is a continuous cycling from one bank to the next so that relays will be pulsed in turn at regular intervals.

A relay type configuration 364 determines whether the particular transceiver decoder 56 has a 16 or 32 relay configuration. A 16 relay configuration transceiver decoder responds to a single address and a 32 relay configuration transceiver decoder responds to two consecutive addresses, one for each bank of 16 relays. The information from relay type configuration 364 is coupled to address input buffer 356 via a line 363 so that the address input buffer will provide both address to data line controller and conflict resolver 354 for address comparison.

A memory buffer area 372 contains system constants representing the previous states of relays and other information, such as sensor input values that are provided by interrogation (polling) by controller 50 over data line 58.

Figure 14:
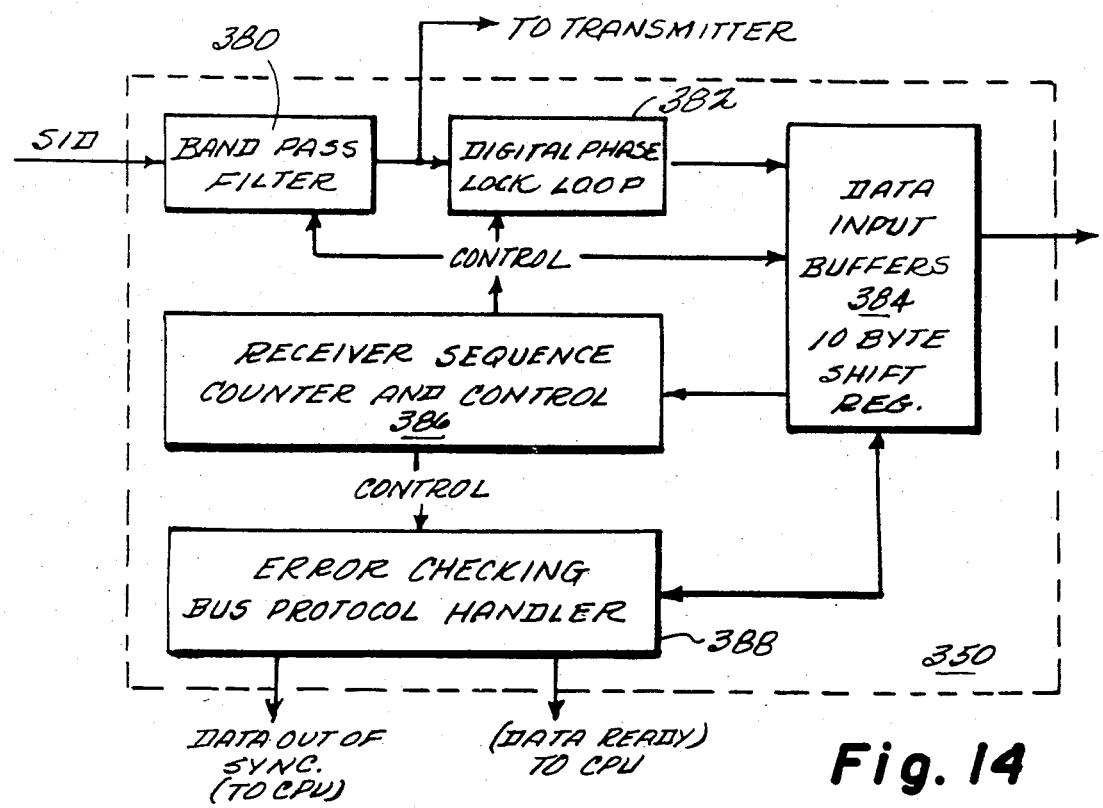
FIG. 14 is a more detailed block diagram of the receiver handler block shown in FIG. 13.

Referring now to FIG. 14 there is shown an expanded block diagram of receiver handler 350. Data bus input SID at pin 38 of microcomputer 100 is coupled to a band pass filter having an initial band width of 4–5 KHz. The output of band pass filter 380 is coupled to the input of a digital phase lock loop 382. During the time that a preamble is being received, digital phase lock loop 382 operates with a capture range of about 5 KHz. After phase lock has been achieved and the preamble has been "captured", the bandwidth of the loop tightens. After lock-up has occurred, digital phase lock loop 382 supplies information to data input buffers 384. In the meantime, a receiver sequence counter and control unit 386 adjusts the bandwidth of band pass filter 380. This bandwidth can be adjusted by triggering a set of transmission gates switching on various capacitive values on an op-amp active filter.

After lock has been achieved, digital phase lock loop 382 is reduced in bandwidth to roughly one-half of the frequency that is being transmitted and has been captured. This frequency is determined only by the data coupled into microcomputer 100 on the data input bus SID. Since all transceiver decoders 56 and controller 50 are operating asynchronously, the capture range of digital phase lock loop 382 must be wide. Receiver sequence counter and control 386 is coupled to a conventional error checking bus protocol handler 388 which is a standard parity bit generator and comparator. The free output lines from receiver handler 350 shown in FIG. 15 correspond to the signal line from the receiver handler to data line controller and conflict resolver 354 in FIG. 14. A flow chart of the function of receiver handler 350 is set forth in FIG. 15.

Figure 15:
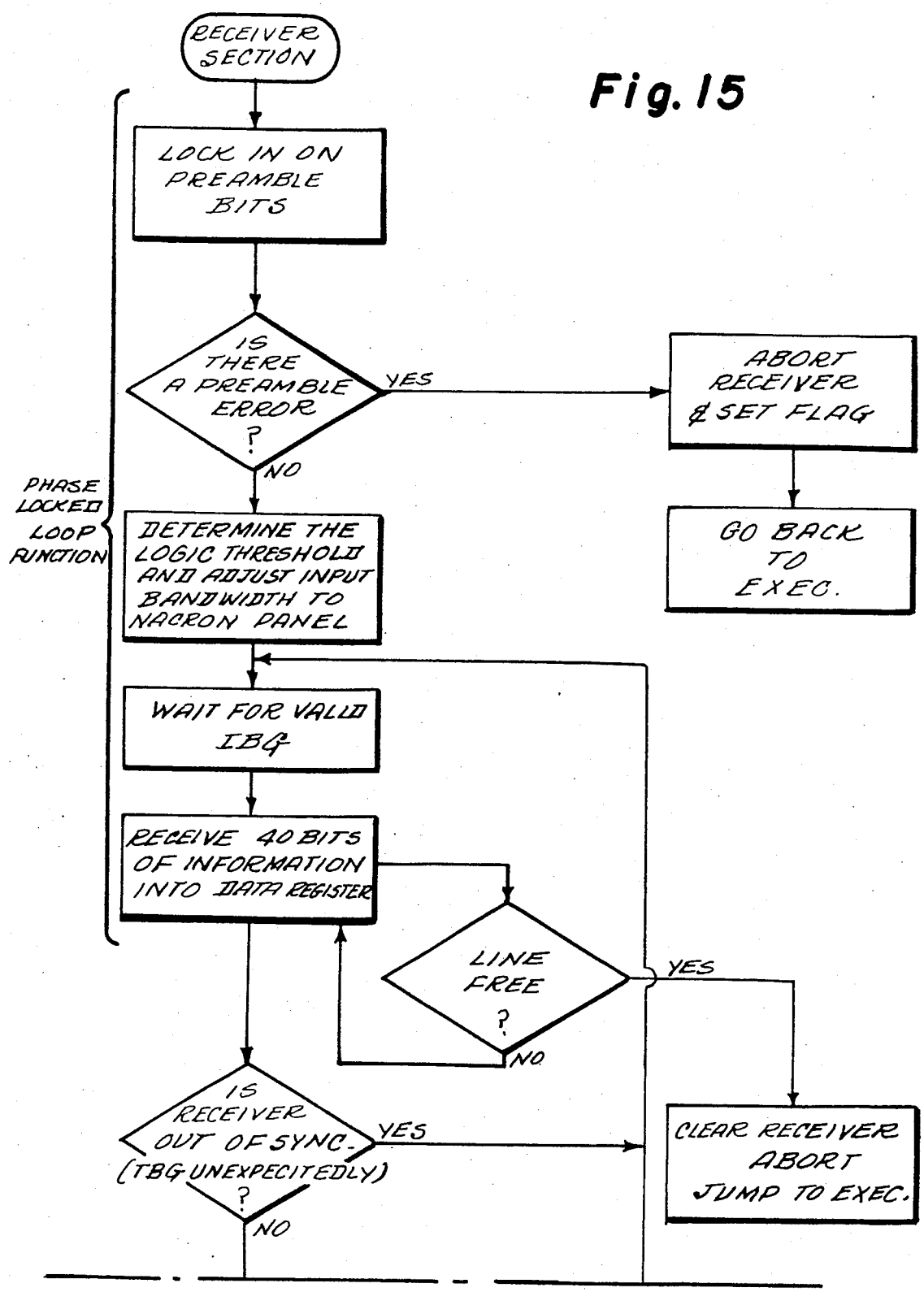
FIGS. 15 and 15a show a flow chart illustrating the logic flow of the receiver function of a transceiver decoder.
Figure 15A:
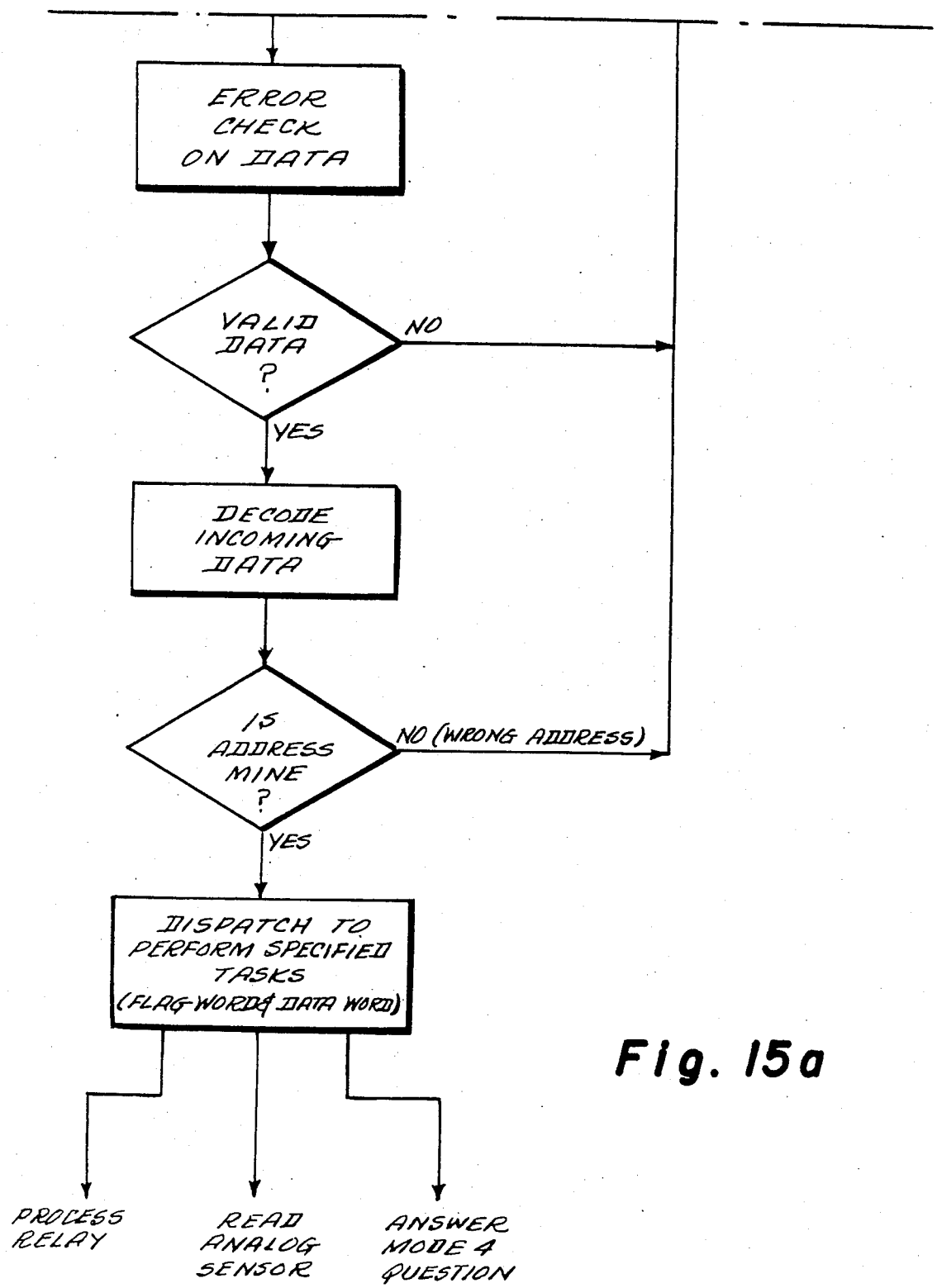

Referring now to FIG. 15, the logic flow of the receiver function of transceiver decoder 56 is set forth. When data line 58 is observed to be in an IBG (low impedance state), data begins to flow with a preamble. During the transmission of the preamble, a digitally simulated phase locked loop locks onto the preamble bits. A minimum of four bits is required for lock. The initial bandwidth of the loop allows lock to a data rate of 300–5000 bits/second.

After preamble lock, it is determined whether or not there is a preamble error.

If there is a preamble error, the received function is aborted and a flag set, control is returned to the executive.

However, if there is no preamble error, the logic thresholds are determined from the preamble bits. During the discussion of the communications link, it was defined that the preamble bits were a 50% duty cycle signal and that logic levels one and zero were determined as a pulse width greater than or less than the width of the preamble bits. It is from the four preamble bits received that the logic threshold levels are established from which logic ones and zeros will be decoded.

After logic level thresholds have been established, the band width of the digitally simulated phase lock loop is narrowed to a range more closely approximating the data rate established by the preamble. After a valid IBG, 40 bits of data are received into data input buffer 384. After data has been received into data input buffer 384, it is determined whether or not the receiver is out of sync. This is determined by the presence of an IBG at an unexpected point in time.

If the receiver is not out of sync, the data is checked by error checking bus protocol handler 388. If the data is determined to be valid, the data is decoded.

After data is decoded, the address transmitted is compared with the address of the transceiver decoder 56 receiving the data (see FIG. 6—Address Election Bus 102). If the address corresponds, the transceiver decoder 56 is dispatched to perform a specific task called for by the flag word and data word in the data received. This data could correspond to processing a relay function, reading an analog sensor, or answering a mode four interrogation by controller 50.

Returning to the reception of the 40 bits of information into data input register 384, a line check is performed to see if the line is free. If the line is not free, data is received, however, if the line is free, then the receiver is cleared and reception aborted, and control returned to the executive.

If the receiver is determined to be out of sync, then the receiver waits for another valid IBG. If the data check by error checking bus protocol handler 388 is determined to be invalid, then the receiver also waits for a valid IBG before proceeding. Furthermore, if when the address is compared, the address is not for a particular transceiver decoder receiving data, then that receiver waits for a valid IBG before proceeding. An expanded block diagram of the transmitter handler 352 is set forth in FIG. 16.

Figure 16:
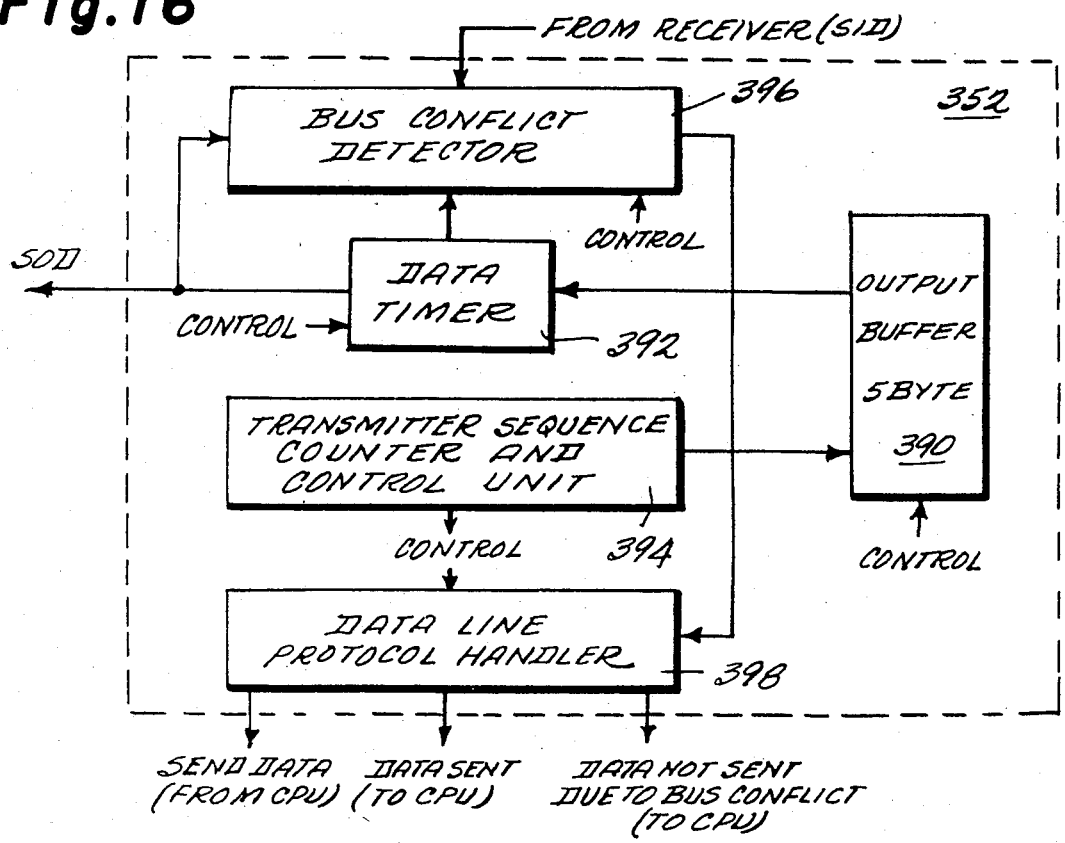
FIG. 16 is a more detailed block diagram of the transmitter handler block shown in FIG. 13.

Referring now to FIG. 16, there is shown a more detailed blocked diagram of transmitter handler 352. An output buffer 390 is coupled to a data timer 392 which also receives information from a transmitter sequence counter and control unit 394. Data timer 392 is coupled to a bus conflict detector 396 also receiving a signal from receiver handler 350. Bus conflict detector 396 provides the arbitration between conflicting control points. The output of data timer 392 is coupled to the data output bus SOD. In addition, the output of bus conflict detector 396 is coupled to a data line protocol handler 398. The three signal line outputs shown at the bottom of FIG. 16 correspond to the signal line from transmitter handler 352 to data line controller and conflict resolver 354 shown in FIGURE 13. The transmission sequence has already been detailed in the flow chart shown in FIGURE 3. The function of bus conflict detector 396 has been detailed in FIG. 4. An expanded block diagram of the switchleg data input circuit 368 is set forth in FIG. 17.

Figure 17:
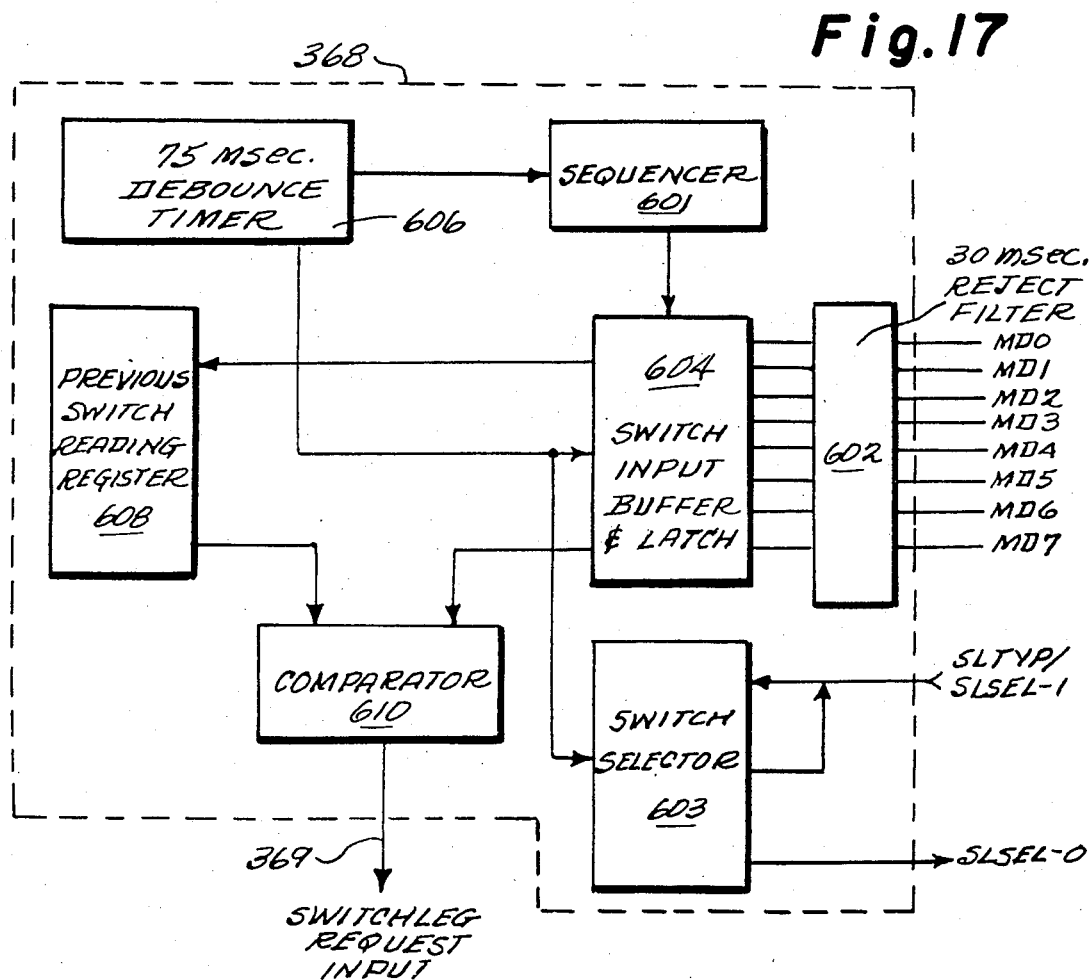
FIG. 17 is a more detailed block diagram of switchleg data register and control block shown in FIG. 13.

Referring now to FIG. 17, there is shown an expanded diagram of the switchleg data input section of the receiver handler. This section includes a 30 msec reject filter 602 coupled to a switch input buffer and latch 604. A 75 msec debounce timer 606 insures that the bouncing of a switch 68 will not produce a false triggering of the switchleg data input. A previous switch reading register 608 contains the status of each switch associated with a particular transceiver decoder 56 after its last switchleg entry. A comparator 610 coupled to the previous switch reading register 608 and to the switch input buffer 604 compares the states of the switch after its previous use and present activation to determine whether there has been a change. If a change is indicated, a switchleg request input signal is activated on line 369 (also see FIG. 14).

A sequencer 601 is a counter providing signals to switch input buffer 604 requesting an alternating read of the two banks of switchlegs. A switch selector 603 receives signals from sequencer 601 and timer 606 and determines which bank of switchlegs are to be read. The bank selection is indicated on the SLSEL-0 and SLSEL-1. The SLTYPP signal (pin 29 of microcomputer 100) is also coupled to switch selector 603 and determines whether momentary or maintain type switches are being used.

A complete printout of the ROM code specifying the entire program permanently fixed into microcomputer 100 included herein as Appendix A. All data values set forth therein are in hexadecimal format.

Controller-Hardware Overview

Figure 18:
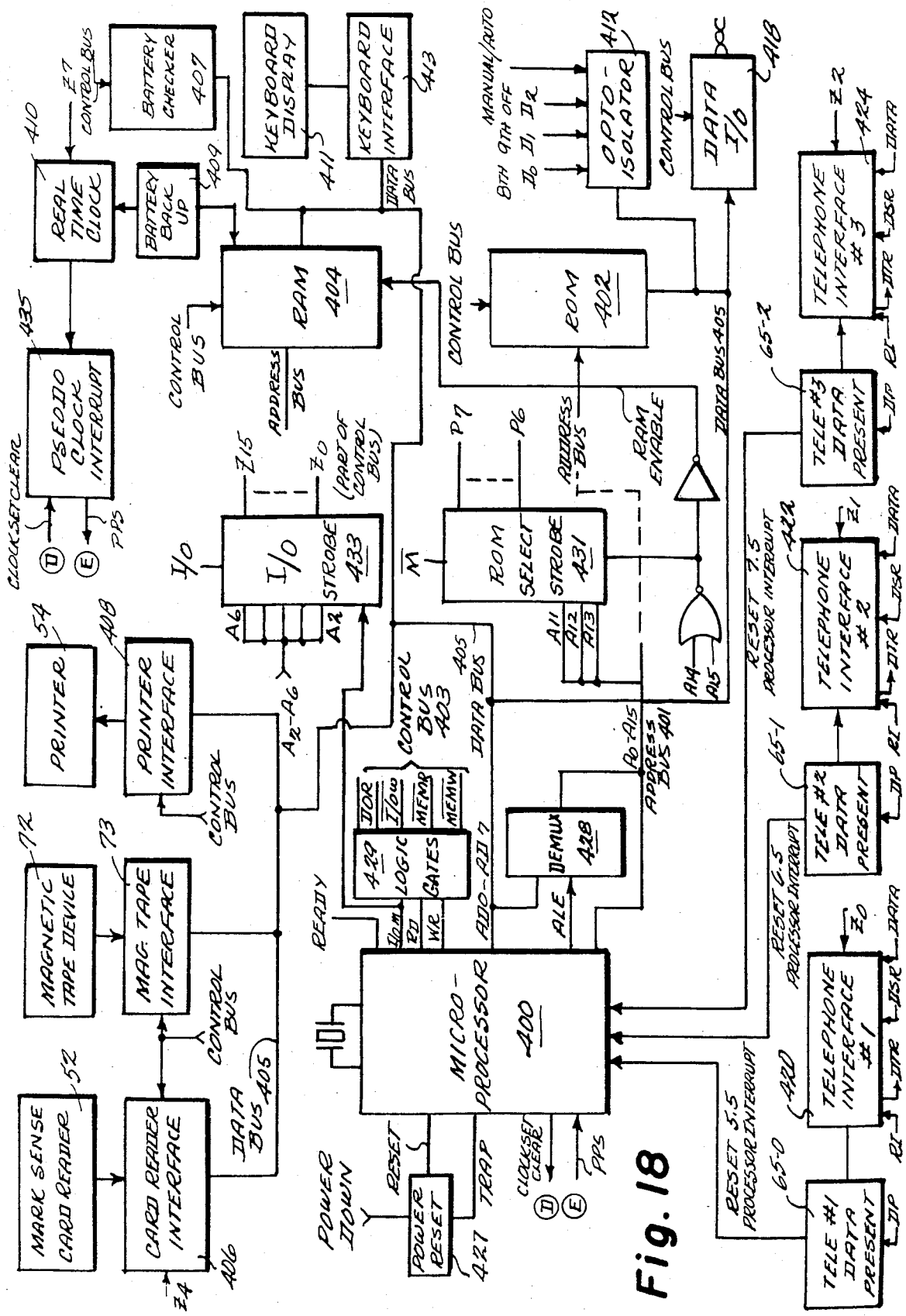
FIG. 18 is a general block diagram of the controller.

Referring now to FIG. 18, there is shown a general block diagram of controller 50. The specific logic functions required for programmable lighting control are implemented by a microcomputer including a microprocessor 400 and associated memory and input/output devices. Microprocessor 400, suitably an Intel 8085 is a general purpose device useable with a variety of input-/output devices. It's coupled to memory and to input-/output devices via an address bus 401, a control bus 403, and a data bus 405. Memory includes a ROM 402 and a RAM 404. The specific logic functions for performing programmable lighting control are "burned" into ROM 402 and transform microprocessor 400 and its associated memory and input/output devices into a fixed purpose computer. The user defined data base including sectors, patterns, schedule, switches and priority erase times is stored in RAM 404 and occupies 95% of its 32k storage capacity. A real time clock 410 tells controller 50 when to effectuate lighting changes in accordance with the user defined schedule. Both RAM 404 and real time clock 410 are backed up by a battery back up 409 including an internal battery and a connection for an external battery. Battery back up 409 maintains the data base stored in RAM 404 which would be otherwise volatile during a power outage. In addition, during a power outage, battery back up 409 maintains real time clock 410. When power returns after an outage, any load changes called for by the user defined schedule and not executed during the power outage can be caught up.

Mark-sense card reader 52, coupled through a card reader interface 406 provides the user a vehicle for conveniently defining the data base and rapidly entering that data base into RAM 404. Mark-sense cards having formats for sector, pattern, and schedule data are marked by the user and are then passed through card reader 52.

A keyboard/display 411 coupled through a keyboard display interface 413 provides for manual access by an operator and for a display of status information. Keyboard/display 411 includes a key lock switch for selecting either automatic or manual mode; a key lock switch for selecting alternate schedule overrides (8th day override; 9th day override and schedule off); tape control switches for selecting tape load or tape store; an output mode switch for selecting a lighted display or printer 54; a set of command keys for selecting program, display clear, manual control, set clock, or check status; a set of item keys for selecting pattern, schedule, sector, priority erase time, switch or sector override table data inputs; a set of number keys for specifying addresses of transceiver decoders, sector numbers, pattern numbers and the like, and several control keys. Using the various keys in combination a user can manually enter data, check the status of relays, switches, transceivers, etc. A lighted display indicates the time on real time clock 410 and annunciates failures in response to self-diagnostics. An audible alarm indicates certain types of failures including involved keyboard entries.

Magnetic tape device 72 is coupled through a magnetic tape interface 73 and provides a non-volatile medium for storing the user defined data base after it has been entered via mark sense card reader 52 or keyboard/display 411. Thus stored data is in machine readable form and is in a suitable format to be laoded directly into RAM 404. In the event of a power failure longer than is protectable by battery back up 409, data is automatically read from tape device 72 upon power up.

Controller 50 further includes a standard RS232 serial printer interface 408 for coupling to printer 54. Printer 54 can provide, on user demand, a hard copy of the data base or a portion thereof or system status information. A printout might include a copy of the schedule in force during the automatic mode operation of controller 50, a list of sectors overriden, or a list of the status of all relays in the system.

The alternate schedule override switch (not shown) and the automatic/manual switch are coupled through an optoisolator 412 8th day, 9th day and schedule off alternate automatic schedules are respectively selected by lines $D_0$, $D_1$ and $D_2$ coupled to optoisolator 412.

A data input/output circuit 418 couples signals to and from data line 58, providing the necessary isolation.

Three telephone interfaces 420, 422, and 424, respectively coupled to data sets 64-0, 64-1, and 64-2 couple telephone entered signals to data preset circuits 65-0, 65-1 and 65-2 respectively. Data preset circuits 65-0 to 65-2 indicate to microprocessor 400 that data has been entered by a telephone user and flags a request for telephone service.

A power reset circuit initializes microprocessor 400 after a power shut down.

Controller 50 utilizes a multiplexed bus for the lower order address A0–A7 and data D0–D7 lines. A demultiplexer and optical latch 428 performs the required multiplexing. An address latch enable signal ALE from microprocessor 400 latches in the lower order address bits, thus providing a 16-bit address line including A0–A7 from demultiplexer 428 and A8–A15 from the higher order address lines from microprocessor 400.

Control bus 403 includes four standard control signals: inut/output read (I/O R), input/output write (I/O W), memory read (MEMR), and memory write (MEMW) which, through logic gates 429 activate the various input/output devices and memory associated with microprocessor 400. The data bus 429 is bi-directional.

A ROM select strobe 431 coupled to address lines $A_{11}$, $A_{12}$, and $A_{13}$ selects ROM memory banks and an I/O strobe 433 provides strobe lines Z0–Z15 of control bus 403 for selecting particular input/output devices to be read or written.

A pseudo clock interrupt 435 receives a pulse each second from real time clock 410 and latches that pulse. In turn, pseudo clock interrupt 435 sends a pseudo pulse second signal PPS to microprocessor 400. A clock set clear signal from microprocessor 400 clears the latching of pseudo clock interrupt 435.

Memorv Access Hardware and Battery Back-Up

Standard circuit techniques have been applied to access ROM 402 as well as RAM 404. The particular memory address is determined by a 16-line (A0–A15) address bus 426 emanating from microprocessor 400. The low order address byte (A0 to A7) is multiplexed on the address bus 426 (also called the address and data lines). An external low order address latch (demultiplexer 428) is used to demultiplex. This address is coupled to a ROM select strobe 430, suitably a standard 75LS138, which is a 1 out of 8 line selector. ROM select strobe 430 is used to select a given bank of memory. That is because the high order address bits are coupled to ROM select strobe 430. The low order address bits are coupled directly to the memroy to select a specific memory location to be accessed.

RAM 404 used is of the dynamic type. That is, it requires refreshing at specific intervals. This refreshing must take place within a 15 microsecond period. The dynamic memory used is based on the current state of the art. It is based on a standard 4116 16K memory integrated circuit. Since RAM 404 is dynamic, allowing greater storage density than that available in static memories, a multiplexed addressing scheme and refresh circuitry is utilized and is considered to be circuit overhead for maintaining this RAM 404.

RAM 404 and real time clock 410 are battery backed-up. Thus, if there is a power failure, microprocessor 400, ROM 402, and all the other input/output interfaces are allowed to fail and lose power. However, a battery back-up provides RAM 404 and real time clock 410, and the associated circuit overhead to maintain the current status of the controller 50. When power is reinstated, the system will self justify with respect to its time of day schedule. This is paticularly important since RAM 404 contains temporary data of the disposition of remotely actuated overrides through switchlegs or through the telephone. This temporary data is not part of the data base defined by the user. Instead, at pedetermined times through the priority erase time feature of the controller 50, this temporary override information entered through switches and telephones is erased. If there is a power failure beyond battery life which backs up the real time clock 410 and RAM 404, then magnetic tape device 72 would be automatically load the required data base defined by the customer once power is reinstated. Once power is reinstated, the controller is capable of responding to switchlegs and telephone commands once this data base has been reloaded. Therefore, the system is capable of some operation after prolonged power outages or after short power outages without any user intervention. It is capable of loading itself and running without any outside commands. However, in the event that data is reloaded via magnetic tape after a power failure and real time clock 410 and RAM 404 were not kept alive using battery backup, the time of day would have to be manually re-entered for automatic operation to take place. Without setting real time clock 410, only the manual control operations, or overrides through switches and telephones, would be operational.

Data Line Coupling to Controller

Figure 19:
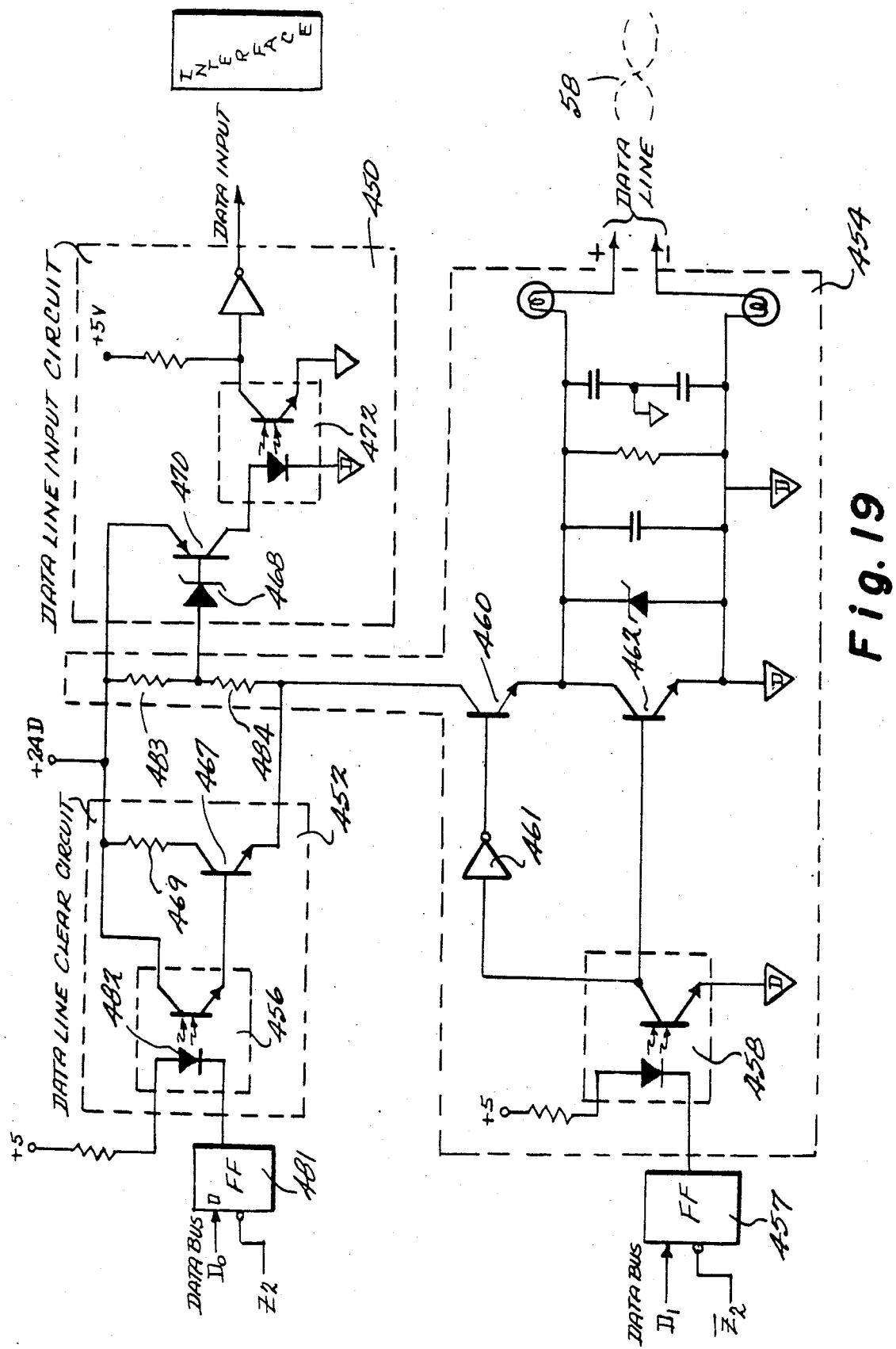
FIG. 19 is a schematic diagram of the data I/O circuit of the controller.

Referring now to FIG. 19, there is shown a schematic diagram of Data I/O 418 of controller 50. Data I/O 418 is responsible for driving and maintaining the data line (data line 58) and includes three sections: a data line input circuit 450, a data line clearing circuit 452 and a data line transmitter circuit 454.

As previously stated, the data line is an isolated communications channel and is not referenced to system ground. Isolation of the data line is provided at transceiver decoders 56 by optoisolators 150 and 174 (see FIG. 8). Similarly, isolation is provided at the controller end of the data line 56 by optoisolators 456, 458, and 472 associated with data line clearing circuit 452, data line transmitter circuit 454 and data line input circuit 450, respectively. All circuitry on the data line side of each of optoisolators 456, 458 and 472 is powered by an isolated power supply (+24 volts with respect to an isolated common ground connection D). This isolation insures that data line 58 is floating and is not referenced to system or earth ground. This isolation helps to provide noise immunity. Common mode noise is rejected and only differential signals (potential difference between the wires of the twisted pair) are detected and decoded.

Data line transmitting circuit 454 is used to send data onto data line 58 in accordance with data signals on data bus line $D_1$ and an enabling strobe signal Z2. Strobe Z2 is coupled to the clock input of a flip-flop 457. Data bus line $D_1$ is coupled to the data input of flip-flop 457. The output of flip-flop 457 is coupled to the cathode of a diode 459 in optoisolator 458. Data is impressed onto the data line by driving it to a low impedance state. A logic level "1" at the output of flip-flop 457 coupled to the diode of optoisolator 458 turns off the optoisolator thereby turning off a transistor 460 coupled thereto through an inverting amplifier 461. A transistor 462 coupled between the emitter of transistor 460 and isolated ground D is activated to bring data line 58 to the isolated ground level D through the collector-emitter junction of the transistor.

To maintain a high impedance state (greater than +10 V difference) on the data line, a logic level "0" is caused to appear at the output of flip-flop 457 to turn on optoisolator 458. Transistor 462 is turned off, pulling up data line 58 to 24 volts through two resistors 483 and 484 coupled from the +24 volts (with respect to D) of the isolated power supply to the collector of transistor 460. The series combination of resistors 483 and 484 is 90–100 ohms thereby limiting the maximum current that can be drawn from the isolated power supply to 240 milliamps.

Data line input circuit 450 couples data from data line 58 to microprocessor 400 and is turned on and off in accordance with the varying current that is passed through a transceiver decoder 56. This passed through current affects the voltage drop across a resistor 483. If enough current is switched by a transceiver decoder 56, (approximately 150 milliamps) a diode 468 (a 4.8 V zener) becomes reversed biased. The cathode of diode 468 is coupled to the base of a transistor 470. Thus, when diode 468 becomes reversed biased, transistor 470 turns on. The turning on of transistor 470 turns on optoisolator 472 generating a signal for coupling to microprocessor 400. Therefore, if the line is externally driven to a low impedance state, i.e. by a transceiver decoder 56, then the data input to microprocessor 400 is a logic level 1.

Data line clear circuit 452 is used only when a data line failure condition exists. A data line failure condition exists when data line 58 is stuck such that there is a low impedance short between its twisted pair for an abnormally long period of time. Such a short can occur when transistor 178 in transceiver decoder 56 (see FIG. 9) fails with short between collector and emitter. When a low impedance short occurs on data line 58, no data can be transferred.

After controller 50 detects and diagnoses a stuck data line condition, data line clear circuit 452 provides a one amp pulse of current through data line 58 to intentionally blow fusable link 154 in the transceiver decoder 56 that is causing the short. To actuate a clear pulse, strobe line $Z_2$ is enabled along with data line $D_0$. Data line $D_0$ is coupled to the input of a flip-flop 481. Strobe line $Z_2$ is coupled to the clock input of flip-flop 481. The output of flip-flop 481 is coupled to the cathode of a diode 482 in optoisolator 456. By activating optoisolator 456, resistor 469 is placed in parallel with two resistors 483 and 484, lowering the effective impedance between the +24 volts (D) power supply and transistor 460. This lower impedance causes a 1 amp current pulse to be impressed through transistor 460 to the data line.

Magnetic Tape

Figure 20:
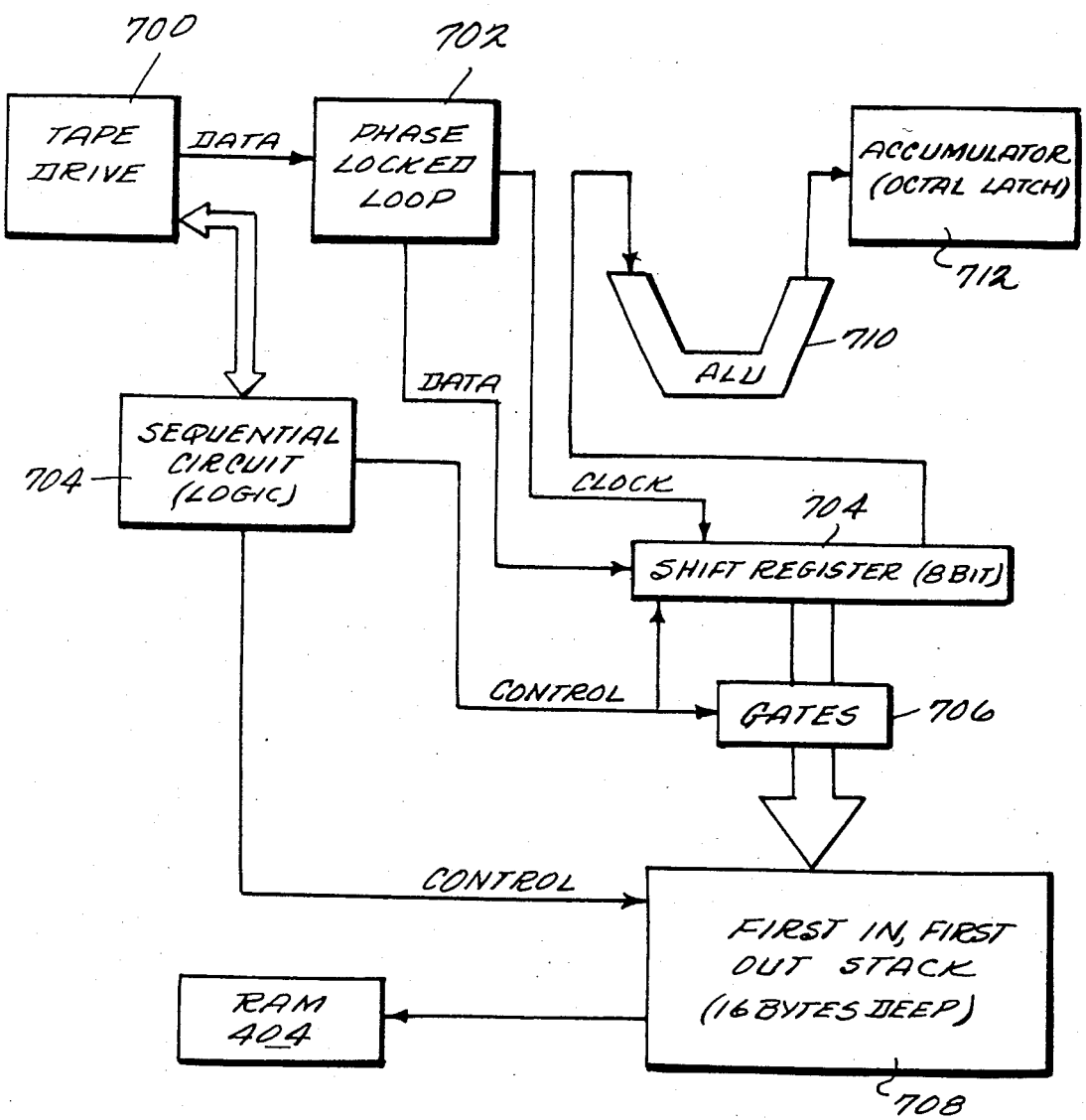
FIG. 20 is a functional block diagram of magnetic tape device 72, magnetic tape interface 73 and the logic built into the controller's microprocessor related to the reading of data from magnetic tape device 72.

Referring now to FIG. 20, there is shown a functional block diagram of magnetic tape device 72, magnetic tape interface 73 and the logic built into microprocessor 400 related to the reading of data from magnetic tape device 72.

A conventional tape drive 700 includes a transducer and tape drive electronics (not shown) for reading data from a magnetic tape. Data read from a magnetic tape is coupled to the data input of a phase locked loop 702. A sequential (logic) circuit 704 provides control signals for tape drive 700 including forward, reverse, stop and go, clear leader sensing, data present, and cassette present signals. Phase locked loop 702 tracks input data on a bit-wise basis using a weighted average technique to correct the logic level thresholds for determining the logic state of the data locked by the loop. Data from phase locked loop 702 is coupled to an 8-bit shift register 704. After shift register 704 has received 8 bits of data, the data is parallel transferred through gates 706 to a conventional FIRST IN FIRST OUT (FIFO) stack 708 for temporary storage. FIFO 708 is 16 bytes deep. Data from shift register 704 is also coupled through an arithmetic logic unit (ALU) 710 to an accumulator register (octal latch) 712.

When tape drive 700 is in a continuous read mode, phase locked loop 702 is serial data with a clock determined by the tape being read. The clock information as well as data information is stored on the magnetic tape. The clock information is coupled on a clock line from phase locked loop 702 to shift register 704 and is used to clock data through the cells of the shift register. After 8 bits of data are clocked into shift register 704 as counted by a counter within sequential circuit 704, the 8 bits are loaded into FIFO 708 for temporary storage. At the same time, the data in shift register 704 is added to the contents of accumulator 712 through ALU710, suitably a 74181 or equivalent. Accumulator 712 always contains the sum of all data clocked through shift register 704 and stored in FIFO 708. Once an entire record of data is read in (a record is 16 bytes of data and a block includes 8 records), a checksum byte (a control byte) of data is read from the tape. The checksum represents the 2's complement of the summation of the 16 bytes of data previously read in. Thus when the checksum is added to the tallied sum in accumulator 712, the net result should be zero. After the checksum byte is read in, accumulator 712 is checked to see if its contents equal zero. If so, the data is valid and sequential circuit 704 causes the contents of FIFO 708 to be coupled into RAM 404 to which it is coupled. Thus valid data is loaded into RAM 404 through FIFO 708 acting as a data buffer. This sequence continues until all records and blocks are entered. The last record on tape is signified by a zero record length.

The start of a record is indicated by a standard ASCII character (a colon":"). An 8-bit record length follows the introductory character. The record length indicates the number of data bytes in the record. A zero record length indicates the final record (after which data input operation is completed). Following the record length is the address specifying where to load the first data byte. The address byte is followed by a zero byte for synchronization. In turn, the data for that record (8 bit bytes) follows the zero synchronization byte.

In the exemplary emobidment, only 16 bytes are used for each record. Therefore, after each 16 bytes of data are sent (i.e., after each record), an 8-bit checksum indicates the 2's complement of the entire record content up to that point. The 2's complement checksum added to the accumulated data should yield zero for valid data. If the checksum indicates invalid data, the reading of the tape will be attempted again. If three successive attempts to read a tape result in invalid data, the tape is considered bad and a failure signal indicating a bad tape is enunciated on keyboard/console 411.

Figure 21:
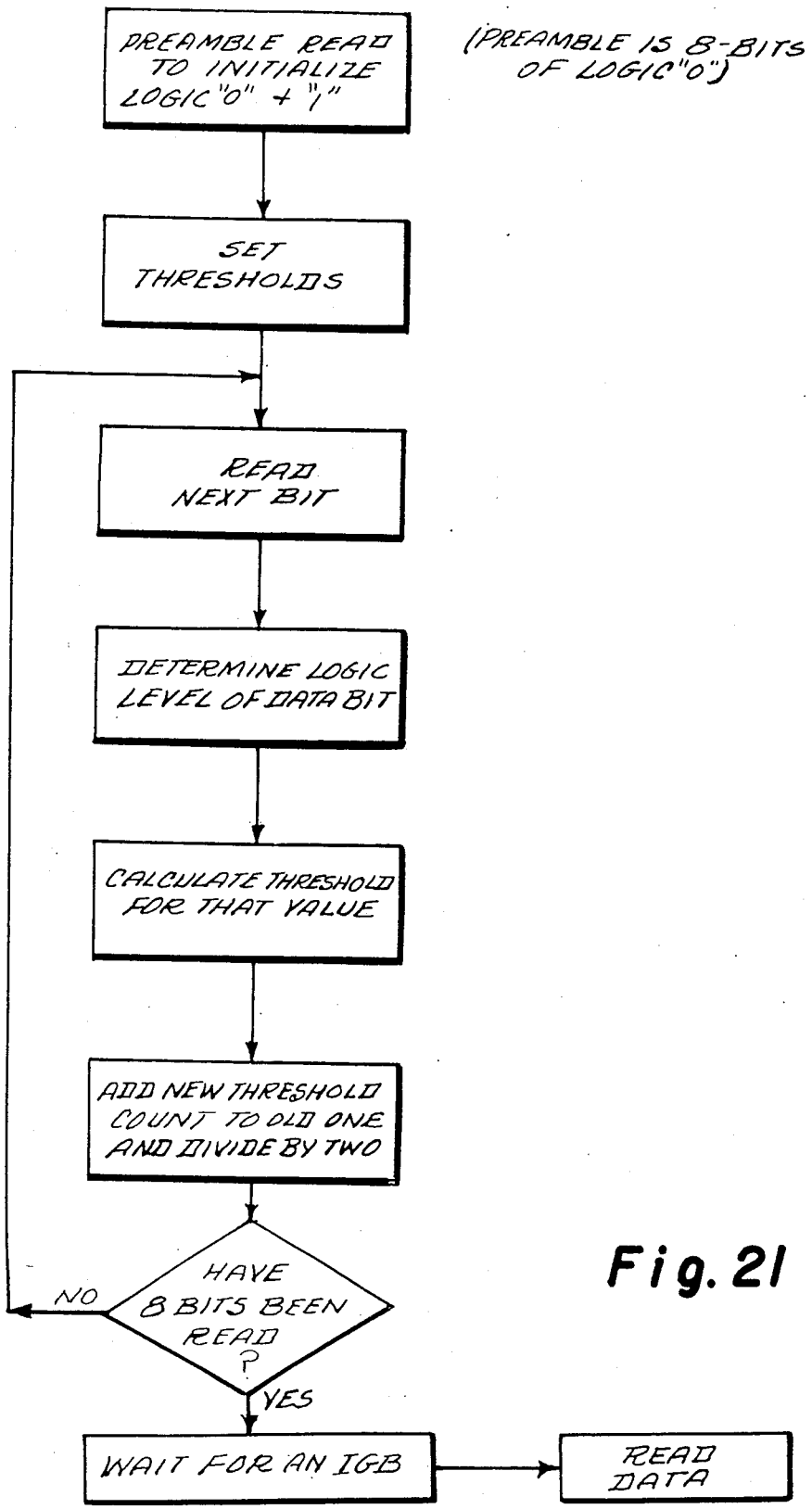
FIG. 21 is a flow chart of the weighted averaging technique implemented by the phase lock loop of the transceiver decoder.

Referring now to FIG. 21, there is shown a flow chart of the weighted averaging technique implemented by phase locked loop 702. The weighted averaging technique allows up to a 50% variation tape speed during a bit period.

A preamble is read to initialize the logic levels ("0" and "1"). One byte (8 bits) of logic "0" are sent in the preamble for phase locked loop 702 to lock onto. This is the logic "0" count. The logic "1" count is defined to be two times the logic "0" count. The logic thresholds for logic "0" and "1" are set and a data bit is then read. By comparing with the thresholds established just before a data bit is read, it is determined whether that data bit is a "0" or a "1". The result of that decision is output data from phase locked loop 702. After it is determined whether a data bit is a "0" or a "1", the threshold for the value of the last data bit is determined. The calculated threshold value is added to the old threshold value and the sum divided by two. The result becomes the updated threshold used for comparison with the next data bit.

Figure 22:
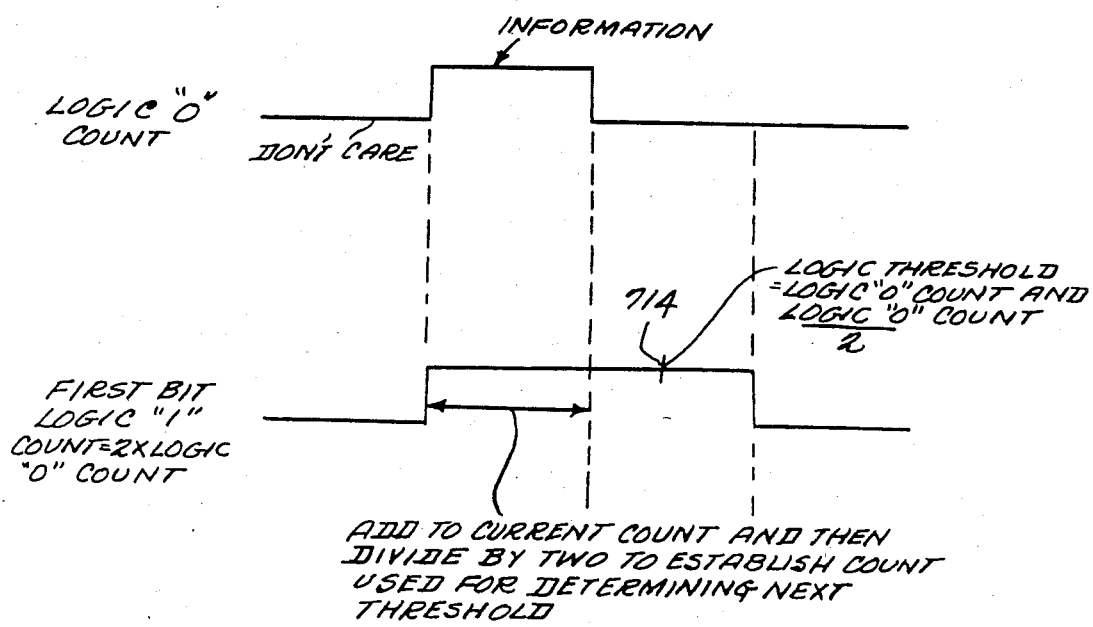
FIG. 22 is a graphical representation of serial data read from a magnetic tape illustrating the self adjustment of threshold levels.

Referring now to FIG. 22, there is shown a graphical representation of serial data read from a magnetic tape illustrating the self adjustment of threshold levels for determing whether a data bit is a "1" or a "0". During the preamble of 8 logic "0"'s, the initial logic "0" count and logic "1" count are established. The logic "1" count is defined to be 2× logic "0" count. The logic threshold established by the "SET THRESHOLD" block in FIG. 22 is $$\text{logic threshold} = \text{logic "0" count} + \frac{\text{logic "0" count}}{2}$$

and is indicated by a vertical line 714. The first bit is read by comparing its count (length) with the threshold level established during the preamble. If that first bit is a logic "0", its count is determined. This count is added to the count established during the threshold and the sum is divided by two. This new count determines the threshold used for reading the next bit. If the first bit is a "1", its count is divided by two before it is added to the previous count. This procedure is repeated for every bit. Thus there is a continuous bit-wise adjustment of the threshold value used for logic level determinations.

The use of a bit wise adjustment of the logic levels in this manner permits up to a 50% variation in tape speed while maintaining data read out accuracy. This allows the use of a less precise and less expensive tape drive 700.

System Definitions

This section recaps and further defines the terms "relay", "sector", "pattern", "schedule" and "switch".

A "relay" is defined to be a mechanical or solid state device which is capable of closing and opening one electrical circuit in response to an electrical control signal received from another electrical circuit.

The term "sector" is a user identification number that identifies a unique geographical area to be load controlled. That area could be of any size, could encompass any floor or part or parts of a floor or floors of the building. In essence, it could be any region under control. A sector can include any number of transceiver decoders 56. A sector is, in essence, a user selected subset of relays and could include only one relay, a plurality of relays, or all of the relays in the entire system. Sector definitions are part of the data base entered by the user to adapt the system to a particular building or complex to be controlled and to the use to be made of the controlled building or complex. When a building is initially wired, it is only necessary to know which relays and associated loads are coupled to which transceiver decoders 56. The sectors are defined by the user after the initial wiring and can be easily redefined (by the use of mark-sense cards or keyboard entries) when there are office reorganizations and personnel shifts.

It is possible to define overlapping sectors. In fact, much of the flexibility and thus the advantage of the present system is derived from the ability to define overlapping sectors. For example, sector 1352 may include control of the lights in room 1352 and sector 1380 may include control of the lights in room 352 and all of the other rooms on the thirteenth floor. Thus, sectors 1352 and 1380 would overlap a sector defined as including corridor lights and one room light in each room could be made responsive to detection of smoke or fire in the area. Either an analog type sensor coupled to analog sensor section 110 could be periodically polled or a switch type sensor could be coupled to a switchleg input of switchleg input circuit 106 to set up the desired condition response. Blinking corridor lights could be used to demonstrate a preferred egress route in the same sector. The capability of defining overlapping sectors and to make sectors condition responsive makes such control feasible. As stated, sector definitions can be altered either by entering the appropriate data at the keyboard of controller 50 or by utilzing mark-sense cards to re-enter the data base. For example, assume sector 1352 is defined to include the relays controlling the lights in room 1352. Further assume that sector 1354 is defined to include the relays controlling the lights in 1354 which is adjacent to room 352. If the wall between rooms 352 and 354 were removed and one larger room created, a new sector could be defined to include the relays controlling the lights in both original rooms. In essence, a sector defines which relays (and loads) are to be affected. The sector is thus represented by a number uniquely defining the geographical area under control.

Once entered by the user, a table of sectors and their associated relays are stored in RAM 404. A sector does not define what the status (on or off) each of those loads is to assume. The status of each load is defined by a pattern.

A "pattern" defines the status (on or off state) of the relays associated with one or more transceiver decoders 56. For each transceiver decoder 56 listed in a particular pattern, the status of each and every relay is defined, i.e., its status either "on" or "off" must be predetermined. Thus, when a particular sector number and pattern are requested by a telephone user, the sector number will be used to determine which relays are to be affected and the pattern will be consulted in order to determine what status to put each of those relays into. A pattern definition table is stored in RAM 404 for all user entered pattern data.

The term "schedule" refers to a time-dependent sequence of patterns that are to be executed in accordance with the time appearing on real time clock 410. When the time shown in the system clock reaches a predetermined time for a schedule change, that change is automatically executed if the system is operating in its automatic mode.

A particular schedule entry calls for the relays in a specific sector or sectors to assume the states called for by a selected pattern at a particular time. For example, the schedule may call for Sunday, 10:00 AM sectors 372, 374, 377 and 378 to assume relay states called for in pattern 6 and for sectors 804 and 805 to assume relay states called for by pattern 4. Multiple sectors can be scheduled for relay activation at the same time because sectors and patterns are independently defined. These basic definitions of sector, pattern, and schedule provide complete flexibility in the activation of particular relays and their associated loads. Sector, pattern, schedule, switch, and priority erase time information comprise the data base entered by the user and stored in RAM 404.

The term "switch" is defined to be a number of a particular transceiver decoder 56 plus a particular switchleg number of that transceiver decoder. Calling for a particular transceiver decoder 56 and a particular switchleg of that transceiver decoder uniquely defines a single switch. Transceiver decoders 56 are numbered from 0 to 1023, defining 1024 transceiver decoders. Associated with each such transceiver decoder 56 are 8 switchlegs, numbered 1-8. If a particular user has a switch 68, that switch will uniquely be defined and when activated, will cause a signal to be sent through its transceiver decoder 56 and data line 58 to controller 50 requesting that a command be sent to operate a particular subset (sector) of relays. A switch 68 is not tied directly to a particular light or relay but rather is utilized only to cause a signal to be sent from the particular transceiver decoder 56 with which it is associated to controller 50. Controller 50 then interprets the signal from that transceiver decoder and issues the appropriate command to a particular transceiver decoder associated with a relay to be activated in acccordance with the switch input.

Firmware Overview

The firmware that controls microprocessor 400 and provides its unique function, is stored in ROM 402. The program is responsible for managing, maintaining, as well as diagnosing, the system hardware and the data base that the user has defined for his particular application. Standard protection means have been provided in the firmware to insure that no action as opposed to an erroneous action would take place in the system. Furthermore, what is known as loop protection has been provided to guard the computer from a lockout condition inhibiting system operation.

Overall system function is achieved through an executive program, referred to hereafter as the executive. The executive loops through its entire program sequence continuously and is "flagged" to perform dispatch to a specific task related to data input/output, data management, self-diagnostics, telephone line management, relay checking, switchleg overrides, sensor polling, data line maintenance, etc. These specific tasks get the attention of the executive while it is looping by the use of flagwords which are indicators of the status of various input/output devices, data conditions and the like. In addition to the detailed discussion of these various specific tasks, there is provided in Appendix B a complete copy in hexadecimal code of executive and all referenced subroutines for effecting these specific tasks.

Flag Words

Table 4 is a summary of the various flag words and/or key memory locations that guide the executive in causing the various specific function tasks to be performed.

TABLE 4

| Flagword | FLAGWORDS Indication Provided | |
|---|---|---|
| SYSERR (system error status flag) | D0 ="1" | indicates data line failure - stuck in low impedance mode |
| | D1-"1" | indicates transceiver failure |
| | D2-"1" | indicates a memory failure |
| TAPBAD | Non-zero indicates bad tape in magnetic tape device 72 | |
| FLGOVR (schedule override) | Value = 0 | no override, main schedule in force |
| | = 1 | alternate schedule, 8th day override |
| | = 2 | alternate schedule, 9th day override |
| | = FFH | schedule off (respond only to switches and telephone |
| RELCKF (relay check) | D0="1" | check relays that were overridden by switch or telephone |
| | D1-"1" | check relays requiring a status change in accor |

TABLE 4-continued

| Flagword | FLAGWORDS Indication Provided | |
|---|---|---|
| | | dance with normal schedule |
| TLSERF (telephone service) | D0="1" | service telephone #1 |
| | D1="1" | service telephone #2 |
| | D2="2" | service telephone #3 |
| PATRQF (service a schedule change) | Value = 0 | no service requested |
| | Value = 1 | service requested |
| SYSCLK (system clock storage area) | SYSCLK: | Day # (1-7) |
| | SYSCLK+1: | Minutes (0-59) BCD |
| | SYSCLK+2: | Hours (00:00-23:59) BCD |
| | SYSCLK = | O indicates clock not set |
| LINUSE (status of data line) | value = 1 | - receive mode |
| | value = 2 | - transmit mode |
| | value = 3 | - bad preamble |
| | value = 4 | - line free (clean) |
| | value = 5 | - line stuck (low impedance) |
| TELUSE (telephone use) | Flag set indicates that a telephone is in use. | |
| CHECKSUM | Arithmetic check to insure the integrity of the bit values stored in a specific memory block. | |

Referring to Table 4, the key flag words and memory locations are set forth on the left side and their respective functions or indications on the right.

SYSERR is the system error status flag and utilizes three bits of an eight bit byte. Bit D0 indicates that the data line is stuck in a low impedance mode. Bit D1 indicates a transceiver decoder failure and bit D2 indicates a memory failure (as diagnosed by CHECKSUM).

TAPBAD is a flag word indicating whether there is a bad magnetic tape in magnetic tape device 72. A non-zero value in TAPBAD indicates that the tape in magnetic tape device 72 is bad and that the user should replace it. This flag is part of the self diagnostics of the system. The flag is set when microprocessor 400 attempts to read data from the magnetic tape and receives bad information after three successive read attempts.

FLGOVR is the schedule override flag which like the other flags is an eight bit flag (1 byte). A zero value for FLGOVR indicates that no overrides are in effect and that the system is operating automatically in its normal 7 day week, 24 hour day schedule. The schedule overrides refer to the eight day, ninth day and off schedule overrides selected by a schedule override switch on console display 415 and coupled through optoisolator 412. A "1" value for FLGOVR indicates that the eight day schedule is called for. A "2" value for flag over indicates that the ninth day schedule override is called for. The FFH (FF hexadecimal which is equivalent to 11111111) indicates that the schedule off override is in effect and that microprocessor 400 should ignore all schedules. As previously stated, in this mode, controller 50 will respond to switchlegs including switch type sensor coupled to switchlegs and telephone requests, but will ignore any user defined time dependent schedule. This is quite different from the manual mode wherein load controls are only under the control of the central controller keyboard and will not respond to remote input such as telephone requests and switchleg actuations.

RELCKF is a relay checker flag using the D0 and D1 bits of a byte. Bit D0 indicates that it is appropriate to check transceiver decoders 56 that have been subjected to a a status change resulting from an override request (telephone or switchleg). The D1 bit indicates that it is appropriate to check a transceiver decoder that has been subjected to a status change due to normal scheduling. In other words, it is desirable to check the status of a transceiver very quickly after it has been changed due to an override. The remaining relay status checks can be done at times when the controller is not processing any system requests (flag words) at the leisure of controller 50. There is no reason to divert the attention of controller 50 from the relays which have been overridden in order to check the status of relays which are operated merely in accordance with the normal schedule.

TLSERF is the telephone service flag. This flag indicates that there is a telephone service request. Three bits of an eight bit word are utilized. The D0 bit indicates that services requested on phone 1; the D1 bit indicates that service is requested on phone 2; and the D2 bit indicates that service is requested on phone 3. Up to three telephones can be coupling data information to controller 50 simultaneously. Of course, any number of telephones can access controller 50 but only three can operate simultaneoulsy.

PATRQF is a flag word indicating that service of a schedule change is required. This flag is set by its schedule check routine. A zero value indicates that no service is requested and a "1" indicates that service is requested. If service is requested, it is an indication to the executive that it should transmit the appropriate information to a transceiver decoder 56 so that a relay status change will be executed at the next available time period.

SYSCLK refers to 3 memory storage locations where system clock information is stored. Each of these three locations includes an eight bit byte location. The base location is defined by SYSCLK. The next location is then address immediately after SYSCLK, i.e., plus 1 and the next address is SYSCLK plus 2. The SYSCLK location contains the day number corresponding to the day of the week in real time. This is a binary number from 1-7 representing the actual day of the week. A zero in this location indicates that real time clock 410 has not been set and any SYSCLK references should be ignored. Of course, it is impossible to do any scheduling until the system clock is set.

If the real time clock is set there will be a day number from 1 to 7 in memory location SYSCLK which will represent the actual day of the week. The next address location (SYSCLK plus 1) contains the minutes (0-59) in BCD format.

The next address location SYSCLK plus 2 contains the hours of the day in BCD format (00:00-23:59).

The system clock area including these three memory locations (SYSCLK, SYSCLK plus 1, and SYSCLK plus 2) are set or written into by the interrogation of the real time clock by the executive. Every sixty seconds the real time clock is interrogated and the value of the system clock will change to the next minute. It will also automatically change the day as it goes from 23:59 to 00:00.

Scheduling changes are therefore based on the time repesented in the SYSCLK area and this, in essence, is the purpose of the system clock. Furthermore, the actual value stored in the system clock area is displayed on the console. Therefore a user will be able to read the value stored in SYSCLK at all times. The system clock area is modified every sixty seconds. This sixty second period is determined by counting sixty clock pulses generated by a pseudo clock interrupt.

A pseudo clock interrupt is utilized so that the executive will not be tied up reading the real time clock every second. The pseudo clock interrupt provides a flag to the executive every sixty seconds to advise the executive that sixty seconds have elapsed. The executive then updates the SYSCLK storage area in response to that flag and does not have to constantly count pulses from a real time clock. The pseudo clock interrupt is also used to count down various system timers such as the telephone timer which specifies a twenty second maximum length telephone connection between a remote user and controller 50. A flow chart of the interrogation of and updating by the pseudo clock interrupt is set forth in FIG. 23.

Figure 23:
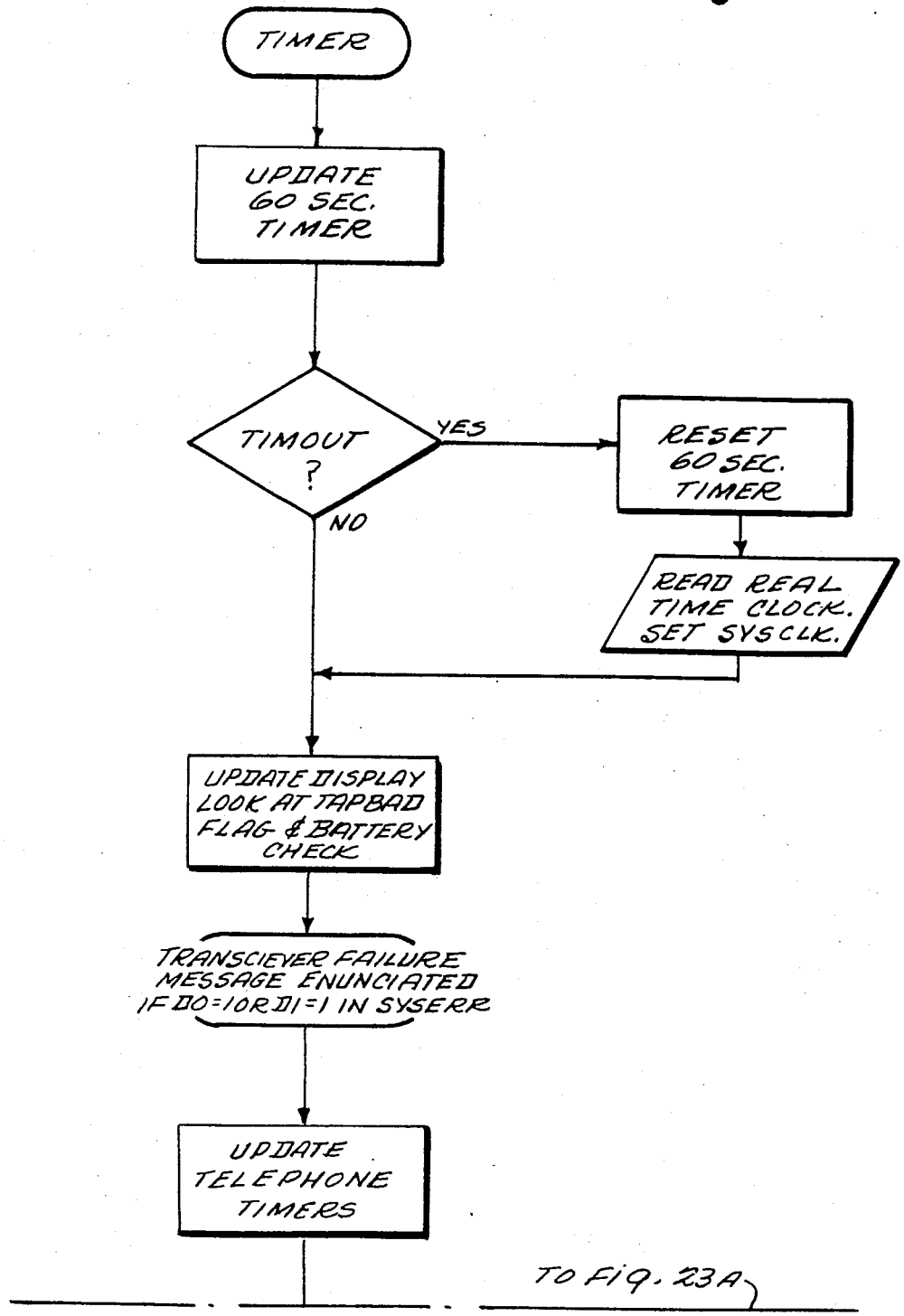

Referring now to FIG. 23, there is shown a flow chart of the timer task showing the updating function of the pseudo clock interrupt. This task is called from the main executive every one second. Each time this task is called, the sixty second timer is updated. It is then determined whether the sixty second timer has timed out. If so, the sixty second timer is reset. The real time clock is then read and SYSCLK is set.

However, if the sixty second timer has not timed out, the display is updated and the TAPBAD flag and battery checker are interrogated. If the D0 or D1 bits of the SYSERR flag are set to a logic level 1, a SYSERR is enunciated on the console. In other words, during each one second period, if the 60 second timer has not timed out, the disposition of the tape and battery checker are determined by interrogation and the result displayed.

Also, during every one second pseudo interrupt, the 20 second telephone timers are updated. If 20 seconds have time out on a telephone timer, the telephone associated with the timer is hung-up, freeing the line for access by other users. When a telephone is automatically hung up, the telephone is automatically hung up and the TELUSE flag is cleared. In the event that there is a time out of the twenty second telephone time and the telephone is not in use or if there is no time out of the twenty second telephone timer, control is returned to the executive.

LINUSE is a flagword indicating the mode of use of data line 58. Mode 1 indicates that the line is in a receive mode. Mode 2 indicates that the line is in a transmit mode. Mode 3 indicates a bad preamble. Mode 4 indicates that the line is free, Mode 5 indicates that the line is stuck in a low impedance (short circuit) condition.

CHECKSUM is a means for checking the validity of contiguous block of memory and is applied to the pattern storage block (PATTERN CHECKSUM), the schedule (SCHEDULE CHECKSUM), the sector (SECTSOR CHECKSUM), the switch (SWITCH CHECKSUM) and the priority (PRIORITY CHECKSUM). Each CHECKSUM location contains a summation of the values of all of the bytes in a block of memory associated with that CHECKSUM location. The CHECKSUM associated with each memory block (pattern, schedule, priority, and switch) is in the last two memory locations of the memory block. The value of CHECKSUM is represented by the 2's complement of that summation. Each time a word of memory is added to a memory block, the value of CHECKSUM for that memory block is updated. CHECKSUM is a 16-bit, modulo 64K summation. Periodically the executive causes the values of all words stored in a memory block to be summed. This summation is added to the value stored in the CHECKSUM location for that memory block. If the resulting sum is zero (the 2's complement value is stored in CHECKSUM) memory integrity is established. The CHECKSUM task is periodically called for by the executive. If a CHECKSUM check indicates that a memory failure has occurred, there is an indication to the user on the main console of controller 50 that there is a data memory failure. In addition, it causes an automatic reload of the data start on magnetic tape. The magnetic tape contains the machine information entered for all data initially acquired through the mark-sense card reader.

Figure 24:
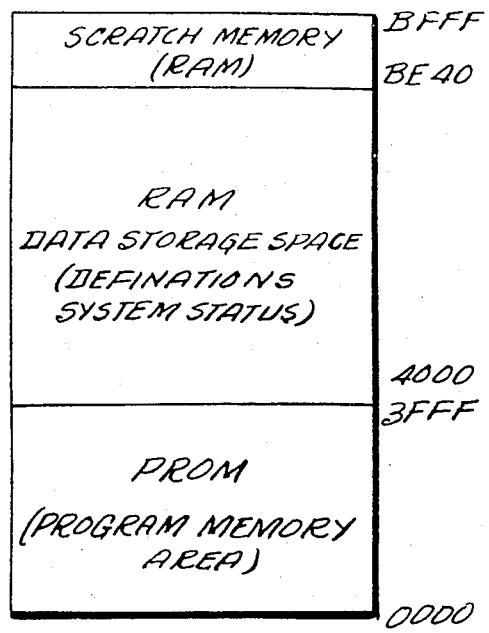
FIG. 24 is a diagram showing the various memory storage areas associated with the controller.

Referring now to FIG. 24, there is shown a diagram of the various memory storage areas associated with controller 50. ROM 402 storage is located from hex address 0000 to 3FFF and contains the logic functions defining the operation of the entire system. The firmware stored in ROM 402 includes the executive and all specific tasks to be performed in the procession of user defined data in order to determine the appropriate commands to be sent to transceiver decoders 56, perform system maintenance, etc.

RAM 404 storage is located from hex address 4000 to the hex address BFFF with user defined data base stored from hex address 4000 to the hex address just below BE40. RAM 404 contains the user entered data base which adapts the system to the user's specific building requirements. This data base entered by the use of the mark-sense card reader 52 and is redefinable as desired. The data base includes definitions of sectors, patterns, priority erase times, switches (including condition responsive switches) and schedules.

A scratch memory area is located from hex address BE40 to BFFF and is used for the temporary storage of data required for system operation. A more detailed breakout of the memory locations of RAM 404 is shown in FIG. 25.

The format of each data area in RAM 404 is defined by the program code for microprocessor 400 (Appendix B) and such formats are automatically realized by the user when data is input via mark-sense cards or by interactive keyboard inputs. The format of each of the four types of mark-sense cards is shown explicitly in FIGS. 33a, 33b, 33c and 33d.

Referring now to FIG. 25, from address 4000 to hexadecimal address 5E11 there is a PATTERN STORAGE AREA. In this area, information related to the individual status of relays required for a particular pattern is stored by the user.

Moving "up" into the memory toward higher addresses, there is a PATTERN CHECKSUM VALUE storage area which serves as a check on the data stored within the PATTERN STORAGE AREA. Next, there is a MAIN SCHEDULE AREA which includes user entered data related to the scheduling of various sectors and patterns. The MAIN SCHEDULE AREA includes the normal seven-day-week schedule based on a 24-hour day.

Above the MAIN SCHEDULE AREA is a memory area devoted to an ALTERNATE SCHEDULE-1 (8th DAY) and an ALTERNATE SCHEDULE-2 (9th DAY) which provide for alternate schedules selectable by the user. These are typically used for holidays and other special days out of the normal 7-day schedule. These alternate schedules are used when a temporary scheduling requirement is needed. By maintaining these alternate schedules, it is not necessary to alter the normal day of the week schedule for a special occasion. The 8th and 9th day alternate schedules are switch selectable by the user from console display 415 (see FIG. 19). Above the alternate schedule areas in ROM 404 is a SCHEDULE CHECKSUM area which provides an arithmetic check of the data storage in the entire schedule area.

Above SCHEDULE CHECKSUM is a memory area devoted to sector definitions called SECTOR DEFINITION AREA. In this section there is stored user entered data defining the group of relays to be in each sector. As stated, sectors may overlap. Any number of overlapping sectors are permitted. If a particular sector number is identified either by an automatic schedule change, a user telephone request, a switchleg activation, or a keyboard entry, this region of memory will indicate which relays are included within the sector called for and thereby indicates a specific area to be controlled. Above the sector definition area are the SECTOR CHECKSUM bytes which is an arithmetic check to assure that data entries of the sector definition area are correct.

Above SECTOR CHECKSUM is a SWITCH DEFINITION AREA which contains user definitions of switchleg and transceiver numbers. Using this section, controller 50 can identify which relays are desired to be affected by each switch command from a user. This achieved by associating each "programmable" switch with a sector number defining the particular area to be controlled. A SWITCH CHECKSUM area above the switch definition area provides an arithmetic check on the data bits within the switch definition area. Above SWITCH CHECKSUM is a PRIORITY ERASE TIME region of memory. In this region, user stored priority erase times are entered. The following is the hierachy of user control:

Manual
Priority Sector Override (Automatic Mode) —Switchleg actuation or telephone
Non-Priority Sector Override (Automatic Mode)—Switchleg actuation or telephone
Schedule Override
Schedule A command by the user when controller 50 is operating in the manual mode overrides any automatic control. However, in the automatic mode, there is a distinct hierarchy of control as set forth above. When a priority erase time occurs, any memory of a priority override is erased and normal scheduling is executed. However, the override will not remain in effect forever. A priority erase time is specified so that eventually normal scheduling will again take over. In this manner, a user does not have to be concerned with removing his priority override. Above the PRIORITY ERASE TIME is a PRIORITY CHECKSUM REGION for providing an arithmetic check on the data stored in PRIORITY ERASE TIME.

Above PRIORITY CHECKSUM is a CODED area containing a sequence of binary information that it is read at predetermined intervals for the purpose of checking memory integrity. The pattern of information is selected such that if power were lost, it is unlikely that the sequence would re-establish itself identically after a power return. Thus by checking this sequence it can be determined whether RAM 404 contains invalid data requiring a new input of user defined data (magnetic tape, mark sense cards or manual entry).

Above CODED area is a CURRENT RELAY TABLE which indicates the current status of all relays in the system, i.e., their open or closed condition. When controller 50 is required to poll the system to determine the status of a relay, it can consult this region of memory which is updated each time a relay is instructed to change state. Above the CURRENT RELAY TABLE is a PRIORITY OVERRIDE area. The PRIORITY OVERRIDE area maintains a list of all priority overrides in effect on each relay. The addresses indicated on the right side of the figure correspond to the hexadecimal address of the particular memory locations or range of memory locations. Appendix B sets forth the firmware using these memory locations for data storage and processing.

Figure 26:
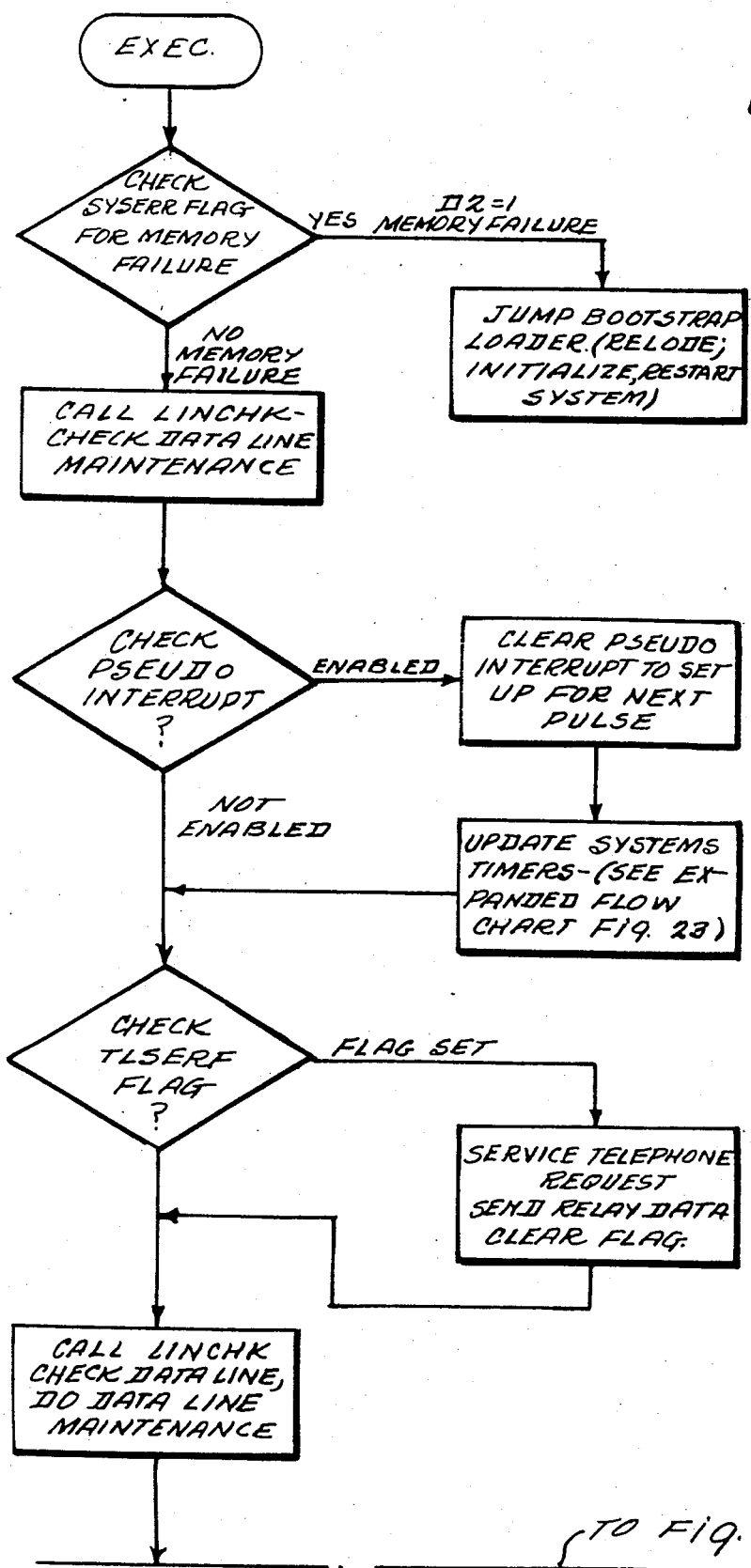
FIGS. 26, 26a, 26b and 26c are a flow chart of the executive associated with the controller.
Figure 26A:
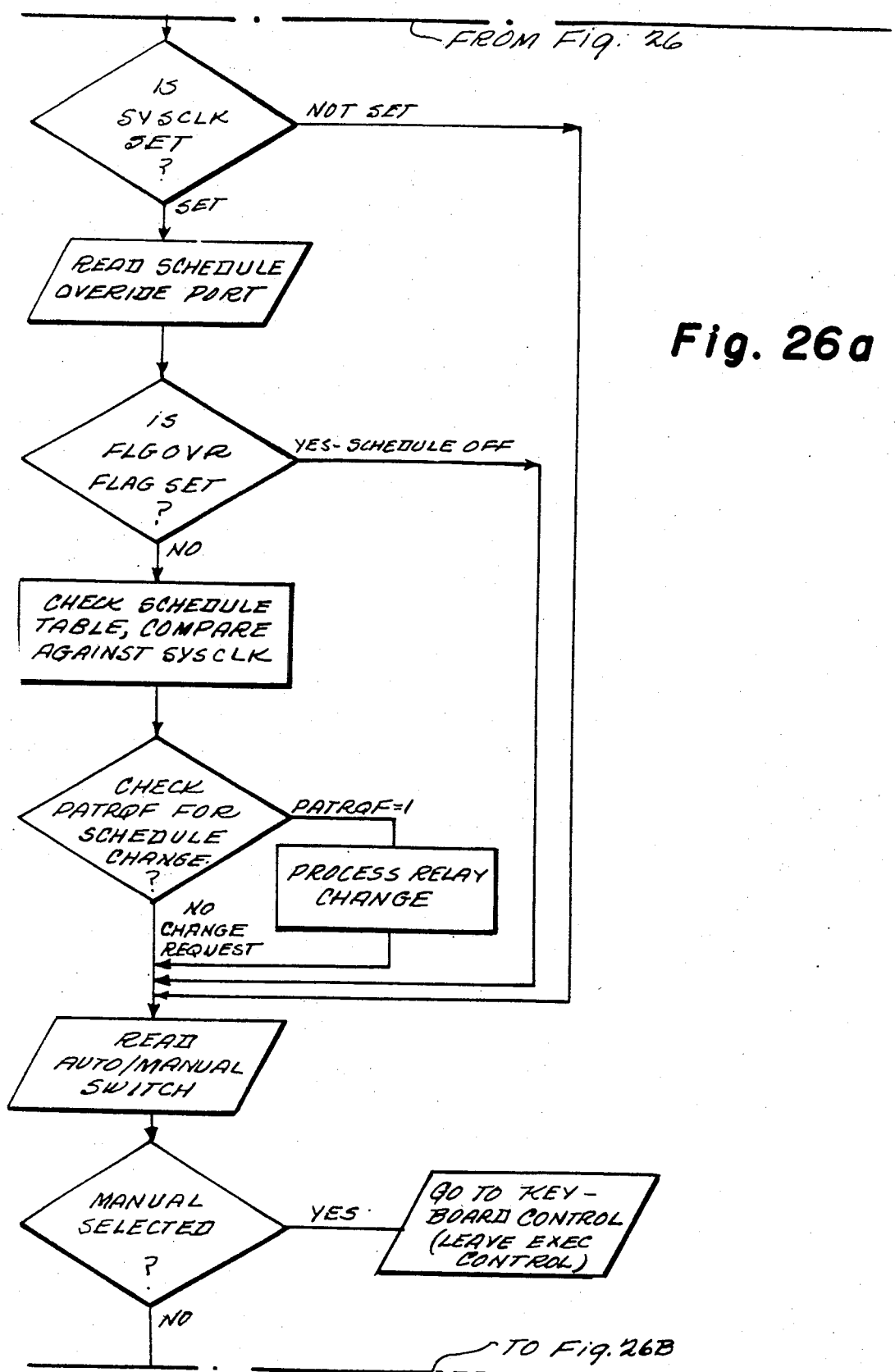
Figure 26B:
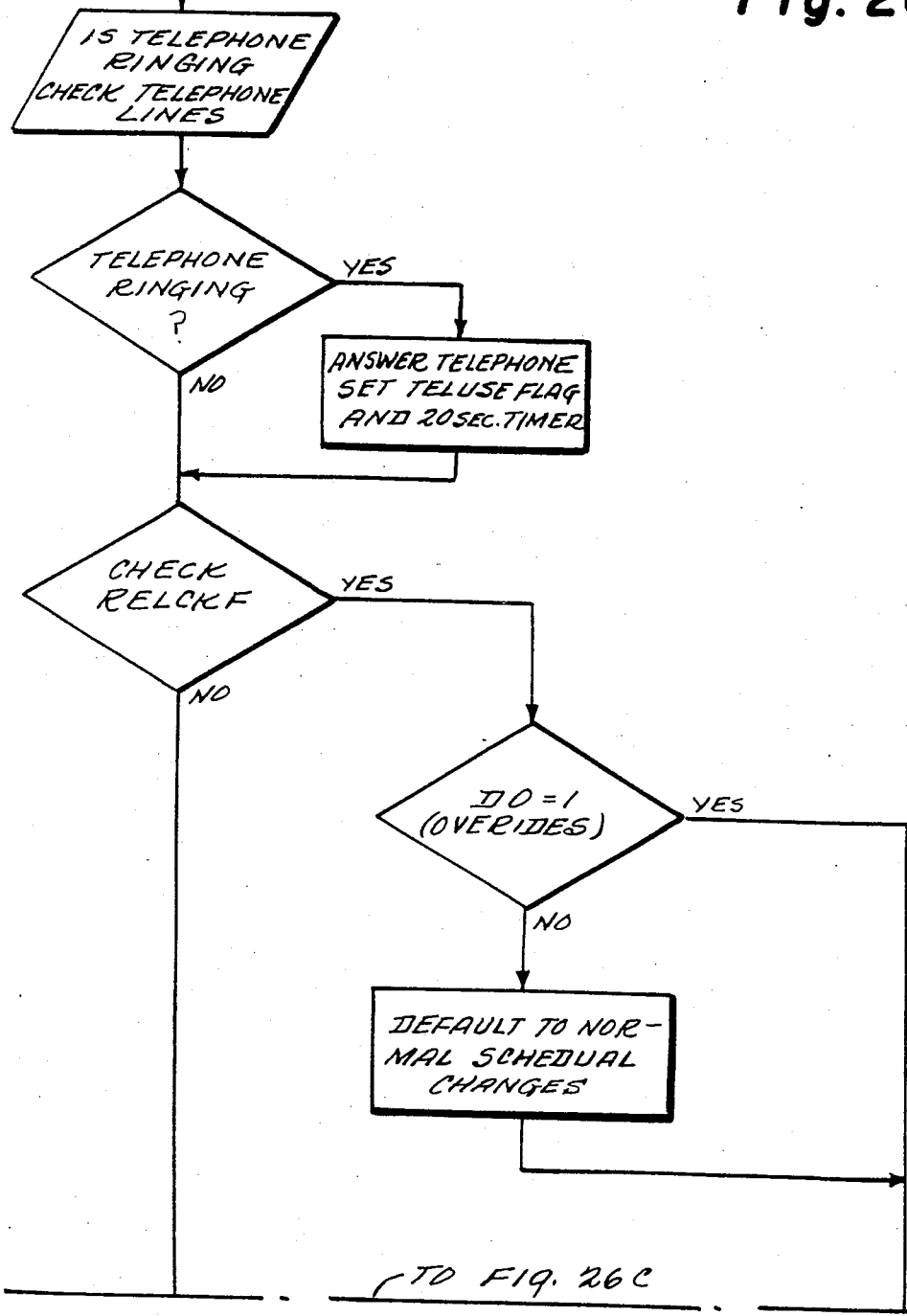
Figure 26C:
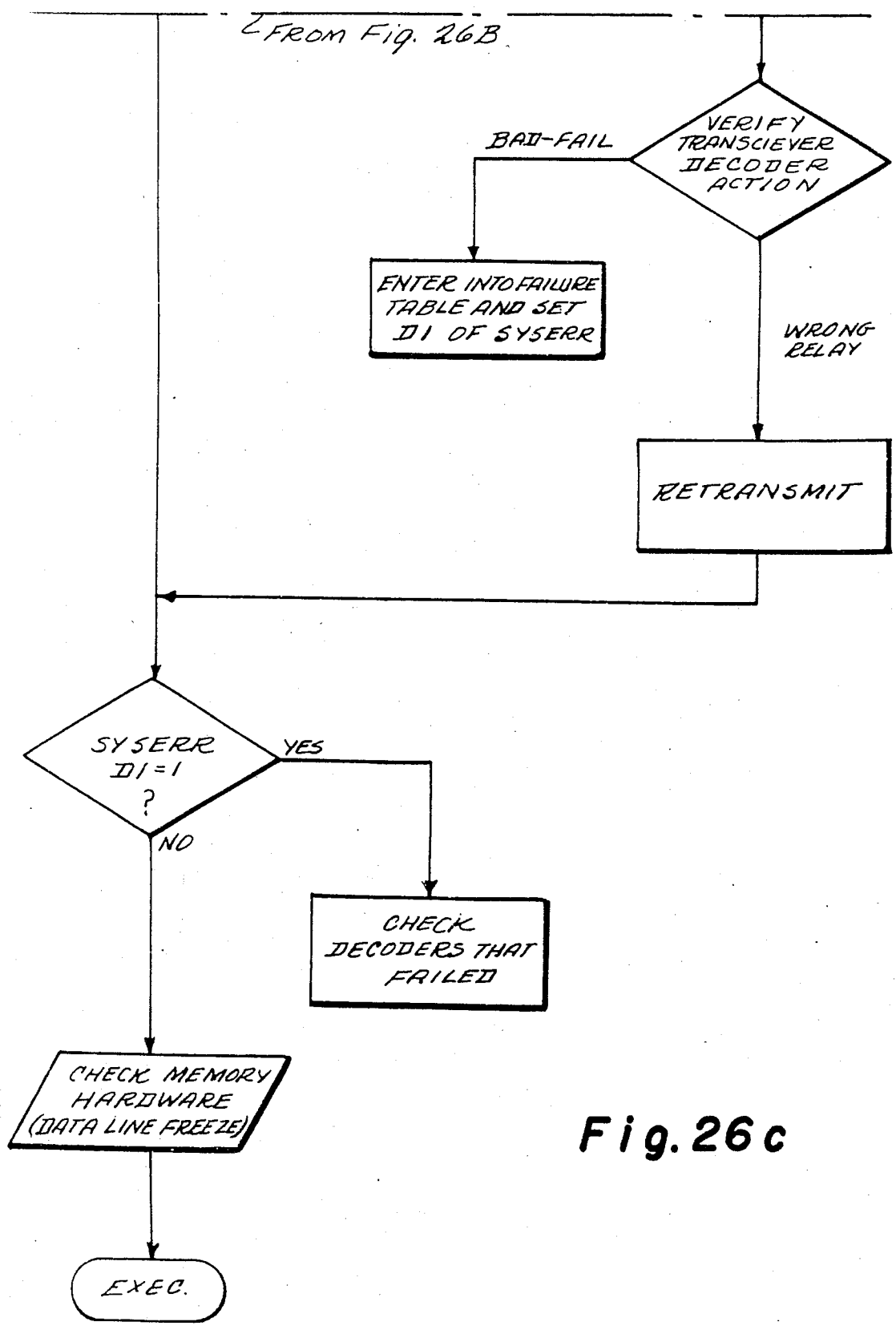

Referring now to FIG. 26, there is shown a flowchart of the executive program (Appendix B) of controller 50.

The executive is utilized for control of the system when it is operating in the automatic mode. The executive is, in essence, a loop of a sequence of instructions which periodically calls for each of a plurality of tasks to be performed. These tasks relate to system maintenance, and the processing of data to perform relay state changes as required and other load control functions.

The executive first checks a system error status flag SYSERR. Data bit D2 is examined in order to determine whether or not there has been a memory failure. If a memor failure is indicated by a logic level "1" in data bit D2, a bootstrap loader takes control and causes the entire system to be re-initialized and all data to be re-loaded through magnetic tape device 72. On the other hand, if no memory failure is indicated, data bit D2, is a logic level "0" and the executive calls LINCHK in order to have the data line checking tasks performed.

In the data line checking section, the LINUSE flag specifying a partaicular state of data line 58 specifies a specific task to be performed. The LINUSE flag indicates one of five possible states of data line 58, as will be discussed in detail hereafter.

After performing the data line checking tasks, the executive checks the one second pseudo clock interrupt. The executive acknowledges and clears this interrupt and performs the following task. When the pseudo clock interrupt is acknowledged system timers, such as the display timer and the 20 second telephone timer, are updated. These timers are essentially count-down timers that are pre-set to a specific time out and are decremented by servicing the pseudo clock interrupt. As shown on the executive flowchart, if the one second pseudo interrupt is enabled, the interrupt is cleared in order to set up for the next pulse.

The next task performed by the executive is the telephone servicing. If the TLSERF flag is present, there is an indication that a user has telephoned controller 50 and keyed in appropriate instructions for adjusting his lights. In essence, this flag indicates that remote control data has been entered and that it is now appropriate to process according to the command entered. If the telephone service flag is set, telephone service is attended and relay data is sent in accordance with the telphone request to the central controller 50. After the appropriate action has taken place in accordance with the user entered instructions, the telephone service flag is cleared and control returns to the executive. In this preferred embodiment, the telephone command results in the state of relays being affected. This relay state control results from the remoter user specifying a sector number and a pattern indicating the area controlled and the desired states of relays associated with what area.

After servicing the telephone line, the executive then checks the data line by performing the line check task by accessing the LINCHK section. There are several line checks throughout the executive program because the checking of the data line is an extremely important function. Communication between controller 50 and each of transceiver decoders 56 requires a data line 58 that is not impaired in any way, i.e., stuck either in a shorted or high impedance mode, etc. Also, the executive must check data line 50 often enough to insure that information transmitted asynchronously by a transceiver decoder 56 is not missed. A separate flowchart details the line check task.

After the line check task has been performed, the system clock SYSCLK is consulted. SYSCLK refers to a region of memory storage wherein the system clock information is stored. As set forth in Table 4 the SYSCLK memory location stores a day of the week number 1-7 (a 0 in this location indicates that the clock is not set). The next memory location above SYSCLK, known as SYSCLK+1 indicates the time in minutes from 0 to 59 in binary coded decimal format. The next address location after SYSCLK+1 is known as SYSCLK+2 and stores the hour of the day on a twenty-four hour cycle from 00:00 to 23:59, also in BCD format. If the system clock is set, i.e., there is information in the SYSCLK memory location, the clock is interrogated to see whether or not it is time to execute a schedule change. If a schedule change is called for at the time appearing on the system clock, then the schedule change is executed or is serviced. A schedule service is dispatched by the executive if the schedule service request flag, PATRQF, is set. A schedule is serviced or set when the executive checks the status of the schedule. The schedule status is checked by comparing the next actuation time of service stored in the SCHEDULE area of RAM 404 pointed to by a schedule pointer with the system clock SYSCLK. It may be possible, after a lengthy power outage, for the system schedule to be significantly behind the system clock thereby calling for a "catch-up" during which several schedule changes would take place. The system would cycle through all schedule changes updating relays with each such schedule change until the schedule is justified with respect to the system clock.

After all schedule changes have taken place and the system schedule is caught up to the system clock, the executive then reads the state of an auto/manual switch located on console display 415. Auto/manual switch is user operated for determining whether the system will be operating in the automatic (under the control of the executive) or manual (data entered via the keyboard) mode. If the manual mode is selected, then controller 50 leaves executive control and is operating under keyboard control only where a console operator is required. However, if the manual mode is not selected, control remains in the executive and continues to check the status of the phone lines.

The phone lines are checked by first determining whether or not a telephone is ringing. If a telephone is ringing, the telephone is answered and the telephone use flag TELUSE is set with a telephone timer limiting the length of the call. It should be noted that the telephone use flag TELUSE is different from the telephone service flag TLSERF. The telephone service flag is activated after there has been a telephone service request, i.e., the user has keyed in the appropriate sector and pattern information and then hit the pound sign on his telephone keyboard. This indicates that the remote user has entered data into controller 50 and it is appropriate for controller 50 to process that data and determine the appropriate relays to be pulsed. The telephone answering block has been expanded into a separate flowchart detailed in FIG. 24.

Figure 27:
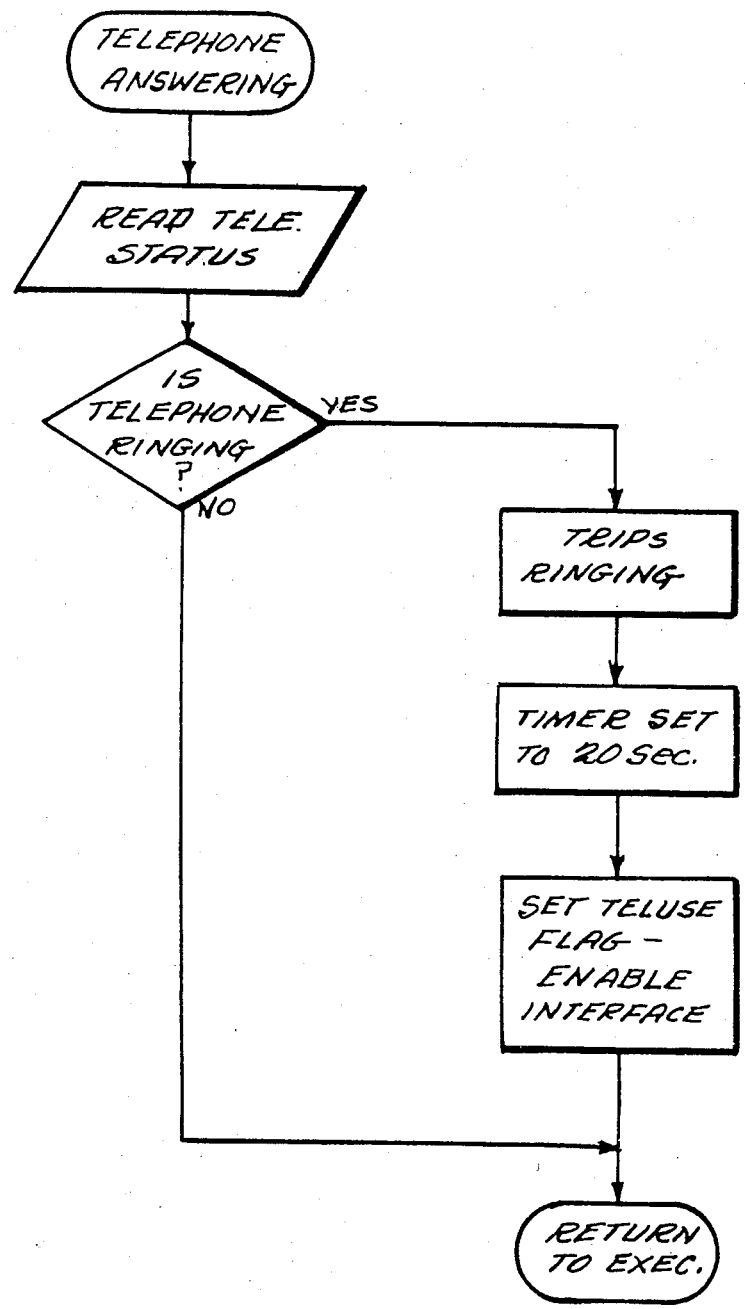
FIG. 27 is a flow chart illustrating the telephone answering task.

Referring now to FIG. 27, there is shown a flow chart of the telephone answering task. When the telephone is answered, in addition to setting the TELUSE flag, the 20 second telephone timer is set. This timer gives each telephone user 20 seconds within which to enter data specifying the sector to be controlled and the desired pattern indicating relay states and to then hang up the telephone.

Referring back to FIG. 23, after checking the telephone lines, the executive determines whether a relay status requires verification. This task assures that a relay has in fact assumed the state to which it was commanded to attain. A transceiver decoder 56 and all its associated relays are checked after any command to alter the status of any or all of those relays. There are two separate and distinct relay check tables. One such table is utilized to check the status of relays which have been pulsed in response to a telephone request or switchleg request from a user. Such requests set a "1" in the D0 bit of the relay check flag RELCKF. The other relay check table is utilized for the checking of the status of relays affected by normal scheduling changes. A normal scheduled change places a "1" in the D1 bit of the relay check flag RELCKF. Two separate and distinct tables are utilized so that relays can be checked quickly which have been the subject of an override while reserving the checking of relays pulsed in response to a normally scheduled change for a time when controller 50 is free of more pressing tasks. If the relay check flag RELCKF has been raised due to an override request, the relay state is verified for each of those transceiver decoders 56 that were subjected to the override command. If all relays are in the proper state no further action is required. However, if a relay or relays have not assumed the appropriate state, the instruction to is retransmitted in an attempt to correct the status of the relay or relays that have not assumed the appropriate state. In the event that a transceiver decoder 56 fails to respond to the controller 50 interrogation, it is said to have malfunctioned. The information that a transceiver decoder 56 has failed is put into a failure table. When a failure occurs, an enunciation (the flashing of the word "FAILURE" on display console 415) takes place to alert the console operator of the failure. The failure enunciation not only indicates that a failure has taken place, but also tells the operator which particular device has failed. Thus, the device can be replaced promptly.

After the executive has processed or checked transceiver decoders 56 in the check table or has retransmitted appropriate information to transceiver decoders that have not responded properly to a command, the executive then checks the system error flag SYSERR. A logic level "1" in the D0 bit of SYSERR indicates that data line 58 is stuck in a low impedance mode (short circuit). A logic level "1" in the D1 bit indicates a transceiver decoder 56 failure. If either of these bits are set, a failure message appears as a flashing signal on console 415.

After failures have been attended to, the SYSERR flag is again checked to determine if there remains any failure condition. If the system error flag indicates that there is a transceiver decoder 56 failure, the controller assumes that no other activity is going on and it checks to see if the transceiver decoder has come back on line (perhaps power had failed and was restored). If the transceiver now responds, it sets the associated the relays to the proper state, and the SYSERR flag is cleared. After the system error check, the executive checks on its memory and hardware.

The executive check of its memory and hardware is a low priority check and it occurs only when the controller is in an inactive state or idling state as indicated by other flag words. In order to check memory and hardware, the CHECKSUM tasks are executed. The check sum task performs a mathematical summation of data bits to determine whether a data bit has been dropped. Because the check sum routine takes a relatively long time, controller 50 would be in danger of missing a switchleg command transmitted over data line 58 from a transceiver decoder 56. Therefore, while memory is being checked in the check sum routine, the data line is frozen by entering a bus freeze condition. In the bus condition, data line 58 is maintained in the low impedance state. Therefore each transceiver decoder 56 thinks that it is being accessed by another device and stops transmitting. Thus all data transfer is inhibited. While in this hold condition, a transceiver decoder 56 holds its data and as soon as the data line is free, attempts to transmit it to controller 50 at which time the controller will be prepared to receive the information. This data line freeze guarantees that no data will be lost. Telephone Referring again to FIG. 27, in describing FIG. 1, it was stated that a user could access controller 50 via standard telephone 66 coupled to controller 50 through a telephone data set 64. In FIG. 17 it was noted that telephone data set 64 was in turn coupled to telephone interfaces 420, 422 and 424 of controller 50. The flowchart set forth in FIG. 23 details the actual telephone answering procedure conducted by microprocessor 400 so that data from a user will be acquired by controller 50 and executed upon. A telephone instruction from a user results in a command being sent to an appropriate transceiver decoder 56 coupled to a relay desired to be affected.

When a remote user calls controller 50 from a telephone, the telephone gets a ringing signal. Microprocessor 400 checks the telephone status port and reads that port. It simply looks at the signal status of the ring indicator line, RI, from a data set 64 to determine whether a telephone is ringing. This is achieved by microprocessor 400 checking a ring indicator for each of telephone interfaces 1, 2, and 3. If a ring indicator shows that a telephone is ringing, that telephone interface is triped by sending a signal onto a standard telephone trip circuit over its data terminal ready line DTR (see FIGS. 1 and 18). The answering of a telephone sets a timer to 20 seconds. After 20 seconds, microprocessor 400 hangs up on the remote user if the call has not been completed. This ensures that no user will be able to tie up the telephone interface circuitry to the exclusion of other users. After triping the ringing of a telephone, a TELUSE flag is set indicating to the executive that there is a telephone call in progress and an interrupt is enabled. This interrupt is coupled to the data present line DP of data set 64 and is active each time a user enters data. Control is then returned to the executive. If the status of the telephones is checked and it is determined that the telephone is not ringing, control is immediately returned to the executive. The telephone status check and answering task set forth in the flowchart of FIG. 23 is returned to periodically as are all other tasks called for by the executive. The executive causes microprocessor 400 to turn its attention to each task sequentially and then begin its task list all over again. In the case of the telephone answering task, once a telephone has been answered and a user is on the line for 20 seconds, the executive enables an interrupt circuit which will monitor the telephone and allow the executive to go to other tasks. When the telephone user enters data the executive is interrupted so that the data is read in for subsequent processing. This is done for each telephone data entry until either a telephone timer timeout or a pound sign "#" is entered or the telephone user hangs up prematurely, indicated by the status of the DSR line from data set 64 when a call is terminated. Microprocessor 400 reads the telephone data input and then goes back to its other tasks. Thus, there is no need for continuous polling of the telephone. Up to three telephones can be answered simultaneously and 20 seconds will be given to each caller. Of course, any number of telephones can be used to call controller 50 however, only three telephones can be answered simultaneously. Controller 50 is coupled to the public telephone lines via data set 64 so that it can be reached by any telephone in the world. Data set 64 is suitably an AT&T type 407A data set which couples a telephone to telephone interfaces 420, 422 and 424 of controller 50.

Figure 28:
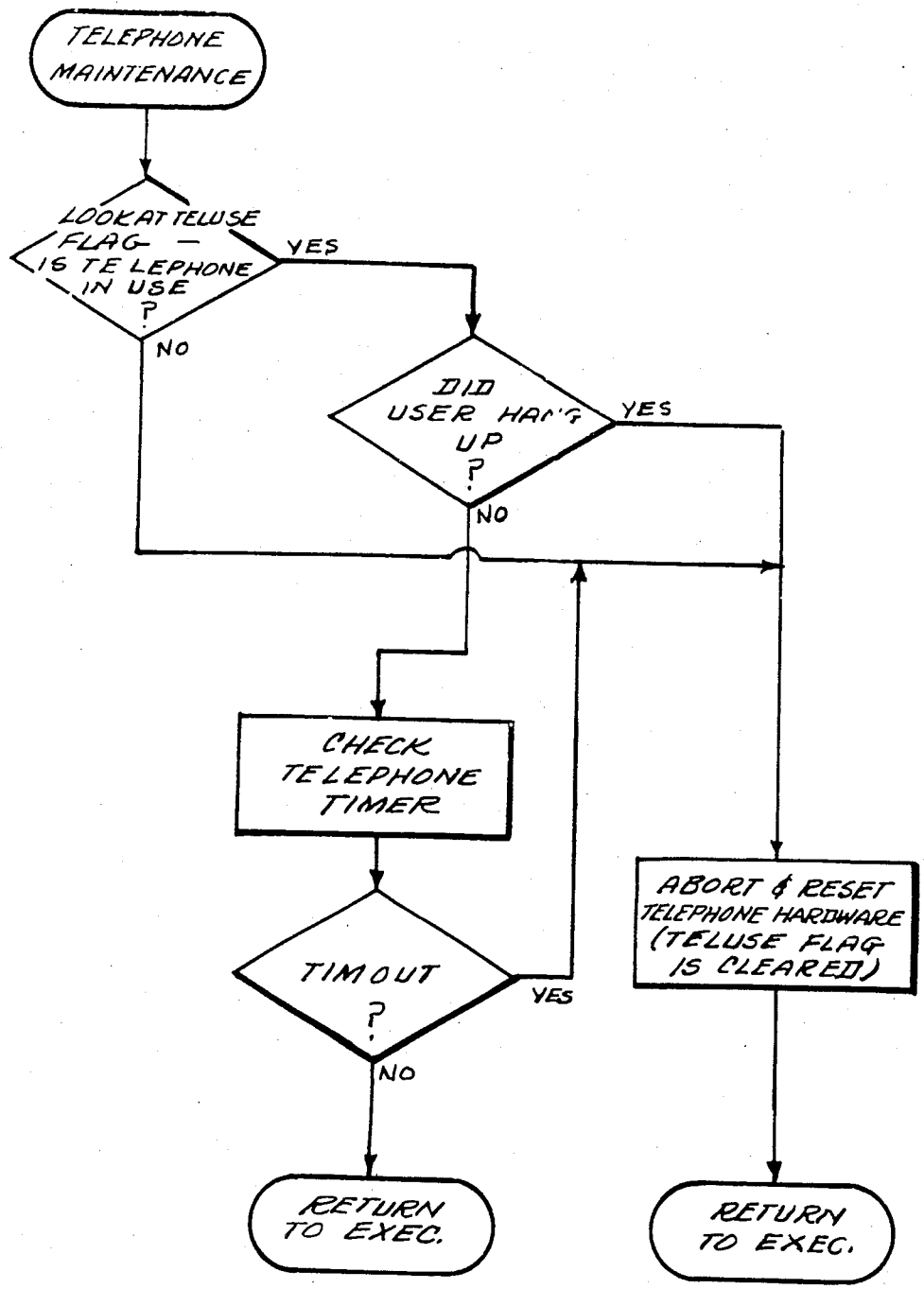
FIG. 28 is a flow chart illustrating the telephone maintenance task.

Referring now to FIG. 28, there is shown a flowchart of the telephone maintenance function. Periodically the telephone status is checked by looking at the TELUSE flag if the TELUSE flag indicates that a telephone call is in progress, the telephone line is examined to see if the call is still in progress or if the user has hung up the telephone. If the user has hung up the telephone the call is aborted and the TELUSE flag is cleared. However, if the telephone line is still in use, the 20 second timer is checked. If time is out, i.e, the 20 second period has elapsed, the call is aborted and control is returned to the executive. However, if time is not out, control is again returned to the executive and the telephone line will be checked again in due course.

Figure 29:
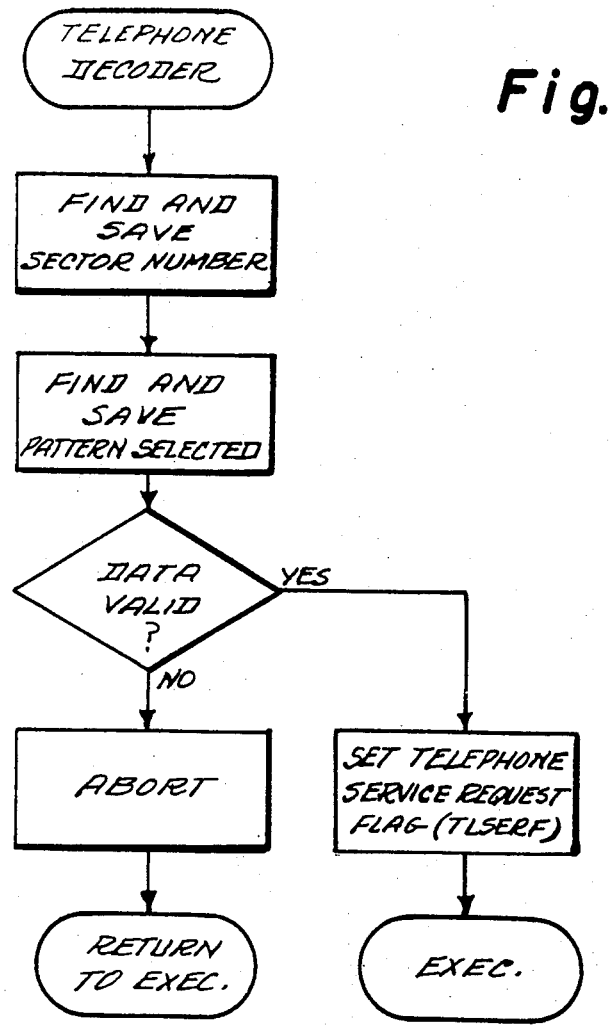
FIG. 29 is a flow chart illustrating th telephone decoder task.

Referring now to FIG. 29, there is shown a flowchart of the telephone decoder task. After a telephone has been answered, a beep of approximately one second in duration will appear on the line to advise the telephone user that the telephone has been answered and is ready for data. Typically the user will enter data calling for a specified sector number to have its relays placed in the status called for by a specified pattern. The user enters in numeric form a sector number which could be his room number or telephone extension number (whatever was originally programmed into the data base) that uniquely defines the area to be affected. The sector may include one or more relays anywhere in the system. After sector and pattern information have been entered, a final signal digit, the pound sign, is enterd by the user specifying that all data have been entered. In essence, the depressing of the pound sign acts as a command to controller 50 that it should act on the data previously entered by this user. When the pound sign is depressed, the telephone is automatically hung up and cleared for use by the next caller. This is accomplished by the automatic clearing of the TELUSE flag and causing the DTR signal to be inactive. Then, the data entered by the caller is decoded. This is the point at which the flowchart in FIG. 29 beings.

An area of memory is set up and the binary equivalent of the sector number calculated and placed therein. This number is saved until the pattern level is located (one of 32 patterns) a check is then made to see if the data is valid if the data is not valid the action is aborted and control returns to the executive. However, if the data is valid a telephone service flag TLSERF is set. The TLSERF indicates to the executive that a telephone user is requesting service and that a complete sector number and pattern number have been entered. Using sector information, controller 50 determines which relays are to be controlled. Using pattern information, the states those relays are specified. This decision making process is started when the executive recognizes the TLSERF flag. The telephone service is detailed in a flowchart in FIG. 28.

Figure 30:
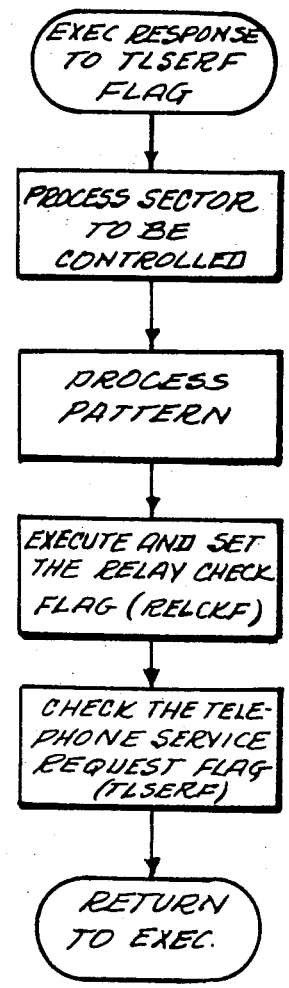
FIG. 30 is a flow chart illustrating the telephone service-task.

Referring now to FIG. 30, there is shown a flowchart of the telephone servicing task. The TLSERF flag indicates to the executive that a telephone service is requested. The executive recognizes the telephone service request flag TLSERF and immediately takes up the task of telephone service it proceeds to process the sector number and determines which transceiver decoders 56 are affected. At least one transceiver decoder 56 is be sent a command to actuate a relay. Of course one sector number can control multiple transceiver decoders so that it may be necessry to send commands to more than transceiver decoder. By processing the sector number, controller 50 determines what loads are to be controlled. It must also determine what state each of those loads is to be put into. This is determined by the pattern number. A pattern defines all of the relays for a particular transceiver decoder 56. If there are 16 relays for a particular transceiver decoder 56, the "on" or "off" condition of each relay must be defined. Therefore, processing the sector and pattern numbers determine the unambiguious status of each relay to be affected. After the sector and pattern numbers have been processed, the information is executed and the appropriate control sent to a transceiver decoder 56. At the same time, a relay check flag RELCKF is set for each transceiver decoder 56 to which a command has been sent. This relay check flag tells the executive that later it is going to have to check the status of the relays associated with that particular transceiver to make sure that the relays have been affected and are in the proper state called for. By the use of a flag, the executive does not need to divert its attention to a check of the relay status immediately but can wait until it is not busy with another task.

Data Line Maintenance

As part of data line maintenance, controller 50 periodically checks data line 58 to insure that it is operating correctly (information flowing or capable of flowing as required). The line check task is called for by the executive with the flagword LINCHK. The status of data line 58 is recorded in a scratch memory location known as LINUSE. LINUSE contains the disposition of the data line and indicates five different modes or states of the data line:

1. receive mode,
2. transmit mode,
3. bad preamble (abort),
4. line free (clear), and
5. line stuck (low impedance state).

The line check task to be performed will be based upon the mode indicated by LINUSE. The line check task sets LINUSE in a particular mode and it receives and processes switchleg information as well as maintain the integrity of the transmitter, receiver, and the data and attempts to maintain the line free of any problems. The term LINCHK refers to the source code of the subroutine for this task called for by the executive.

Figure 31:
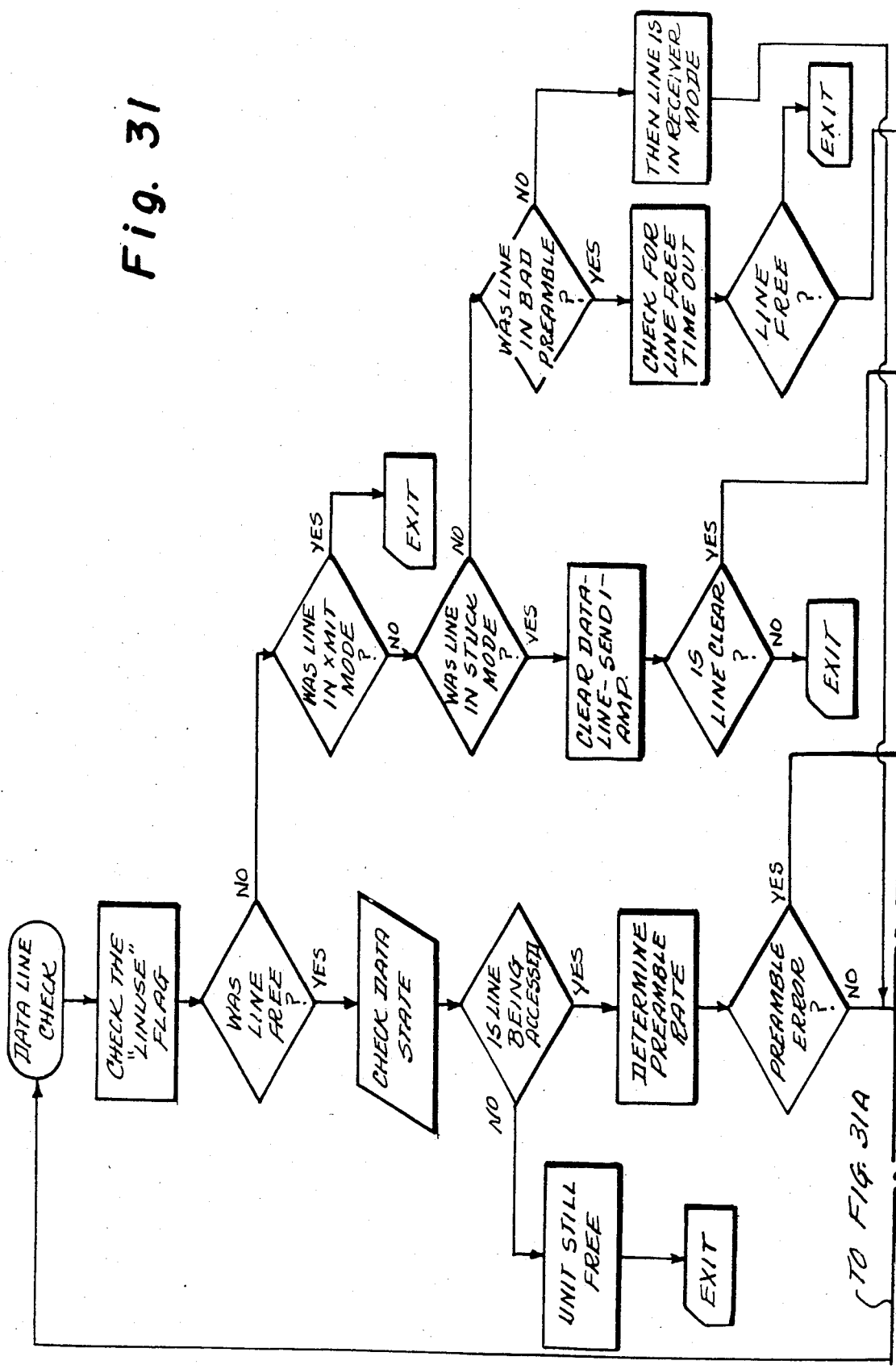

Referring now to FIG. 31, there is shown a flowchart of the entire line check task. When LINCHK is called from the executive, the line use flag is examined and the value of the line use flag is loaded. The line use flag indicates one of the five modes discussed above. It describes the past state of the data line or the disposition of the data or transmitter receiver circuit shown in FIG. 18. The first decision is whether or not line is free. If the line is not free, it must be determined whether or not the line was in a transmit mode the last time the line check task was carried out. If the line was in the transmit mode, then control is returned to the executive so that it can finish the transmission. However, if the line was not in a transmit mode, it must be determined whether the line is stuck. If the line is not stuck, then it must be determined whether there was a bad preamble. If there was no bad preamble, then the line must be in a receive mode and data is received.

Returning to the decision regarding whether there was a bad preamble, if the line is in a bad preamble state then it must be determined whether or not the line is free. If it went free, then the line use flag LINUSE is reset to reflect that line is in a free condition. If the line was not free, then return is controlled to the executive. No data can be received because the data rate is not known. Data cannot be received until the line is free and good preamble sent so that synchronization can take place.

Referring back to the line stuck decision three, if the line is in a stuck mode then there is a short on the data line. Therefore it is necessary to blow a fusable link on the transceiver decoder 56 that is causing the problem which removes the malfunctioned transceiver decoder from the data line. Therefore if it is determined that the line is in a stuck mode, a five millisecond pulse is sent down the data line in order to blow the appropriate fusable link.

Referring back to FIG. 19, a data line clear is initiated by activating the Z2 strobe line and signalling on the D0 data line coupled to data I/O 418. A pulse coupled into optoisolator 456 effectively shorts a transistor 467 placing a resistor 469 in parallel with the series combination of resistors 464 and 466. This causes an effective low impedance to the power supply enabling more current to flow through the data line (data line 58). This clearing current is appropriately one amp which still does not exceed the power limiting specification required by the National Electrical Code (NEC) for low voltage class two wiring.

After a line clear pulse has been sent down the data line, the line is again checked to determine whether or not it is clear. If fusable link 154 has been blown, the line will have been clear. However, if the fusable link has not been blown, the line will continue to be stuck. If the line has not been cleared, control is returned to the executive and the line use flag remains in the stuck mode condition. In this way, the next time the executive calls for the routine it will again note the line stuck condition and pulse the data line in an attempt to clear itself. This continuous loop pulsing will continue until the data line has become clear and the line use flag is set to a bad preamble mode before control returns to the executive. The next time the executive interrogates this routine and it is determined that the line is not free, since the line is not stuck, it will assume that a bad preamble condition exists and will check the line for a time out into the line free mode. After the line is deemed free microprocessor 400 clears the line use flag LINUSE to indicate the free line condition If the line is free when the executive initially enters this task, the state of the data line is checked. It is determined whether line is being accessed by a transceiver decoder 56 or other remote device. If the line is still free the routine returns control to the executive. However, if the line is being accessed, then a preamble is being received and controller 50 can determine the rate of data from the preamble. It is then determined whether a preamble error exists. If there is no preamble error, then the data from a switchleg entry is read. However, if there is a preamble error, it is determined whether the line is stuck in a low impedance mode, the line use flag LINUSE is set to indicate that a stuck mode exists (the D0 bit in the SYSERR flag is set before control is returned to the executive) or to indicate a bad preamble exists and should ignore the current transmission. Returning to the decision tree related to whether the line is stuck in a low impedance mode, the line use flag LINUSE is set to indicate a bad preamble and control is returned to the executive.

Assuming there is no preamble error, switchleg data can be read in. If reception is okay, the line use flag is set to indicate a receive mode. When in the receive mode, no transmission can take place and data on the line must be received. Once data is received, it is determined whether the switchleg is valid. That is, if the switchleg data is valid. If it is not, control is returned to the executive and the line is left in a receive mode. If the switchleg data is valid, the switchleg information data is processed, i.e., controller 50 grabs the data line away from whatever devices are using it and transmits a command immediately to the appropriate transceiver decoder 56. After the transmission, the line is left in a free state and control returned to the executive.

If the switchleg data was not valid, the line use flag is left in the receive mode and the next time the routine is executed another attempt will be made to read the switchleg transmission data. If it cannot read the data, it must be determined whether the line is stuck. If the line is stuck, the line use flag is adjusted to so indicate and control is returned to the executive. If the line is not stuck it is determined whether or not the line is free. If so, the line use flag is set to indicate the free line status and control returns to the executive. However, if the line is not free, then synchronization has not been achieved and control is again returned to the executive with the line use flag indicating that the receive mode is in effect.

Relay Check

When a command is sent to a particular relay pursuant to a telephone request or a switch activation, the RELCHK flag is set. Only two bits of an 8-bit byte are used. Bit D0 indicates that it is appropriate for controller 50 to check the status of relays which have been pulsed in response to a switch or telephone request. Bit D1 indicates that it is appropriate to check the status of relays that have been pulsed in response to a schedule change automatically occurring in accordance with the time showing on the real time clock. The use of two separate data bits allows a more leisurely check of relays automatically pulsed for a schedule change. It is not necessary to divert the attention of the executive to these routine checks. However, the executive is interrupted when a telephone or switch request by a user pulses a relay. The D0 bits indicates that the status of the affected relay should be immediately checked to make sure that it has been switched. If it has not responded to the users override instruction, another pulse is immediately sent to attempt to trigger the relay again.

Priority Override

Under normal scheduled control (automatic mode), the change of status of each relay is controlled in accordance with the 7-day-24-hour schedule stored in the main schedule area of RAM 404. For example, the schedule may call for Wednesday, 6:00 PM, lights out in sector 712. If the user controlling sector 712 which has been given priority status (which is entered on the mark-sense card at the time the sector definition is made), the user will be able to inhibit the upcoming schedule change from affecting the priority overridden sector by placing a telephone call to controller 50 in advance of that schedule change. To establish a priority override the remote user who has been assigned a priority sector calls controller 50 by telephone and indicates that even though his lights are scheduled to be turned off at 6:00, they should remain on when the rest of the normally scheduled changes occur at 6:00. When a priority override is in effect, normal schedule changes will not affect the status of the relays controlling the overriden sector.

The priority overrides can be cleared. The inhibiting of an up-coming schedule change can be asserted for sectors that have been overridden which have priority status. For non-priority sector overrides, the override is not retained. Of course, the current state of all relays is retained even for non-priority overrides. However, a subsequent schedule change will affect areas that have been overridden by a command to a sector having non-priority status. Only commands to a priority status sector can override a previously overridden priority status sector until the priority erase time clears all present priority sector overrides. A previously set priority erase time will automatically remove the priority request at a predetermined time. For example, if the previously set priority erase time is 8:00 PM, and the user takes no specific action to cancel his 6:00 PM priority override of the schedule lighting change, then his lights will automatically go out at 8:00 PM, the priority erase time. The priority erase times are stored in RAM 404 between address B266 and B276. The priority erase times are specified at the same time that priority status is assigned to a sector by the user. However, a separate priority erase time is not defined for each sector number. Thus, at the priority erase time, all priorities entered by all remote users for all sectors are erased. If a priority override is required the next day, it must again be specifically requested by the user. This feature is advantageous for energy savings because if a user forgets to turn his lights out after overriding a scheduled lights-out change, his lights will not remain on all night or all weekend, but rather they will go out at the priority erase time. Thus, the building or office complex is constantly forced back into automatic schedule and specific action or scheduling change commands required by the user to alter that schedule.

Alternate Schedules

When the system is operating in the automatic mode, it is regularly checking the real time clock 410 in order to determine when a program schedule change should be executed. These schedule changes are instituted in accordance with a particular day of the week and particular time of the day, based upon a twenty-four hour clock. While the system is operating in the automatic mode, it is also processing telephone requests and remote switchleg overrides. In addition, it is also performing self-diagnostics as will be further explained. In the manual mode (automatic and manual modes are switch selectable from the console of controller 50), all functions are entered via the keyboard through keyboard display interface 414. The system cannot operate in both the automatic and manual modes at the same time. In the automatic mode, no user interaction is required. However, user initiated telephone requests for priority override and switches will be responded to. In the manual mode, the system does not answer or service any telephone or process any remotely actuated switchlegs.

In addition to the main schedules entered for the seven days of the week and the twenty-four hours of each day, special days, such as holidays, may require a special schedule. During those times, there are two alternate schedules available providing a limited amount of scheduling capability without destroying the schecules stored corresponding to the main schedules. Schedule override circuitry is provided such that three possible schedule overrides exist. These are known as eight day override, ninth day override and schedule off. In the schedule off mode, controller 50 will not respond to any predefined schedule but will respond to remote switchleg activation and to telephone requests. Thus, in the schedule off mode the system becomes a fancy "switch".

The eighth and ninth day overrides are provided respectfully in RAM 404 addresses 710B and 71AD. There are 32 entries per alternate schedule available.

Once an eight day override is enabled, there is in place a twenty-four hour schedule specified by the eighth day override. This twenty-four hour schedule will be continously repeated until cancelled. There is no automatic sequencing back to the normal schedule until the eighth day override is cancelled. The normal schedule will continue to default to an override schedule each and every day.

Eighth and ninth day and off schedule overrides are switch selectable at the console of controller 50. Referring back to FIG. 17, the eighth day, ninth day, and off schedule overrides are shown as inputs to an optoisolator 412 coupled to the data bus of controller 50. Optoisolator 412 impresses the eighth schedule override on line D0 of the data bus, ninth day override on line D1 of the data bus and the schedule off override on line D2 of the data bus.

The use of schedule overrides provides significant advantage in that flexibility is provided for handling special situations which occur from time to time without having to redefine and reload the entire memory.

Dynamic Allocation of Pattern Data

Referring now to FIG. 32, there is shown a diagram of the dynamic storage of pattern data in RAM 404. In prior art load control devices, each pattern was assigned a specific amount of memory regardless of the number of relays defined by that pattern. Thus, a pattern including two relays took up as much memory room as a pattern including 30 relays. Under the fixed allocation arrangement, each pattern would have a base address which would be added to some relative address to find the absolute address associated for a transceiver in a particular pattern. This type of arrangment is very wasteful of memory space. The present system utilizes a dynamically allocated memory. In the dynamically allocated memory, there is no fixed amount of memory space dedicated to each pattern. Rather, if a particular pattern defines the status of fewer relays and transceivers than does another pattern, then it would occupy less memory space. In order to determine the location of each pattern from its preceding pattern, a bit of information is included in the pattern specification which indicates the number of bits of data within that pattern. Thus, if pattern 4 is being consulted, the bit indicating the number of data bits is added to the address pattern 4 to yield the address of the beginning of pattern 5. Thus, the pattern table can be scanned readily in order to determine the states of a relay in any pattern. Patterns can be expanded or contracted as long as the number of bits designated in the total bit byte is amended to reflect the new size of the pattern definition.

Keyboard

Figure 34A:
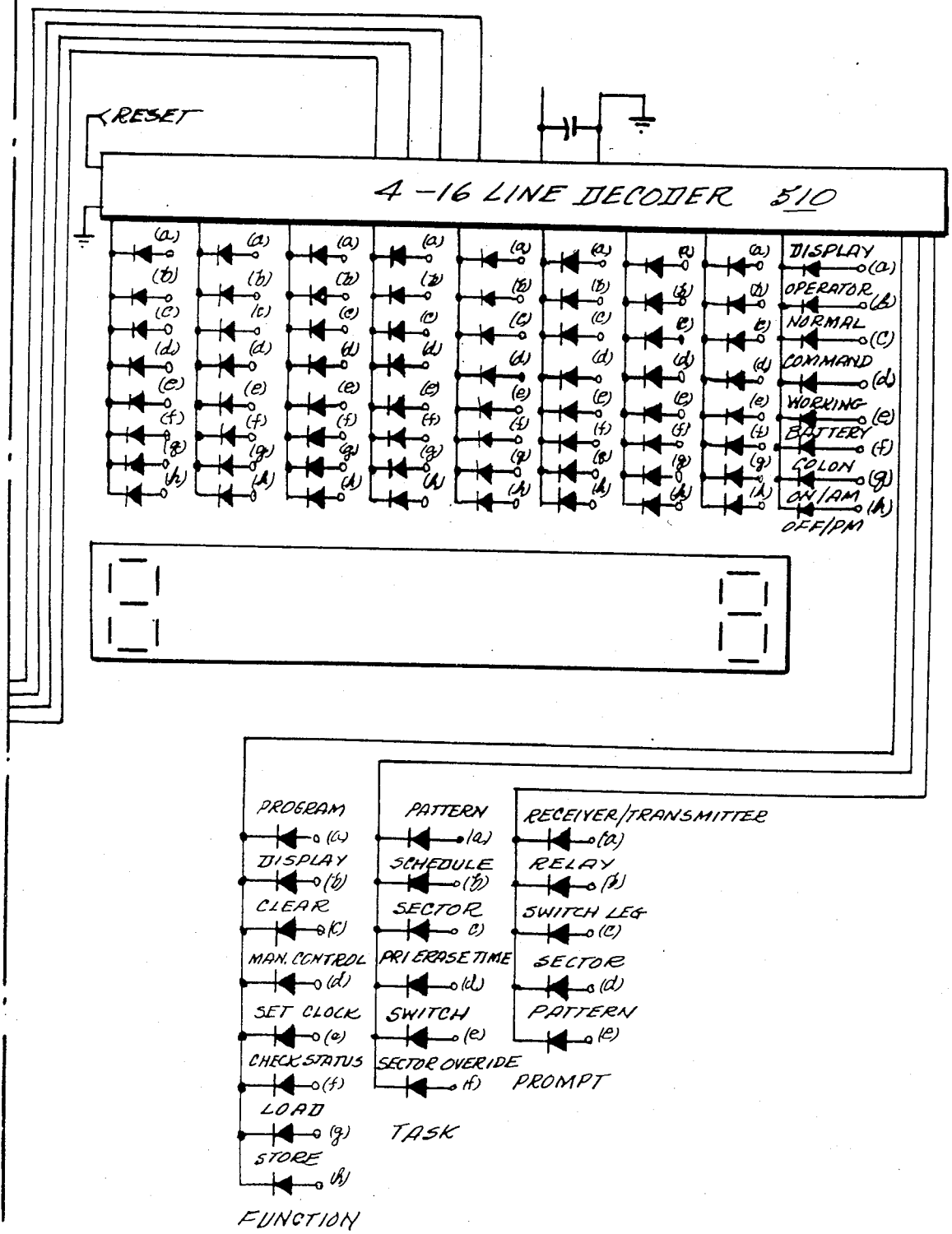

Referring now to FIG. 34, there is shown a schematic diagram of keyboard display 411 and keyboard interface 413.

Microprocessor 400 interfaces directly to a user console via a keyboard interface 413 and keyboard display 411. The keyboard interface 413 utilizes a standard keyboard display controller integrated circuit 502, suitably an Intel 8279, which manages keyboard and display operations. Keyboard interface 413 further includes driver and decoder circuitry 508 coupled to keyboard display controller integrated circuit 502.

Keyboard interface 411 includes a keyboard 504 including a plurality of special purpose keys and a display 506 including a plurality of light emitting diodes (LEDs).

Keyboard display controller 502 is interfaced to microprocessor 400 via data bus 405 and control bus 403 with a strobe Z8 eminating from I/O Strobe 433. At predetermined times, microprocessor 400 issues commands that set keyboard display controller 502 to specific modes which affect the information displayed by display 506. Furthermore, keyboard 504 is read by keyboard display controller 502 which in turn notifies microprocessor 400. In order for keyboard inputs to be read from keyboard display controller 502 microprocessor 400 must pull the status of keyboard display controller 502. The polling of this status for recognizing keyboard inputs is performed only in the manual mode of operation where commands from the user console device are accepted.

Display 506 is refreshed automatically by keyboard display controller 502 thereby allowing a X-Y matrix multiplexing display technique which reduces the number of connections to display 506 thus relieving microprocessor 400 of the time consuming burden of refreshing.

The multiplexing technique used to drive display 506 includes a 4-16 line decoder 510, suitably a 74159, to select the column of up to eight LEDs to be energized. These LEDs form a digital alpha-numeric display for ennunciating failure conditions, system status, and prompt for interactive system definition inputs, e.g., sectors, switches, patterns, priority erase times, and schedule. Once an LED column is selected by decoder 510, a bank of LED drivers 512, coupled to keyboard display controller 502 and receiving information therefrom, causes the appropriate LEDs to be lighted.

Through stages of the definition procedure by the console operator, as well as system status and failure modes, the information displayed on the LEDs is determined by microprocessor 400 instructed by the firmware set forth in Appendix B.

The user inputs to program display, clear, manual control, set the clock, read the status, load and store on tape and for each of the definition functions (pattern, sector, schedule, priority erase time, and switch) are provided in keyboard 504 and are read by a scanning X-Y matrix managed by keyboard display controller 502. The technique of scanning an X-Y keyboard matrix is similar to the X-Y matrix of the display described with reference to the display above. The scanning of the keyboard is achieved by selecting a column of keys and reading any that is enabled by depressing the appropriate key of the column selected of keyboard 504. The depressing of a key electrically connects a column line to a row line.

The column is selected by a 3-8 line decoder 514, suitably a 74156, coupled to the scan lines of keyboard display controller 502. As a column is selected and the row is read, the mechanical contacts of the keys of keyboard 504 are automatically debounced guarding against multiple contact readings. Once a valid key is read by keyboard display controller 502 a flag word is set which is subsequently polled by microprocessor 400 indicating this event. The decoding of the actual key in the X-Y matrix of keyboard 504 that determines if a pattern, sector, schedule, switch, priority erase time, is pressed is achieved in a look-up table provided in the firmware set forth in Appendix B.

Figure 35:
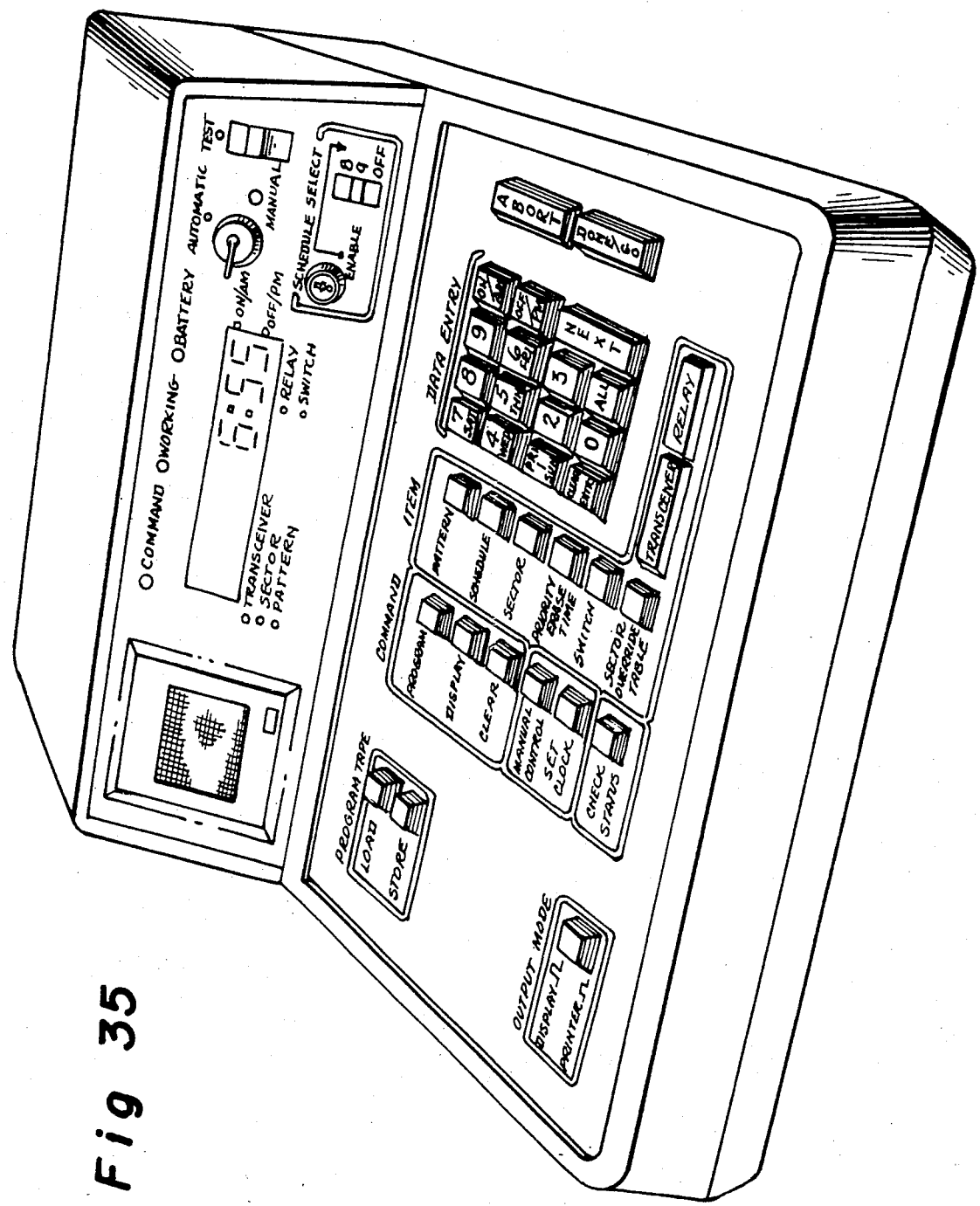
FIG. 35 is a perspective view of the console of the central controller.

FIG. 35 is a perspective view of the console showing the display and keyboard.

Summary

Therefore it is apparent that there has been provided an apparatus for distributed load control providing enhanced flexibility and consequent greater utility to the user.

Many unique features combine to produce a highly sophisticated user interactive load control system:
- use of a low voltage twisted pair data line for bi-directional communication;
- use of distributed "smart" transceiver decoders;
- use of a communication protocol and data format permitting data line arbitration among completing transceiver decoders;
- use of switchleg and analog input circuits for condition responsiveness;
- time dependent scheduling of sectors defining a subset of relays and loads rather than scheduling of patterns;
- self-diagnosis of error and self-clearing;
- self-clocking synchronization for magnetic tape reading; and
- mode control of transceiver decoders via function words in the data stream.

It should be apparent that the apparatus and methods and articles which are described above provide great facility and flexibility in the control of electric loads within a building.

In understanding the significance of some of the features which are incorporated in the system and apparatus, it is important to have an idea of the use of such a system from the point of view of a potential user.

In the first place the one feature of the system is that it is made up of components which are very susceptible to removal and replacement. The controller itself has basically two connections for a twisted pair of wires; it has a number of plug-in ports for accessories, such as card readers and it has the conventional power source which can be plugged into a convenient wall receptacle. To replace the controller involves simply a disconnection of the accessory plugs, the removal of the two twisted pair of wires, unplugging from the power source and replacement by another programmer which is the full equivalent of that which is removed. Similarly, the transceiver decoder units are built to include a board which can be removed from operation essentially as described in this application, and which can be removed physically from its container structure for replacement by an equivalent transceiver decoder structure with a minimum of disconnection and reconnection effort.

In other words, the system itself is made up of highly replaceable elements so that a user requires a minimum of maintenance and service in order to keep his system functioning and in good order and providing the inherent capability which has been discussed above.

The factor of relatively low level of needed service is important in a system of this type because the user is not confronted with a level of complexity in dealing with the installation or in dealing with the substitution of components which is characteristic of numerous other systems. From the user's point of view numerous features have been incorporated in the system which greatly facilitate the user installation and substitution of the components thereof with a minimum service requirement in putting the system to actual use and deriving the benefits including the economy and cost saving therefrom.

Another attribute of the system, apparatus and articles of this invention is that because of the numerous elements discussed and described above, the system is highly interactive. By interactive is meant that the user communicates with the system through interrogation and response and can adapt and utilize the system for the specialized uses to which his building is to be put. Such control includes furnishing and controlling energy distribution or supply within the building as well as in providing a desired lighting environment around the building.

One of the unique advantages of this system is that the features as described above have been combined and incorporated in the system so that the user can directly enter his energy distribution and control needs into the system and can establish control which is specially tailored to the user's particular building use and to the uses to be made of it. In other words, one of the results of the incorporation of the numerous features discussed above is that it makes it feasible for individuals who are not trained in the use of sophisticated control equipment to actually undertake and to establish control of the lighting within the building to serve the tasks which are to be performed in the building and to achieve cost saving economy in furnishing the energy needed for carrying out the tasks. This can be accomplished without the need for highly trained specialists to get the system working after it is first installed or to modify its operation after it has been working. Because of the described features the user need not engage in complex forms of programming to make the system operate or to perform in accordance with particular needs of building occupants. This is significant to the user of a building in that it is the user who has the greatest understanding of what the energy needs for the tasks are.

The system does not exclude the employment of a specialist in energy supply and control and the system can be used by a highly skilled individual. However, the highly skilled individual is not needed in order to initiate the energy supply and control within the building and in order to alter it to the changing tasks and pattern of tasks to be carried out. Skilled specialists are not needed to alter the energy supply and control when the building is to be used for other purposes.

What makes this great facility in initiating and modifying the supply and control of energy in a building are the numerous features which have been incorporated in the system as are described above. For example, one such feature is a great facility in exchange of the individual units. Another feature is that such exchange will be a rare occurrence because of the great reliability which has been built into the system. One of the contributing factors to the great reliability is the self-diagnostic features and the self-checking and automatic establishing of the most reliable mode of operation of the system. Accordingly, it may be seen that the features which are combined in the subject invention are very significant in the combination provided in that they contribute significantly to the interactive control and supply of energy by non-specialists and directly by the building, occupants and operators and users.

The foregoing is true although the control and energy supply which is achieved is at a very sophisticated level involving the establishment of numerous economical and valuable patterns and changes in patterns with conditions and with time. Further, one of the additional novel aspects achieved because of the incorporation of the numerous unique features of the system, as described herein, is that the system can be fine tuned to the individual tasks performed within the building and to individual needs of the personnel who perform such tasks within areas of the building.

Moreover, because of the combination of features and means to achieve these features as set forth herein, it is feasible for modifications to be made on an individual employee basis to provide optimum energy supply for the needs of the individual, but at the same time to optimize the economy of his use of energy and thus the overall use of energy within the building. This is illustrated, for example, by the accommodation to a "flextime" schedule under which individual employees operate at different schedules and where in a series of six adjoining offices there may be six different schedules to be followed based on the individual preferences of those employees who use the offices.

It is particularly significant that although the system may be used with such great flexibility, nevertheless, this can be accomplished by individuals making the changes in the schedules who tailor them to the needs and working preferences of employees on an individual basis and yet there is great reliability in the system because of the numerous features which are described above which contribute to such reliability.

One feature which contributes to the responsiveness of the overall system to individual needs and the needs for specific tasks is the feature as discussed above. The arbitration feature actually permits accelerated communication in a system which can have data signals generated from many sources for transmission over a single communication data link. Such random accessing of the communication link by any of the numerous data sources is in contrast to the prior art schemes which depend on time consuming sequential polling.

A system such as that described can operate entirely by following a schedule, where there are no interrupts or overrides implemented by any parametric condition change or by a user override command. Where the schedule has been constructed to achieve optimum economy then the cost of operation is minimized. However, the criteria for optimum operation of the system is not operation at lowest cost. Rather what is sought and what is made possible by the system as described herein is an optimum use of a facility such as a building in the sense of both lower energy use but also in the sense of increased efficiency in use of the energy consumed to achieve the designated tasks within the structure. The significant gain in operation of this system is in facilitating a highly interactive mode of operation of the system so that individual uses of discrete portion of the structure can control energy usage in their respective position of the structure. Such interactive use is both by changing the overall schedule or condition responsive mode of operation and by overriding schedule or condition responsive operation of a position of a structure. Accordingly while increased energy use and increased energy cost may be incurred by overrides of schedule or condition response the efficiency of use of a part of a facility such as an office, conference room, cafeteria or the like can be accomplished.

Other embodiments and modification of the present invention will be apparent to those of ordinary skill in the art having the benefit of the teaching presented in the foregoing description and drawings. It is therefore, to be understood that this invention is not to be unduly limited and such modifications are intended to be included within the scope of the appended claims.

APPENDIX A

ROM CODE FOR MICROCOMPUTER 100
ASSOCIATED WITH TRANSCEIVER DECODER 56

© General Electric Company, 1979

| ADDRESS | DATA | ADDRESS | DATA |
|---------|------|---------|------|
| 0000 | 1A | 0001 | A5 |
| 0002 | 13 | 0003 | 21 |
| 0004 | 08 | 0005 | 1E |
| 0006 | 64 | 0007 | 6A |
| 0008 | 5D | 0009 | 20 |
| 000A | 80 | 000B | 5D |
| 000C | 70 | 000D | 5D |
| 000E | 80 | 000F | B1 |
| 0010 | B4 | 0011 | B4 |
| 0012 | 6F | 0013 | 5D |
| 0014 | 5D | 0015 | 73 |
| 0016 | 5D | 0017 | 65 |
| 0018 | 68 | 0019 | 70 |
| 001A | 5D | 001B | 5D |
| 001C | 5D | 001D | 5D |
| 001E | 90 | 001F | 49 |
| 0020 | 49 | 0021 | 21 |
| 0022 | 80 | 0023 | 84 |
| 0024 | 07 | 0025 | 31 |
| 0026 | 84 | 0027 | 03 |
| 0028 | 1B | 0029 | 1C |
| 002A | 0C | 002B | 70 |
| 002C | B4 | 002D | B1 |
| 002E | 64 | 002F | 69 |
| 0030 | 3C | 0031 | 84 |
| 0032 | 28 | 0033 | 6C |
| 0034 | 70 | 0035 | EC |
| 0036 | 94 | 0037 | 26 |
| 0038 | 20 | 0039 | FF |
| 003A | B7 | 003B | 20 |
| 003C | EA | 003D | B6 |
| 003E | 1B | 003F | 6B |
| 0040 | 70 | 0041 | EC |
| 0042 | 94 | 0043 | 1D |
| 0044 | 68 | 0045 | 70 |
| 0046 | EC | 0047 | 94 |
| 0048 | 1B | 0049 | 13 |
| 004A | A6 | 004B | 91 |
| 004C | 05 | 004D | 2B |
| 004E | 28 | 004F | 90 |

| ADDRESS | DATA | ADDRESS | DATA |
|---|---|---|---|
| 0050 | FA | 0051 | A6 |
| 0052 | 81 | 0053 | F7 |
| 0054 | A6 | 0055 | 81 |
| 0056 | F4 | 0057 | 29 |
| 0058 | 03 | 0059 | D0 |
| 005A | 29 | 005B | 05 |
| 005C | AE | 005D | 29 |
| 005E | 04 | 005F | 6B |
| 0060 | 29 | 0061 | 00 |
| 0062 | AE | 0063 | 29 |
| 0064 | 06 | 0065 | 8E |
| 0066 | 2B | 0067 | 2B |
| 0068 | 20 | 0069 | 38 |
| 006A | B5 | 006B | 20 |
| 006C | 18 | 006D | B5 |
| 006E | 20 | 006F | 10 |
| 0070 | B5 | 0071 | 2B |
| 0072 | A1 | 0073 | 5D |
| 0074 | 20 | 0075 | 08 |
| 0076 | B5 | 0077 | 2B |
| 0078 | A1 | 0079 | 5D |
| 007A | 20 | 007B | 18 |
| 007C | B5 | 007D | 62 |
| 007E | 68 | 007F | 70 |
| 0080 | 5C | 0081 | 1D |
| 0082 | 94 | 0083 | 0F |
| 0084 | 66 | 0085 | 6A |
| 0086 | 20 | 0087 | FF |
| 0088 | 5D | 0089 | 5D |
| 008A | 6E | 008B | 5D |
| 008C | 5D | 008D | 64 |
| 008E | 6C | 008F | 20 |
| 0090 | C0 | 0091 | 5C |
| 0092 | A5 | 0093 | 1F |
| 0094 | 94 | 0095 | 96 |
| 0096 | 29 | 0097 | 07 |
| 0098 | EA | 0099 | 2B |
| 009A | 2B | 009B | 2B |
| 009C | 2B | 009D | 2B |
| 009E | 2B | 009F | 2B |

71

| ADDRESS | DATA |
|---------|------|
| 00A0 | A6 |
| 00A2 | 08 |
| 00A4 | 81 |
| 00A6 | A6 |
| 00A8 | 02 |
| 00AA | 40 |
| 00AC | 1B |
| 00AE | 70 |
| 00B0 | 91 |
| 00B2 | 12 |
| 00B4 | 0A |
| 00B6 | 84 |
| 00B8 | 29 |
| 00BA | 8C |
| 00BC | 04 |
| 00BE | 29 |
| 00C0 | BB |
| 00C2 | 67 |
| 00C4 | 72 |
| 00C6 | 20 |
| 00C8 | 52 |
| 00CA | 57 |
| 00CC | 58 |
| 00CE | 91 |
| 00D0 | A6 |
| 00D2 | 1D |
| 00D4 | 54 |
| 00D6 | 55 |
| 00D8 | 70 |
| 00DA | A7 |
| 00DC | 20 |
| 00DE | 59 |
| 00E0 | B7 |
| 00E2 | 78 |
| 00E4 | A6 |
| 00E6 | CC |
| 00E8 | 94 |
| 00EA | 35 |
| 00EC | F8 |
| 00EE | 5F |

72

| ADDRESS | DATA |
|---------|------|
| 00A1 | 81 |
| 00A3 | A6 |
| 00A5 | 05 |
| 00A7 | 81 |
| 00A9 | 0C |
| 00AB | B6 |
| 00AD | 1C |
| 00AF | EC |
| 00B1 | 0A |
| 00B3 | 84 |
| 00B5 | 12 |
| 00B7 | 0A |
| 00B9 | 01 |
| 00BB | 29 |
| 00BD | 4C |
| 00BF | 01 |
| 00C1 | 1B |
| 00C3 | 68 |
| 00C5 | 51 |
| 00C7 | 18 |
| 00C9 | 70 |
| 00CB | 78 |
| 00CD | A6 |
| 00CF | 04 |
| 00D1 | 81 |
| 00D3 | 70 |
| 00D5 | 74 |
| 00D7 | 1A |
| 00D9 | B6 |
| 00DB | 56 |
| 00DD | 81 |
| 00DF | 4C |
| 00E1 | 20 |
| 00E3 | 50 |
| 00E5 | 81 |
| 00E7 | 34 |
| 00E9 | FB |
| 00EB | 94 |
| 00ED | 90 |
| 00EF | 29 |

| ADDRESS | DATA | ADDRESS | DATA |
|---|---|---|---|
| 00F0 | 01 | 00F1 | 8C |
| 00F2 | 40 | 00F3 | B6 |
| 00F4 | 28 | 00F5 | 07 |
| 00F6 | 79 | 00F7 | 84 |
| 00F8 | 74 | 00F9 | A7 |
| 00FA | 31 | 00FB | 84 |
| 00FC | 08 | 00FD | 69 |
| 00FE | CC | 00FF | 92 |
| 0100 | 5C | 0101 | 70 |
| 0102 | 90 | 0103 | 07 |
| 0104 | 6A | 0105 | CC |
| 0106 | 82 | 0107 | 55 |
| 0108 | 20 | 0109 | 80 |
| 010A | 51 | 010B | 47 |
| 010C | 12 | 010D | E1 |
| 010E | 57 | 010F | 38 |
| 0110 | 84 | 0111 | 18 |
| 0112 | 67 | 0113 | 68 |
| 0114 | 70 | 0115 | B6 |
| 0116 | 4D | 0117 | B7 |
| 0118 | 54 | 0119 | A6 |
| 011A | 81 | 011B | 41 |
| 011C | 72 | 011D | 51 |
| 011E | 20 | 011F | 7B |
| 0120 | 50 | 0121 | A6 |
| 0122 | 81 | 0123 | CF |
| 0124 | 34 | 0125 | 94 |
| 0126 | FB | 0127 | 90 |
| 0128 | 29 | 0129 | 42 |
| 012A | 0B | 012B | 47 |
| 012C | 5D | 012D | 0A |
| 012E | 25 | 012F | 1D |
| 0130 | 94 | 0131 | 34 |
| 0132 | 64 | 0133 | 6B |
| 0134 | 71 | 0135 | 5C |
| 0136 | 68 | 0137 | 67 |
| 0138 | 4C | 0139 | CC |
| 013A | 82 | 013B | 12 |
| 013C | CC | 013D | 82 |
| 013E | 0F | 013F | CC |

| ADDRESS | DATA | ADDRESS | DATA |
|---|---|---|---|
| 0140 | 82 | 0141 | 0C |
| 0142 | 50 | 0143 | A6 |
| 0144 | 81 | 0145 | 17 |
| 0146 | 28 | 0147 | 07 |
| 0148 | 7E | 0149 | 92 |
| 014A | 04 | 014B | 90 |
| 014C | 6F | 014D | 1E |
| 014E | 29 | 014F | 00 |
| 0150 | 2B | 0151 | 20 |
| 0152 | 1E | 0153 | 50 |
| 0154 | 28 | 0155 | 07 |
| 0156 | 7E | 0157 | 92 |
| 0158 | F6 | 0159 | 29 |
| 015A | 00 | 015B | C1 |
| 015C | 20 | 015D | 1E |
| 015E | 50 | 015F | 28 |
| 0160 | 07 | 0161 | 7E |
| 0162 | 1B | 0163 | 90 |
| 0164 | 28 | 0165 | 52 |
| 0166 | 78 | 0167 | 58 |
| 0168 | 70 | 0169 | 57 |
| 016A | 90 | 016B | A7 |
| 016C | 1A | 016D | 74 |
| 016E | 50 | 016F | A6 |
| 0170 | 91 | 0171 | 1B |
| 0172 | 30 | 0173 | 94 |
| 0174 | FB | 0175 | 70 |
| 0176 | 08 | 0177 | 09 |
| 0178 | 1F | 0179 | 94 |
| 017A | FC | 017B | 20 |
| 017C | 28 | 017D | 50 |
| 017E | 28 | 017F | 07 |
| 0180 | 7E | 0181 | 64 |
| 0182 | 6B | 0183 | 70 |
| 0184 | 5C | 0185 | 6F |
| 0186 | 5C | 0187 | 1B |
| 0188 | 1E | 0189 | 29 |
| 018A | 00 | 018B | 49 |
| 018C | 1A | 018D | 64 |
| 018E | 6B | 018F | 74 |

| ADDRESS | DATA | ADDRESS | DATA |
|---|---|---|---|
| 0190 | 5C | 0191 | 1B |
| 0192 | A7 | 0193 | 25 |
| 0194 | 01 | 0195 | 84 |
| 0196 | B8 | 0197 | 1A |
| 0198 | 67 | 0199 | 68 |
| 019A | 4D | 019B | 57 |
| 019C | A6 | 019D | 81 |
| 019E | 0B | 019F | 37 |
| 01A0 | 94 | 01A1 | FB |
| 01A2 | 72 | 01A3 | 64 |
| 01A4 | 6B | 01A5 | 5C |
| 01A6 | 29 | 01A7 | 00 |
| 01A8 | C1 | 01A9 | A6 |
| 01AA | 91 | 01AB | F1 |
| 01AC | 67 | 01AD | 68 |
| 01AE | 4D | 01AF | 12 |
| 01B0 | 1F | 01B1 | 57 |
| 01B2 | A6 | 01B3 | 91 |
| 01B4 | E4 | 01B5 | 37 |
| 01B6 | 2B | 01B7 | 94 |
| 01B8 | FA | 01B9 | 90 |
| 01BA | C7 | 01BB | 1A |
| 01BC | 63 | 01BD | 6B |
| 01BE | 70 | 01BF | 56 |
| 01C0 | 28 | 01C1 | 07 |
| 01C2 | 92 | 01C3 | 28 |
| 01C4 | 07 | 01C5 | 92 |
| 01C6 | 28 | 01C7 | 07 |
| 01C8 | 92 | 01C9 | 28 |
| 01CA | 07 | 01CB | 92 |
| 01CC | 6C | 01CD | 4C |
| 01CE | E6 | 01CF | 1F |
| 01D0 | 94 | 01D1 | 4D |
| 01D2 | 68 | 01D3 | A5 |
| 01D4 | 21 | 01D5 | 03 |
| 01D6 | 1F | 01D7 | 50 |
| 01D8 | 4D | 01D9 | C0 |
| 01DA | 21 | 01DB | 03 |
| 01DC | 94 | 01DD | 41 |
| 01DE | A4 | 01DF | 18 |

| ADDRESS | DATA |
|---------|------|
| 01E0 | 21 |
| 01E2 | 1E |
| 01E4 | 1F |
| 01E6 | 1D |
| 01E8 | 03 |
| 01EA | FE |
| 01EC | 94 |
| 01EE | 4E |
| 01F0 | 84 |
| 01F2 | 21 |
| 01F4 | 1E |
| 01F6 | 14 |
| 01F8 | 50 |
| 01FA | 12 |
| 01FC | 22 |
| 01FE | E0 |
| 0200 | 94 |
| 0202 | 6A |
| 0204 | 5A |
| 0206 | 5B |
| 0208 | 25 |
| 020A | 92 |
| 020C | 84 |
| 020E | 25 |
| 0210 | 84 |
| 0212 | 30 |
| 0214 | 3D |
| 0216 | 84 |
| 0218 | 29 |
| 021A | 97 |
| 021C | 02 |
| 021E | 64 |
| 0220 | 72 |
| 0222 | 29 |
| 0224 | C1 |
| 0226 | 6B |
| 0228 | 5C |
| 022A | 00 |
| 022C | 28 |
| 022E | C0 |

| ADDRESS | DATA |
|---------|------|
| 01E1 | 90 |
| 01E3 | A0 |
| 01E5 | CC |
| 01E7 | 84 |
| 01E9 | 21 |
| 01EB | 19 |
| 01ED | 31 |
| 01EF | 1D |
| 01F1 | 04 |
| 01F3 | 01 |
| 01F5 | 4C |
| 01F7 | 12 |
| 01F9 | 4C |
| 01FB | 12 |
| 01FD | F8 |
| 01FF | 1F |
| 0201 | 1D |
| 0203 | 4D |
| 0205 | 4D |
| 0207 | 40 |
| 0209 | 04 |
| 020B | 13 |
| 020D | 0E |
| 020F | 00 |
| 0211 | 20 |
| 0213 | 84 |
| 0215 | 30 |
| 0217 | 5C |
| 0219 | 02 |
| 021B | 29 |
| 021D | CD |
| 021F | 6B |
| 0221 | 5C |
| 0223 | 00 |
| 0225 | 64 |
| 0227 | 72 |
| 0229 | 29 |
| 022B | C2 |
| 022D | 06 |
| 022F | 90 |

81

| ADDRESS | DATA |
|---------|------|
| 0230 | EE |
| 0232 | 1D |
| 0234 | 0A |
| 0236 | 20 |
| 0238 | 50 |
| 023A | 80 |
| 023C | 90 |
| 023E | 6E |
| 0240 | AF |
| 0242 | 20 |
| 0244 | 51 |
| 0246 | 5D |
| 0248 | 5D |
| 024A | 6C |
| 024C | F0 |
| 024E | 5C |
| 0250 | DC |
| 0252 | 1D |
| 0254 | 10 |
| 0256 | 4A |
| 0258 | 4B |
| 025A | 64 |
| 025C | 4C |
| 025E | 0C |
| 0260 | 01 |
| 0262 | 90 |
| 0264 | 6C |
| 0266 | 5D |
| 0268 | 5D |
| 026A | 6F |
| 026C | 21 |
| 026E | 22 |
| 0270 | 5C |
| 0272 | B3 |
| 0274 | 6F |
| 0276 | 1D |
| 0278 | 18 |
| 027A | 01 |
| 027C | A2 |
| 027E | 66 |

82

| ADDRESS | DATA |
|---------|------|
| 0231 | 66 |
| 0233 | 94 |
| 0235 | 6A |
| 0237 | 5F |
| 0239 | 20 |
| 023B | 51 |
| 023D | 08 |
| 023F | 20 |
| 0241 | 50 |
| 0243 | 40 |
| 0245 | 4A |
| 0247 | 4B |
| 0249 | 64 |
| 024B | 4C |
| 024D | E1 |
| 024F | 90 |
| 0251 | 66 |
| 0253 | 94 |
| 0255 | 68 |
| 0257 | 5D |
| 0259 | 5D |
| 025B | 6F |
| 025D | 21 |
| 025F | 22 |
| 0261 | 5C |
| 0263 | C2 |
| 0265 | 4A |
| 0267 | 4B |
| 0269 | 64 |
| 026B | 4C |
| 026D | 03 |
| 026F | 04 |
| 0271 | 90 |
| 0273 | 64 |
| 0275 | 4C |
| 0277 | 94 |
| 0279 | 21 |
| 027B | 84 |
| 027D | 68 |
| 027F | 4A |

| ADDRESS | DATA |
|---|---|
| 0280 | EC |
| 0282 | 94 |
| 0284 | 4D |
| 0286 | 4B |
| 0288 | 1F |
| 028A | A2 |
| 028C | 5B |
| 028E | 02 |
| 0290 | 21 |
| 0292 | 84 |
| 0294 | 6C |
| 0296 | E8 |
| 0298 | 66 |
| 029A | 2C |
| 029C | 7C |
| 029E | 72 |
| 02A0 | 4A |
| 02A2 | 52 |
| 02A4 | 5D |
| 02A6 | 64 |
| 02A8 | 4C |
| 02AA | E1 |
| 02AC | 28 |
| 02AE | CA |
| 02B0 | A8 |
| 02B2 | 28 |
| 02B4 | 9F |
| 02B6 | 0A |
| 02B8 | 8C |
| 02BA | A6 |
| 02BC | 07 |
| 02BE | 94 |
| 02C0 | 29 |
| 02C2 | 2C |
| 02C4 | 02 |
| 02C6 | 6C |
| 02C8 | 50 |
| 02CA | 51 |
| 02CC | D4 |
| 02CE | 21 |

| ADDRESS | DATA |
|---|---|
| 0281 | 1F |
| 0283 | A9 |
| 0285 | 5A |
| 0287 | EC |
| 0289 | 94 |
| 028B | 4C |
| 028D | 29 |
| 028F | 31 |
| 0291 | 04 |
| 0293 | 8B |
| 0295 | 90 |
| 0297 | 1D |
| 0299 | 94 |
| 029B | 68 |
| 029D | 50 |
| 029F | 51 |
| 02A1 | 5D |
| 02A3 | 4B |
| 02A5 | 53 |
| 02A7 | 6F |
| 02A9 | F0 |
| 02AB | 5C |
| 02AD | 06 |
| 02AF | 22 |
| 02B1 | 07 |
| 02B3 | 06 |
| 02B5 | 84 |
| 02B7 | 20 |
| 02B9 | 54 |
| 02BB | 91 |
| 02BD | 34 |
| 02BF | FB |
| 02C1 | 02 |
| 02C3 | 29 |
| 02C5 | 25 |
| 02C7 | 73 |
| 02C9 | 78 |
| 02CB | 90 |
| 02CD | 4A |
| 02CF | 0F |

| ADDRESS | DATA | ADDRESS | DATA |
|---|---|---|---|
| 02D0 | 50 | 02D1 | 4A |
| 02D2 | 14 | 02D3 | E0 |
| 02D4 | 25 | 02D5 | 0F |
| 02D6 | 94 | 02D7 | E9 |
| 02D8 | 40 | 02D9 | 13 |
| 02DA | 2A | 02DB | 03 |
| 02DC | 3D | 02DD | 8E |
| 02DE | 0E | 02DF | 0D |
| 02E0 | 4B | 02E1 | 5A |
| 02E2 | 20 | 02E3 | AA |
| 02E4 | 5B | 02E5 | 66 |
| 02E6 | 1D | 02E7 | 94 |
| 02E8 | 0B | 02E9 | 6A |
| 02EA | 20 | 02EB | 5F |
| 02EC | 50 | 02ED | 20 |
| 02EE | 20 | 02EF | 51 |
| 02F0 | 29 | 02F1 | 02 |
| 02F2 | 45 | 02F3 | 6E |
| 02F4 | 20 | 02F5 | AF |
| 02F6 | 50 | 02F7 | 20 |
| 02F8 | 10 | 02F9 | 51 |
| 02FA | 29 | 02FB | 02 |
| 02FC | 45 | 02FD | 4B |
| 02FE | 5A | 02FF | 20 |
| 0300 | 55 | 0301 | 90 |
| 0302 | E2 | 0303 | 64 |
| 0304 | 6F | 0305 | 4C |
| 0306 | 1D | 0307 | 94 |
| 0308 | 0E | 0309 | 21 |
| 030A | 02 | 030B | 84 |
| 030C | 11 | 030D | 68 |
| 030E | 66 | 030F | 4D |
| 0310 | 5A | 0311 | 4D |
| 0312 | 5B | 0313 | 29 |
| 0314 | 02 | 0315 | 31 |
| 0316 | 21 | 0317 | 08 |
| 0318 | 84 | 0319 | 04 |
| 031A | 6C | 031B | 90 |
| 031C | F2 | 031D | 29 |
| 031E | 02 | 031F | 1E |

| ADDRESS | DATA | ADDRESS | DATA |
|---------|------|---------|------|
| 0320 | 28 | 0321 | 06 |
| 0322 | D9 | 0323 | 94 |
| 0324 | 16 | 0325 | 65 |
| 0326 | 1D | 0327 | 94 |
| 0328 | 04 | 0329 | 68 |
| 032A | 90 | 032B | 02 |
| 032C | 6A | 032D | 4D |
| 032E | 52 | 032F | 4D |
| 0330 | 53 | 0331 | 28 |
| 0332 | 06 | 0333 | CA |
| 0334 | 22 | 0335 | A8 |
| 0336 | 07 | 0337 | 28 |
| 0338 | 06 | 0339 | 9F |
| 033A | 29 | 033B | 02 |
| 033C | 2C | 033D | 90 |
| 033E | A2 | 033F | 90 |
| 0340 | BD | 0341 | 90 |
| 0342 | C1 | 0343 | 90 |
| 0344 | F6 | 0345 | 90 |
| 0346 | DA | 0347 | 90 |
| 0348 | 0B | 0349 | 90 |
| 034A | 09 | 034B | 90 |
| 034C | 07 | 034D | 90 |
| 034E | 25 | 034F | 90 |
| 0350 | D5 | 0351 | 90 |
| 0352 | 06 | 0353 | 28 |
| 0354 | 06 | 0355 | D9 |
| 0356 | 94 | 0357 | E3 |
| 0358 | A4 | 0359 | 21 |
| 035A | 90 | 035B | 14 |
| 035C | 53 | 035D | 12 |
| 035E | 12 | 035F | E3 |
| 0360 | 21 | 0361 | 03 |
| 0362 | 64 | 0363 | 6A |
| 0364 | EC | 0365 | 22 |
| 0366 | 60 | 0367 | 52 |
| 0368 | 67 | 0369 | 68 |
| 036A | 4C | 036B | 53 |
| 036C | 28 | 036D | 06 |
| 036E | CA | 036F | 22 |

| ADDRESS | DATA | ADDRESS | DATA |
|---|---|---|---|
| 0370 | E0 | 0371 | 90 |
| 0372 | C4 | 0373 | A5 |
| 0374 | 21 | 0375 | 40 |
| 0376 | 84 | 0377 | E1 |
| 0378 | 70 | 0379 | B1 |
| 037A | B4 | 037B | 18 |
| 037C | 51 | 037D | 4B |
| 037E | B1 | 037F | 28 |
| 0380 | 03 | 0381 | A2 |
| 0382 | 28 | 0383 | 03 |
| 0384 | A2 | 0385 | 50 |
| 0386 | 28 | 0387 | 03 |
| 0388 | A2 | 0389 | C0 |
| 038A | 50 | 038B | 41 |
| 038C | 19 | 038D | 18 |
| 038E | 21 | 038F | 80 |
| 0390 | 51 | 0391 | 40 |
| 0392 | 12 | 0393 | E1 |
| 0394 | 53 | 0395 | 4B |
| 0396 | 22 | 0397 | 90 |
| 0398 | 52 | 0399 | 20 |
| 039A | FF | 039B | B7 |
| 039C | 20 | 039D | EA |
| 039E | 27 | 039F | 06 |
| 03A0 | 90 | 03A1 | CB |
| 03A2 | 70 | 03A3 | B6 |
| 03A4 | 20 | 03A5 | A8 |
| 03A6 | 52 | 03A7 | 20 |
| 03A8 | 38 | 03A9 | B5 |
| 03AA | 20 | 03AB | 81 |
| 03AC | B7 | 03AD | A5 |
| 03AE | 21 | 03AF | 40 |
| 03B0 | 94 | 03B1 | FC |
| 03B2 | 42 | 03B3 | B6 |
| 03B4 | A7 | 03B5 | 12 |
| 03B6 | 94 | 03B7 | FD |
| 03B8 | 20 | 03B9 | 18 |
| 03BA | B5 | 03BB | 20 |
| 03BC | 19 | 03BD | 53 |
| 03BE | 33 | 03BF | 94 |

| 91 | | | 92 | |
|---|---|---|---|---|
| ADDRESS | DATA | | ADDRESS | DATA |
| 03C0 | FE | | 03C1 | 70 |
| 03C2 | B7 | | 03C3 | 42 |
| 03C4 | B6 | | 03C5 | A5 |
| 03C6 | 21 | | 03C7 | 40 |
| 03C8 | 84 | | 03C9 | FC |
| 03CA | A7 | | 03CB | 84 |
| 03CC | 03 | | 03CD | 18 |
| 03CE | 1F | | 03CF | 1C |
| 03D0 | 1A | | 03D1 | 67 |
| 03D2 | 6B | | 03D3 | A7 |
| 03D4 | 56 | | 03D5 | 20 |
| 03D6 | 81 | | 03D7 | 59 |
| 03D8 | A6 | | 03D9 | 91 |
| 03DA | 11 | | 03DB | 73 |
| 03DC | 55 | | 03DD | 70 |
| 03DE | 54 | | 03DF | 34 |
| 03E0 | 94 | | 03E1 | 04 |
| 03E2 | 35 | | 03E3 | 84 |
| 03E4 | 5D | | 03E5 | A6 |
| 03E6 | 81 | | 03E7 | F8 |
| 03E8 | A6 | | 03E9 | 81 |
| 03EA | F5 | | 03EB | 70 |
| 03EC | B6 | | 03ED | 70 |
| 03EE | B7 | | 03EF | 54 |
| 03F0 | 74 | | 03F1 | 55 |
| 03F2 | 71 | | 03F3 | 51 |
| 03F4 | 20 | | 03F5 | 7B |
| 03F6 | 50 | | 03F7 | 34 |
| 03F8 | 94 | | 03F9 | 04 |
| 03FA | 35 | | 03FB | 84 |
| 03FC | 45 | | 03FD | A6 |
| 03FE | 91 | | 03FF | F8 |
| 0400 | 40 | | 0401 | B6 |
| 0402 | 28 | | 0403 | 07 |
| 0404 | 79 | | 0405 | 84 |
| 0406 | 3B | | 0407 | A7 |
| 0408 | 18 | | 0409 | 1F |
| 040A | 5E | | 040B | 8F |
| 040C | CC | | 040D | 68 |
| 040E | 4D | | 040F | 52 |

| ADDRESS | DATA | ADDRESS | DATA |
|---|---|---|---|
| 0410 | 70 | 0411 | 53 |
| 0412 | 28 | 0413 | 07 |
| 0414 | D3 | 0415 | 28 |
| 0416 | 07 | 0417 | D3 |
| 0418 | 28 | 0419 | 07 |
| 041A | D3 | 041B | 28 |
| 041C | 07 | 041D | C3 |
| 041E | 28 | 041F | 07 |
| 0420 | C3 | 0421 | 42 |
| 0422 | 25 | 0423 | 0A |
| 0424 | 92 | 0425 | 05 |
| 0426 | 71 | 0427 | 50 |
| 0428 | 90 | 0429 | 1B |
| 042A | 7A | 042B | 50 |
| 042C | 28 | 042D | 07 |
| 042E | 7E | 042F | 68 |
| 0430 | 42 | 0431 | 5D |
| 0432 | 12 | 0433 | 12 |
| 0434 | 53 | 0435 | 33 |
| 0436 | 43 | 0437 | 18 |
| 0438 | 1F | 0439 | 5D |
| 043A | C2 | 043B | 18 |
| 043C | 1F | 043D | 5D |
| 043E | 29 | 043F | 01 |
| 0440 | 8C | 0441 | 20 |
| 0442 | 96 | 0443 | 50 |
| 0444 | 28 | 0445 | 07 |
| 0446 | 7E | 0447 | 64 |
| 0448 | 6B | 0449 | 20 |
| 044A | 80 | 044B | 5C |
| 044C | 1B | 044D | 70 |
| 044E | 1E | 044F | 1A |
| 0450 | 54 | 0451 | 73 |
| 0452 | 55 | 0453 | 34 |
| 0454 | 94 | 0455 | 04 |
| 0456 | 35 | 0457 | 84 |
| 0458 | 0A | 0459 | A6 |
| 045A | 81 | 045B | F8 |
| 045C | 1B | 045D | A6 |
| 045E | 91 | 045F | FE |

| ADDRESS | DATA | ADDRESS | DATA |
|---|---|---|---|
| 0460 | 90 | 0461 | EB |
| 0462 | 1A | 0463 | 64 |
| 0464 | 6B | 0465 | 70 |
| 0466 | 5C | 0467 | 1B |
| 0468 | 29 | 0469 | 00 |
| 046A | 49 | 046B | 70 |
| 046C | B4 | 046D | 81 |
| 046E | 4C | 046F | 21 |
| 0470 | 0F | 0471 | 84 |
| 0472 | 59 | 0473 | 12 |
| 0474 | 4D | 0475 | 4D |
| 0476 | 50 | 0477 | 4D |
| 0478 | 51 | 0479 | 63 |
| 047A | 6F | 047B | 84 |
| 047C | 09 | 047D | 3E |
| 047E | 91 | 047F | 4C |
| 0480 | 4C | 0481 | 50 |
| 0482 | 29 | 0483 | 05 |
| 0484 | A5 | 0485 | 70 |
| 0486 | EE | 0487 | 84 |
| 0488 | 43 | 0489 | 52 |
| 048A | 21 | 048B | 80 |
| 048C | 94 | 048D | 12 |
| 048E | 4C | 048F | 15 |
| 0490 | 94 | 0491 | 18 |
| 0492 | 32 | 0493 | 4E |
| 0494 | 4C | 0495 | 13 |
| 0496 | 84 | 0497 | 0E |
| 0498 | 25 | 0499 | 10 |
| 049A | 94 | 049B | 0C |
| 049C | 71 | 049D | 90 |
| 049E | 09 | 049F | 6F |
| 04A0 | 18 | 04A1 | FC |
| 04A2 | 52 | 04A3 | 90 |
| 04A4 | 07 | 04A5 | 20 |
| 04A6 | 10 | 04A7 | 5D |
| 04A8 | 7F | 04A9 | 5D |
| 04AA | 42 | 04AB | 5C |
| 04AC | 21 | 04AD | 03 |
| 04AE | 52 | 04AF | 12 |

| ADDRESS | DATA |
|---|---|
| 04B0 | 40 |
| 04B2 | 02 |
| 04B4 | 50 |
| 04B6 | 21 |
| 04B8 | 7F |
| 04BA | 84 |
| 04BC | F0 |
| 04BE | 07 |
| 04C0 | 8E |
| 04C2 | 50 |
| 04C4 | 05 |
| 04C6 | 15 |
| 04C8 | 14 |
| 04CA | F3 |
| 04CC | 6C |
| 04CE | 21 |
| 04D0 | 84 |
| 04D2 | 91 |
| 04D4 | 13 |
| 04D6 | 63 |
| 04D8 | 91 |
| 04DA | 72 |
| 04DC | 65 |
| 04DE | 4D |
| 04E0 | 4D |
| 04E2 | 66 |
| 04E4 | 28 |
| 04E6 | 76 |
| 04E8 | 6A |
| 04EA | 5D |
| 04EC | 5D |
| 04EE | 10 |
| 04F0 | 66 |
| 04F2 | 90 |
| 04F4 | 29 |
| 04F6 | 71 |
| 04F8 | 10 |
| 04FA | 22 |
| 04FC | 5C |
| 04FE | 68 |

| ADDRESS | DATA |
|---|---|
| 04B1 | 94 |
| 04B3 | 41 |
| 04B5 | 42 |
| 04B7 | 01 |
| 04B9 | 1E |
| 04BB | 0B |
| 04BD | 2A |
| 04BF | DA |
| 04C1 | 16 |
| 04C3 | 29 |
| 04C5 | A5 |
| 04C7 | F0 |
| 04C9 | 90 |
| 04CB | 64 |
| 04CD | 4C |
| 04CF | F0 |
| 04D1 | 23 |
| 04D3 | 41 |
| 04D5 | 91 |
| 04D7 | 13 |
| 04D9 | 1E |
| 04DB | 5C |
| 04DD | 6A |
| 04DF | 50 |
| 04E1 | 51 |
| 04E3 | 6E |
| 04E5 | 05 |
| 04E7 | 65 |
| 04E9 | 40 |
| 04EB | 41 |
| 04ED | 20 |
| 04EF | 51 |
| 04F1 | 6E |
| 04F3 | 59 |
| 04F5 | 05 |
| 04F7 | 20 |
| 04F9 | FC |
| 04FB | 02 |
| 04FD | 65 |
| 04FF | 4D |

| ADDRESS | DATA | ADDRESS | DATA |
|---|---|---|---|
| 0500 | 50 | 0501 | 4D |
| 0502 | 51 | 0503 | 66 |
| 0504 | 6A | 0505 | 28 |
| 0506 | 05 | 0507 | 76 |
| 0508 | 65 | 0509 | 68 |
| 050A | 40 | 050B | 5D |
| 050C | 41 | 050D | 5D |
| 050E | 71 | 050F | 51 |
| 0510 | 66 | 0511 | 6A |
| 0512 | 90 | 0513 | 39 |
| 0514 | 20 | 0515 | 50 |
| 0516 | FC | 0517 | 22 |
| 0518 | 01 | 0519 | 5C |
| 051A | 66 | 051B | 6A |
| 051C | 4D | 051D | 50 |
| 051E | 4D | 051F | 51 |
| 0520 | 65 | 0521 | 68 |
| 0522 | 71 | 0523 | 52 |
| 0524 | 40 | 0525 | 5D |
| 0526 | 41 | 0527 | 5D |
| 0528 | 64 | 0529 | 6D |
| 052A | 40 | 052B | 5D |
| 052C | 41 | 052D | 5D |
| 052E | 63 | 052F | 6F |
| 0530 | 20 | 0531 | 8F |
| 0532 | 5E | 0533 | 7F |
| 0534 | 5E | 0535 | 42 |
| 0536 | 5E | 0537 | 90 |
| 0538 | 35 | 0539 | 20 |
| 053A | 20 | 053B | FC |
| 053C | 22 | 053D | 01 |
| 053E | 5C | 053F | 66 |
| 0540 | 6E | 0541 | 4D |
| 0542 | 50 | 0543 | 4D |
| 0544 | 51 | 0545 | 65 |
| 0546 | 6A | 0547 | 20 |
| 0548 | 10 | 0549 | 52 |
| 054A | 90 | 054B | D9 |
| 054C | 4C | 054D | 24 |
| 054E | FC | 054F | 92 |

101

| ADDRESS | DATA |
|---|---|
| 0550 | 0A |
| 0552 | 08 |
| 0554 | 41 |
| 0556 | 51 |
| 0558 | 90 |
| 055A | 73 |
| 055C | 84 |
| 055E | 13 |
| 0560 | 90 |
| 0562 | 5D |
| 0564 | 50 |
| 0566 | 6F |
| 0568 | 5E |
| 056A | 5E |
| 056C | 5E |
| 056E | 29 |
| 0570 | 38 |
| 0572 | 5C |
| 0574 | 00 |
| 0576 | 4D |
| 0578 | 24 |
| 057A | 1E |
| 057C | 08 |
| 057E | 32 |
| 0580 | 08 |
| 0582 | 90 |
| 0584 | 1F |
| 0586 | 90 |
| 0588 | 18 |
| 058A | 1D |
| 058C | 0D |
| 058E | 50 |
| 0590 | 19 |
| 0592 | 12 |
| 0594 | 18 |
| 0596 | 18 |
| 0598 | 1C |
| 059A | 51 |
| 059C | 19 |
| 059E | 06 |

102

| ADDRESS | DATA |
|---|---|
| 0551 | 84 |
| 0553 | 5C |
| 0555 | 13 |
| 0557 | 4C |
| 0559 | F4 |
| 055B | 3C |
| 055D | 05 |
| 055F | 13 |
| 0561 | FA |
| 0563 | FC |
| 0565 | 63 |
| 0567 | 73 |
| 0569 | 40 |
| 056B | 41 |
| 056D | 64 |
| 056F | 00 |
| 0571 | 70 |
| 0573 | 29 |
| 0575 | 38 |
| 0577 | 52 |
| 0579 | F7 |
| 057B | 82 |
| 057D | 71 |
| 057F | 84 |
| 0581 | 13 |
| 0583 | FB |
| 0585 | 52 |
| 0587 | F6 |
| 0589 | 53 |
| 058B | 82 |
| 058D | F0 |
| 058F | 4C |
| 0591 | 91 |
| 0593 | 40 |
| 0595 | F3 |
| 0597 | 50 |
| 0599 | F1 |
| 059B | 4C |
| 059D | 91 |
| 059F | 41 |

| ADDRESS | DATA | | ADDRESS | DATA |
|---------|------|---|---------|------|
| 05A0 | 18 | | 05A1 | F3 |
| 05A2 | 18 | | 05A3 | 51 |
| 05A4 | 1C | | 05A5 | 40 |
| 05A6 | 63 | | 05A7 | 6E |
| 05A8 | FE | | 05A9 | B1 |
| 05AA | 4C | | 05AB | B4 |
| 05AC | 90 | | 05AD | C0 |
| 05AE | 73 | | 05AF | 5C |
| 05B0 | 70 | | 05B1 | 52 |
| 05B2 | 53 | | 05B3 | 5A |
| 05B4 | 20 | | 05B5 | 10 |
| 05B6 | B5 | | 05B7 | A1 |
| 05B8 | 50 | | 05B9 | 78 |
| 05BA | B5 | | 05BB | A5 |
| 05BC | 21 | | 05BD | 10 |
| 05BE | 1E | | 05BF | A1 |
| 05C0 | 51 | | 05C1 | 20 |
| 05C2 | 18 | | 05C3 | B5 |
| 05C4 | 65 | | 05C5 | 6C |
| 05C6 | 40 | | 05C7 | 18 |
| 05C8 | EC | | 05C9 | 25 |
| 05CA | FF | | 05CB | 84 |
| 05CC | 6D | | 05CD | 07 |
| 05CE | 28 | | 05CF | 06 |
| 05D0 | 75 | | 05D1 | 42 |
| 05D2 | 5A | | 05D3 | 43 |
| 05D4 | 5B | | 05D5 | 20 |
| 05D6 | 10 | | 05D7 | B5 |
| 05D8 | 28 | | 05D9 | 06 |
| 05DA | 7B | | 05DB | 84 |
| 05DC | 5D | | 05DD | 28 |
| 05DE | 06 | | 05DF | 7B |
| 05E0 | 84 | | 05E1 | 58 |
| 05E2 | 4A | | 05E3 | F6 |
| 05E4 | 56 | | 05E5 | 4A |
| 05E6 | 18 | | 05E7 | F0 |
| 05E8 | E6 | | 05E9 | 50 |
| 05EA | 1D | | 05EB | 94 |
| 05EC | 2E | | 05ED | 4A |
| 05EE | FB | | 05EF | 54 |

105
| ADDRESS | DATA |
|---|---|
| 05F0 | 6D |
| 05F2 | 18 |
| 05F4 | 25 |
| 05F6 | 84 |
| 05F8 | 07 |
| 05FA | 06 |
| 05FC | 42 |
| 05FE | 43 |
| 0600 | 78 |
| 0602 | 28 |
| 0604 | 7B |
| 0606 | 5E |
| 0608 | 06 |
| 060A | 84 |
| 060C | 4A |
| 060E | 56 |
| 0610 | 18 |
| 0612 | E6 |
| 0614 | 4A |
| 0616 | E4 |
| 0618 | F4 |
| 061A | 6C |
| 061C | 5D |
| 061E | 5D |
| 0620 | FA |
| 0622 | 3B |
| 0624 | 68 |
| 0626 | EC |
| 0628 | 5C |
| 062A | 6A |
| 062C | 0F |
| 062E | 18 |
| 0630 | EA |
| 0632 | 4A |
| 0634 | FC |
| 0636 | 5E |
| 0638 | 07 |
| 063A | 31 |
| 063C | 5D |
| 063E | 5D |

106
| ADDRESS | DATA |
|---|---|
| 05F1 | 41 |
| 05F3 | EC |
| 05F5 | FF |
| 05F7 | 6D |
| 05F9 | 28 |
| 05FB | 75 |
| 05FD | 5A |
| 05FF | 5B |
| 0601 | 85 |
| 0603 | 06 |
| 0605 | 84 |
| 0607 | 28 |
| 0609 | 7B |
| 060B | 59 |
| 060D | F6 |
| 060F | 4A |
| 0611 | F1 |
| 0613 | 51 |
| 0615 | FB |
| 0617 | 5A |
| 0619 | 5B |
| 061B | 40 |
| 061D | 41 |
| 061F | 4A |
| 0621 | 84 |
| 0623 | 64 |
| 0625 | 70 |
| 0627 | 71 |
| 0629 | 62 |
| 062B | 84 |
| 062D | 4A |
| 062F | FC |
| 0631 | 5D |
| 0633 | 18 |
| 0635 | EB |
| 0637 | 90 |
| 0639 | 90 |
| 063B | 4A |
| 063D | 4B |
| 063F | 68 |

| ADDRESS | DATA | ADDRESS | DATA |
|---|---|---|---|
| 0640 | A0 | 0641 | 07 |
| 0642 | 28 | 0643 | 06 |
| 0644 | D1 | 0645 | 22 |
| 0646 | C4 | 0647 | 5D |
| 0648 | 41 | 0649 | 5D |
| 064A | 6B | 064B | 70 |
| 064C | 56 | 064D | 28 |
| 064E | 07 | 064F | 92 |
| 0650 | 28 | 0651 | 07 |
| 0652 | 92 | 0653 | 28 |
| 0654 | 07 | 0655 | 92 |
| 0656 | 28 | 0657 | 07 |
| 0658 | 92 | 0659 | 46 |
| 065A | 6C | 065B | 18 |
| 065C | 5C | 065D | 64 |
| 065E | 20 | 065F | 18 |
| 0660 | B5 | 0661 | 29 |
| 0662 | 00 | 0663 | 33 |
| 0664 | 44 | 0665 | 5A |
| 0666 | 5B | 0667 | 4C |
| 0668 | 51 | 0669 | 90 |
| 066A | B0 | 066B | 1D |
| 066C | 94 | 066D | F0 |
| 066E | 4C | 066F | 50 |
| 0670 | 70 | 0671 | 5A |
| 0672 | 29 | 0673 | 05 |
| 0674 | ED | 0675 | 03 |
| 0676 | 18 | 0677 | 52 |
| 0678 | FC | 0679 | 53 |
| 067A | 1C | 067B | 08 |
| 067C | A1 | 067D | 56 |
| 067E | 18 | 067F | EC |
| 0680 | 07 | 0681 | 28 |
| 0682 | 06 | 0683 | 75 |
| 0684 | 42 | 0685 | FA |
| 0686 | 84 | 0687 | 06 |
| 0688 | 5A | 0689 | FB |
| 068A | 5B | 068B | 22 |
| 068C | 01 | 068D | 0C |
| 068E | 1A | 068F | 72 |

| ADDRESS | DATA | ADDRESS | DATA |
|---|---|---|---|
| 0690 | 56 | 0691 | 28 |
| 0692 | 06 | 0693 | F4 |
| 0694 | 84 | 0695 | 04 |
| 0696 | 29 | 0697 | 00 |
| 0698 | 49 | 0699 | 1B |
| 069A | 2B | 069B | 2B |
| 069C | 29 | 069D | 03 |
| 069E | D0 | 069F | 08 |
| 06A0 | 62 | 06A1 | 68 |
| 06A2 | 03 | 06A3 | 5D |
| 06A4 | 41 | 06A5 | 5D |
| 06A6 | 42 | 06A7 | 5D |
| 06A8 | 43 | 06A9 | 5C |
| 06AA | 70 | 06AB | 56 |
| 06AC | 28 | 06AD | 07 |
| 06AE | 92 | 06AF | 28 |
| 06B0 | 07 | 06B1 | 92 |
| 06B2 | 28 | 06B3 | 07 |
| 06B4 | 92 | 06B5 | 28 |
| 06B6 | 07 | 06B7 | 92 |
| 06B8 | 46 | 06B9 | 18 |
| 06BA | 6C | 06BB | 5C |
| 06BC | 09 | 06BD | 29 |
| 06BE | 06 | 06BF | DF |
| 06C0 | 64 | 06C1 | 6F |
| 06C2 | 1D | 06C3 | 73 |
| 06C4 | 94 | 06C5 | 02 |
| 06C6 | 7C | 06C7 | FC |
| 06C8 | 5C | 06C9 | 1C |
| 06CA | A0 | 06CB | 1D |
| 06CC | 84 | 06CD | 05 |
| 06CE | 21 | 06CF | FE |
| 06D0 | 07 | 06D1 | 03 |
| 06D2 | 18 | 06D3 | 51 |
| 06D4 | A5 | 06D5 | 18 |
| 06D6 | 21 | 06D7 | 03 |
| 06D8 | 1C | 06D9 | 64 |
| 06DA | 68 | 06DB | 70 |
| 06DC | EC | 06DD | 84 |
| 06DE | 15 | 06DF | 71 |

111

| ADDRESS | DATA |
|---|---|
| 06E0 | 56 |
| 06E2 | 54 |
| 06E4 | 55 |
| 06E6 | 94 |
| 06E8 | 35 |
| 06EA | 07 |
| 06EC | 91 |
| 06EE | 29 |
| 06F0 | F4 |
| 06F2 | 00 |
| 06F4 | A6 |
| 06F6 | 24 |
| 06F8 | 91 |
| 06FA | 20 |
| 06FC | B5 |
| 06FE | 8C |
| 0700 | 77 |
| 0702 | 35 |
| 0704 | 05 |
| 0706 | 2B |
| 0708 | FA |
| 070A | 54 |
| 070C | 20 |
| 070E | B5 |
| 0710 | A6 |
| 0712 | 84 |
| 0714 | A6 |
| 0716 | FB |
| 0718 | 81 |
| 071A | 90 |
| 071C | 20 |
| 071E | B5 |
| 0720 | 94 |
| 0722 | 20 |
| 0724 | 55 |
| 0726 | 68 |
| 0728 | 57 |
| 072A | 58 |
| 072C | 84 |
| 072E | A6 |

112

| ADDRESS | DATA |
|---|---|
| 06E1 | 70 |
| 06E3 | 77 |
| 06E5 | 34 |
| 06E7 | 04 |
| 06E9 | 91 |
| 06EB | A6 |
| 06ED | F8 |
| 06EF | 06 |
| 06F1 | 21 |
| 06F3 | 1C |
| 06F5 | 91 |
| 06F7 | A6 |
| 06F9 | 21 |
| 06FB | 98 |
| 06FD | 20 |
| 06FF | 55 |
| 0701 | 58 |
| 0703 | 84 |
| 0705 | A6 |
| 0707 | 90 |
| 0709 | 7C |
| 070B | 55 |
| 070D | 18 |
| 070F | A6 |
| 0711 | 34 |
| 0713 | 09 |
| 0715 | 81 |
| 0717 | A6 |
| 0719 | F8 |
| 071B | 5B |
| 071D | 98 |
| 071F | 38 |
| 0721 | E1 |
| 0723 | 46 |
| 0725 | 62 |
| 0727 | 4D |
| 0729 | 78 |
| 072B | 35 |
| 072D | 04 |
| 072F | 90 |

113

| ADDRESS | DATA |
|---|---|
| 0730 | FB |
| 0732 | 21 |
| 0734 | 84 |
| 0736 | 20 |
| 0738 | 54 |
| 073A | 90 |
| 073C | 77 |
| 073E | 20 |
| 0740 | 55 |
| 0742 | 18 |
| 0744 | A6 |
| 0746 | 34 |
| 0748 | 09 |
| 074A | 81 |
| 074C | A6 |
| 074E | F8 |
| 0750 | 26 |
| 0752 | 98 |
| 0754 | 38 |
| 0756 | 06 |
| 0758 | 12 |
| 075A | 90 |
| 075C | 0A |
| 075E | 15 |
| 0760 | C7 |
| 0762 | 94 |
| 0764 | 20 |
| 0766 | 55 |
| 0768 | 84 |
| 076A | A6 |
| 076C | FB |
| 076E | 18 |
| 0770 | 64 |
| 0772 | 70 |
| 0774 | 18 |
| 0776 | 21 |
| 0778 | 1C |
| 077A | 1B |
| 077C | 90 |
| 077E | 1D |

114

| ADDRESS | DATA |
|---|---|
| 0731 | 47 |
| 0733 | 01 |
| 0735 | 07 |
| 0737 | 11 |
| 0739 | 77 |
| 073B | 05 |
| 073D | 54 |
| 073F | 11 |
| 0741 | 20 |
| 0743 | B5 |
| 0745 | A6 |
| 0747 | 84 |
| 0749 | A6 |
| 074B | FB |
| 074D | 81 |
| 074F | 90 |
| 0751 | 20 |
| 0753 | B5 |
| 0755 | 84 |
| 0757 | 47 |
| 0759 | 57 |
| 075B | D0 |
| 075D | 25 |
| 075F | 94 |
| 0761 | 36 |
| 0763 | BF |
| 0765 | 46 |
| 0767 | 35 |
| 0769 | 04 |
| 076B | 90 |
| 076D | 20 |
| 076F | B5 |
| 0771 | 68 |
| 0773 | 5C |
| 0775 | 1C |
| 0777 | 00 |
| 0779 | 03 |
| 077B | 2B |
| 077D | FE |
| 077F | 1E |

115

| ADDRESS | DATA |
|---|---|
| 0780 | 40 |
| 0782 | 1F |
| 0784 | 92 |
| 0786 | 84 |
| 0788 | B7 |
| 078A | EA |
| 078C | 1C |
| 078E | B7 |
| 0790 | 90 |
| 0792 | 46 |
| 0794 | 56 |
| 0796 | 55 |
| 0798 | 51 |
| 079A | 50 |
| 079C | 18 |
| 079E | 02 |
| 07A0 | 31 |
| 07A2 | 04 |
| 07A4 | 90 |
| 07A6 | 71 |
| 07A8 | 46 |
| 07AA | 02 |
| 07AC | 56 |
| 07AE | 84 |
| 07B0 | 13 |
| 07B2 | 74 |
| 07B4 | 70 |
| 07B6 | 4E |
| 07B8 | 90 |
| 07BA | 1C |
| 07BC | C2 |
| 07BE | 4D |
| 07C0 | C3 |
| 07C2 | 1C |
| 07C4 | 21 |
| 07C6 | 1E |
| 07C8 | 12 |
| 07CA | 42 |
| 07CC | 1D |
| 07CE | 03 |

116

| ADDRESS | DATA |
|---|---|
| 0781 | 18 |
| 0783 | C6 |
| 0785 | 0S |
| 0787 | 06 |
| 0789 | 20 |
| 078B | B6 |
| 078D | 71 |
| 078F | E6 |
| 0791 | F8 |
| 0793 | 13 |
| 0795 | 72 |
| 0797 | 74 |
| 0799 | 70 |
| 079B | 4C |
| 079D | 91 |
| 079F | 30 |
| 07A1 | 84 |
| 07A3 | 13 |
| 07A5 | F8 |
| 07A7 | F0 |
| 07A9 | 94 |
| 07AB | 1F |
| 07AD | 35 |
| 07AF | 0B |
| 07B1 | 56 |
| 07B3 | 51 |
| 07B5 | 50 |
| 07B7 | 15 |
| 07B9 | E4 |
| 07BB | 4D |
| 07BD | 52 |
| 07BF | 19 |
| 07C1 | 53 |
| 07C3 | 43 |
| 07C5 | 01 |
| 07C7 | 43 |
| 07C9 | 53 |
| 07CB | 12 |
| 07CD | 84 |
| 07CF | 22 |

| ADDRESS | DATA | | ADDRESS | DATA |
|---------|------|---|---------|------|
| 07D0 | 80 | | 07D1 | 52 |
| 07D2 | 1C | | 07D3 | 42 |
| 07D4 | CD | | 07D5 | 52 |
| 07D6 | 43 | | 07D7 | 19 |
| 07D8 | 53 | | 07D9 | 1C |
| 07DA | AA | | 07DB | A9 |
| 07DC | A6 | | 07DD | A5 |
| 07DE | 9A | | 07DF | 99 |
| 07E0 | 96 | | 07E1 | 95 |
| 07E2 | 6A | | 07E3 | 69 |
| 07E4 | 66 | | 07E5 | 65 |
| 07E6 | 5A | | 07E7 | 59 |
| 07E8 | 56 | | 07E9 | 55 |
| 07EA | 2A | | 07EB | 00 |
| 07EC | 00 | | 07ED | 11 |
| 07EE | 4A | | 07EF | B1 |
| 07F0 | 4B | | 07F1 | B0 |
| 07F2 | 16 | | 07F3 | B4 |
| 07F4 | A6 | | 07F5 | 81 |
| 07F6 | FE | | 07F7 | 90 |
| 07F8 | F5 | | 07F9 | 2B |
| 07FA | 2B | | 07FB | 2B |
| 07FC | 2B | | 07FD | 2B |
| 07FE | 2B | | 07FF | 2B |

APPENDIX B

MACHINE CODE FOR MICROPROCESSOR 400 ASSOCIATED WITH CONTROLLER 50

ALL VALUES IN HEXADECIMAL FORMAT

© General Electric Company, 1979

```
0000H=F3H 31H FFH BFH 21H FAH BFH 0EH 14H 7EH 0DH C2H 09H 00H CDH 39H
0010H=11H 0EH C8H CDH 81H 08H CDH 39H 11H 3EH 06H 32H 52H BEH CDH 27H
0020H=10H C3H 3FH 00H C3H 72H 02H 00H 00H 00H 00H 00H C3H 6EH 13H 00H
0030H=00H 00H 00H 00H C3H 9AH 13H 00H C3H 00H 00H 20H C3H C3H 13H DAH
0040H=5AH 00H 2AH 82H B2H 22H A5H BEH 3AH 81H B2H 32H A4H BEH CDH 7FH
0050H=01H CDH EAH 32H CDH 44H 33H C3H D1H 00H F3H 31H FFH BFH CDH 39H
0060H=11H CDH 11H 11H 3EH FFH 32H 90H BEH CDH 7FH 01H 3AH 43H BEH E6H
0070H=01H C2H 91H 00H CDH 13H 02H DBH 18H E6H 20H CAH 84H 00H CDH 94H
0080H=1FH C3H 77H 00H CDH A6H 11H 3AH 43H BEH 2FH 32H 43H BEH C3H 6CH
0090H=00H CDH 88H 07H D2H A9H 00H AFH 32H 4CH BEH CDH C9H 19H 21H 41H
00A0H=38H 0EH 00H CDH D3H 19H C3H 77H 00H 3AH 4CH BEH B7H CAH B9H 00H
00B0H=CDH C9H 19H 21H 38H 38H C3H A1H 00H CDH C9H 19H AFH 32H 4EH BEH
00C0H=CDH 0CH 0AH F5H CDH A4H 19H F1H D2H CEH 00H C3H B0H 00H CDH 3CH
00D0H=01H 31H FFH BFH 3AH 49H BEH E6H 04H C2H 39H 01H CDH 26H 01H CDH
00E0H=A1H 18H CDH 26H 01H 3AH 81H B2H B7H CAH 02H 01H CDH 9CH 16H DAH
00F0H=F8H 00H CDH 26H 01H CDH 36H 15H CDH 26H 01H 3AH 4DH BEH B7H C2H
0100H=1AH 01H CDH A4H 12H CDH 26H 01H CDH 94H 17H CDH 26H 01H CDH 03H
0110H=19H CDH 26H 01H CDH 2CH 19H C3H D1H 00H CDH 87H 15H CDH 26H 01H
0120H=CDH A4H 12H C3H D1H 00H CDH AFH 02H CDH 41H 01H CDH AFH 02H FBH
0130H=3AH 48H BEH B7H C8H D1H C3H D1H 00H C3H 5AH 00H 3AH 4EH BEH B7H
0140H=C0H FBH CDH 11H 14H CDH B0H 01H CDH 9FH 1FH CDH 94H 1FH C9H CDH
0150H=39H 11H CDH 13H 1EH CDH 7FH 01H CDH F6H 16H CDH 44H 33H CDH 7EH
0160H=0FH AFH 32H 49H BEH 32H A4H BEH 32H 4AH BEH 21H 5BH BAH 11H 1FH
0170H=BBH 0EH 00H CDH 53H 0EH CDH 36H 1AH CDH C4H 19H C3H D1H 00H AFH
0180H=32H 50H BEH 32H 4EH BEH 32H 4DH BEH 32H 4BH BEH 32H 43H BEH 32H
0190H=47H BEH 3EH 05H 32H 52H BEH 3EH 0AH 32H 51H BEH 3EH 05H 32H 48H
01A0H=BEH CDH 62H 0CH CDH 9FH 1FH 3EH 3CH 32H 45H BEH 32H 44H BEH C9H
01B0H=DBH 18H E6H 20H C0H CDH A6H 11H CDH 61H 12H 3AH 45H BEH 3DH 32H
01C0H=45H BEH CCH C9H 01H CDH E2H 01H C9H 3EH 3CH 32H 45H BEH 32H 44H
01D0H=BEH CDH 69H 0CH CDH EAH 32H 3AH 82H B2H FEH 23H C0H 32H 42H
01E0H=BEH C9H 3AH 49H BEH B7H CAH 1FH 02H 4FH 3AH 43H BEH EEH 80H 32H
01F0H=43H BEH FAH 1FH 02H 79H 32H 44H BEH E6H 03H C2H 07H 02H 3EH 99H
0200H=32H 57H BEH CDH CFH 1EH C9H CDH C4H 19H 21H 5EH 38H 0EH 00H CDH
0210H=D3H 19H C9H CDH C4H 19H 21H 81H 38H 0EH 00H CDH D3H 19H C9H CDH
0220H=46H 02H CDH 88H 07H DAH 3DH 02H 3AH 4CH BEH B7H 16H FFH CAH 33H
0230H=02H 16H 68H 0EH 02H CDH 5CH 1BH 4AH CDH E2H 19H C9H AFH 32H 4CH
0240H=BEH 16H 78H C3H 33H 02H 3AH 44H BEH B7H C8H CDH C9H 19H CDH 8BH
0250H=1AH AFH 32H 44H BEH 3AH 81H B2H B7H CAH 68H 02H 0EH 00H CDH 5EH
0260H=1AH 2AH 82H B2H CDH F6H 0BH C9H 0EH 04H 06H 04H 1EH 7AH CDH 52H
0270H=1AH C9H F3H CDH 39H 11H 21H 88H 38H 0EH 00H CDH D3H 19H 21H 00H
0280H=00H 2BH 7DH B4H CAH 00H 00H 20H E6H 80H C2H 81H 02H C3H 00H 00H
0290H=DBH 18H E6H 80H C2H A7H 02H 06H 7CH DBH 18H E6H 80H C2H A7H 02H
02A0H=05H CAH A7H 02H C3H 99H 02H 3EH 02H 32H 48H BEH C3H DBH 05H 3AH
02B0H=48H BEH B7H CAH 47H 03H FEH 04H CAH 06H 03H FEH 03H CAH CDH 02H
02C0H=FEH 01H CAH CDH 02H 3EH 00H 32H 05H BFH C3H CDH 02H 3AH 05H BFH
02D0H=4FH 06H 00H DBH 18H E6H 80H CAH E8H 02H 05H CAH EFH 02H DBH 18H
02E0H=E6H 80H CAH E8H 02H C3H D3H 02H CDH 3DH 05H DAH F6H 02H C9H 3EH
02F0H=04H 32H 48H BEH 37H C9H AFH 32H 48H BEH 3AH 49H BEH E6H FEH 32H
0300H=49H BEH CDH 36H 1AH C9H CDH C4H 05H 06H 00H DBH 18H E6H 80H CAH
0310H=39H 03H 05H C2H 0BH 03H CDH 3CH 1AH 3EH 07H D3H 48H 0EH 14H CDH
0320H=81H 08H CDH C4H 05H 0EH 01H CDH 81H 08H CDH 52H 05H CAH 39H 03H
0330H=3AH 49H BEH F6H 01H 32H 49H BEH C9H 3AH 49H BEH E6H FEH 32H 49H
0340H=BEH 3EH 05H 32H 48H BEH C9H CDH 52H 05H C2H 4EH 03H C9H F3H CDH
0350H=3CH 1AH 21H E3H BEH CDH 97H 04H DAH 49H 04H FBH 00H F3H 23H CDH
0360H=D2H 04H DAH D5H 03H 3EH 02H 06H 01H 32H D7H BEH 78H 32H 48H BEH
0370H=FBH 21H E6H BEH CDH 5AH 04H 3AH E7H BEH 91H 32H DAH BEH C2H 8AH
0380H=03H 21H E3H BEH CDH 24H 04H D2H A6H 03H 3AH D7H BEH 3DH 37H C0H
0390H=21H EBH BEH CDH 5AH 04H 3AH ECH BEH 91H 32H DAH BEH 37H C0H 21H
03A0H=EBH BEH CDH 24H 04H D8H 3AH DBH BEH FEH 06H 37H C0H CDH 5EH 23H B7H
03B0H=3EH 01H 32H DEH BEH EBH 22H DCH BEH 11H F5H BEH AFH 12H 7DH B7H
03C0H=CAH F7H 03H 1FH 6FH DAH E2H 03H 7CH 1FH 67H 3AH DEH BEH 3CH 32H
03D0H=DEH BEH C3H BEH 03H D6H 02H 47H 3EH 01H CAH 69H 03H 06H 03H C3H
03E0H=69H 03H 7CH 1FH 67H 3AH DEH BEH DAH F2H 03H F6H 40H 13H 12H C3H
03F0H=CBH 03H F6H C0H C3H EDH 03H 2AH D8H BEH 22H 59H BEH 1AH B7H C8H
0400H=4FH E6H 0FH 32H 5BH BEH 79H E6H C0H 07H 32H 93H BEH D5H CDH 9EH
```

```
0410H=31H DAH 1FH 04H 3EH 01H 32H 4FH BEH CDH 9AH F5H 00H 00H 00H 01H
0420H=18H C3H FDH 03H 7EH CDH AFH 0DH 1FH 4FH 7EH 1FH 1FH 2FH A9H E6H
0430H=07H C2H 47H 04H 79H E6H 07H 32H DBH BEH 7EH E6H 03H 32H D9H BEH
0440H=23H 7EH 32H D8H BEH 23H C9H 37H C9H FEH 02H CAH F6H 02H FEH 03H
0450H=CAH EFH 02H 3EH 05H 32H 48H BEH 37H C9H 0EH 00H 06H 04H 7EH E6H
0460H=F0H EAH 65H 04H 37H 79H 17H 4FH 7EH E6H 0FH EAH 6FH 04H 37H 79H
0470H=17H 4FH 05H C8H 2BH C3H 5EH 04H 3AH 05H BFH 4FH 3AH 02H BFH 47H
0480H=DBH 18H E6H 80H CAH 90H 04H 05H C8H DBH 18H E6H 80H C2H 80H 04H
0490H=CDH 3DH 05H D2H 78H 04H C9H CDH 52H 05H CAH 11H 05H AFH 57H 4FH
04A0H=06H 00H CDH 28H 05H DAH 1CH 05H 57H 1EH 03H 0EH 00H 06H 00H CDH
04B0H=28H 05H DAH 1CH 05H 82H 1FH 57H 1DH C2H ABH 04H 32H 01H BFH 87H
04C0H=32H 04H BFH 32H 02H BFH 5FH 87H 83H 32H 03H BFH 4FH AFH 91H 32H
04D0H=05H BFH CDH 78H 04H 3EH 02H D8H 22H FFH BEH 3AH 01H BFH 57H E5H
04E0H=26H 05H 2EH 80H 06H 00H C3H EDH 04H 3AH 02H BFH 47H 3AH 05H BFH
04F0H=4FH CDH 28H 05H DAH 1DH 05H 3AH 03H BFH 81H 92H 3FH 7DH 1FH 6FH
0500H=D2H E9H 04H E3H 77H 23H E3H 25H 2EH 80H C2H E9H 04H E1H 2BH B7H
0510H=C9H 0EH 00H CDH 3DH 05H D2H 9DH 04H C9H 00H 00H C9H E1H 2AH FFH
0520H=BEH FEH 02H 37H C8H C3H DBH 04H DBH 18H E6H 80H CAH 3DH 05H 05H
0530H=CAH 4EH 05H DBH 18H E6H 80H CAH 3DH 05H C3H 28H 05H 0CH CAH 4AH
0540H=05H DBH 18H E6H 80H CAH 3DH 05H 79H C9H 3EH 02H 37H C9H 3EH 03H
0550H=37H C9H DBH 18H E6H 80H C9H 01H DCH 05H CDH 52H 05H CAH 69H 05H
0560H=0BH 78H 81H C2H 5AH 05H C3H EFH 02H 01H C8H 00H CDH C9H 05H B7H
0570H=C9H CDH 90H 02H 16H 07H 01H D2H 01H CDH C9H 05H 0EH 27H 41H CDH
0580H=D4H 05H CDH E5H 05H 15H C2H 7CH 05H 01H C8H 00H 21H EFH BEH 1EH
0590H=05H CDH C9H 05H 16H 08H 7EH 0FH 77H DAH A3H 05H 06H 17H 0EH 19H
05A0H=C3H A7H 05H 06H 37H 0EH 19H CDH D4H 05H CDH E5H 05H 15H C2H 96H
05B0H=05H 1DH C8H 23H C3H 94H 05H AFH 32H 48H BEH CDH 36H 1AH 01H D2H
05C0H=01H CDH C9H 05H 3EH 03H D3H 48H C9H 3EH 01H D3H 48H 0BH 79H B0H
05D0H=C2H CDH 05H C9H 3EH 07H D3H 48H CDH E0H 05H 3EH 01H D3H 48H C9H
05E0H=05H C8H C3H E0H 05H 0DH C8H C3H E5H 05H AFH 32H 6FH BEH AFH 32H
05F0H=D6H BEH 3AH 48H BEH B7H CAH 1EH 06H FEH 02H CAH B2H 06H FEH 03H
0600H=CAH 11H 06H FEH 01H CAH 11H 06H FEH 05H 37H C0H 3EH 00H 32H 05H
0610H=BFH CDH CDH 02H D8H 3AH D6H BEH 3DH C2H EFH 05H 37H C9H CDH 90H
0620H=02H CDH 3CH 1AH CDH 3CH 01H F3H 3AH 6FH BEH B7H C2H 82H 06H CDH
0630H=79H 06H FAH 8CH 06H CAH 96H 06H 70H CDH DEH 06H CDH BEH 05H
0640H=CDH F2H 06H 3EH 05H 32H 48H BEH D8H 3AH DBH BEH FEH 05H C2H 74H
0650H=06H 5EH 23H 56H 2AH 63H BEH CDH 56H 0DH C2H 74H 06H CDH 57H 05H
0660H=DAH 74H 06H 21H F1H BEH 36H D2H 23H 36H 00H CDH 87H 06H CDH B7H
0670H=05H FBH B7H C9H CDH C4H 05H 37H C9H DBH 08H 17H 17H 17H E6H 03H
0680H=3DH C9H 06H 8CH C3H DEH 06H 06H 8CH C3H E8H 06H 06H 1CH C3H DEH
0690H=06H 06H 1CH C3H EBH 06H 06H 38H CDH DEH 06H 21H F1H BEH 7EH 2FH
06A0H=77H 23H 7EH 2FH 77H C3H 2BH 39H E8H 06H 06H 38H CDH E8H 06H C3H
06B0H=9BH 06H F3H 3AH 6FH BEH B7H C2H B7H 06H CDH 79H 06H FAH 91H 06H
06C0H=CAH AAH 06H 00H 00H 00H C9H 2AH 59H BEH 7DH 32H F0H BEH 7CH B0H
06D0H=32H EFH BEH 21H F2H BEH CDH 5AH 04H 21H F3H BEH 71H C9H CDH C7H
06E0H=06H F3H CDH 74H 05H FBH B7H C9H CDH C7H 06H F3H CDH 89H 05H C3H
06F0H=E5H 06H 0EH 00H CDH 3DH 05H D8H F3H 21H E3H BEH CDH 97H 04H D8H
0700H=21H E6H BEH CDH 5AH 04H 3AH E7H BEH 91H 37H C0H 21H E3H BEH CDH
0710H=24H 04H D8H E5H 2AH D8H BEH EBH 3AH 59H BEH CDH D6H 0DH E1H C8H
0720H=37H C9H 3EH 01H 32H 6FH BEH C3H EEH 05H CDH 22H 07H DAH 3CH 07H
0730H=CDH BEH 05H CDH F2H 06H 3EH 05H 32H 48H BEH C9H CDH 36H 07H C3H
0740H=74H 06H 3EH 03H D3H 48H 3EH BCH D3H 19H C2H CDH 88H 07H D8H 3EH
0750H=03H D3H 48H 3EH BAH D3H 19H 0EH 96H CDH 81H 08H 3EH 02H D3H 48H
0760H=0EH 96H CDH 81H 08H CDH 75H 08H DBH 4CH E6H 02H C2H 79H 07H CDH
0770H=88H 07H D2H 65H 07H CDH 42H 07H C9H 0EH 48H CDH 81H 08H DBH 4CH
0780H=E6H 02H C2H 75H 07H CDH 68H 07H DBH 4CH E6H 04H C8H C3H 37H C9H 3EH
0790H=03H D3H 48H 0EH 96H CDH 81H 08H 3EH 02H D3H 48H 0EH 96H CDH 81H
07A0H=08H DBH 4CH E6H 02H C2H AFH 07H DBH 4CH E6H 02H CAH BAH 07H CDH
07B0H=88H 07H D2H A1H 07H CDH 42H 07H 37H C9H 0EH C8H CDH 81H 08H DBH
07C0H=4CH E6H 02H C2H CFH 07H CDH 88H 07H D2H BFH 07H C3H B5H 07H DBH
07D0H=4CH E6H 02H C2H DBH 07H DBH 4CH E6H 02H C8H CDH 88H 07H D2H CFH
07E0H=07H C3H B5H 07H CDH 66H 08H 1EH 00H CDH 91H 08H E5H 26H 08H 2EH
07F0H=10H CDH 44H 08H 16H 00H 5DH CDH 8EH 08H E3H 5CH CDH 8EH 08H 5DH
0800H=CDH 8EH 08H 1EH 00H CDH 8EH 08H E3H E3H 5EH 23H CDH 8EH 08H E3H
0810H=2DH C2H 09H 08H AFH 92H 5FH CDH 91H 08H 25H C2H EFH 07H CDH A5H
0820H=08H 2AH 91H BEH 2BH 22H 91H BEH 7DH B4H E1H C2H E7H 07H 1EH 00H
0830H=CDH 91H 08H CDH 44H 08H 1EH 00H CDH 91H 08H 1EH 00H CDH 91H 08H
0840H=CDH 66H 08H C9H CDH 5BH 08H CDH 5BH 08H CDH 5BH 08H 1EH 3AH CDH
0850H=91H 08H C9H 3EH B4H D3H 19H 0DH C2H 57H 08H 0EH 33H 3EH B5H D3H
0860H=19H 0DH C2H 61H 08H C9H CDH 5BH 08H 3EH B4H D3H 19H 0EH 28H CDH
0870H=81H 08H C3H 5BH 08H 06H 04H 0EH FAH CDH 81H 08H 05H C2H 77H 08H
0880H=C9H 3EH 3CH E3H E3H 3DH C2H 83H 08H 0DH C2H 81H 08H C9H 7AH 83H
0890H=57H 06H 08H 7BH 0FH 5FH 0EH 32H D2H 9DH 08H 0EH 64H CDH 53H 08H
08A0H=05H C8H C3H 93H 08H 0EH 96H CDH 53H 08H C9H AFH 32H 71H BEH 1EH
08B0H=31H 3EH 08H 32H 91H BEH 06H 07H CDH 25H 09H DAH 1DH 09H 5FH CDH
```

```
08C0H=59H 09H DAH 1DH 09H 83H 1FH 5FH 05H C2H BFH 08H CDH 1FH 09H 3AH
08D0H=71H BEH B7H C2H 15H 09H 3CH 32H 71H BEH CDH A2H 09H D8H CAH 1DH
08E0H=09H 22H 9EH BFH D5H 11H 16H BFH 06H 10H 3AH 6FH BEH B7H CAH 02H
08F0H=09H 1AH BEH C2H FFH 08H 23H 13H 05H C2H F1H 08H C3H 0AH 09H D1H
0900H=37H C9H 1AH 77H 23H 13H 05H C2H 02H 09H D1H 3AH 91H BEH 3DH 32H
0910H=91H BEH CAH B1H 08H CDH A2H 09H D8H C8H C3H E4H 08H 37H C9H 7BH
0920H=B7H 1FH 83H 57H C9H 0EH FFH CDH 88H 07H D8H 0DH CAH 7CH 09H DBH
0930H=4CH E6H 01H CAH 27H 09H 4BH 0DH CAH 45H 09H DBH 4CH E6H 01H C2H
0940H=37H 09H C3H 25H 09H C3H 00H 39H CAH 7CH 09H DBH 4CH E6H 01H CAH
0950H=59H 09H DBH 4CH E6H 01H C2H 47H 09H DBH 4CH E6H 01H C2H 7CH 09H
0960H=0EH 00H 0DH CAH 7CH 09H DBH 4CH E6H 01H CAH 62H 09H 0EH 00H 0CH
0970H=CAH 7CH 09H DBH 4CH E6H 01H C2H 6FH 09H 79H C9H 37H C9H E5H 06H
0980H=00H 2EH 08H CDH 59H 09H DAH A0H 09H 92H 78H 1FH 47H 87H 79H FAH
0990H=93H 09H 1FH 83H 1FH 5FH CDH 1FH 09H 2DH C2H 83H 09H 78H 2FH 47H
09A0H=E1H C9H CDH 7EH 09H D8H FEH 3AH C2H 0AH 0AH CDH 7EH 09H D8H 87H
09B0H=C8H FEH 10H C2H 0AH 0AH 32H 98H BFH 32H 99H BEH CDH 7EH 09H D8H
09C0H=67H 3AH 98H BFH 80H 32H 98H BEH CDH 7EH 09H D8H 6FH 22H 9AH BFH
09D0H=3AH 98H BFH 80H 32H 98H BFH CDH 7EH 09H D8H 21H 16H BFH B7H C2H
09E0H=0AH 0AH CDH 7EH 09H D8H 77H 3AH 98H BFH 80H 32H 98H BFH 3AH 99H
09F0H=BFH 3DH 32H 99H BEH 23H C2H E2H 09H CDH 7EH 09H D8H 3AH 98H BFH
0A00H=80H C2H 0AH 0AH 2AH 9AH BFH F6H 01H C9H 37H C9H 0EH FBH CDH 6BH
0A10H=1AH CDH 42H 07H CDH 88H 07H DAH E5H 0AH CDH 61H 1FH 3EH 03H 32H
0A20H=9CH BFH CDH 4BH 07H DAH E5H 0AH AFH 32H 6FH BEH 3EH BCH D3H 19H
0A30H=CDH 8FH 07H DAH E5H 0AH CDH ABH 08H F5H CDH 42H 07H CDH 48H 07H
0A40H=F1H DAH 79H 0AH 2AH 9EH BFH 11H BFH BFH CDH 56H 0DH CAH BFH BFH
0A50H=11H BDH BFH CDH 56H 0DH CAH BDH BFH 11H 00H 40H CDH 56H 0DH C2H
0A60H=6DH 0AH CDH 27H 10H DAH 6DH 0AH AFH 32H 4CH BEH C9H 21H 00H 40H
0A70H=11H 7FH B2H CDH 17H 11H C3H F7H 0AH 3AH 9CH BFH 3DH 32H 9CH BFH
0A80H=C2H 28H 0AH 00H 00H 00H C3H F7H 0AH 0EH F7H CDH 6BH 1AH CDH 42H
0A90H=07H CDH 88H 07H DAH E5H 0AH CDH 61H 1FH CDH 7EH 0FH CDH 48H 07H
0AA0H=DAH E5H 0AH 3EH B5H D3H 19H 3EH B4H D3H 19H CDH 8FH 07H DAH E5H
0AB0H=0AH 21H E5H 00H 22H 91H BEH 21H 00H 40H CDH E4H 07H CDH 42H 07H
0AC0H=CDH 4BH 07H 3EH 01H 32H 6FH BEH 3EH BCH D3H 19H CDH 8FH 07H DAH
0AD0H=E5H 0AH CDH ABH 08H F5H CDH 42H 07H CDH 48H 07H F1H DAH F7H 0AH
0AE0H=AFH 32H 4CH BEH C9H CDH 42H 07H 3AH 4EH BEH B7H 37H C8H CDH E9H
0AF0H=1AH 21H 41H 38H C3H C1H 1EH CDH 42H 07H 3EH 01H 32H 4CH BEH 3AH
0B00H=4EH BEH B7H 37H C8H CDH B3H 19H CDH E9H 1AH 21H 38H 38H C3H C1H
0B10H=1EH 0EH FEH CDH 6BH 1AH CDH 45H 0BH DAH 98H 1EH 21H 11H 0BH 22H
0B20H=55H BEH 21H 00H 00H 39H 22H 53H BEH 3AH 8CH BEH FEH 08H D2H A0H
0B30H=1EH CDH 3CH 1AH 2AH 6AH BEH 22H 82H B2H EBH CDH F8H 0CH 3AH 8CH
0B40H=BEH 32H 81H B2H C9H 21H 45H 0BH 22H 55H BEH 21H 00H 00H 39H 22H
0B50H=53H BEH CDH C9H 19H CDH 37H 0CH DAH 98H 1EH FEH 2AH C2H 98H 1EH
0B60H=21H 60H 0BH 22H 55H BEH 21H 00H 00H 39H 22H 53H BEH CDH C9H 19H
0B70H=0EH 00H 3AH 8CH BEH CDH 5EH 1AH CDH 7CH 0BH C9H 3AH 90H BEH E6H
0B80H=F3H 32H 90H BEH CDH 88H 1AH 06H 04H 0EH 04H CDH 1DH 1BH DAH BAH
0B90H=0BH F5H 7EH FEH FFH CAH C4H 0BH CDH B9H 0DH 3EH 59H BDH DAH A0H
0BA0H=1EH 3EH 12H BCH DAH A0H 1EH AFH B4H CAH A0H 1EH F1H FEH 28H CAH
0BB0H=C7H 0BH FEH 29H CAH D5H 0BH C3H 98H 1EH 7EH FEH FFH C2H 98H 1EH
0BC0H=3EH 31H 37H C9H F1H 37H C9H CDH 47H 1AH 7CH FEH 12H C2H E2H 0BH
0BD0H=26H 00H C3H E2H 0BH CDH 10H 1AH 7CH FEH 12H CAH E2H 0BH C6H 12H
0BE0H=27H 67H 22H 6AH BEH CDH F0H 1AH CAH 7CH 0BH E6H 3FH FEH 31H C8H
0BF0H=FEH 2AH C8H C3H 98H 1EH CDH 8BH 1AH 7CH FEH 12H CAH 18H 0CH D2H
0C00H=18H 0CH CDH 47H 1AH 7CH B7H C2H 0CH 0CH 26H 12H 0EH 04H 7CH E6H
0C10H=F0H C2H 00H 1DH 0CH C3H 00H 1DH F5H CDH 10H 1AH F1H CAH 0CH 0CH
0C20H=CDH AFH 0DH E6H 0FH 4FH 7CH E6H 0FH C6H 0AH 0DH C2H 29H 0CH D6H
0C30H=0CH B7H 27H 67H C3H 0CH 0CH 0EH 01H 21H 4CH 38H CDH D3H 19H 0EH
0C40H=00H 06H 01H CDH 1DH 1BH F5H 7EH FEH FFH CAH 5FH 0CH 87H CAH A0H
0C50H=1EH 32H 8CH BEH F1H DAH 5DH 0CH FEH 2AH C2H 98H 1EH 87H C9H F1H
0C60H=37H C9H 3AH 81H B2H B7H CAH 7CH 0CH CDH 8FH 0CH EBH 2AH 82H B2H
0C70H=CDH 56H 0DH DAH 7EH 0CH EBH 22H 82H B2H B7H C9H 37H C9H 3AH 81H
0C80H=B2H 3CH FEH 08H DAH 89H 0CH 3EH 01H 32H 81H B2H C3H 76H 0CH 21H
0C90H=00H 00H DBH 18H E6H 40H F5H DBH 5CH E6H 10H CAH A4H 0CH CDH E5H
0CA0H=0CH C3H 97H 0CH CDH F2H 0CH 6FH CDH E5H 0CH DBH 5CH E6H 20H C2H
0CB0H=A8H 0CH CDH F2H 0CH CDH B4H 0DH B5H 6FH CDH E5H 0CH DBH 5CH E6H
0CC0H=40H C2H BAH 0CH CDH F2H 0CH 67H CDH E5H 0CH DBH 5CH E6H 80H C2H
0CD0H=C8H 0CH CDH F2H 0CH CDH B4H 0DH B4H 67H DBH 18H E6H 40H 4FH F1H
0CE0H=B9H C2H 8FH 0CH C9H 3EH 3CH D3H 19H E5H E1H E5H E1H 3EH BCH D3H
0CF0H=19H C9H DBH 5CH 2FH E6H 0FH C9H 3EH BCH D3H 19H CDH 13H 0DH CDH
0D00H=56H 0DH C2H FCH 0CH 3EH BCH D3H 19H CDH 8FH 0CH CDH 56H 0DH C2H
0D10H=F8H 0CH C9H DBH 5CH E6H 10H CAH 20H 0DH CDH 42H 0DH C3H 13H 0DH
0D20H=CDH F2H 0CH 6FH CDH 42H 0DH CDH F2H 0CH CDH B4H 0DH B5H 6FH CDH
0D30H=42H 0DH CDH F2H 0CH 67H CDH 42H 0DH CDH F2H 0CH CDH B4H 0DH B4H
0D40H=67H C9H 3EH 7CH D3H 19H E5H E1H E5H E1H 3EH FCH D3H 19H C9H 7CH
0D50H=1FH 67H 7DH 1FH 6FH C9H 7AH BCH C0H 7BH BDH C9H 7BH 95H 5FH 7AH
0D60H=9CH 57H C9H EBH 19H EBH 7BH B2H C9H D5H 5FH 79H B0H 7BH D1H C9H
```

```
0D70H=CDH 56H 0DH C8H 79H 95H 4FH 78H 9CH 47H DAH 88H 0DH EBH E5H 7EH
0D80H=09H 77H E1H CDH 56H 0DH C8H 28H C3H 7EH 0DH E5H 7EH 09H 77H E1H
0D90H=CDH 56H 0DH C8H 23H C3H 88H 0DH 7CH CDH B4H 0DH E6H F0H 67H 7DH
0DA0H=CDH AFH 0DH E6H 0FH B4H 67H 7DH CDH B4H 0DH E6H F0H 6FH C9H 0FH
0DB0H=0FH 0FH 0FH C9H 07H 07H 07H 07H C9H 11H 00H 00H 23H 36H FFH 21H
0DC0H=07H BFH EBH 1AH FEH FFH C8H CDH 98H 0DH 1AH B5H 6FH 13H C3H C3H
0DD0H=0DH 21H FFH FFH 1AH FEH FFH CAH 01H 0EH 6FH 26H 00H 1BH 1AH FEH
0DE0H=FFH C8H 01H 0AH 00H CDH 03H 0EH 1BH 1AH FEH FFH C8H 01H 64H 00H
0DF0H=CDH 03H 0EH 1BH 1AH FEH FFH C8H 01H E8H 03H CDH 03H 0EH 87H 1BH
0E00H=C9H 37H C9H 3DH F8H 09H C3H 03H 0EH 22H 71H BEH AFH 32H 73H BEH
0E10H=21H EBH 03H CDH 2AH 0EH 21H 64H 00H CDH 2AH 0EH 21H 0AH 00H CDH
0E20H=2AH 0EH 2AH 71H BEH 73H 23H 36H FFH C9H 0EH FFH CDH 5CH 0DH 0CH
0E30H=D2H 2CH 0EH CDH 63H 0DH 3AH 73H BEH B7H C2H 43H 0EH 79H B7H C8H
0E40H=32H 73H BEH 2AH 71H BEH 71H 23H 22H 71H BEH C9H 7DH 17H 6FH 7CH
0E50H=17H 67H C9H 13H CDH 5CH 0DH 71H 23H 1BH 78H B2H C2H 57H 0EH C9H
0E60H=E5H D5H 2AH 87H BEH EBH 2AH 85H BEH CDH 56H 0DH D1H E1H C9H DBH
0E70H=59H 47H E6H 02H CAH 6FH 0EH DBH 58H E6H 7FH 47H C9H E5H 21H 00H
0E80H=00H 2BH 7DH B4H CAH ACH 0EH DBH 59H E6H 04H CAH 81H 0EH E1H 78H
0E90H=D3H 58H 3AH 98H BFH 3CH 32H 98H BFH 78H FEH 0DH C0H 06H 0AH CDH
0EA0H=7DH 0EH D8H CDH B5H 0EH D8H AFH 32H 98H BFH C2H E1H 37H C9H 06H
0EB0H=0DH CDH 7DH 0EH C9H 06H 7FH 0EH 07H CDH 7DH 0EH 0DH C2H B9H 0EH
0EC0H=C9H 3EH 00H 32H 40H BFH 21H 10H 27H 0EH FFH CDH 5CH 0DH 0CH D2H
0ED0H=CBH 0EH CDH 63H 0DH 79H B7H C4H 30H 0FH 21H E8H 03H 0EH FFH CDH
0EE0H=5CH 0DH 0CH D2H DFH 0EH CDH 63H 0DH 79H B7H C2H F2H 0EH 3AH 40H
0EF0H=BFH B7H C4H 30H 0FH 21H 64H 00H 0EH FFH CDH 5CH 0DH 0CH D2H FAH
0F00H=0EH CDH 63H 0DH 79H B7H C2H 0FH 0FH 3AH 40H BFH B7H C4H 30H 0FH
0F10H=21H 0AH 00H 0EH FFH CDH 5CH 0DH 0CH D2H 15H 0FH CDH 63H 0DH 79H
0F20H=B7H C2H 27H 0FH 3AH 40H BFH B7H C4H 30H 0FH 4BH CDH 30H 0FH C9H
0F30H=3EH 01H 32H 40H BFH 2AH 16H BFH 79H C6H 30H 77H 23H 36H 00H 22H
0F40H=16H BFH C9H F5H C5H D5H E5H 21H 18H BFH CDH 58H 0FH 21H 18H BFH
0F50H=CDH 63H 0FH E1H D1H C1H F1H C9H AFH 32H 40H BFH 22H 16H BFH CDH
0F60H=C1H 0EH C9H 7EH B7H C8H 47H CDH 7DH 0EH 23H C3H 63H 0FH DBH 11H
0F70H=2FH E6H 07H C8H FEH 05H C8H FEH 06H C8H FEH 03H C8H C9H 21H 0CH
0F80H=5EH 11H 11H 5EH 0EH 0DH CDH 53H 0EH 21H 00H 40H 11H 11H 5EH CDH
0F90H=1CH 10H 22H 12H 5EH 21H 15H 5EH 11H ADH 71H CDH 1CH 10H 22H AEH
0FA0H=71H 21H B5H A2H 11H BBH A2H 0EH FEH CDH 53H 0EH 21H B1H 71H 11H
0FB0H=BBH A2H CDH 1CH 10H 22H BCH A2H 21H 5FH B2H 11H 62H B2H 0EH 00H
0FC0H=CDH 53H 0EH 21H BFH A2H 11H 62H B2H CDH 1CH 10H 22H 63H B2H 21H
0FD0H=FFH FFH 22H 76H B2H 21H 66H B2H 11H 77H B2H CDH 1CH 10H 22H 78H
0FE0H=B2H 21H 7BH B2H 36H 45H 23H 36H 42H 23H 36H 4DH 23H 36H 00H 23H
0FF0H=FFH AFH 32H 47H BEH 3AH 49H BEH E4H FBH 32H 49H BEH C9H 22H
1000H=85H BEH EBH 22H 87H BEH 06H 00H 21H 00H 00H 1AH 4FH 09H 13H EBH
1010H=22H 85H BEH EBH CDH 60H 0EH D2H 0BH 10H EBH C9H CDH FFH 0FH 7BH
1020H=2FH 6FH 7AH 2FH 67H 23H C9H AFH 32H 47H BEH CDH 9BH 10H FBH 21H
1030H=87H 10H E5H 3AH 52H BEH 3DH F8H 32H 52H BEH CAH AEH 10H 3DH CAH
1040H=D5H 10H 3DH CAH E4H 10H 3DH CAH F3H 10H 3DH CAH 02H 11H CDH AEH
1050H=10H D8H CDH D5H 10H D8H CDH F3H 10H D8H CDH 02H
1060H=11H D8H 21H 7BH B2H 7EH FEH 45H C2H C5H 10H 23H 7EH FEH 42H C2H
1070H=C5H 10H 23H 7EH FEH 4DH C2H C5H 10H 23H 7EH B7H C2H C5H 10H 23H
1080H=7EH FEH FFH C2H C5H 10H C9H CDH A7H 10H 3AH 47H BEH B7H CAH F2H
1090H=0FH 3AH 49H BEH F6H 04H 32H 49H BEH 37H C9H CDH DBH 05H 3EH 05H
10A0H=32H 48H BEH CDH 3CH 1AH C9H CDH C4H 05H CDH 36H 1AH C9H 3EH 05H
10B0H=32H 52H BEH 21H 00H 40H 11H 11H 5EH CDH FFH 0FH 2AH 12H 5EH CDH
10C0H=63H 0DH 37H 3FH C8H 3EH 01H 32H 47H BEH 06H 04H 3AH 49H BEH B0H
10D0H=32H 49H BEH 37H C9H 21H 15H 5EH 11H ADH 71H CDH FFH 0FH 2AH AEH
10E0H=71H C3H BFH 10H 21H B1H 71H 11H BBH A2H CDH FFH 0FH 2AH BCH A2H
10F0H=C3H BFH 10H 21H BFH A2H 11H 62H B2H CDH FFH 0FH 2AH 63H B2H C3H
1100H=BFH 10H 21H 66H B2H 11H 77H B2H CDH FFH 0FH 2AH 78H B2H C3H BFH
1110H=10H 21H 00H 40H 11H ACH BFH 0EH 00H CDH 53H 0EH 21H B1H 71H 11H
1120H=BBH A2H 0EH FFH CDH 53H 0EH 21H 66H B2H 11H 77H B2H 0EH FFH CDH
1130H=53H 0EH CDH 2DH 33H CDH 7EH 0FH C9H F3H 3EH DFH 30H D3H 40H D3H
1140H=44H FBH AFH D3H 02H D3H 03H D3H 0AH D3H 12H D3H 13H D3H 1AH 3EH
1150H=BCH D3H 19H 3EH FFH D3H 1BH 3EH BCH D3H 19H 3EH FFH D3H 0BH D3H
1160H=09H CDH 95H 12H CDH 74H 11H CDH A4H 19H CDH A6H 11H CDH C4H 05H
1170H=CDH 42H 07H C9H 3EH 37H D3H 59H D3H 59H D3H 59H 3EH 77H D3H 59H
1180H=DBH 18H E6H 10H 3EH 7BH C2H 8BH 11H 3EH 7AH D3H 59H 3EH 37H D3H
1190H=59H C9H F3H 20H E6H 07H F6H 98H A0H 30H FBH C9H F3H 20H E6H 07H
11A0H=B0H F6H 80H 30H FBH C9H 3EH 40H 30H 00H 00H 3EH C0H 30H C9H CDH
11B0H=B6H 11H 7EH B1H 77H C9H 7DH E6H 07H 4FH 3EH 01H CAH C4H 11H 17H
11C0H=0DH CDH BFH 11H 4FH CDH 4FH CDH 4FH CDH 4FH 0DH CDH 4FH 0DH 3EH 1FH
11D0H=A4H 67H E5H 19H E3H 3AH 89H BEH 95H 32H 89H BEH E1H C9H 21H 00H
11E0H=00H 01H 08H 00H 1AH B7H C2H F6H 11H 09H 3AH 89H BEH 3DH 32H 89H
11F0H=BEH C2H E4H 11H 37H C9H 4FH 3EH 01H B7H 47H A1H C2H 05H 12H 78H
1200H=17H 23H C3H FAH 11H 2FH A1H 12H C9H 11H 00H 00H 22H 9FH BEH 3EH
1210H=01H 32H 9EH BEH 2AH 9FH BEH 3AH 9EH BEH 4FH 7EH A1H C0H 13H 79H
```

```
1220H=17H 32H 9EH BEH D2H 1AH 12H 23H 3AH 89H BEH 3DH 32H 89H BEH C2H
1230H=0CH 12H 37H C9H 2AH 9FH BEH 3AH 9EH BEH 4FH B7H C3H 1EH 12H 11H
1240H=00H 2AH 85H BEH 7EH 0EH 09H 0DH CAH 54H 12H 1FH D2H 48H 12H
1250H=13H C3H 48H 12H D5H 23H 22H 85H BEH CDH 60H 0EH D1H D2H 42H 12H
1260H=C9H 3AH A8H BEH B7H C4H 7FH 12H 3AH A9H BEH B7H C4H 8AH 12H 3AH
1270H=AAH BEH B7H C8H 3AH ADH BEH 3DH 32H ADH BEH C0H C3H 5DH 13H 3AH
1280H=ABH BEH 3DH 32H ABH BEH C0H C3H 29H 13H 3AH ACH BEH 3DH 32H ACH
1290H=BEH C0H C3H 4AH 13H 3EH FFH 32H AEH BEH C0H 29H 13H CDH 4AH 13H
12A0H=CDH 5DH 13H C9H 3AH 4BH BEH 1FH F5H D4H B8H 12H F1H 1FH F5H D4H
12B0H=E7H 12H F1H 1FH D2H 09H 13H C9H DBH 08H E6H 01H C0H F3H DBH 40H
12C0H=0EH FEH 06H BEH 3EH 0FH 32H A8H BEH 32H ABH BEH 3EH 06H 32H AFH
12D0H=BEH 21H B8H BEH 22H B2H BEH 36H FFH CDH 92H 11H 3AH AEH BEH A1H
12E0H=32H AEH BEH D3H 09H FBH C9H DBH 08H E6H 04H C0H F3H DBH 44H 0EH
12F0H=FBH 06H BDH 3EH 0FH 32H A9H BEH 32H ACH BEH 3EH 06H 32H B0H BEH
1300H=21H C1H BEH 22H B4H BEH C3H D7H 12H DBH 08H E6H 10H C0H F3H 0EH
1310H=EFH 06H 9BH 3EH 0FH 32H AAH BEH 32H ADH BEH 3EH 06H 32H B1H BEH
1320H=21H CAH BEH 22H B6H BEH C3H D7H 12H F3H 0EH 03H 06H 89H AFH 32H
1330H=A8H BEH DBH 40H 3AH 4BH BEH E6H FEH 32H 4BH BEH CDH 9CH 11H 3AH
1340H=AEH BEH B1H 32H AEH BEH D3H 09H FBH C9H F3H 0EH 0CH 06H 8AH AFH
1350H=32H A9H BEH DBH 44H 3AH 4BH BEH E6H FDH C3H 39H 13H F3H 0EH 30H
1360H=06H 9DH AFH 32H AAH BEH 3AH 4BH BEH E6H FBH C3H 39H 13H F3H F5H
1370H=E5H D5H C5H CDH 0BH 15H FEH 23H CAH EAH 13H FEH 0AH D2H FFH 13H
1380H=3AH AFH BEH 3DH CAH FFH 13H 32H AFH BEH 2AH B2H BEH 23H 70H 22H
1390H=B2H BEH DBH 40H C1H D1H E1H F1H FBH C9H F3H F5H E5H D5H C5H CDH
13A0H=22H 15H FEH 23H CAH F1H 13H FEH 0AH D2H FFH 13H 3AH B0H BEH 3DH
13B0H=CAH FFH 13H 32H B0H BEH 2AH B4H BEH 23H 70H 22H B4H BEH DBH 44H
13C0H=C3H 94H 13H F3H F5H E5H D5H C5H CDH 2CH 15H FEH 23H CAH F8H 13H
13D0H=FEH 0AH D2H FFH 13H 3AH B1H BEH 3DH CAH FFH 13H 32H B1H BEH 2AH
13E0H=B6H BEH 23H 70H 22H B6H BEH C3H 94H 13H 21H 94H 13H E5H C3H 2EH
13F0H=14H 21H 94H 13H E5H C3H 5FH 14H 21H 94H 13H E5H C3H 90H 14H 21H
1400H=94H 13H E5H 3AH A7H BEH 3DH CAH 29H 13H 3DH CAH 4AH 13H C3H 5DH
1410H=13H CDH 1BH 14H CDH 4CH 14H CDH 7DH 14H C9H 3AH A8H BEH B7H C8H
1420H=3AH ABH BEH FEH 0CH D0H DBH 08H E6H 02H C8H C3H 29H 13H CDH 29H
1430H=13H 2AH B2H BEH CDH AEH 14H D8H 2AH B2H BEH 7EH EBH 22H B9H BEH
1440H=32H BBH BEH 3AH 4BH BEH F6H 01H 32H 4BH BEH C9H 3AH A9H BEH B7H
1450H=C8H 3AH ACH BEH FEH 0CH D0H DBH 08H E6H 08H C8H C3H 4AH 13H CDH
1460H=4AH 13H 2AH B4H BEH CDH AEH 14H D8H 2AH B4H BEH 7EH EBH 22H C2H
1470H=BEH 32H C4H BEH 3AH 4BH BEH F6H 02H 32H 4BH BEH C9H 3AH AAH BEH
1480H=B7H C8H 3AH ADH BEH FEH 0CH D0H DBH 08H E6H 20H C8H C3H 5DH 13H
1490H=CDH 5DH 13H 2AH B6H BEH CDH AEH 14H D8H 2AH B6H BEH 7EH EBH 22H
14A0H=CBH BEH 32H CDH BEH 3AH 4BH BEH F6H 04H 32H 4BH BEH C9H 7EH FEH
14B0H=FFH 37H C8H 2BH EBH CDH D1H 0DH D8H 11H A0H 0FH CDH 56H 0DH D8H
14C0H=EBH C9H E6H 0FH CDH E8H 14H 4FH 78H 0FH 0FH 0FH 0FH E6H 0FH CDH
14D0H=E8H 14H 07H 07H B1H 4FH 06H 00H 21H FBH 14H 09H 7EH FEH FFH CAH
14E0H=E4H 14H 47H C9H C1H C3H FFH 13H FEH 04H DAH F9H 14H CAH F3H 14H
14F0H=C3H F6H 14H 3EH 02H C9H 3EH 03H C9H 3DH C9H 01H 04H 07H 2AH 02H
1500H=05H 08H 00H 03H 06H 09H 23H FFH FFH FFH 3EH 01H 32H A7H BEH
1510H=DBH 40H 47H E6H 0FH CAH E4H 14H 78H E6H F0H CAH E4H 14H 78H C3H
1520H=C2H 14H 3EH 02H 32H A7H BEH DBH 44H C3H 12H 15H 3EH 03H 32H A7H
1530H=BEH DBH 10H C3H 12H 15H 3AH 4DH BEH B7H C0H 21H 81H B2H 4EH 3AH
1540H=46H BEH B7H CAH 48H 15H F8H 4FH 23H 5EH 23H 56H 2AH 94H BEH CDH
1550H=25H 26H DBH 22H 94H BEH 7EH E6H 07H 4FH 3AH 46H BEH B7H 79H CAH
1560H=64H 15H C6H 07H 32H 58H BAH 7EH 1FH 1FH 1FH E6H 1FH 32H A1H BEH
1570H=23H 5EH 23H 56H EBH 22H 59H BAH EBH 23H 5EH 23H 56H EBH 22H 83H
1580H=BEH 3EH 01H 32H 4DH BEH C9H AFH 32H 4FH BEH 32H 4DH BEH 3AH A1H
1590H=BEH 32H 93H BEH 2AH 83H BEH 22H 7FH BEH FBH 2AH 7FH BEH 3EH 01H
15A0H=32H 6FH BEH EBH CDH 93H 2BH D8H 22H DFH BEH 2AH 79H BEH 22H 59H
15B0H=BEH 23H 22H 79H BEH CDH 0BH 16H DAH C2H 15H CDH EAH 05H DAH 05H
15C0H=16H FBH 2AH 7BH BEH EBH 2AH 79H BEH CDH 56H 0DH D2H AEH 15H 2AH
15D0H=7FH BEH EBH 3EH 01H 32H 6FH BEH 2AH DFH BEH CDH 96H 2BH DAH E4H
15E0H=15H C3H A8H 15H 3AH 4FH BEH B7H 3AH 4AH BEH CDH B7H 05H C9H 22H
15F0H=C2H FFH 15H 04H 22H 9AH BEH B0H 32H 4AH BEH CDH B7H 05H C9H 22H
1600H=98H BEH C3H F7H 15H CDH EAH 05H C3H C1H 15H 3AH 93H BEH B7H FAH
1610H=3DH 16H 32H 5DH BEH CDH 01H 27H D8H 5EH 23H 56H 3AH 4FH BEH B7H
1620H=CAH 49H 16H D5H 11H 5CH BAH 2AH 59H BEH CDH AFH 11H 3AH 58H BEH
1630H=B7H CAH 53H 16H CDH 68H 33H D1H CDH 6EH 16H B7H C9H 11H 00H 00H
1640H=E6H 01H CAH 1CH 16H 1BH C3H 1CH 16H 32H 58H BEH D5H 11H 9DH BAH
1650H=C3H 27H 16H 2AH 59H BEH 29H 11H 6EH B6H 19H 5EH 23H 7EH 2AH 7DH
1660H=BEH 2FH A4H 67H 7BH 2FH A5H 6FH 22H 7DH BEH C3H 37H 16H 2AH 7DH
1670H=BEH 7DH A3H 4FH 7CH A2H 47H 2AH 59H BEH 29H 11H B4H B2H 19H 5EH
1680H=23H 56H E5H 2AH 7DH BEH 7DH 2FH A3H B1H 5FH 7CH 2FH A2H B0H 57H
1690H=E1H 72H 2BH 73H EBH 22H F1H BEH 22H 63H BEH C9H 21H 51H BEH 35H
16A0H=C2H F1H 16H 36H 0AH 3AH 46H BEH B7H C2H CEH 16H CDH 6EH 0FH 37H
16B0H=3FH C8H CDH 17H 17H DAH CAH 16H 22H 96H BEH 32H 8CH BEH EBH 2AH
16C0H=82H B2H EBH CDH 6FH 25H AFH 32H 50H BEH 22H 94H BEH C9H 4FH CDH
```

```
16D0H=6EH 0FH CAH E4H 16H B9H C8H FEH 04H C2H B2H 16H A1H 37H C0H 3EH
16E0H=04H C3H B2H 16H AFH 32H 46H BEH 21H 15H 5EH 3AH 81H B2H C3H B8H
16F0H=16H 3AH 46H BEH 17H C9H AFH 32H 50H BEH 32H 46H BEH 3AH 81H B2H
1700H=B7H CAH 0DH 17H CDH 6EH 0FH CAH E4H 16H CAH B2H 16H 21H 15H 5EH
1710H=22H 96H BEH 22H 94H BEH C9H B7H CAH 26H 17H 3DH CAH 2DH 17H 3DH
1720H=CAH 35H 17H 37H 3EH FFH 21H 15H 5EH 32H 46H BEH C9H 3EH 01H 21H
1730H=77H 70H C3H 29H 17H 3EH 02H 21H 12H 71H C3H 29H 17H 00H 3AH 8BH
1740H=BEH 32H 5AH BEH 2AH 85H BEH 7EH 32H 59H BEH 23H 5EH 23H 56H 23H
1750H=22H 85H BEH EBH 22H 63H BEH 11H 6EH B6H 2AH 59H BEH 29H 19H 7EH
1760H=2FH 5FH 23H 7EH 2FH 52H EBH 22H 7DH BEH 2AH 63H BEH EBH CDH 6EH
1770H=16H CDH EAH 05H 2AH 85H BEH EBH 2AH 87H BEH CDH 56H 0DH D2H 84H
1780H=17H C3H 44H 17H CDH 66H 27H CAH 8EH 17H CDH B7H 05H C9H CDH C0H
1790H=2AH C3H 3EH 17H 21H D3H BEH 35H C0H 36H 50H 3AH 4AH BEH 1FH DAH
17A0H=F5H 17H 1FH DAH 19H 18H C9H 22H 59H BEH CDH 41H 18H 3EH 40H 32H
17B0H=89H BEH EBH 2AH 75H BEH DAH E0H 17H EBH CDH B6H 11H 79H 32H 9EH
17C0H=BEH C3H 19H 39H EBH CDH 14H 12H DAH E7H 17H EBH 22H 59H BEH CDH
17D0H=4CH 18H D2H ECH 17H FEH 01H CAH F0H 17H 3EH 02H B7H C3H F0H 17H
17E0H=CDH 09H 12H D2H CBH 17H C9H AFH 21H 00H 00H C9H CDH 37H 18H AFH
17F0H=2AH 59H BEH 23H C9H 21H 5CH BAH 22H 75H BEH 2AH 98H BEH CDH A7H
1800H=17H DAH 10H 18H 22H 98H BEH FEH 02H C0H CDH 37H 18H C3H EBH 18H
1810H=3AH 4AH BEH E6H FEH 32H 4AH BEH C9H 21H 9DH BAH 22H 75H BEH 2AH
1820H=9AH BEH CDH A7H 17H DAH 2EH 18H 22H 9AH BEH C3H 07H 18H 3AH 4AH
1830H=BEH E6H FDH 32H 4AH BEH C9H 3AH 9EH BEH 2FH 2AH 9FH BEH A6H 77H
1840H=C9H 7DH B4H 37H C8H 11H F4H 01H CDH 56H 0DH C9H 11H 84H B2H 2AH
1850H=59H BEH 29H 19H 5EH 23H 56H EBH 22H 63H BEH 3EH 03H 32H D5H BEH
1860H=21H F1H BEH 36H 69H 23H 36H 00H CDH 2AH 07H BAH CDH 97H 18H 3AH DBH
1870H=BEH FEH 05H C2H 97H 18H 5EH 23H 56H 2AH 63H BEH CDH 56H 0DH C2H
1880H=83H 18H C9H CDH 57H 05H DAH 93H 18H 22H F1H BEH CDH 91H 06H CDH
1890H=B7H 05H FBH 3EH 01H 37H C9H FBH 3AH D5H BEH 3DH C2H 5DH 18H 37H
18A0H=C9H FBH CDH 11H 14H 3AH 4BH BEH 1FH DAH B5H 18H 1FH DAH D5H 18H
18B0H=1FH DAH E0H 18H C9H 21H B9H BEH 3AH 4BH BEH E6H FEH 32H 4BH BEH
18C0H=5EH 23H 56H 23H 7EH 32H 93H BEH EBH 22H 7FH BEH 3EH 01H 32H 4FH
18D0H=BEH CDH 9AH 15H CDH 2IH C2H BEH 3AH 4BH BEH E6H FDH C3H BDH 18H
18E0H=21H CBH BEH 3AH 4BH BEH E6H FBH C3H BDH 18H 2AH 59H BEH 11H DEH
18F0H=BAH CDH AFH 11H 3AH 49H BEH F6H 02H 32H 49H BEH 21H 00H 00H 22H
1900H=9CH BEH C9H 3AH 49H BEH E6H 02H C8H 21H D4H BEH 35H C0H 36H A0H
1910H=21H DEH BAH 22H 75H BEH 2AH 9CH BEH CDH A7H 17H DAH 23H 19H 22H
1920H=9CH BEH C9H 3AH 49H BEH E6H FDH 32H 49H BEH C9H 3AH 42H BEH B7H
1930H=C8H AFH 32H 42H BEH FBH CDH 27H 10H C9H F3H 31H FFH BEH CDH 39H
1940H=11H CDH 9FH 1FH CDH 1BH 1AH CDH 13H 1FH 3EH 01H 32H 4EH BEH AFH
1950H=32H 48H BEH 32H 4DH BEH 3EH 06H 32H 52H BEH CDH 27H 10H DCH E3H
1960H=1EH 31H FFH BFH 21H 64H 19H 22H 55H BEH 21H 00H 00H 39H 22H 53H
1970H=BEH CDH 4DH 1FH CDH 9FH 1FH CDH 89H 1EH CDH 08H 1BH DAH 43H 1EH
1980H=C2H 56H 1DH CDH ABH 1FH CDH 8FH 19H CDH 97H 19H C3H 74H 19H DBH
1990H=18H E6H 02H CAH 83H 35H C9H DBH 08H 17H 17H 17H E6H 03H FEH 03H
19A0H=C0H C3H F0H BFH CDH B3H 19H 3EH FFH 32H 90H BEH 32H A2H BEH 32H
19B0H=A3H BEH C9H 3EH 08H D3H 61H 3EH 3DH D3H 61H 3EH E0H D3H 61H 3EH
19C0H=DFH D3H 61H C9H 0EH F1H CDH F9H 19H 0EH 00H 06H 08H 1EH FFH CDH
19D0H=52H 1AH C9H CDH 5CH 1BH 7EH FEH 61H C8H 4FH CDH E2H 19H 23H C3H
19E0H=D6H 19H DBH 61H E6H 80H C2H E2H 19H 79H D3H 60H C9H 3AH 90H BEH
19F0H=A1H 4FH 32H 90H BEH CDH 08H 1AH C9H 79H 2FH 4FH 3AH 90H BEH B1H
1A00H=32H 90H BEH 4FH CDH 08H 1AH C9H 3EH 88H D3H 61H CDH E2H 19H C9H
1A10H=0EH F7H CDH EDH 19H 0EH FBH CDH F9H 19H C9H 0EH EFH CDH EDH 19H
1A20H=0EH DFH CDH F9H 19H C9H 0EH DFH CDH EDH 19H 0EH EFH CDH F9H 19H
1A30H=C9H 0EH BFH CDH EDH 19H 0EH 7FH CDH F9H 19H C9H 0EH 7FH CDH EDH
1A40H=19H 0EH BFH CDH F9H 19H C9H 0EH FBH CDH EDH 19H 0EH F7H CDH F9H
1A50H=19H C9H CDH 5CH 1BH 4BH CDH E2H 19H 05H C8H C3H 56H 1AH F5H CDH
1A60H=5CH 1BH F1H CDH FCH 1BH 4FH CDH E2H 19H C9H 79H 32H A2H BEH 3EH
1A70H=89H D3H 61H CDH E2H 19H C9H 79H 32H A3H BEH 3EH 8AH D3H 61H CDH
1A80H=E2H 19H C9H 3EH 88H D3H 61H CDH E2H 19H C9H 0EH FDH CDH EDH 19H
1A90H=C9H CDH 5CH 1BH 7DH B7H 06H 00H C2H A1H 1AH B4H CAH C3H 1AH 06H
1AA0H=08H CAH 1FH D2H A1H 1AH 78H FEH 10H CCH CBH 1AH B7H 27H 47H E6H
1AB0H=F0H CAH C3H 1AH CDH AFH 0DH E6H 0FH CDH 63H 1AH 78H E6H 0FH CDH
1AC0H=63H 1AH C9H 0EH FFH CDH E2H 19H C3H 8CH 1AH 3EH 16H C9H 3AH 58H
1AD0H=BEH B7H C8H 0EH 04H CDH 5CH 1BH 0EH C8H CDH E2H 19H C9H 0EH FFH
1AE0H=CDH 6BH 1AH CDH 77H 1AH CDH 83H 1AH CDH C4H 19H CDH 31H 1AH C9H
1AF0H=CDH 08H 1BH DAH 43H 1EH CAH F0H 1AH 57H E6H 3FH FEH 30H CAH 51H
1B00H=1EH FEH 13H C8H 37H 3FH 7AH C9H DBH 61H E6H 30H C2H 1BH 1BH DBH
1B10H=61H E6H 0FH C8H 3EH 40H D3H 61H DBH 60H C9H 37H C9H C5H CDH 8DH
1B20H=1BH CDH 9DH 1BH 21H 06H BFH 36H FFH CDH F0H 1AH CAH 62H 1BH E6H
1B30H=3FH FEH 0FH DAH 98H 1EH FEH 31H CAH 66H 1BH FEH 14H CAH 6EH 1BH
1B40H=FEH 1CH CAH 6EH 1BH FEH 23H D2H 6EH 1BH 05H FAH 98H 1EH CDH A8H
1B50H=1BH 23H 77H CDH E2H 1BH CDH 9DH 1BH C3H 29H 1BH 3EH 90H B1H D3H
1B60H=61H C9H C1H C3H 1DH 1BH 37H 1BH 3EH 31H C9H B7H F5H
1B70H=CDH 76H 1BH F1H C1H C9H E5H 21H 0EH BFH 23H 7EH FEH 61H CAH 8BH
1B80H=1BH FEH 7FH C2H 7AH 1BH 36H FFH C3H 7AH 1BH E1H C9H 21H 0EH BFH
```

```
1B90H=71H 48H 23H 36H 7FH 0DH C2H 92H 1BH 23H 36H 61H C9H E5H 21H 0EH
1BA0H=BFH 4EH 23H CDH D3H 19H E1H C9H 1EH 00H FEH 1BH CAH E0H 1BH 1CH
1BB0H=FEH 12H CAH E0H 1BH 1CH FEH 1AH CAH E0H 1BH 1CH FEH 22H CAH E0H
1BC0H=1BH 1CH FEH 11H CAH E0H 1BH 1CH FEH 19H CAH E0H 1BH 1CH FEH 21H
1BD0H=CAH E0H 1BH 1CH FEH 10H CAH E0H 1BH 1CH FEH 18H CAH E0H 1BH 1CH
1BE0H=7BH C9H CDH FCH 1BH E5H 4FH 21H 0FH BFH 11H 10H BFH 1AH FEH 61H
1BF0H=CAH F9H 1BH 77H 23H 13H C3H EDH 1BH 71H E1H C9H E5H 21H 6CH 38H
1C00H=85H 6FH D2H 06H 1CH 24H 7EH E1H C9H CDH 1DH 1BH F5H EBH CDH D1H
1C10H=0DH DAH 22H 1CH EBH 2AH 89H BEH CDH 56H 0DH D2H A0H 1EH F1H B7H
1C20H=EBH C9H F1H 37H C9H 0EH FEH CDH 83H 1AH 06H 02H 0EH 00H 21H 20H
1C30H=00H C3H 40H 1CH 0EH EFH CDH 83H 1AH 06H 03H 0EH 00H 21H F4H 01H
1C40H=22H 89H BEH CDH 09H 1CH F5H FEH 31H CAH 56H 1CH FEH 2AH CAH 56H
1C50H=1CH FEH 23H C2H 98H 1EH 0EH FFH CDH 83H 1AH F1H C9H CDH C9H 19H
1C60H=CDH 34H 1CH D8H FEH 2AH C2H 98H 1EH 22H 59H BEH CDH C9H 19H 0EH
1C70H=BFH CDH 83H 1AH 0EH 00H 2AH 59H BEH CDH 45H 1DH 0EH 07H 06H 01H
1C80H=21H 09H 00H 22H 89H BEH CDH 09H 1CH DAH 98H 1EH F5H 7DH B7H CAH
1C90H=A0H 1EH 32H 5BH BEH 0EH FFH CDH 83H 1AH F1H C9H 0EH 7FH CDH 83H
1CA0H=1AH 06H 04H 0EH 00H 21H A0H 0FH C3H 40H 1CH 21H 04H 38H 0EH 00H
1CB0H=CDH D3H 19H 0EH 04H CDH 5CH 1BH 0EH 7FH CDH E2H 19H 0EH 04H CDH
1CC0H=5CH 1BH AFH 32H 58H BEH CDH F0H 1AH CAH B3H 1CH E6H 3FH FEH 12H
1CD0H=C2H E5H 1CH 3EH 80H 0EH 19H 32H 58H BEH CDH E2H 19H CDH F0H 1AH
1CE0H=CAH B3H 1CH E6H 3FH FEH 2AH C2H 98H 1EH 3AH 58H BEH C9H CDH 5CH
1CF0H=1BH 7EH FEH FFH C8H CDH FCH 1BH 4FH CDH E2H 19H 23H C3H F1H 1CH
1D00H=11H 0EH BFH 7CH CDH AFH 0DH E6H 0FH C2H 26H 1DH B4H C2H 2CH 1DH
1D10H=7DH CDH AFH 0DH E6H 0FH C2H 35H 1DH B5H CDH 20H 1DH C3H 3EH 1DH
1D20H=12H 13H 3EH FFH 12H C9H CDH 20H 1DH 7CH E6H 0FH CDH 20H 1DH 7DH
1D30H=CDH AFH 0DH E6H 0FH CDH 20H 1DH 7DH E6H 0FH CDH 20H 1DH 21H 0EH
1D40H=BFH CDH EEH 1CH C9H CDH 5CH 1BH EBH 21H 0EH BEH CDH 09H 0EH 21H
1D50H=0EH BEH CDH F1H 1CH C9H 47H E6H 3FH FEH 08H D2H 98H 1EH 87H 6FH
1D60H=26H 00H 11H 6FH 1DH 19H 5EH 23H 56H 21H 61H 19H E5H EBH E9H C9H
1D70H=1DH 22H 1EH 35H 1EH DAH 1DH 11H 0BH F9H 1DH 0CH 0AH 89H 0AH 98H
1D80H=1EH 31H 28H 79H 23H CEH 2DH C0H 32H C2H 2FH 98H 1EH 98H 1EH E0H
1D90H=29H 73H 24H C4H 2EH 8FH 32H 77H 30H 98H 1EH 98H 1EH DAH 2AH 02H
1DA0H=25H E7H 2CH 1DH 32H 17H 31H 09H 34H 98H 1EH CDH F0H 1AH CAH 61H
1DB0H=19H E6H 3FH FEH 08H DAH 98H 1EH FEH 0EH D2H 98H 1EH F5H CDH C9H
1DC0H=19H F1H E6H 07H 87H 6FH 26H 00H C9H 0EH EFH CDH 6BH 1AH CDH ABH
1DD0H=1DH 11H 81H 1DH 19H 5EH 23H 56H EBH E9H 0EH 7FH CDH 6BH 1AH CDH
1DE0H=F0H 1AH CAH 61H 19H E6H 3FH FEH 08H CAH 5EH 36H FEH 0AH CAH 97H
1DF0H=36H FEH 14H CAH 35H 37H C3H 98H 1EH 0EH FDH CDH 6BH 1AH 78H 17H
1E00H=D2H 99H 38H CDH F0H 1AH CAH 61H 19H E6H 3FH FEH 0DH CAH A9H 33H
1E10H=FEH 09H CAH 85H 34H FEH 14H CAH BEH 34H FEH 1CH CAH 1CH 34H C3H
1E20H=98H 1EH 0EH DFH CDH 6BH 1AH 78H 17H D2H 96H 38H CDH ABH 1DH 11H
1E30H=8FH 1DH C3H D4H 1DH 0EH BFH CDH 6BH 1AH CDH ABH 1DH 11H 9DH 1DH
1E40H=C3H D4H 1DH 31H FFH BFH CDH A4H 19H 3EH 0BH 32H 57H BEH CDH 57H
1E50H=1EH CDH DEH 1AH C3H 61H 19H CDH E9H 1AH 21H F7H 37H 0EH 00H CDH
1E60H=D3H 19H 3AH 57H BEH 4FH CDH E2H 19H 3EH ACH D3H 19H CDH 75H 08H
1E70H=3EH BCH D3H 19H C9H CDH 57H 1EH 3EH DFH D3H 61H CDH E9H 1AH CDH
1E80H=90H 1FH 3AH A2H BEH 4FH CDH 6BH 1AH 3AH A3H BEH 4FH CDH 77H 1AH
1E90H=2AH 53H BEH F9H 2AH 55H BEH E9H 3EH 9FH 32H 57H BEH C3H 75H 1EH
1EA0H=3EH 4AH C3H 9AH 1EH 3EH 29H C3H 9AH 1EH CDH E9H 1AH 21H 14H 38H
1EB0H=0EH 00H CDH D3H 19H CDH F0H 1AH C3H 78H 1EH CDH C4H 19H 21H 09H
1EC0H=38H 3EH FFH 32H 57H BEH CDH 5DH 1EH CDH F0H 1AH C3H 61H 19H CDH
1ED0H=C4H 19H 21H 66H 38H CDH 5DH 1EH C9H 32H 57H BEH CDH CFH 1EH CDH
1EE0H=F0H 1AH C9H CDH 11H 11H 3EH 99H CDH D9H 1EH C9H E5H CDH C4H 19H
1EF0H=0EH 7EH CDH 83H 1AH 0EH 00H 2AH 7FH BEH CDH 45H 1DH 0EH 05H 1EH
1F00H=7CH 06H 01H CDH 52H 1AH 3AH 8EH BEH 6FH 26H 00H 0EH 06H CDH 45H
1F10H=1DH E1H C9H CDH E9H 1AH 0EH FFH CDH 83H 1AH 21H 20H 38H 0EH 00H
1F20H=CDH D3H 19H CDH 3CH 1AH C9H CDH 13H 1FH CDH 75H 08H C9H CDH E9H
1F30H=1AH 21H 0EH 38H 0EH 00H CDH D3H 19H CDH 31H 1AH CDH F0H 1AH CAH
1F40H=78H 1EH E6H 3FH FEH 31H C8H FEH 2AH C8H C3H 98H 1EH CDH DEH 1AH
1F50H=21H FEH 37H 0EH 00H CDH D3H 19H 3EH FFH 32H A3H BEH 32H A2H BEH
1F60H=C9H CDH C9H 19H 3AH 4EH BEH B7H CAH 7DH 1FH 21H 25H 38H 0EH 00H
1F70H=CDH D3H 19H CDH F0H 1AH E6H 3FH FEH 31H C2H 61H 19H 21H 2CH 38H
1F80H=0EH 00H CDH D3H 19H CDH 3CH 1AH C9H DBH 18H E6H 01H C2H 4FH 01H
1F90H=CDH 1BH 1AH C9H DBH 18H E6H 01H CAH 3AH 19H CDH 26H 1AH C9H DBH
1FA0H=18H E6H 03H 0EH FEH C2H EDH 19H C3H F9H 19H DBH 54H E6H 40H C0H
1FB0H=C3H E2H 1FH 0EH 0FH CDH 81H 08H 16H 00H 06H 25H DBH 54H 4FH E6H
1FC0H=40H C0H B1H FAH BCH 1FH DBH 50H 77H 23H 71H 23H 14H 05H CAH E0H
1FD0H=1FH DBH 54H B7H F2H D1H 1FH DBH 54H B7H FAH BCH 1FH C3H D1H 1FH
1FE0H=37H C9H 21H 61H 19H E5H CDH C9H 19H 21H 51H 38H 0EH 00H CDH D3H
1FF0H=19H CDH 3CH 1AH 21H 16H BEH CDH B3H 1FH DAH A5H 1EH 21H 16H BFH
2000H=7EH 23H 23H 1FH DAH C9H 20H 1FH DAH 35H 22H 1FH DAH FCH 22H 1FH
2010H=DAH 7DH 21H C3H A5H 1EH 3EH 01H 32H 6FH BEH 0EH 04H CDH 6EH 20H
2020H=DAH A5H 1EH E5H 21H A0H 0FH CDH 56H 0DH D2H A0H 1EH EBH 22H 7FH
2030H=BEH E1H C9H 3EH 01H 32H 6FH BEH 0EH 02H CDH 6EH 20H DAH A5H 1EH
2040H=7BH FEH 20H D2H A0H 1EH C9H D5H 5EH 23H 7EH E6H 03H 57H B3H CAH
```

```
2050H=69H 20H EBH B7H 06H 00H CDH 4FH 0DH DAH 60H 20H 04H C3H 56H 20H
2060H=7CH B5H C2H A5H 1EH EBH 78H D1H C9H AFH 47H 37H D1H C9H 11H 00H
2070H=00H CDH 47H 20H 0DH CAH 97H 20H D2H 7FH 20H 23H C3H 71H 20H EBH
2080H=CDH 98H 00H 78H B5H 6FH EBH 79H B7H CAH 9CH 20H 23H CDH 47H 20H
2090H=DAH A5H 1EH 0DH C3H 7FH 20H D2H 7FH 20H 37H C9H 3AH 6FH BEH B7H
20A0H=C8H E5H 21H 06H BFH 36H FFH 23H 7AH CDH AFH 0DH E6H 0FH 77H 23H
20B0H=7AH E6H 0FH 77H 23H 7BH CDH AFH 0DH E6H 0FH 77H 23H 7BH E6H 0FH
20C0H=77H EBH CDH D1H 0DH EBH E1H B7H C9H 7AH FEH 23H C2H A5H 1EH 0EH
20D0H=BFH CDH 77H 1AH AFH 32H 70H BEH CDH 16H 20H E5H 2BH 2BH 7EH E6H
20E0H=04H E1H CDH B4H 0DH 17H E6H 80H 32H 58H BEH 23H 0EH 03H CDH 6EH
20F0H=20H DAH A5H 1EH E5H 21H 61H BFH E5H 21H F4H 01H CDH 56H 0DH D2H
2100H=A0H 1EH E1H 73H 23H 72H 23H EBH 22H 79H BEH EBH E3H 23H 5EH 23H
2110H=23H 56H 23H 7BH B2H CAH A5H 1EH EBH 22H 7DH BEH EBH E3H 73H 23H
2120H=72H E3H 23H 11H 50H BEH CDH 56H 0DH DAH 3EH 21H 0EH 03H CDH 6EH
2130H=20H DAH 3EH 21H 3EH 05H 32H 70H BEH E3H 23H C3H F8H 20H 21H 52H
2140H=BFH 0EH 03H CDH 6EH 20H DAH 73H 21H 3AH 70H BEH B7H C2H A5H 1EH
2150H=E1H 2AH 79H BEH CDH 56H 0DH DAH A5H 1EH 21H F4H 01H CDH 56H 0DH
2160H=D2H A5H 1EH EBH 22H 7BH BEH 3EH 07H 32H 70H BEH CDH 14H 2CH DAH
2170H=BBH 1EH C9H E1H 22H 87H BEH 21H 61H BFH C3H 98H 2EH 7AH FEH 23H
2180H=C2H A5H 1EH 0EH DEH CDH 77H 1AH CDH 47H 20H DAH A5H 1EH 32H 8CH
2190H=BEH 23H 23H 23H E5H 21H 61H BFH E3H AFH 32H 6FH BEH 0EH 02H CDH
21A0H=6EH 20H DAH 20H 22H 7BH B7H CAH A0H 1EH FEH 13H D2H A0H 1EH 7EH
21B0H=E6H 04H 32H 71H BEH 7BH C2H 16H 22H FEH 12H CAH C2H 21H C6H 12H
21C0H=27H 5FH 23H 0EH 01H CDH 47H 20H DAH A5H 1EH CDH 7FH 20H 7BH FEH
21D0H=60H D2H A5H 1EH 7EH E6H 04H 47H 3AH 71H BEH B0H CAH A5H 1EH 3AH
21E0H=71H BEH A0H C2H A5H 1EH EBH 22H 6AH BEH EBH 23H CDH 16H 20H 23H
21F0H=CDH 33H 20H E3H 77H 23H EBH 2AH 6AH BEH EBH 73H 23H 72H 23H EBH
2200H=2AH 7FH BEH EBH 73H 23H 72H 23H 11H 70H BFH CDH 56H 0DH E3H DAH
2210H=20H 22H 23H C3H 99H 21H FEH 12H DAH C2H 21H 1EH 00H C3H C2H 21H
2220H=E1H 2BH 1JH 61H BEH CDH 56H 0DH D2H A5H 1EH 22H 87H BEH EBH 22H
2230H=85H BEH C3H 15H 24H 7AH FEH 23H C2H A5H 1EH 0EH EFH CDH 77H 1AH
2240H=23H 23H CDH 33H 20H 32H 5DH BEH 23H 0EH 03H CDH 6EH 20H E5H 21H
2250H=F4H 01H CDH 56H 0DH D2H A0H 1EH BFH 21H 61H BFH E3H 0EH 0BH EBH 22H
2260H=59H BEH EBH 23H 0DH CAH 91H 22H 5EH 23H 7EH E6H 02H CAH 8CH 22H
2270H=23H 56H 23H E3H D5H EBH 2AH 59H BEH EBH 73H 23H 72H 23H D1H 73H
2280H=23H 72H 23H E3H EBH 2AH 59H BEH 23H C3H 5FH 22H 23H 23H C3H 84H
2290H=22H E3H 11H 61H BEH CDH 56H 0DH CAH A5H 1EH E3H 0EH 03H 23H 23H
22A0H=CDH 6EH 20H DAH EEH 22H 21H F4H 01H CDH 56H 0DH D2H A0H 1EH EBH
22B0H=22H 87H BEH D1H 21H 65H BEH CDH 56H 0DH C2H A5H 1EH 21H 61H BFH
22C0H=5EH 23H 56H 23H E5H EBH 22H 85H BEH CDH 60H 0EH DAH A5H 1EH E1H
22D0H=5EH 23H 56H EBH 22H 63H BEH 2AH 85H BEH 22H 59H BEH 23H 22H 85H
22E0H=BEH CDH 6FH 29H DAH BBH 1EH CDH 60H 0EH D8H C3H D7H 22H E1H 2BH
22F0H=22H 87H BEH 21H 61H BFH 22H 85H BEH C3H 3AH 29H 7AH FEH 24H C2H
2300H=A5H 1EH 0EH FEH CDH 77H 1AH E5H 21H 61H BFH E3H 3EH 01H 32H 6FH
2310H=BEH 0EH 03H CDH 6EH 20H DAH A5H 1EH E5H 21H F4H 01H CDH 56H 0DH
2320H=E1H D2H A0H 1EH EBH 22H 59H BEH EBH 3EH 01H 32H 5BH BEH 23H 0EH
2330H=04H CDH 6EH 20H DAH 58H 23H E5H 21H A0H 0EH CDH 56H 0DH E1H D2H
2340H=A0H 1EH E3H D5H EBH 2AH 59H BEH EBH 73H 23H 72H 3AH 5BH BEH 23H
2350H=77H 23H D1H 73H 23H 72H 23H E3H 3AH 5BH BEH 3CH FEH 09H 32H 5BH
2360H=BEH DAH 2EH 23H E1H 2BH 11H 61H BFH CDH 56H 0DH D2H A5H 1EH 22H
2370H=87H BEH EBH 22H 85H BEH C3H 41H 30H 0EH DFH CDH 77H 1AH 21H 16H
2380H=BFH 22H 85H BEH 21H ACH BFH 22H 87H BEH CDH 45H 0BH DAH 98H 1EH
2390H=21H 90H 23H 22H 55H BEH 21H 00H 00H 39H 22H 53H BEH CDH C4H 19H
23A0H=CDH 9CH 1CH DAH 98H 1EH FEH CDH 77H 1AH 21H 16H BFH 22H 87H BEH
23B0H=23H 22H 55H BEH 21H 00H 00H 39H 22H 53H BEH CDH C9H 19H CDH 25H
23C0H=1CH DAH 98H 1EH EBH 2AH 85H BEH 73H 23H EBH 2AH 6AH BEH EBH 73H
23D0H=23H 72H 23H EBH 2AH 7FH BEH EBH 73H 23H 72H 23H 22H 85H BEH FEH
23E0H=31H CAH 05H 24H FEH 2AH C2H 98H 1EH CDH 60H 0BH DAH 00H 24H FEH
23F0H=2AH C2H 98H 1EH CDH 60H 0EH CAH 05H 24H DAH 05H 24H C3H 90H 23H
2400H=FEH 31H C2H 98H 1EH CDH 27H 1FH 2AH 85H BEH 2BH 22H 87H BEH 2LH
2410H=16H BFH 22H 85H BEH CDH 44H 24H 32H 8CH BEH CDH 60H 0EH D8H 2AH
2420H=85H BEH 7EH 32H 8EH BEH 23H 5EH 23H 56H 23H EBH 22H 6AH BEH EBH
2430H=5EH 23H 56H 23H 22H 85H BEH EBH 22H 7FH BEH CDH 9EH 25H DAH BBH
2440H=1EH C3H 1BH 24H 3AH 8CH BEH FEH 08H DAH 5FH 24H CAH 68H 24H 3EH
2450H=02H 11H 12H 71H 21H A8H 71H 22H 77H BEH EBH 22H 75H BEH C9H 11H
2460H=15H 5EH 21H 71H 70H C3H 57H 24H 3EH 01H 11H 77H 70H 21H 0DH 71H
2470H=C3H 57H 24H 0EH DEH CDH 77H 1AH 21H 78H 24H 22H 55H BEH 21H 00H
2480H=00H 39H 22H 53H BEH CDH C9H 19H 0EH FFH CDH 83H 1AH E1H 37H 0CH
2490H=DAH 98H 1EH FEH 2AH C2H 98H 1EH 3AH 8CH BEH 32H 8DH BEH 11H 00H
24A0H=00H CDH ADH 26H DAH AAH 1EH 7EH E6H 07H 4FH 3AH 8CH BEH B9H C2H
24B0H=AAH 1EH E5H CDH C4H 19H 0EH FFH CDH 83H 1AH E1H 7EH 1FH 1FH 1FH
24C0H=E6H 1FH 32H 8EH BEH 23H 5EH 23H 56H 23H E5H EBH CDH F6H 0BH 3AH
24D0H=8CH BEH 6FH 26H 00H 0EH 00H CDH 45H 1DH E1H CDH F0H 1AH CAH 78H
24E0H=24H 5EH 23H 56H 23H EBH 22H 7FH BEH EBH CDH ECH 1EH CDH F0H 1AH
24F0H=CAH 78H 24H FEH 31H C8H 7EH E6H 07H 4FH 3AH 8CH BEH B9H C0H C3H
2500H=B2H 24H 0EH DEH CDH 77H 1AH 21H 07H 25H 22H 55H BEH 21H 00H 00H
```

```
2510H=39H 22H 53H BEH CDH C9H 19H CDH 37H 0CH DAH 50H 25H FEH 31H C2H
2520H=98H 1EH CDH 27H 1FH 11H 00H 00H CDH ADH 26H DAH AAH 1EH 3AH 8CH
2530H=BEH 4FH 7EH E6H 07H B9H C2H AAH 1EH E5H 23H 23H 23H 23H 23H 7EH
2540H=E6H 07H B9H CAH 3AH 25H C1H EBH 2AH 77H BEH EBH CDH 70H 0DH C9H
2550H=FEH 23H C2H 98H 1EH CDH 2EH 1FH FEH 31H C2H 98H 1EH CDH 27H 1FH
2560H=0EH 00H 21H 15H 5EH 11H ADH 71H CDH 53H 0EH C9H 21H 15H 5EH E5H
2570H=7EH B7H CAH 9BH 25H CDH B3H 26H D1H DAH 7DH 25H C8H CDH 56H 0DH
2580H=CAH 8EH 25H D2H 9CH 25H 2BH 2BH 2BH 2BH 2BH F6H 01H C9H 7EH B7H
2590H=CAH 86H 25H 23H 23H 23H 23H 23H C3H 8EH 25H E1H 37H C9H 2AH 77H
25A0H=BEH CDH F6H 26H 37H C0H E5H 3AH 8EH BEH 32H 8FH BEH 2AH 6AH BEH
25B0H=EBH 2AH 75H BEH CDH B3H 26H DAH ECH 25H CAH F0H 25H D1H E5H 4DH
25C0H=44H 03H 03H 03H 03H 03H CDH 70H 0DH E1H 3AH 8FH BEH 17H 17H 17H
25D0H=E6H F8H 4FH 3AH 8CH BEH B1H 77H 23H EBH 2AH 6AH BEH EBH 73H 23H
25E0H=72H 23H EBH 2AH 7FH BEH EBH 73H 23H 72H B7H C9H D1H C3H CAH 25H
25F0H=E5H 2AH 7FH BEH EBH 2AH 81H BEH CDH 56H 0DH E1H CAH 15H 26H 23H
2600H=23H 23H 23H 23H EBH 2AH 6AH BEH EBH CDH B3H 26H DAH ECH 25H C2H
2610H=BDH 25H C3H F0H 25H 3AH 8FH BEH 17H 17H 17H E6H F8H 4FH 7EH E6H
2620H=07H B1H 77H D1H C9H 7EH B7H 37H C8H E5H E6H 07H B9H C2H 36H 26H
2630H=CDH 7AH 26H CAH 50H 26H AFH 32H 50H BEH 23H 23H 23H 23H 23H 7EH
2640H=B7H CAH 88H 26H E6H 07H B9H CAH 6CH 26H DAH 72H 26H E1H 37H C9H
2650H=3AH 50H BEH B7H CAH 72H 26H 23H 23H 23H 23H 7EH E6H 07H B9H
2660H=C2H 4DH 26H CDH 7AH 26H DAH 4DH 26H C3H 72H 26H CDH 7AH 26H DAH
2670H=4DH 26H 3EH 01H 32H 50H BEH D1H B7H C9H D5H 23H 5EH 23H 56H 2BH
2680H=2BH E3H EBH CDH 56H 0DH E1H C9H E1H E5H 7EH E6H 07H B9H CAH A4H
2690H=26H DAH 4DH 26H 2AH 96H BEH 7EH E6H 07H B9H CAH 6CH 26H DAH 72H
26A0H=26H C3H 4DH 26H CDH 7AH 26H DAH 94H 26H C3H 4DH 26H CDH 25H 39H
26B0H=32H 8CH BEH 3AH 8CH BEH 4FH 7EH B7H CAH F2H 26H E6H 07H B9H CAH
26C0H=CBH 26H D0H 23H 23H 23H 23H 23H C3H B7H 26H D5H 7EH 1FH 1FH 1FH
26D0H=E6H 1FH 32H 8EH BEH 23H 5EH 23H 56H E3H CDH 56H 0DH EBH E1H DAH
26E0H=C5H 26H C2H EFH 26H E5H 23H 5EH 23H 56H EBH 22H 81H BEH E1H 2BH
26F0H=2BH C9H F6H 01H 37H C9H 0EH 06H AFH 2BH B6H C0H 0DH C2H F9H 26H
2700H=C9H 21H 00H 00H 22H 67H BEH CDH 63H 27H C2H 57H 27H EBH 21H 00H
2710H=00H 22H 67H BEH 2AH 59H BEH EBH 7EH 0EH 06H 1FH 0DH C2H 1BH 27H
2720H=E6H 03H BAH C2H 44H 27H 23H 4EH 23H 46H 23H 7EH BBH CAH 59H 27H
2730H=D2H 51H 27H 3EH 03H 23H 0BH CDH 69H 0DH CAH 57H 27H 3DH C2H 35H
2740H=27H C3H 2BH 27H D2H 57H 27H 3AH 5DH BEH 47H CDH 78H 27H C3H 0AH
2750H=27H C5H E3H 22H 67H BEH E1H 37H C9H 23H 0BH C5H E3H 22H 67H BEH
2760H=E1H AFH C9H 21H 00H 40H 3AH 5DH BEH 47H 7EH B7H CAH 81H 27H E6H
2770H=1FH B8H CAH A1H 27H D2H A2H 27H 23H 5EH 23H 56H 23H 19H C3H 6AH
2780H=27H E5H 23H B6H C2H 9CH 27H 23H B6H C2H 9CH 27H 11H 0CH 5EH CDH
2790H=56H 0DH E1H C2H A2H 27H F6H 01H 37H C3H A2H 27H E1H 7EH C3H 6FH
27A0H=27H AFH 22H 5FH BEH C9H E5H 21H 00H 40H 7EH B7H CAH C1H 27H 23H
27B0H=5EH 23H 56H 23H 19H 11H 0CH 5EH CDH 56H 0DH DAH D3H 27H C3H AAH
27C0H=27H E5H 23H B6H C2H D6H 27H 23H B6H C2H D6H 27H E1H 11H 06H 5EH
27D0H=CDH 56H 0DH EBH E1H C9H E1H C3H AFH 27H 2AH 61H BEH 0EH 04H CDH
27E0H=91H 1AH 2AH 63H BEH EBH 2AH 61H BEH 7DH A3H C2H F0H 27H 7CH A2H
27F0H=32H 65H BEH CAH 10H 1AH C3H 47H 1AH 3AH 65H BEH B7H C2H 0AH 28H
2800H=AFH 32H 65H BEH CDH 10H 1AH C3H 12H 28H 3EH FFH 32H 65H BEH CDH
2810H=47H 1AH CDH F0H 1AH CAH 90H 1EH E6H 3FH FEH 2AH C8H FEH 28H CAH
2820H=0AH 28H FEH 29H CAH 00H 28H FEH 14H C8H FEH 31H C2H 98H 1EH 37H
2830H=C9H 0EH EFH CDH 77H 1AH 21H 00H 00H 22H 59H BEH 21H 16H BFH 22H
2840H=85H BEH 11H ACH BFH 0EH FFH CDH 53H 0EH 22H 87H BEH 21H 4DH 28H
2850H=22H 55H BEH 21H 00H 00H 39H 22H 53H BEH CDH 5EH 29H DAH 98H 1EH
2860H=21H 60H 28H 22H 55H BEH 21H 00H 00H 39H 22H 53H BEH CDH C4H 19H
2870H=CDH 34H 1CH DAH 0DH 29H FEH 2AH C2H 98H 1EH 22H 59H BEH 21H 7EH
2880H=28H 22H 55H BEH 21H 00H 00H 39H 22H 53H BEH 21H 01H 00H 22H 61H
2890H=BEH 2EH 00H 22H 63H BEH CDH C9H 19H 2AH 59H BEH 0EH 00H CDH 45H
28A0H=1DH CDH 01H 27H DAH AEH 28H 5EH 23H 56H EBH 22H 63H BEH 0EH DFH
28B0H=CDH 83H 1AH CDH DAH 27H CDH F9H 27H DAH 98H 1EH FEH 14H CAH 60H
28C0H=28H 2AH 63H BEH EBH 2AH 61H BEH 3AH 65H BEH 4FH A5H 47H 7DH 2FH
28D0H=A3H B0H 5FH 79H A4H 47H 7CH 2FH A2H B0H 57H EBH 22H 63H BEH EBH
28E0H=B7H CDH 4CH 0EH 22H 61H BEH D2H B3H 28H 2AH 85H BEH EBH 2AH 59H
28F0H=BEH 7DH 12H 13H 7CH 12H 13H 2AH 63H BEH 7DH 12H 13H 7CH 12H 13H
2900H=EBH 22H 85H BEH CDH 60H 0EH DAH 2AH 29H C3H 60H 28H FEH 31H CAH
2910H=2AH 29H FEH 2AH C2H 98H 1EH 2AH 59H BEH 23H 11H F3H 01H CDH 56H
2920H=0DH DAH 98H 1EH 22H 59H BEH C3H 7EH 28H 2AH 85H BEH 2BH 22H 87H
2930H=BEH 21H 16H BFH 22H 85H BEH CDH 27H 1FH CBH 60H 0EH D8H 2AH 85H
2940H=BEH 5EH 23H 56H 23H EBH 22H 59H BEH EBH 5EH 23H 56H 23H 22H 85H
```

```
2950H=BEH EBH 22H 63H BEH CDH 6FH 29H DAH BBH 1EH C3H 3AH 29H CDH C9H
2960H=19H CDH 25H 1CH D8H FEH 2AH C2H 98H 1EH 7DH 32H 5DH BEH C9H CDH
2970H=01H 27H D2H AAH 29H CDH A6H 27H D8H EBH 01H 06H 00H 09H E5H 2AH
2980H=5FH BEH CDH 56H 0DH EBH D1H CAH B5H 29H 4DH 44H 03H 03H 03H E5H
2990H=CDH 70H 0DH 2AH 5FH BEH 23H 5EH 23H 56H E5H 21H 03H 00H 19H EBH
29A0H=E1H 72H 2BH 73H E1H 3AH 59H BEH 77H 23H 3AH 63H BEH 77H 23H 3AH
29B0H=64H BEH 77H B7H C9H 01H 06H 00H 09H 4DH 44H 2AH 5FH BEH CDH 70H
29C0H=0DH 2AH 5FH BEH 3AH 5DH BEH 4FH 3AH 5AH BEH 06H 06H 17H 05H C2H
29D0H=CDH 29H E6H C0H B1H 77H 23H 36H 03H 23H 36H 00H 23H C3H A5H 29H
29E0H=0EH EFH CDH 77H 1AH 21H E5H 29H 22H 55H BEH 21H 00H 00H 39H 22H
29F0H=53H BEH CDH AAH 2AH 21H F5H 29H 22H 55H BEH 21H 00H 00H 39H 22H
2A00H=53H BEH CDH C4H 19H CDH 34H 1CH DAH 97H 2AH FEH 2AH C2H 98H 1EH
2A10H=22H 59H BEH CDH 3CH 1AH CDH 01H 27H DAH AAH 1EH 2BH 22H 85H BEH
2A20H=23H EBH 2AH 67H BEH 19H 22H 87H BEH 3AH 5AH BEH 32H 8BH BEH CDH
2A30H=60H 0EH CAH 9DH 2AH DAH 9DH 2AH CDH C9H 19H 3AH 8BH BEH 57H 2AH
2A40H=85H BEH 5EH 23H 22H 85H BEH EBH 22H 59H BEH 0EH 00H CDH 45H 1DH
2A50H=21H 01H 00H 22H 61H BEH 2AH 85H BEH 5EH 23H 56H 23H 22H 85H BEH
2A60H=EBH 22H 63H BEH 0EH DFH CDH 83H 1AH CDH 31H 1AH CDH 73H 2AH D8H
2A70H=C3H F5H 29H CDH DAH 27H CDH F0H 1AH C8H E6H 3FH FEH 14H C8H FEH
2A80H=31H 37H C8H FEH 2AH C2H 98H 1EH 2AH 61H BEH B7H CDH 4CH 0EH 22H
2A90H=61H BEH D2H 73H 2AH B7H C9H FEH 31H C8H C3H 2FH 2AH 2AH 87H BEH
2AA0H=CDH 66H 27H C0H CDH C0H 2AH C3H 2FH 2AH CDH 5EH 29H DAH 98H 1EH
2AB0H=CDH 3CH 1AH CDH 63H 27H C2H AAH 1EH CDH C0H 2AH CDH 31H 1AH C9H
2AC0H=7EH 0EH 06H 1FH 0DH C2H C3H 2AH AAH 03H 32H 8BH BEH 23H 5EH 23H
2AD0H=56H 23H 22H 85H BEH 19H 22H 87H BEH C9H 0EH EFH CDH 77H 1AH 21H
2AE0H=FFH FFH 22H 59H BEH 21H E5H 2AH 22H 55H BEH 21H 00H 00H 39H 22H
2AF0H=53H BEH CDH 5EH 29H DAH 77H 2BH CDH B0H 2AH 21H FBH 2AH 22H 55H
2B00H=BEH 21H 00H 00H 39H 22H 53H BEH CDH C9H 19H CDH 34H 1CH DAH 42H
2B10H=2BH FEH 31H C2H 98H 1EH 22H 59H BEH CDH 27H 1FH CDH 01H 27H DAH
2B20H=AAH 1EH 2BH 22H 85H BEH EBH 2AH 5FH BEH 23H 4EH 23H 46H 0BH 0BH
2B30H=0BH 0BH 78H B1H CAH 52H 2BH 70H 2BH 71H EBH 4DH 44H 23H 23H C3H
2B40H=70H 2BH FEH 23H C2H 98H 1EH CDH 2EH 1FH FEH 31H C2H 98H 1EH CDH
2B50H=27H 1FH 2AH 5FH BEH 4DH 44H 23H 5EH 23H 56H 23H 19H 3AH 5AH BEH
2B60H=FEH FFH C2H 70H 2BH 3AH 5DH BEH 5FH 7EH E6H 1FH BBH CAH 57H 2BH
2B70H=11H 11H 5EH CDH 70H 0DH C9H FEH 23H C2H 98H 1EH CDH 2EH 1FH FEH
2B80H=31H C2H 98H 1EH CDH 27H 1FH 0EH 00H 21H 00H 40H 11H 11H 5EH CDH
2B90H=53H 0EH C9H 21H B1H 71H D5H 06H 00H 7EH FEH FFH CAH C6H 2BH E6H
2BA0H=0FH 57H 23H 5EH 2BH 3AH 6FH BEH FEH 03H CAH CFH 2BH E3H CDH 56H
2BB0H=0DH E3H CAH D2H 2BH D2H CCH 2BH 7EH E6H 40H 0EH 05H CAH C2H 2BH
2BC0H=0EH 07H 09H C3H 99H 2BH 23H BEH 2BH C2H 9FH 2BH D1H 37H C9H EBH
2BD0H=E3H EBH 3AH 6FH BEH B7H CAH B8H 2BH FEH 02H CAH 11H 2CH 7EH E6H
2BE0H=80H 32H 58H BEH 7EH CDH AFH 0DH E6H 03H 57H 7EH E6H 40H F5H 23H
2BF0H=23H 5EH EBH 22H 79H BEH EBH 23H 5EH 23H 56H EBH 22H 7DH BEH 2AH
2C00H=79H BEH EBH 23H F1H CAH 0CH 2CH 56H 23H 5EH 23H EBH 22H 7BH BEH
2C10H=EBH D1H B7H C9H CDH A8H 2DH D8H 01H 07H 00H 09H 22H 73H BEH 2AH
2C20H=7FH BEH EBH 3AH 70H BEH FEH 05H CAH 8DH 2CH AFH 32H 6FH BEH CDH
2C30H=93H 2BH 22H 71H BEH 06H 00H 3AH 70H BEH 4FH 09H 4DH 44H 2AH 73H
2C40H=BEH EBH 2AH 71H BEH CDH 70H 0DH 3AH 7AH BEH CDH B4H 0DH E6H 30H
2C50H=4FH 3AH 70H BEH D6H 05H CAH 5BH 2CH 3EH 40H B1H 4FH 3AH 58H BEH
2C60H=B1H 4FH 2AH 7FH BEH 7CH B1H EBH 2AH 71H BEH 77H 23H 73H 23H 3AH
2C70H=79H BEH 77H 23H EBH 2AH 7DH BEH EBH 73H 23H 72H 23H 3AH 70H BEH
2C80H=FEH 05H C8H EBH 2AH 7BH BEH EBH 72H 2BH 73H 23H C9H 3EH 02H 32H
2C90H=6FH BEH CDH 93H 2BH DAH 32H 2CH 22H 71H BEH 7EH E6H 40H C2H CFH
2CA0H=2CH 7EH CDH AFH 0DH E6H 03H 57H 23H 23H 5EH 23H 22H E1H BEH 2AH
2CB0H=79H BEH CDH 56H 0DH C2H DFH 2CH 2AH 7DH BEH EBH 2AH E1H BEH 7EH
2CC0H=B3H 77H 23H 7EH B2H 77H 2AH 71H BEH 3AH 58H BEH B6H 77H C9H 0EH
2CD0H=07H 06H 00H 09H EBH 2AH 7FH BEH EBH CDH 96H 2BH C3H 95H 2CH 2AH
2CE0H=71H BEH 0EH 05H C3H D1H 2CH 0EH BFH CDH 77H 1AH 21H ECH 2CH 22H
2CF0H=55H BEH 21H 00H 00H 39H 22H 53H BEH CDH C9H 19H CDH 9CH 1CH DAH
2D00H=27H 2DH FEH 31H C2H 98H 1EH E5H CDH 7FH D1H 3EH 02H 32H 6FH BEH
2D10H=BEH CDH 93H 2BH DAH AAH 1EH E5H AFH 32H 6FH BEH CDH 96H 2BH C1H
2D20H=11H BBH A2H CDH 70H 0DH C9H FEH 23H C2H 98H 1EH CDH 2EH 1FH FEH
2D30H=31H C2H 98H 1EH CDH 27H 1FH 0EH FFH 21H B1H 71H 11H BBH A2H CDH
2D40H=53H 0EH C9H CDH C9H 19H 0EH DFH CDH 83H 1AH 0EH 00H 2AH 59H BEH
2D50H=CDH 45H 1DH 0EH 06H 06H 02H 21H 11H 00H 22H 89H BEH CDH 09H 1CH
2D60H=DAH 8EH 2DH F5H 4DH 7DH B7H CAH A0H 1EH 21H 01H 00H 0DH CAH 77H
2D70H=2DH CDH 4CH 0EH C3H 6DH 2DH EBH 2AH 63H BEH 7DH B3H 6FH 7CH B2H
```

```
2D80H=67H 22H 63H BEH F1H FEH 31H C8H FEH 14H C8H C3H 53H 2DH FEH 31H
2D90H=C8H FEH 14H C8H FEH 2AH C8H FEH 23H C2H 98H 1EH 0EH 04H CDH 2EH
2DA0H=1FH 21H FFH FFH 22H 63H BEH C9H 21H B1H 71H 11H AEH A2H 06H 00H
2DB0H=7EH FEH FFH CAH C7H 2DH 0EH 05H E6H 40H CAH BFH 2DH 0EH 07H 09H
2DC0H=CDH 56H 0DH D8H C3H B0H 2DH 23H BEH 2BH C2H B6H 2DH C9H 0EH BFH
2DD0H=CDH 77H 1AH 21H 16H BFH 22H 85H BEH 21H ACH BFH 22H 87H BEH 21H
2DE0H=DFH 2DH 22H 55H BEH 21H 00H 00H 39H 22H 53H BEH CDH C9H 19H CDH
2DF0H=9CH 1CH DAH 98H 1EH FEH 2AH C2H 98H 1EH 22H 7FH BEH 21H FDH 2DH
2E00H=22H 55H BEH 21H 00H 00H 39H 22H 53H BEH CDH C9H 19H CDH ABH 1CH
2E10H=21H 00H 00H 22H 59H BEH 21H 16H 2EH 22H 55H BEH 21H 00H 00H 39H
2E20H=22H 53H BEH CDH C9H 19H CDH 34H 1CH DAH 71H 2EH FEH 2AH C2H 98H
2E30H=1EH 22H 59H BEH 21H 00H 00H 22H 63H BEH CDH 43H 2DH F5H 0EH FFH
2E40H=CDH 83H 1AH 2AH 63H BEH 7DH B4H CAH 82H 2EH F1H 2AH 59H BEH EBH
2E50H=2AH 85H BEH 73H 23H 72H 23H EBH 2AH 63H BEH EBH 73H 23H 72H 23H
2E60H=22H 85H BEH FEH 31H CAH 88H 2EH CDH 60H 0EH DAH 88H 2EH CDH C3H 16H
2E70H=2EH FEH 31H CAH 88H 2EH FEH 2AH C2H 98H 1EH 2AH 59H BEH 23H C3H
2E80H=31H 2EH F1H FEH 31H CAH 88H 2EH C3H 16H 2EH CDH 27H 1FH 2AH 85H
2E90H=BEH 2BH 22H 87H BEH 21H 16H BFH 22H 85H BEH 3EH 05H 32H 70H BEH
2EA0H=CDH 60H 0EH D8H 2AH 85H BEH 5EH 23H 56H 23H EBH 22H 79H BEH EBH
2EB0H=5EH 23H 56H 23H 22H 85H BEH EBH 22H 7DH BEH CDH 14H 2CH DAH BBH
2EC0H=1EH C3H A0H 2EH 0EH BEH CDH 77H 1AH 21H B1H 71H 22H E1H BEH 21H
2ED0H=CFH 2EH 22H 55H BEH 21H 00H 00H 39H 22H 53H BEH CDH 31H 1AH CDH
2EE0H=C9H 19H CDH 9CH 1CH DAH 84H 2FH FEH 2AH C2H 98H 1EH 22H 7FH BEH
2EF0H=CDH 3CH 1AH EBH 3EH 01H 32H 6FH BEH CDH 93H 2BH DAH AAH 1EH 22H
2F00H=E1H BEH 21H 02H 2FH 22H 55H BEH 21H 00H 00H 39H 22H 53H BEH CDH
2F10H=C4H 19H 0EH CFH CDH 83H 1AH 2AH 79H BEH 0EH 00H CDH 45H 1DH CDH
2F20H=CEH 1AH 21H 01H 00H 22H 73H BEH EBH 2AH 7DH BEH EBH 0EH 06H 7DH
2F30H=A3H C2H 39H 2FH 7CH A2H CAH 51H 2FH C4H 91H 1AH CDH 31H 1AH CDH
2F40H=F0H 1AH E6H 3FH FEH 31H C8H FEH 14H CAH 5BH 2FH FEH 2AH C2H 98H
2F50H=1EH 2AH 73H BEH B7H CDH 4CH 0EH D2H 25H 2FH 2AH 7BH BEH EBH 2AH
2F60H=79H BEH 23H 22H 79H BEH CDH 56H 0DH D2H 0FH 2FH 2AH 7FH BEH CDH
2F70H=3CH 1AH EBH 3EH 01H 32H 6FH BEH 2AH E1H BEH CDH 96H 2BH DAH CFH
2F80H=2EH C3H FFH 2EH FEH 31H C8H FEH 2AH C2H 98H 1EH 2AH E1H BEH 3EH
2F90H=03H 32H 6FH BEH CDH 96H 2BH D8H 22H E1H BEH EBH 22H 7FH BEH CDH
2FA0H=C9H 19H 0EH 00H 2AH 7FH BEH CDH 45H 1DH 0EH 7FH CDH 83H 1AH CDH
2FB0H=F0H 1AH CAH CFH 2EH E6H 3FH FEH 31H C8H FEH 2AH C2H 98H 1EH C3H
2FC0H=02H 2FH 0EH FEH CDH 77H 1AH 21H 16H BFH 22H 85H BEH 21H ACH BFH
2FD0H=22H 87H BEH 21H D3H 2FH 22H 55H BEH 21H 00H 00H 39H 22H 53H BEH
2FE0H=CDH 5DH 1CH DAH 6BH 30H FEH 2AH C2H 98H 1EH 21H EBH 2FH 22H 55H
2FF0H=BEH 21H 00H 00H 39H 22H 53H BEH CDH C9H 19H CDH 9CH 1CH DAH 98H
3000H=1EH FEH 2AH CAH 0BH 30H FEH 31H C2H 98H 1EH F5H E5H 2AH 59H BEH
3010H=EBH 2AH 85H BEH 73H 23H 72H 23H 3AH 5BH BEH 77H 23H D1H 73H 23H
3020H=72H 23H 22H 85H BEH CDH 60H 0EH DAH 73H 30H F1H FEH 2AH CAH D3H
3030H=2FH CDH 27H 1FH 2AH 85H BEH 2BH 22H 87H BEH 21H 16H BFH 22H 85H
3040H=BEH CDH 60H 0EH C8H D8H 2AH 85H BEH 5EH 23H 56H 23H EBH 22H 59H
3050H=BEH EBH 7EH 32H 5BH BEH 23H 5EH 23H 56H 23H 22H 85H BEH EBH 22H
3060H=7FH BEH CDH 65H 31H DAH AAH 1EH C3H 41H 30H FEH 31H C2H 98H 1EH
3070H=C3H 31H 30H F1H C3H 31H 30H 0EH FEH CDH 77H 1AH 21H BFH A2H 22H
3080H=85H BEH 21H 5EH B2H 22H 87H BEH 21H 88H 30H 22H 55H BEH 21H 00H
3090H=00H 39H 22H 53H BEH CDH 5DH 1CH DAH C6H 30H CDH 9EH 31H DAH AAH
30A0H=1EH 23H 23H 22H 85H BEH CDH C9H 19H 2AH 7FH BEH 0EH 00H CDH 45H
30B0H=1DH 0EH 7FH CDH 83H 1AH CDH F0H 1AH E6H 3FH FEH 2AH CAH 88H 30H
30C0H=FEH 31H C8H C3H 98H 1EH FEH 31H C8H FEH 2AH C2H 98H 1EH CDH 60H
30D0H=0EH D8H 2AH 85H BEH 5EH 23H 7EH B7H C8H E6H 03H 57H 7EH 1FH 1FH
30E0H=E6H 0FH 32H 5BH BEH EBH 22H 59H BEH EBH 23H 5EH 23H 56H 23H 22H
30F0H=85H BEH EBH 22H 7FH BEH CDH C9H 19H 0EH 00H 2AH 59H BEH CDH 45H
3100H=1DH 0EH BFH CDH 83H 1AH 0EH 07H 3AH 5BH BEH 6FH 26H 00H CDH 45H
3110H=1DH CDH F0H 1AH C3H A6H 30H 0EH FEH CDH 77H 1AH 21H 1CH 31H 22H
3120H=55H BEH 21H 00H 00H 39H 22H 53H BEH CDH 5DH 1CH DAH 4CH 31H FEH
3130H=31H C2H 98H 1EH CDH 9EH 31H DAH AAH 1EH E5H CDH 27H 1FH E1H 4DH
3140H=44H 23H 23H 23H 23H 11H 62H B2H CDH 70H 0DH C9H FEH 23H C2H 98H
3150H=1EH CDH 2EH 1FH FEH 31H C2H 98H 1EH 0EH 00H 21H BFH A2H 11H 62H
3160H=B2H CDH 53H 0EH C9H 2AH 7FH BEH E5H CDH 9EH 31H D2H 83H 31H E5H
3170H=CDH E1H 31H C2H 9AH 31H EBH E1H E5H 4DH 44H 03H 03H 03H 03H CDH
3180H=70H 0DH E1H 3AH 5BH BEH 17H 17H E6H 3CH EBH 2AH 59H BEH B4H EBH
3190H=73H 23H 77H D1H 23H 73H 23H 72H B7H C2H E1H D1H 37H C9H 2AH 59H
31A0H=BEH 3AH 5BH BEH 4FH E5H 21H BFH A2H 5EH 23H 7EH B7H CAH DDH 31H
31B0H=E6H 03H 57H E3H CDH 56H 0DH E3H CAH C4H 31H D2H DDH 3LH 23H 23H
31C0H=23H 23H 1FH 7EH 1FH 1FH E6H 0FH B9H DAH BEH 31H C2H DDH 31H
31D0H=E5H 23H 5EH 23H 56H EBH 22H 7FH BEH E1H 2BH D1H C9H 2BH D1H 37H
31E0H=C9H 21H 5AH B2H 0EH 04H AFH B6H C0H 0DH C8H 23H C3H E7H 31H 21H
31F0H=74H B2H 7EH FEH FFH C2H 05H 32H 2AH 6AH BEH CDH 6AH 32H DAH 07H
3200H=32H C8H C3H 0CH 32H 37H C9H 73H 23H 72H B7H C9H D5H E5H 11H 73H
3210H=B2H 4DH 44H 03H 03H CDH 70H 0DH E1H D1H C3H 07H 32H 0EH 7FH CDH
3220H=77H 1AH 21H 22H 32H 22H 55H BEH 21H 00H 00H 39H 22H 53H BEH CDH
```

```
3230H=C9H 19H CDH 7CH 0BH DAH 51H 32H FEH 31H C2H 98H 1EH CDH 6AH 32H
3240H=DAH AAH 1EH C2H AAH 1EH 40H 44H 23H 23H 11H 77H B2H CDH 70H 0DH
3250H=C9H FEH 23H C2H 98H 1EH CDH 2EH 1FH FEH 31H C2H 98H 1EH 0EH FFH
3260H=21H 66H B2H 11H 77H B2H CDH 53H 0EH C9H E5H 21H 66H B2H 7EH FEH
3270H=FFH CAH 88H 32H 5FH 23H 56H 2BH E3H CDH 56H 0DH E3H CAH 88H 32H
3280H=D2H 8BH 32H 23H 23H C3H 6EH 32H D1H 37H C9H D1H 37H 3FH C9H 0EH
3290H=7FH CDH 77H 1AH CDH C9H 19H 21H 66H B2H 7EH FEH FFH CAH AAH 1EH
32A0H=5FH 23H 56H 23H 22H 71H BEH EBH CDH F6H 0BH CDH F0H 1AH E6H 3FH
32B0H=FEH 31H C8H CDH C9H 19H 2AH 71H BEH 7EH FEH FFH C8H C3H A0H 32H
32C0H=0EH 7FH CDH 77H 1AH 21H C5H 32H 22H 55H BEH 21H 00H 00H 39H 22H
32D0H=53H BEH CDH C9H 19H CDH 7CH 0BH DAH 98H 1EH FEH 31H C2H 98H 1EH
32E0H=22H 6AH BEH CDH EFH 31H DAH BBH 1EH C9H 2AH 6DH BEH 7EH FEH FFH
32F0H=C8H 5FH 23H 56H E5H 2AH 82H B2H CDH 56H 0DH CAH 08H 33H D2H 27H
3300H=33H 3AH 6CH BEH B7H C2H 27H 33H CDH 2DH 33H E1H 23H 7EH FEH FFH
3310H=CAH 1BH 33H 22H 6DH BEH AFH 32H 6CH BEH C9H 21H 66H B2H 22H 6DH
3320H=BEH 3EH 01H 32H 6CH BEH C9H E1H AFH 32H 6CH BEH C9H 0EH FFH 21H
3330H=20H BBH 11H 41H BEH CDH 53H 0EH 0EH 00H 21H 6EH B6H 11H 57H BAH
3340H=CDH 53H 0EH C9H 3AH 81H B2H B7H CAH 5CH 33H 2AH 82H B2H CDH 6AH
3350H=32H DAH 5CH 33H AFH 32H 6CH BEH 22H 6DH BEH C9H 21H 66H B2H 22H
3360H=6DH BEH 3EH 01H 32H 6CH BEH C9H 2AH 59H BEH 29H 11H 6EH B6H 19H
3370H=EBH 2AH 7DH BEH EBH 7EH B3H 77H 23H 7EH B2H 72H CDH 58H 34H DAH
3380H=97H 33H 3AH 93H BEH B7H F2H 8BH 33H F6H 0AH CDH B4H 0DH E6H F0H
3390H=47H 7EH E6H 0FH B0H 77H C9H 11H 40H BEH EBH CDH 56H 0DH D0H 2AH
33A0H=7FH BEH EBH 73H 23H 72H C3H 82H 33H CDH FDH CDH 77H 1AH 21H 21H
33B0H=BBH 7EH 2BH FEH FFH CAH AAH 1EH E5H CDH C4H 19H 0EH 7FH CDH 83H
33C0H=1AH E1H 5EH 23H 7EH FEH FFH C8H E6H 0FH 57H E5H EBH 0EH 00H CDH
33D0H=45H 1DH 0EH 05H 21H 49H 38H CDH D3H 19H E1H 7EH CDH AFH 0DH E6H
33E0H=0FH 23H E5H FEH 0AH D2H FAH 33H 6FH 26H 00H 0EH 06H CDH 45H 1DH
33F0H=CDH F0H 1AH FEH 31H E1H C8H C3H B8H 33H CAH 03H 34H CDH 47H 1AH
3400H=C3H F0H 33H CDH 10H 1AH C3H F0H 33H 0EH FDH CDH 77H 1AH CDH 2EH
3410H=1FH FEH 31H C2H 98H 1EH CDH 27H 1FH C3H 2DH 33H CDH 13H 1FH 21H
3420H=84H B2H 22H 85H B2H BEH 21H 6BH B6H 22H 87H BEH CDH 3FH 12H D5H CDH
3430H=C4H 19H CDH 31H 1AH E1H 0EH 00H CDH 45H 1DH CDH F0H 1AH 3AH A4H
3440H=BEH B7H C8H CDH C4H 19H 2AH A5H BEH CDH F6H 0BH 3AH A4H BEH 0EH
3450H=00H CDH 5EH 1AH CDH F0H 1AH C9H 2AH 7FH BEH E5H 21H 20H BBH 5EH
3460H=23H 7EH FEH FFH CAH 76H 34H E6H 0FH 57H E3H CDH 56H 0DH CAH 7AH
3470H=34H E3H 23H C3H 5FH 34H 2BH 37H D1H C9H E1H 7EH CDH AFH 0DH E6H
3480H=0FH 32H 69H BEH C9H 0EH DFH CDH 77H 1AH CDH C9H 19H 3AH 58H BAH
3490H=B7H CAH AAH 1EH 0EH 00H CDH 5EH 1AH 2AH 59H BAH CDH F6H 0BH CDH
34A0H=F0H 1AH C9H EBH E5H 0EH 00H CDH 45H 1DH E1H CDH F0H 1AH FEH 31H
34B0H=37H C8H EBH CDH 34H 12H DAH BCH 34H C3H A3H 34H B7H C9H 0EH EFH
34C0H=CDH 83H 1AH CDH C9H 19H 3AH 49H BEH 1FH DCH 35H 35H D8H 3AH 49H
34D0H=BEH 1FH 1FH DAH 49H 35H 21H 59H 38H 0EH 00H CDH D3H 19H CDH F0H
34E0H=1AH FEH 31H C8H 21H 00H 00H 22H 59H BEH 21H EAH 34H 22H 55H BEH
34F0H=21H 00H 00H 39H 22H 53H BEH CDH C4H 19H CDH 34H 1CH DAH 6BH 35H
3500H=FEH 31H C8H 22H 59H BEH CDH C9H 19H 2AH 59H BEH 0EH 00H CDH 45H
3510H=1DH 21H 01H 00H 22H 61H BEH 2AH 59H BEH 29H 11H 84H B2H 19H 5EH
3520H=23H 56H EBH 22H 63H BEH 0EH DFH CDH 83H 1AH CDH 31H 1AH CDH 73H
3530H=2AH D8H C3H EAH 34H 21H 77H 38H 0EH 00H CDH D3H 19H CDH F0H 1AH
3540H=FEH 31H 37H C8H CDH C9H 19H AFH C9H 21H DEH BAH 3EH 3FH 32H 89H
3550H=BEH CDH 09H 12H DAH D6H 34H D5H 21H 1BH 38H 0EH 04H CDH D3H 19H
3560H=D1H CDH A3H 34H D8H CDH C9H 19H C3H E4H 34H FEH 31H C8H FEH 2AH
3570H=C2H 98H 1EH 2AH 59H BEH 23H 11H F4H 01H CDH 56H 0DH DAH A0H 1EH
3580H=C3H 03H 35H CDH 54H 36H CDH C9H 19H 21H 7CH 38H 0EH 00H CDH D3H
3590H=19H CDH F0H 1AH CDH 54H 36H 21H 97H 35H 22H 55H BEH 21H 00H 00H
35A0H=39H 22H 53H BEH CDH C4H 19H CDH 54H 36H CDH 34H 1CH DAH 98H 1EH
35B0H=FEH 2AH C2H 98H 1EH 22H 59H BEH E5H CDH C9H 19H CDH 3CH 1AH E1H
35C0H=0EH 00H CDH 45H 1DH 3EH 05H 32H 48H BEH 3EH 03H 32H D5H BEH 21H
35D0H=F1H BEH 36H 69H 23H 36H 00H CDH 2AH 07H DAH 47H 36H 5EH 23H 56H
35E0H=D5H 01H 84H B2H 2AH 59H BEH 29H 09H 5EH 23H 56H E1H 22H 63H BEH
35F0H=CDH 56H 0DH 21H 34H 38H C2H 7EH 35H 21H 59H 38H 0EH 04H CDH D3H
3600H=19H CDH 31H 1AH CDH F0H 1AH E6H 3FH CDH 54H 36H FEH 14H CAH 97H
3610H=35H FEH 1CH CAH 2BH 36H FEH 2AH C2H 98H 1EH 2AH 59H BEH 23H 11H
3620H=F3H 01H CDH 56H 0DH DAH 97H 35H C3H B5H 35H CDH C4H 19H 2AH 59H
3630H=BEH 0EH 00H CDH 45H 1DH 21H 01H 00H 22H 61H BEH 0EH DFH CDH 83H
3640H=1AH CDH 73H 2AH C3H 97H 35H 3AH D5H BEH 3DH C2H CCH 35H 21H 1BH
3650H=38H C3H FCH 35H F5H DBH 18H E6H 02H C2H 61H 19H F1H C9H 0EH EFH
3660H=CDH 77H 1AH 21H 63H 36H 22H 55H BEH 21H 00H 00H 39H 22H 53H BEH
3670H=CDH C9H 19H CDH 25H 1CH DAH 98H 1EH FEH 31H C2H 98H 1EH 7DH 32H
3680H=5DH BEH CDH B0H 2AH CDH 27H 1FH 3EH 05H 32H 48H BEH 3AH 5DH BEH
3690H=32H A1H BEH CDH 3DH 17H C9H 0EH BFH CDH 77H 1AH 21H 9CH 36H 22H
36A0H=55H BEH 21H 00H 00H 39H 22H 53H BEH CDH C9H 19H CDH 9CH 1CH DAH
36B0H=98H 1EH FEH 2AH C2H 98H 1EH 22H 7FH BEH 3EH 01H 32H 6FH BEH EBH
36C0H=CDH 93H 2BH DAH AAH 1EH 21H C6H 36H 22H 55H BEH 21H 00H 00H 39H
36D0H=22H 53H BEH CDH C9H 19H 0EH 00H 2AH 7FH BEH CDH 45H 1DH 0EH 05H
36E0H=21H 49H 38H CDH D3H 19H 06H 01H 0EH 07H CDH 1DH 1BH F5H 7EH FEH
```

```
36F0H=FFH CAH 16H 37H F1H D2H 98H 1EH EBH CDH D1H 0DH 7DH FEH 20H D2H
3700H=A0H 1EH 32H 93H BEH CDH 27H 1FH 3EH 05H 32H 48H BEH 3EH 01H 32H
3710H=4FH BEH CDH 9AH 15H C9H F1H FEH 28H CAH 22H 37H FEH 29H C2H 98H
3720H=1EH AFH 32H 65H BEH CDH F9H 27H D2H 98H 1EH 3AH 65H BEH E6H 01H
3730H=F6H 80H C3H 02H 37H 21H 35H 37H 22H 55H BEH 21H 00H 00H 39H 22H
3740H=53H BEH CDH C9H 19H CDH 34H 1CH FEH 2AH C2H 98H 1EH 22H 59H BEH
3750H=21H 50H 37H 22H 55H BEH 21H 00H 00H 39H 22H 53H BEH CDH C9H 19H
3760H=2AH 59H BEH 0EH 00H CDH 45H 1DH 0EH DFH CDH 83H 1AH 0EH 06H 06H
3770H=02H 21H 11H 00H 22H 89H BEH CDH 09H 1CH DAH 98H 1EH FEH 28H CAH
3780H=8AH 37H FEH 29H CAH F0H 37H C3H 98H 1EH 3EH FFH 32H 65H BEH 7DH
3790H=B7H CAH A0H 1EH 32H 71H BEH CDH F9H 27H D2H 98H 1EH CDH 27H 1FH
37A0H=3AH 71H BEH 32H F2H BEH 0EH F0H 3AH 65H BEH B7H C4H F4H 37H 79H
37B0H=32H F1H BEH 3EH 05H 32H 48H BEH CDH 22H 07H CDH BEH 05H 21H 01H
37C0H=00H B7H 3AH 71H BEH 5FH 1DH CAH D0H 37H CDH 4CH 0EH C3H C6H 37H
37D0H=E5H 2AH 59H BEH 29H 11H 84H B2H 19H 3AH 65H BEH 5FH C1H 78H A3H
37E0H=57H 79H A3H 5FH 79H 2FH A6H B3H 77H 23H 78H 2FH A6H B2H 77H C9H
37F0H=AFH CAH 8CH 37H 0EH E1H C9H 68H FAH FAH 3AH FAH 7BH 61H ECH 68H
3800H=88H 1AH 19H 61H C8H FAH BFH 7BH 61H E8H 1CH 7CH 7CH 61H 88H 7CH
3810H=7CH FFH CAH 61H BAH 3AH 78H FBH BFH BAH 61H E8H 88H 9FH 7CH 61H
3820H=38H 1CH 29H 19H 61H 78H 88H C8H 68H FBH CAH 61H 78H 88H C8H 68H
3830H=FBH 3AH BAH 61H ECH 7CH 19H 61H 38H 88H 1AH FBH 78H 88H C8H 68H
3840H=61H BAH 3AH FBH 78H 88H C8H 68H 61H 7CH 7BH 61H FFH 1AH 88H 19H
3850H=61H 6CH 88H ECH 1AH FBH BFH BAH 61H 09H 3AH 3AH 1AH 61H E8H 88H
3860H=9FH 7CH 1CH ECH 68H 61H E8H 88H 9FH 7CH 7BH 61H 0CH 9FH 4AH 0BH
3870H=99H 29H 28H 8FH 08H 89H 61H 7CH 9FH 8CH 68H 61H 78H 68H 29H 78H
3880H=61H 1AH 68H EBH 9FH 8CH 68H 61H 78H ECH 88H C8H 61H BAH 3AH FBH
3890H=C8H FAH BFH BAH 78H 61H 00H 00H 00H CDH C4H 19H 21H 8DH 38H C3H
38A0H=C1H 1EH 00H 00H FFH FFH FFH FFH FFH FFH FFH FFH FFH FFH FFH FFH
38B0H=FFH FFH FFH FFH FFH FFH FFH FFH FFH FFH FFH FFH FFH FFH FFH FFH
38C0H=00H 00H 00H 04H 00H 00H 00H 00H 00H 00H 00H 00H 00H 00H 00H 00H
38D0H=00H 00H 00H 00H 00H 00H 00H 00H 00H 00H 00H 00H 00H 00H 00H 00H
38E0H=00H 00H 00H 00H 00H 00H 00H 00H 00H 00H 00H 00H 00H 00H 00H 00H
38F0H=00H 00H 00H 00H 00H 00H 00H 00H 00H 00H 00H 00H 00H 00H 00H 00H
3900H=C5H 01H 70H 17H 0BH 78H 81H CAH 15H 39H DBH 4CH E6H 01H C2H 04H
3910H=39H C1H C3H 59H 09H C1H C3H 7CH 09H 22H 9FH BEH 2AH 59H BEH C3H
3920H=C4H 17H FFH FFH FFH D5H CDH 44H 24H D1H C9H 01H C8H 00H CDH C9H
3930H=05H 06H 54H C3H E8H 06H FFH FFH FFH FFH FFH FFH FFH FFH FFH FFH
3940H=00H 00H 00H 00H 00H 00H 00H 00H 00H 00H 00H 00H 00H 00H 00H 00H
3950H=00H 00H 00H 00H 00H 00H 00H 00H 00H 00H 00H 00H 00H 00H 00H 00H
3960H=00H 00H 00H 00H 00H 00H 00H 00H 00H 00H 00H 00H 00H 00H 00H 00H
3970H=00H 00H 00H 00H 00H 00H 00H 00H 00H 00H 00H 00H 00H 00H 00H 00H
```

3980 through 3FFF is presently unused and is reserved for possible future use.

What is claimed is:

1. In a control arrangement having apparatus at plural locations permitting non-interfering asynchronously initiated digital data communication between plural apparatus via a common data communication link, said apparatus being situated at each of said plural locations, a method for communicating among said plural locations comprising the steps of:

monitoring, by access means, the busy or free status of said communication link, inhibiting initial access thereto from an apparatus unless a free status exists, serially transmitting, by data transmitting means within an apparatus, digital binary bit information conveying width modulated pulses of electrical signals having first and second states onto said communications link as desired only if said communication link is in free status as monitored by said access means, one of said first and second states being dominant when transmitted on said link even it simultaneous transmission of the other state on the same link is attempted from another remote location, where the two binary values are represented by different pulse widths occurring as required to represent desired data values within successive bit cells or time periods, monitoring, by arbitration means, the existence of said first and second states on the link during the time required for the transmission of each binary bit of information, comparing the state value then being transmitted from its respective remote location with the state value then existing on said link; and inhibiting further transmission of data onto said link by its respective said data transmission means is there is a difference between the value then being transmitted and the actual state then existing thus eventually leaving only one apparatus transmitting on said link.

2. A method according to claim 1 wherein said step of comparing includes comparing the impedance state value then being transmitted from its respective remote location with the impedance state value then existing on said link.

3. In a programmable system for controlling plural distributed electrical loads including plural relays, each connected to control a respectively corresponding one of said plural distributed electrical loads; plural remotely located transceiver decoder circuits all connected in common to a data link for controlling a predetermined sub-set of relays in response to received data signals and for transmitting data signals relating to such control onto said data link; and a programmable central controller connected to provide said received data signal to each of said transceiver decoders via said data link; a method for arbitrating conflicting communication among said plural remotely located transceiver decoder circuits comprising the steps of:

monitoring, by access means at each transceiver decoder, the busy or free status of said data line;

inhibiting initial transmitting access thereto from the respectively associated transceiver decoder unless a free status exists, serially transmitting, by data transmitting means within each transceiver decoder, digital binary bit information conveying width modulated pulses of electrical signals having first and second states onto said data link as desired only if permitted by said access means, one of said first and second states being dominant when transmitted on said link even if simultaneous transmission of the other state on the link is attempted by another transceiver decoder, where the two binary values are represented by different pulse widths occurring as required to represent desired data values within successive bit cells or time periods;

monitoring, by arbitration means at each transceiver decoder site, the existence of said first and second states on the link during the time required for the transmission of each binary bit of information, comparing the state value then being transmitted from its respective transceiver decoder with the state value then existing on said link, and inhibiting further transmission of data onto said link by its respective said data transmission means if there is a difference between the value then being transmitted and the actual state then existing thus eventually leaving only one transceiver decoder in communication on said link by its respective said data transmission means and doing so without interferring with communication from said one transceiver decoder.

4. A method according to claim 3 wherein said step of comparing includes comparing the impedance state value being transmitted from its respective transceiver decoder with the impedance state value then existing on said link.

5. In programmable system for controlling plural distributed electrical loads including plural relays, each connected to control a respectively corresponding one of said plural distributed electrical loads; plural remotely located transceiver decoder circuits all connected in common to a data link for controlling a predetermined sub-set of said relays in response to received data signals and for transmitting data signal relating to such control onto said data link; and a programmable central controller for normally controlling said relays in at least one preprogrammed time-dependent sequence, said controller connected to provide said received data signals to each of said transceiver decoders via said data link; a method for arbitrating conflicting communication among said plural remotely located transceiver decoder circuits comprising the steps of:

monitoring, by access means at each transceiver decoder, the busy or free status of said data line, inhibiting initial transmitting access thereto from the respectively associated transceiver decoder unless a free status exists, serially transmitting, by data transmitting means within each transceiver decoder, digital binary bit information conveying width modulated pulses of electrical signals having first and second states onto said data link as desired only if permitted by said access means, one of said first and second states being dominant when transmitted on said link even if simultaneous transmission of the other state on the link is attempted by another transceiver decoder, where the two binary values are represented by different pulse widths occurring as required to represent desired data values within successive bit cells of time periods;

monitoring, by arbitration means at each transceiver decoder site, the existence of said first and second states on the link during the time required for the transmission of each binary bit of information, comparing the state value then being transmitted from its respective transceiver decoder with the state value then existing on said link; and inhibiting further transmission of data onto said link by its respective said data transmission means if there is a difference between the value then being transmitted and the actual state then existing thus eventually leaving only one transceiver decoder in communication on said link and doing so without interfering with the communication from said one transceiver decoder.

6. In a control arrangement having apparatus at plural remote locations permitting non-interfering randomly occurring digital data communcation between plural remote locations via a common data communication link, said apparatus being situated at each of said plural remote locations, a method for arbitrating conflicting communications along said plural apparatus comprising the steps of:

serially transmitting, by data transmitting means, digital binary bit information conveying signals having first and second states onto said communications link as desired, one of said first and second states being dominant when transmitted on said link even if simultaneous transmission of the other state on the same link is attempted from another remote location, said signals being width modulated pulses of electrical signals where the two binary values are represented by different pulse widths in said first state as required to represent desired data values within successive bit cells or time periods, each such width modulated pulse being separated from the next such pulse by a period of said second state, said period of said second state providing said apparatus at each of said plural locations time to process the preceding information bit, monitoring, by arbitration means, the existence of said first and second states on the link during the time required for the transmission of each binary bit of information, comparing the state value then being transmitted from its respective remote location with the state value then existing on said link, and inhibiting further transmission of data onto said link by its respective said data transmission means is there is a difference thus eventually leaving only one remote location in communication on said link and doing so without interfering with the communication from said one remote location.

7. A method according to claim 6 further including the steps of:

monitoring by access means the busy or free status of said communication link; and inhibiting initial access thereto from a remote location unless a free status exists.

8. A method according to claim 6 wherein said step of serially transmitting includes serially transmitting width modulated pulses wherein said period of said second state is of a fixed duration thereby making the total time required to transmit a binary bit of information vary as a function of the information value being transmitted.

9. A method according to claim 6 wherein said step of comparing includes comparing the impedance state value then being transmitted from its respective remote location with the impedance state value then existing on said link.

* * * * *